United States Patent [19]

Nakatsu et al.

[11] Patent Number: 5,684,652

[45] Date of Patent: Nov. 4, 1997

[54] ROTARY MAGNETIC HEAD DEVICE USING PLURAL MAGNETS AND COILS TO POSITION PLURAL MAGNETIC HEADS

[75] Inventors: Kimihide Nakatsu; Kazuo Mori; Tetsuya Shigeeda; Kazuyuki Kokubo; Norihiro Yonezawa, all of Nagaokakyo, Japan

[73] Assignee: Mitsubishi Denki Kabushiki Kaisha, Tokyo, Japan

[21] Appl. No.: 465,011

[22] Filed: Jun. 5, 1995

Related U.S. Application Data

[62] Division of Ser. No. 92,691, Jul. 16, 1993, Pat. No. 5,502,606.

[30] Foreign Application Priority Data

| Jul. 17, 1992 | [JP] | Japan | 4-190881 |
| Jul. 17, 1992 | [JP] | Japan | 4-190882 |
| Dec. 25, 1992 | [JP] | Japan | 4-359166 |
| Jan. 20, 1993 | [JP] | Japan | 5-007286 |
| Apr. 21, 1993 | [JP] | Japan | 5-094356 |
| May 20, 1993 | [JP] | Japan | 5-118470 |
| Jun. 14, 1993 | [JP] | Japan | 5-142030 |
| Jun. 14, 1993 | [JP] | Japan | 5-142031 |
| Jul. 15, 1993 | [JP] | Japan | 5-175366 |

[51] Int. Cl.⁶ .................................. G11B 5/592
[52] U.S. Cl. .......................... 360/77.16; 360/107
[58] Field of Search .................. 360/75, 77.13, 360/77.16, 107, 109

[56] References Cited

U.S. PATENT DOCUMENTS

| 4,882,635 | 11/1989 | Sanai . | |
| 4,930,030 | 5/1990 | Yabu et al. . | |
| 4,985,794 | 1/1991 | Kato et al. | 360/107 |
| 5,157,563 | 10/1992 | Nagasawa et al. . | |
| 5,182,683 | 1/1993 | Mitsuhashi | 360/77.16 |
| 5,227,937 | 7/1993 | Magnussan et al. . | |
| 5,247,404 | 9/1993 | Takeda | 360/77.16 |
| 5,343,342 | 8/1994 | Kanagawa et al. | 360/77.16 |

FOREIGN PATENT DOCUMENTS

| 463883 | 1/1992 | European Pat. Off. | 360/77.16 |
| 58-215488 | 12/1983 | Japan . | |
| 59-104722 | 6/1984 | Japan | 360/77.16 |
| 61-055173 | 3/1986 | Japan . | |
| 3-224114 | 10/1991 | Japan | 360/77.16 |
| 4-255906 | 9/1992 | Japan | 360/77.16 |
| 4-368607 | 12/1992 | Japan | 360/77.16 |
| 5-81629 | 4/1993 | Japan | 360/77.16 |

*Primary Examiner*—Aristotelis M. Psitos
*Assistant Examiner*—James L. Habermehl

[57] ABSTRACT

A rotary magnetic head device has a plurality of bobbins to which coils are respectively fixedly attached, and a place spring fixedly attached to the bobbins. The plate spring has a plurality of front ends to which magnetic heads are respectively fixed. The magnetic heads are held in such a manner that, when a current is selectively supplied to one or more of the coils, the respective one or more of the magnetic heads independently moves in the axial direction. A rotary magnetic head device has a head supporting base plate, and a head supporting table which is tilted by an angle with respect to the head supporting base plate. The tilt angle is adjusted by moving the head supporting table. In a rotary magnetic head device, the position in the axial direction of a magnetic head is detected, and the level of a current to be supplied to a coil is adjusted on the basis of the detection result.

2 Claims, 120 Drawing Sheets

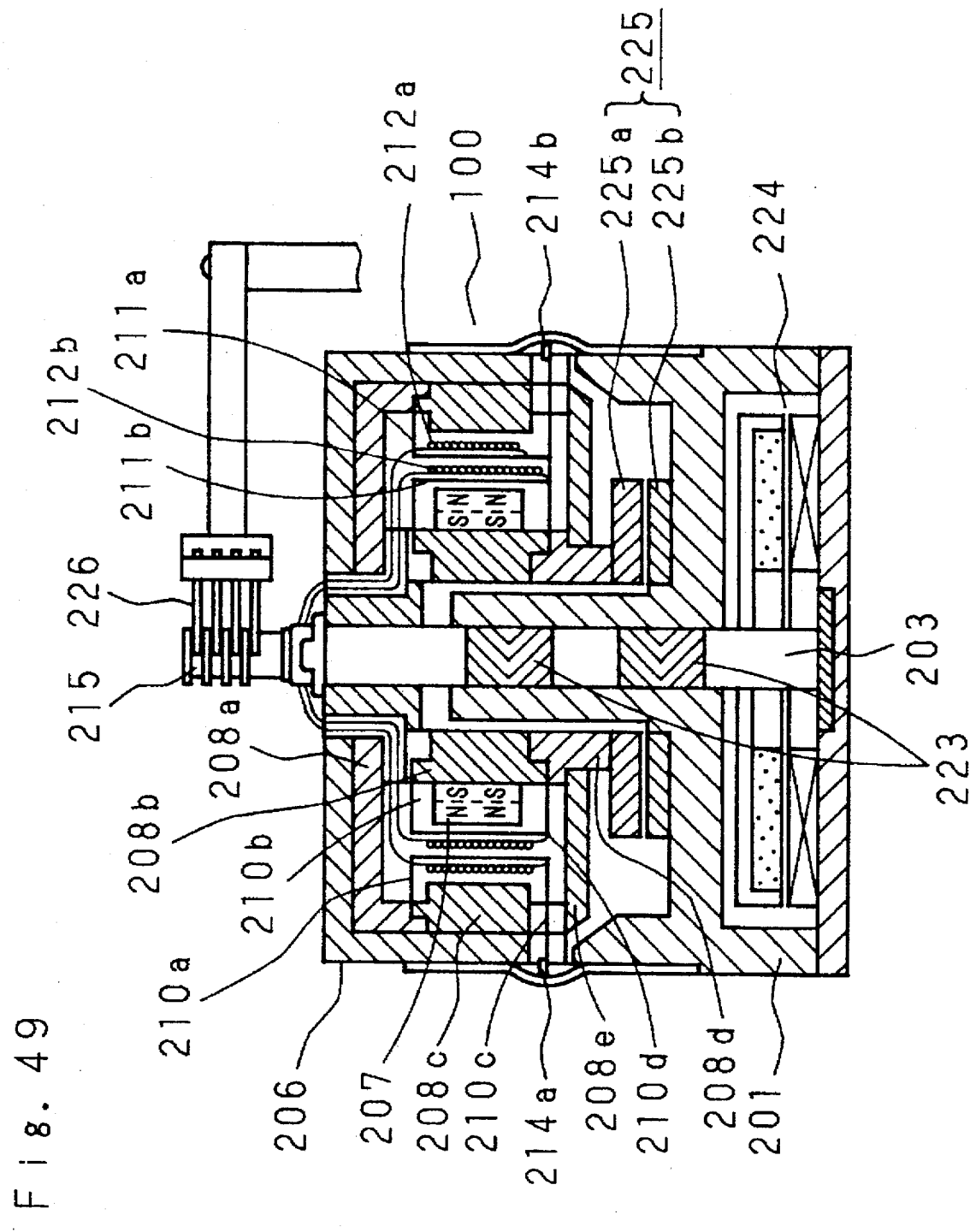

AFTER ASSEMBLY

BEFORE ASSEMBLY

→ ROTATION DIRECTION OF ROTATING SHAFT

⇒ AIR FLOW DIRECTION

→ ROTATION DIRECTION OF ROTATING SHAFT

⇒ AIR FLOW DIRECTION

⇒ AIR FLOW DIRECTION

Fig. 130
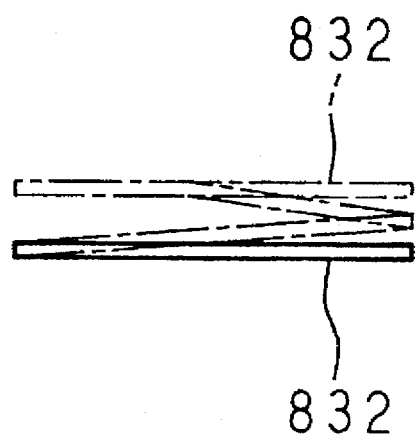
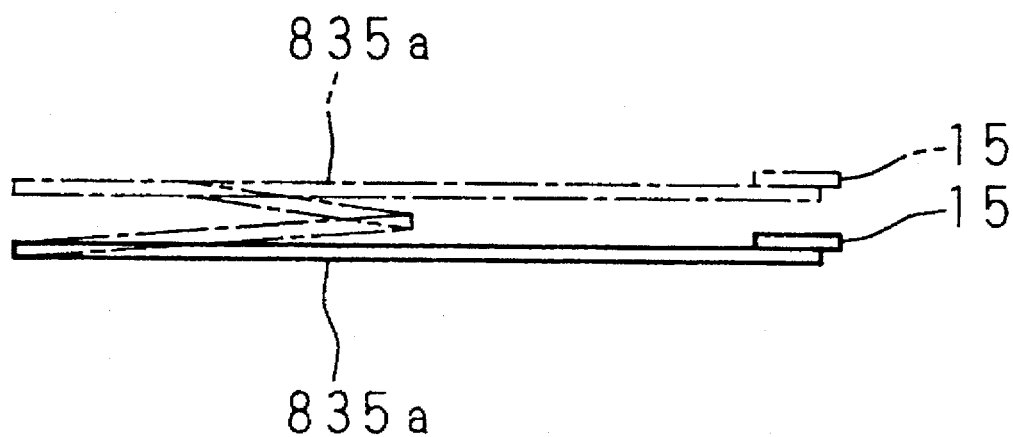

ROTARY MAGNETIC HEAD DEVICE USING PLURAL MAGNETS AND COILS TO POSITION PLURAL MAGNETIC HEADS

This application is a divisional of application Ser. No. 08/092,691, filed on Jul. 16, 1993 now U.S. Pat. No. 5,502,606, the entire contents of which are hereby incorporated by reference.

BACKGROUND OF THE INVENTION

1. Field of the Invention

The invention relates to a rotary magnetic head device which is used in a recording/reproduction apparatus such as a VTR.

2. Description of the Background Art

FIG. 1 is a section view of a rotary magnetic head device which is a first prior art device disclosed in, for example, Japanese Patent Application Laid-Open No. 61-55173 (1986). In the figure, 101 is a stationary cylinder having an outer face on which a guide groove (lead) for guiding a magnetic tape is formed, 102 is a shaft-integrated bearing, 102a is a bearing portion which is pressingly inserted into and fixed to the stationary cylinder 101, and 102b is a rotating shaft which is pressingly inserted into and fixed to a rotary cylinder 103 and rotatable in any direction with respect to the stationary cylinder 101.

The reference numeral 105 is a cylindrical bobbin which is concentric with the rotating shaft 102b. As shown in FIG. 2, step portions 105a and 105b are formed at the both ends of the bobbin in the direction of the rotating shaft 102b, respectively. The reference numeral 171 is a coil which is wound on and fixedly attached to the outer face of the bobbin 105. The reference numeral 181 is a first plate spring which is fixed at an outer periphery portion to the rotary cylinder 103, and welded at an inner periphery portion to the step portion 105a of the bobbin 105. The inner periphery portion is swingable in the direction perpendicular to the sheet in FIG. 2, with respect to the outer periphery portion. The reference numeral 191 is a second plate spring which is fixed at an outer periphery portion to the rotary cylinder 103, and welded at an inner periphery portion to the step portion of 105b of the bobbin 105. Magnetic heads 104a and 104b are fixedly attached to front ends of plate portions which are elongated from the inner periphery portions in the directions of the respective outer peripheries of the second spring plate 191, so as to oppose each other by an angle of 180 deg. The inner periphery portions are swingable in the direction perpendicular to the sheet in FIG. 2, with respect to the outer periphery portions, and also the magnetic heads 104a and 104b are swingable integrally with the respective inner periphery portions. The reference numeral 110 is a cylindrical back yoke which is fixedly attached to the rotary cylinder 103, and 111 is a cylindrical magnet which is fixedly attached to the inner periphery of the back yoke 110 and is magnetized in the radial direction. The magnet 111 is located so that its inner face opposes the coil 171 and is separated therefrom by about 0.1 mm. The magnet 111 generates magnetic fluxes which perpendicularly intersect with the coil 171 in the space between the inner periphery face and the rotating shaft 102b.

The reference numeral 122 is a first base plate which is fixed to the inside of the rotary cylinder 103 and to which ends of the coil 171 are connected, and 113 is a second base plate which is fixed to the upper end face side of the rotary cylinder 103 and connected to the first base plate 112 through pins 114. The reference numeral 115 is a slip ring having two electrodes fixed to the upper end portion of the rotary cylinder 103. The electrodes are connected to the coil 171 through lead wires 115a, the second base plate 113, the pins 114, and the first base plate 112. The reference numeral 116 is a brush which pressingly contacts with the outer face of the slip ring 115 to externally supply the electric power, 117 is a rotor of a motor which rotor is pressingly fitted onto the rotating shaft 102b, 118 is a stator of the motor which stator is attached to the stationary cylinder 101, 119 is a rotary yoke which is fixed to the rotating shaft 102b at a position opposite to the rotor 117 of the motor, 120 is a rotational rotary transformer attached to the rotary cylinder 103, and 121 is a fixed rotary transformer which is attached to the stationary cylinder 101 at a position opposite to the rotational rotary transformer 120.

First, the operation of recording or reproducing signals on or from a magnetic tape in the thus configured prior art rotary magnetic head device will be described. As shown in FIG. 7, a magnetic tape 100 runs on the rotary cylinder 103 while being wound by an angle ($\alpha$ in the figure) of 180 deg. or less. The rotary cylinder 103, and the magnetic heads 104a and 104b are rotated, and signals sent from a recording amplifier (not shown) are transmitted in a noncontacting manner through the fixed rotary transformer 121 and the rotational rotary transformer 120 shown in FIG. 1, to the magnetic heads 104a and 104b, thereby obliquely recording the signals on the magnetic tape 100. The magnetic heads 104a and 104b trace signals recorded on the magnetic tape 100, and transmit through the rotational rotary transformer 120 and the fixed rotary transformer 121 to a reproduction amplifier (not shown), thereby reproducing the signals recorded on the magnetic tape 100.

Next, the reproduction conducted on a magnetic tape 100 where there exists a track curve in recording tracks will be described. The linearity of a track recorded on a magnetic tape depends on the machining accuracy of the guide groove (lead) formed on the outer face of the stationary cylinder 101. The machining accuracy of the guide groove (lead) is 2 to 3 ($\mu$m) at the highest. In a case where the magnetic heads 104a and 104b are fixed to the rotary cylinder 103 in a system having a track pitch of about 10 ($\mu$m), therefore, the track deviation is caused and the reproduction output is lowered. As a counter measure, means for moving the magnetic heads to follow the curved track is adopted.

In the first prior art rotary magnetic head device having such a configuration, when a current is supplied from the brush 116 through the slip ring 115 to the coil 171, an electromagnetic force according to Fleming's left-hand rule is generated in the coil 17 so that the bobbin 105 is displaced to a position at which the electromagnetic force balances with the resilient forces of the first and second plate springs 181 and 191. This causes the magnetic heads 104a and 104b fixedly attached to the front ends of the plate portion of the second plate spring 191, to displace together with the bobbin. Therefore, an error signal due to a deviation of the magnetic head trace locus from the recording track is detected during the reproduction process, so that the magnetic heads 104a and 104b are moved in accordance with a control signal based on the error signal, thereby enabling the magnetic heads 104a and 104b to follow the curved track.

FIG. 3 shows a rotary magnetic head device which is a second prior art device disclosed in Japanese Patent Application Laid-Open No. 61-55173 (1986). In the figure, 201 is a stationary cylinder which has a lead for adequately holding a magnetic tape 100 while slanting it, and a sleeve at the center, 203 is a rotating shaft which is driven by a motor (not shown) and disposed on the inner face of the sleeve of the stationary cylinder 201, 204 is a holding member fixedly attached to the rotating shaft 203, and 205 is a center pole which is fixedly attached to the holding member 204 and made of a magnetic material. The reference numeral 206 is a rotary cylinder which is fixedly attached to the center pole 205 and rotatable in any direction, 207 is a permanent magnet fixedly attached to the center pole 205, 208 is a yoke which is fixedly attached to the permanent magnet 207 and made of a magnetic material, 209 is a spring attach member attached to the yoke 208, 210 is a plate spring member attached to the spring attach member 209, and 211 is a bobbin which is held by the plate spring member 210 and made of a nonmagnetic material. The reference numeral 212 is a coil which is formed by an insulated wire wound on the outer face of the bobbin 211, 213 is a magnetic head supporting base plate which has a disk-like shape and is attached to the bobbin 211, 214 designates magnetic heads which are attached to the vicinity of the outer face of the magnetic head supporting base plate 213 so as to protrude from the rotary cylinder 206 by a given distance, and 215 is a slip ring connected to the coil 212.

FIG. 4 shows the main portions of a conventional magnetic recording/reproduction apparatus. In the figure, 216 is a deck base, and 217 is a rotary magnetic head device which is fixedly attached to the deck base 216 with a given angle. The reference numeral 218 is an inlet tape guide roller having a flange for regulating the vertical position (the position along the width) of the magnetic tape 100 which is to be wound on the rotary magnetic head device 217. The reference numeral 219 is an inlet slant guide adjacent to the inlet tape guide roller 218 and for slanting the magnetic tape 100 which is to be wound on the rotary magnetic head device 217. The reference numeral 220 is an outlet slant guide for returning the magnetic tape 100 which has been peeled from the rotary magnetic head device 217, to the original state. The reference numeral 221 is an outlet tape guide roller having a flange for regulating the vertical position (the position along the width) of the magnetic tape 100 which has been peeled from the rotary magnetic head device 217. The reference numeral 222 is a tape cassette which is to be placed on the deck base 216 and accommodates the magnetic tape 100.

First, the operation of recording signals on a magnetic tape or reproducing signals from a magnetic tape having a track curve of a small degree in the second prior art rotary magnetic head device having such a configuration will be described. As shown in FIG. 4, the magnetic tape 100 runs while being slanted with respect to the rotary magnetic head device 217 with a given angle and wound on the outer face of the device 217, the rotary cylinder 206 and the magnetic heads 214 are rotated by driving the motor, and signals sent from a recording circuit (not shown) are transmitted in a noncontacting manner through rotary transformers (not shown) to the magnetic heads 214, thereby obliquely recording the signals on tile magnetic tape 100. The magnetic heads 214 rotated by driving the motor trace signals recorded on the magnetic tape 100, and transmit in a noncontacting manner through the rotary transformers to a reproduction circuit, thereby reproducing the signals.

Next, the reproduction conducted on a magnetic tape 100 where there exists a track curve will be described. In a case where a magnetic tape having a track curve as shown in FIG. 5 is to be subjected to the reproduction process using a rotary magnetic head device in which the magnetic heads 214 are fixed, it is impossible to accurately trace the tracks, thereby producing portions of a reduced reproduction output level. Accordingly, a current is supplied through the slip ring 215 from a brush (not shown) connected external to the coil 212, whereby an electromagnetic force is generated so that the bobbin 211 moves in the axial direction of the rotating shaft 203 to a position at which the electromagnetic force balances with the resilient force of the plate spring member 210. This causes the magnetic heads 214 attached to the front end of the magnetic head supporting base plate 213 fixedly attached to the bobbin 211, to move in the axial direction of the rotating shaft 203. In the reproduction process, therefore, the relative positional relationship between the recording track and the magnetic heads 214 is detected, and a current of an adequate level is supplied through the slip ring 215 of the rotary magnetic head device 217, thereby moving the magnetic heads 214 so as to accurately follow the curved recording track as shown in FIG. 6.

Since a prior art rotary magnetic head device is constructed as described above, two magnetic heads cannot operate independently from each other. For example, in a case where the first prior art rotary magnetic head device is applied to a system in which the wrap angle of the magnetic tape 100 is 180 deg. or less as shown in FIG. 7, it is not necessary for the two magnetic heads 104a and 104b to simultaneously follow a track on the magnetic tape 100. Therefore, the two magnetic heads 104a and 104b are not required to operate independently from each other. By contrast, in a case where such a device is applied to a system in which the wrap angle of the magnetic tape 100 is greater than 180 deg. as shown in FIG. 8, there is a period during which the two magnetic heads 104a and 104b simultaneously contact with the magnetic tape 100. When the magnetic head 104a follows a track on the magnetic tape 100, therefore, the magnetic head 104b must follow another track on the magnetic tape 100, whereby producing a problem in that such a prior art rotary magnetic head device cannot be applied to a system in which the wrap angle of the magnetic tape 100 is greater than 180 deg.

Also in the second prior art rotary magnetic head device, when a plurality, of magnetic heads 214 are used, all the magnetic heads are simultaneously moved. For example, in a case where two magnetic heads 214a and 214b are provided as shown in FIGS. 9 and 10, when the wrap angle of the magnetic tape 100 on the rotary magnetic head device 217 is less than 180 deg., even a prior art device such as shown in FIG. 3 can cope with a track curve. When the wrap angle exceeds 180 deg., however, in a certain portion of the period when the magnetic head 214a contacts with the magnetic tape 100, the magnetic head 214b also contacts with the magnetic tape 100. As a result, the operation of moving the magnetic head 214a so as to follow a track causes the magnetic head 214b to move in the same manner as the magnetic head 214a, resulting in that, when a magnetic tape 100 having a track curve is to be subjected to the reproduction process, the magnetic head 214b cannot follow a curved recording track. This produces a problem in that the signal output from the magnetic head 214b is lowered in level.

A rotary magnetic head device which can solve such a problem has been proposed. FIGS. 11 and 12 show a rotary magnetic head device which is a third prior art device disclosed in Japanese Patent Application Publication No. 5-8486 (1993). FIG. 11 is a section view showing the prior art rotary magnetic head device for dynamic head tracking, and FIG. 12 is an exploded perspective view of the device of FIG. 11. In FIG. 11, 301 is a stationary cylinder for guiding on its outer face the magnetic tape 100 which is a recording medium, 302 designates two bearings which are respectively fixed at the if outer ring to two bearing-supporting projections 230 and 231 formed on the stationary cylinder 301, 303 is a rotating shaft which is supported by the bearings 302 so as to be rotatable with respect to the stationary cylinder 301, and 304 is a rotary cylinder which is integrally fixed to the rotating shaft 303. The reference numeral 305 is a primary side of a ring-like rotary transformer which is coaxial with the rotating shaft 303 and fixed in a plane perpendicular to the rotating shaft, and 306 is a secondary side of the rotary transformer which is separated from the primary side 305 by a small gap so as to oppose it and is fixed to the rotary cylinder 304. The reference numeral 307 is a first annular plate spring which is attached to the rotary cylinder 304 by first and second fixing portions 308 and 309 separated from each other by all angle of 180 deg., so that the plate spring forms a plane perpendicular to the rotating shaft 303.

The reference numerals 310 and 311 are first and second posts for attaching the first plate spring 307 to the rotary cylinder 304, 312 is a first arcuate holder having one end fixed to a portion of the first plate spring 307 which portion is separated from the first fixing portion 308 by an angle of 90 deg., and 313 is a second arcuate holder having one end fixed to another portion of the first plate spring 307 which portion is separated from the second fixing portion 309 by an angle of 90 deg. The reference numeral 314 is a first sectorial magnet A which is disposed in the first holder 312 so that the inner periphery side positioned in the rotary cylinder 304 is the N-pole, and 315 is a second sectorial magnet A which is disposed in the first holder so that the inner periphery side positioned in the rotary cylinder 304 is the S-pole. The reference numeral 316 is a first magnet B which is disposed in the second holder 313 so that it opposes the first magnet A 314 by an angle of 180 deg. about the rotating shaft 303, and that the inner periphery side is the N-pole, and 317 is a second magnet B which is disposed in the second molder 313 so that it opposes the second magnet A 315 by an angle of 180 deg., about the rotating shaft 303, and that the inner periphery side is the N-pole. The reference numeral 318 is a first head base having one end fixed to the first holder 312, and the other end protruding in the vicinity of time outer face of the stationary cylinder 301, and 319 is a first magnetic head which is attached to a portion of time first head base 318 in the vicinity of the outer face of the stationary cylinder 301, and has a front end protruding the stationary cylinder.

The reference numeral 320 is a second head base having one end fixed to the second holder 313, and the other end protruding in the vicinity of the outer face of the stationary cylinder 301, and 321 is a second magnetic head which is attached to a portion of the second head base 320 in the vicinity of the outer face of the stationary cylinder 301, and has a front end protruding the stationary cylinder 301. The reference numeral 322 is a second annular plate spring which is fixed to the other ends of the first and second holders 312 and 313, and at portions 323 and 324 to the first and second posts 310 and 311 by screws 325 and 326. The reference numeral 327 is a cylindrical base which is fixed at one end to the stationary cylinder 301 and coaxial with the rotating shaft 303, 328 is a first coil which is attached to the base 327 so as to oppose the first magnet A 314 and the first magnet B 316, 329 is a second coil which is attached to the base 327 so as to oppose the second magnet A 315 and the second magnet B 317, 200a is a head moving unit, and 300 is the rotary magnetic head device.

Next, the operation of the prior art device will be described. Regarding the first magnetic head 319, when a driving current is supplied to the first and second coils 328 and 329 intersecting with the magnetic field in the magnetic circuit formed by the first and second magnets A 314 and 315, a driving force is generated in the axial direction. This driving force causes the first magnetic head 319 which is integrally attached to the first holder 312 of the moving unit, to move in the axial direction. This is applicable also to the second magnetic head 321. Since the magnetization direction of the second magnet A 315 is contrary to that of the second magnet B 317, however, the first and second holders 312 and 313 are moved in the directions opposite to each other, respectively. In other words, the first and second holders 312 and 313 can be moved independently from each other by controlling the level and direction of the driving currents supplied to the first and second holders 312 and 313.

TABLE 1

|  |  | 1st Holder | 2nd Holder |
|---|---|---|---|
| Current Direction | 1st Coil: (+) 2nd Coil: (+) | 0 | 2F |
|  | 1st Coil: (+) 2nd Coil: (−) | 2F | 0 |
|  | 1st Coil: (−) 2nd Coil: (+) | −2F | 0 |
|  | 1st Coil: (−) 2nd Coil: (−) | 0 | −2F |

In order to describe the driving method more specifically, the relationship between the directions of currents supplied to the coils and the driving forces generated in the holders will be described with reference to Table 1. In Table 1, the driving forces respectively applied to the first magnet A 314 and the first magnet B 316 when a driving current A flows through the first coil 328 in the positive direction are F, and the driving forces respectively applied to the second magnet A 315 and the second magnet B 317 when a driving current A flows through the second coil 329 in the positive direction are −F and F. By setting the driving currents of the first and second coils 328 and 329 so as to be equal in level but opposite in direction to each other, it is possible to perform a control in which the first holder 312 is moved and the second holder 313 is not moved. In contrast, by setting the driving currents of the first and second coils 328 and 329 so as to be identical in direction to each other, it is possible to perform a control in which the second holder 313 is moved and the first holder 312 is not moved.

Generally, when approximated with a primary spring or mass system, the control band f which is an important property of such a head moving device can be expressed by Equation 1:

$$f = (1/2\pi) \times (K/M)^{1/2} \qquad (1)$$

where M is a moving mass, and K is a spring constant of the moving mechanism.

From Equation 1, it will be noted that the track following property of a magnetic head with respect to a recording track can be improved by increasing the spring constant K or decreasing the mass M.

A driving force F required for moving the head moving device is expressed by Equation 2 below:

$$F = K \times X \qquad (2)$$

where X is a moving distance.

From the above, it will be noted that, in order to move the head moving device by a small driving force, the spring constant K is decreased or the moving range X is reduced.

As seen from the above description, a head moving device having a wide control band f and requiring a reduced driving force can be realized by decreasing the mass M, the spring constant K, and the moving distance X, and increasing K/H. From Equation 2, the case shown in Table 1 where a driving force of 2F is obtained by using two coils and two magnets is equivalent to a case where the spring constant is apparently 2K. From Equation 1, it is expected that the band is widened by about 1.4 times. This is equivalent to an effect which is obtained by reducing the moving mass to half. Since expensive magnets of a high saturation magnetic flux density are generally used, the reduction of the mass is most effective.

Next, a fourth prior art rotary magnetic head device in which the mass is reduced will be described. FIG. 13 is a section view of a rotary magnetic head device which is disclosed in Japanese Patent Application Laid-Open No. 2-304711 (1990). In the figure, 330 is a first yoke having a fitting hole 331, 332 is a first column-like magnet which is attached to the first yoke 330 and in which the first yoke 330 side is the S-pole, 333 is a second column-like yoke which is attached so as to be coaxial with the first magnet 332, and 334 is a second column-like magnet which is attached to the second yoke so as to be coaxial with first magnet 332 and in which the second yoke 333 side is the N-pole. The reference numeral 335 is a first annular plate spring having an outer periphery which is positioned by the first yoke 330, an end to which the magnetic head 319 (321) is attached, and an inner periphery portion which is coaxial with the first magnet 332. The reference numeral 336 is a cylindrical bobbin which is attached at one end to an inner periphery portion of the first plate spring 335 and coaxial with the first magnet 332, 337 is a coil attached to the bobbin 336, 338 is a second annular plate spring having an inner periphery portion which is attached to the other end of the bobbin 336, and 339 is a third cylindrical yoke which is coaxial with the first magnet 332 and has an end cooperating with the first yoke 330 so as to position and fit the first plate spring 331. The reference numeral 340 is a fourth disk-like yoke having an outer periphery portion cooperating with the third yoke 339 so as to position and fit the second plate spring 338, and an inner periphery portion for fixing the second magnet 334, 341 is a Hall element disposed at the inside of the fourth yoke 340, and 200 is a head moving device consisting of these elements.

The operation of the fourth prior art example will be described. Principally, this example operates in the same manner as the third prior art example of FIGS. 11 and 12. The fourth prior art example is of the electromagnetic drive type, but differs from the third prior art example in that only a single coil, i.e., the coil 337 is used and the moving portion is not the magnet portion but the coil portion. Since two magnets are used so as to sandwich the second yoke 333, the size of a magnetic circuit in a magnetic head moving direction 342 can be increased, thereby increasing the moving distance of the magnetic head 319 (321) moving integrally with, the bobbin 336 which is integral with the coil 337. Generally, the head moving device 200 is used while being incorporated into a rotary magnetic head device.

FIG. 14 is a section view showing the main portions of the rotary magnetic head device 300 to which the head moving device 200 is attached, and FIG. 15 is a plan view showing the main portions of the rotary cylinder 304 to which the head moving device 200 is attached. In the figures, 343 is a hole formed in the rotary cylinder 304 so that the head moving device 200 is attached to the rotary cylinder 304 by screws 344, 345 is a flange to which the rotary cylinder 304 is attached by screws 346 and which is integral with the rotating shaft 303, 347 is a driving transfer base plate for the head moving device 200 and fixed to the rotary cylinder 304, 348 is an external brush which slidingly connects the driving transfer base plate 347 with the external of the rotary magnetic head device 300, and 349 is a slip ring disposed in the side of the rotary cylinder 304.

In the figure, a power is externally supplied to the driving transfer base plate 347 through the sliding contact between the brush 348 and the slip ring 349, so that a driving current is supplied from the driving transfer base plate 347 to the coil 337 of the head moving device 200. The coil 337 is formed so as to intersect a first magnetic circuit consisting of the First magnet 332, and the first to third yokes 330, 333 and 339, and a second magnetic circuit consisting of the second magnet 334, and the second to fourth yokes 333, 339 and 340. When a driving current is supplied to the coil 337, the bobbin 336 to which the coil 337 is attached moves in the magnetic head moving direction 342. Since the magnetic force generated by the coil 337 in the magnetic head moving direction 342 is proportional to the moving distance of the bobbin 336 due to the driving current, the moving distance of the bobbin 336, namely the moving distance of the magnetic head 319 (321) can be substantially detected in the term, of the output of the Hall element 341.

The third prior art device having the configuration described above has problems such as that, in order to increase the width of a control band shown by Equation 1 for the independent driving of time magnetic heads, two moving magnets are required for each of the magnetic heads, thereby increasing the production cost, and that, when a plurality of magnetic heads are to be independently driven at the same time, a complex control circuit for conjointly controlling two coils is required. By contrast, in the fourth prior art device having the configuration described above, the moving unit, which is problematic in the third prior art device, can be lightened so that the control band is broadened. However, in the fourth prior art device, a sliding contact unit realized by, for example, a combination of a slip ring and a brush, thereby producing a problem in that it is difficult to ensure the life and the reliability due to the service environment.

The procedure of assembling the third prior art device will be described. Time assembling procedure requires complex steps as follows: In FIGS. 11 and 12, the head moving unit 200a which consists of the first and second plate springs 307 and 322, the first and second holders 312 and 313, etc, is attached to the rotary cylinder 304 by the screws 325 and 326. Then, the secondary rotary transformer 306 is fixed to the rotary cylinder 304 while sandwiching the base 327 to which the first and second coils 328 and 329 are fixedly attached. Thereafter, the rotary cylinder 304 is inserted toward the stationary cylinder 301. In this way, the base 327 to which the first and second coils 328 and 329 are fixedly attached, and the secondary rotary transformer 306 are assembled in such a manner that they are intermingled with each other. Therefore, it is difficult to assemble the device, and it is impossible to ensure a high dimensional accuracy for dimensions after assembling, such as the distance between the rotary transformers.

Furthermore, in the third prior art device, the two bearings 302 are held by the bearing-supporting projections 330 and 331 of the stationary cylinder 301, and the rotating shaft 303 is integral with the head moving unit 200a and the rotary cylinder 304 so as to be rotatably supported by the bearings 302. In order to suppress the runout of the shaft, therefore, the two bearings 302 must be separated from each other by a long distance, thereby requiring the thickness of the projection 330 of the stationary cylinder 301 in the side of the rotary cylinder 304, to be increased in the radial direction. The increased thickness of the projection 330 of the stationary cylinder 301 in the radial direction limits the space for the head moving unit 200a. As the whole size of the rotary magnetic head device 300 is reduced, the influence of this space limitation becomes larger. Therefore, it is difficult to secure a sufficient configuration space.

FIGS. 16 to 20 show a magnetic lead device which is a fifth prior art device disclosed in, for example, Japanese Patent Application Laid-Open No. 60-209913 (1985). FIG. 16 is a perspective view of the magnetic head device, FIG. 17 is a front view the device as viewed in the head gap direction in FIG. 16, FIG. 18 is an perspective view of showing an operation state where a magnetic tape contacts with a rotary cylinder into which magnetic heads are mounted, and FIG. 19 is a section view of a rotary magnetic lead device provided with the magnetic head device shown in FIG. 16. The rotary magnetic head device is used in a VTR or the like of the so-called segment recording type in which video signals of one field are recorded over a plurality of tracks.

In the figures, 501 designates magnetic heads, 502 is a head-attaching plate to which the magnetic heads 501 are attached, 502a is a reference plane of the head-attaching plate 502, 502b is an insertion hole through which a screw for attaching the head-attaching plate 502 to a rotary cylinder 504 is to be passed, and 503 is an adhesive for attaching the magnetic heads 501 to the head-attaching plate 502. The head-attaching plate 502 attached to the rotary cylinder 504 is supported so that it appears on the outer face of the rotary cylinder 504 through a window 505 formed on the rotary cylinder 504, and that the magnetic heads 501 slidingly contact with a magnetic tape 100 wound on the outer face of the rotary cylinder 504.

The reference numeral 507 designates tape guides, 508 designates air grooves formed on the rotary cylinder 504, 509 is a lead face for guiding the lower end of the magnetic tape 100, 510 is a stationary cylinder on which the lead face 509 is formed, 511 is a screw for adjusting the height of the magnetic heads 501, 512 is a flange to which the rotary cylinder 504 is attached, 513 is a rotating shaft which is integral with the flange 512, 514 designates bearings which rotatably support the rotating shaft 513 with respect to the stationary cylinder 510, and 515a and 515b are a stator and a rotor of a motor 400 for rotating the rotating shaft 513. The reference numeral 516 is a chassis to which the stationary cylinder 510 is attached, 517 is a screw for attaching the head-attaching plate 502 to the rotary cylinder 504, 518a and 518b are primary and secondary rotary transformers for sending and receiving signals, and 600 is a rotary magnetic head device consisting of these elements.

The operation of the thus configured fifth prior art device will be described.

The head-attaching plate 502 is generally made of an alloy such as brass, and is provided at the center portion with the insertion hole 502b through which the attaching screw passes. The upper face of the plate is made flat to function as the reference plane 502a. When the head-attaching plate 502 is to be attached to the rotary cylinder 504, the plate is highly accurately positioned using the reference plane 502a with respect to the rotary cylinder 504, and then screwed thereto.

The magnetic heads 501 are fixedly adhered to the front end portion of the reference plane 502a of the head-attaching plate 502, by the adhesive 503. More specifically, when the magnetic heads 501 are to be attached to the head-attaching plate 502, their attaching states are finely adjusted with respect to the adhesive 503 which has been just applied to the reference plane 502a and still remains uncured, and within the range of the adhesive 503. Each of the magnetic heads 501 is attached with a given head level difference Z1 and gap distance L1, and an adequate projection amount, head height and slant angle, and thereafter the adhesive 503 is cured, whereby the magnetic heads are fixed into the respective adequate attaching states.

As the adhesive 503, used is a resin adhesive having a low temporal dimensional change rate and a small coefficient of thermal expansion, such as an epoxy resin adhesive.

As shown in FIG. 19, the head-attaching plate 502 to which the magnetic heads 501 are stuck is attached to the rotary cylinder 504 by the screw 517, and the head height is adjusted by turning the screw FIG. 20 is a diagram showing the relationship between a head level difference error $\Delta Z$ and the width TW of a track recorded on the tape. The relationship between the head level difference error $\Delta Z$ and the track width TW in FIG. 20 is expressed as follows:

$$\Delta Z = \tfrac{1}{2} \times |TW1 - TW2| \qquad (3)$$

When an error in the head level difference is caused, therefore, the track width TW is affected by twice the degree of the error $\Delta Z$.

Recently, the track width is narrowed in order to attain a lone-time recording. Under such a situation, in the view point of obtaining a stable reproduction signal, the suppression of the track width error |TW1−TW2| is an important matter. As described above, it is important to suppress the head level difference error.

In the fifth prior art device having the configuration described above, among the values such as the gap distance between two adjacent magnetic heads 501, the projection amount of a head from the rotary cylinder, the level difference (the relative height Z1 between heads), and the relative azimuth angle, the gap distance L1 and the head projection amount calm relatively accurately be adjusted. However, because the head level difference Z1 depends on the thickness of the adhesive 503, the accuracy of the adhering jig is limited, and the accuracy of the adhesive thickness itself is limited, there arises a problem in that it is difficult to accurately adjust the head level difference Z1.

Particularly, as described in conjunction with FIG. 20 and Equation 3, there is a problem in the that the allowable head level difference error $\Delta Z$ must be reduced as the track width TW becomes narrower.

In a case where the positioning technique of the fifth prior art device is applied to the third prior art device, the magnetic heads can follow a curved track as described above. However, in such a case, the level difference Z1 among the four magnetic heads 501 depends on the accuracy of the working step using the adhesive 503, and the accuracy of attaching the head moving device 200 to the rotary cylinder 504, and the track width error cannot be absorbed by the operation of the head moving device 200.

Furthermore, in a prior art device structured as described above, heat generated by heating elements accumulates in a space of the device. In the third prior art rotary magnetic head device, for example, the heating elements such as the coils 328 and 329 for vertically moving the magnetic heads 319 and 321 are located in the small space between the rotary cylinder 304 and the stationary cylinder 301, resulting in that the heat stays in this small space. When the rotary cylinder 304 has a small diameter in order to reduce the size of an apparatus, the heat value in the space is large and the heat radiation becomes insufficient. This may cause the coils to be overheated, resulting in that the electromagnetic properties cannot sufficiently be obtained, or that the coils are burned out.

In the third prior art device, for example, when signals recorded on the magnetic tape 100 are to be reproduced, driving currents of the level and polarity corresponding to an error signal which is included in reproduced signals obtained by the magnetic head A 319 and the magnetic head B 321 and which is proportional to the deviation from the recording locus on the magnetic tape 100 are supplied to the upper and lower coils 328 and 329. The magnetic head A 319 and the magnetic head B 321 are independently operated by controlling the currents supplied to the upper and lower coils 328 and 329, so that the deviation from the recording locus is eliminated.

When a given signal is to be recorded on the magnetic tape 100, however, the magnetic heads must be fixed in the moving direction. In the third prior art device, under a state where the upper and lower coils 328 and 329 are not energized by a current, the force of restraining the magnetic heads from moving in the vertical directions is weak. The magnetic head height cannot be highly accurately adjusted in the assembling process. Moreover, during a process in which a magnetic tape is actually running, the magnetic heads are easily displaced by an external force caused by the magnetic tape, thereby producing a problem in that the recording cannot be performed with accurately positioned tracks.

When the magnetic head A 319 and the magnetic head B 321 move vertically, the upper and lower plate springs 307 and 322 deform as shown in FIG. 21 in a manner different from the cantilever deformation which is observed when only one of the plate springs is deformed. This increases the rigidity of the upper and lower plate springs 307 and 322, so that larger driving currents are required for obtaining a given displacement.

Furthermore, there is a problem in that, when the magnetic head A 319 and the magnetic head B 321 move vertically, the amount of the projection of a head indicated by D in FIG. 21 is changed.

SUMMARY OF THE INVENTION

The invention has been conducted in view of the circumstances described above. It is an object of the invention to provide a rotary magnetic head device in which, even when a magnetic tape having a track curve is wound on the device by an angle of 180 deg. or more, two magnetic heads can independently be moved so as to correctly follow a track, thereby obtaining a stable reproduction signal.

It is another object of the invention to provide a rotary magnetic head device which is of the magnet-moving head-independently-driven type where the most portion of the total weight is occupied by the weight of magnets, and in which the weight of the moving unit is reduced so that the driving force is small and a wide control band is attained.

It is a further object of the invention to provide a rotary magnetic head device in which two magnetic heads can be highly accurately positioned at given positions of the front end of a moving member, and a given head level difference can be obtained.

It is a still further object of the invention to provide a rotary magnetic head device in which an air guide is done so that, the heat radiation or a coil is facilitated.

It is a still further object of the invention to provide a rotary magnetic head device having a magnetic head moving mechanism which is simple in structure and by which the position of a magnetic head can be detected and controlled.

It is a still further object of the invention to provide a rotary magnetic head device in which a magnetic head is stably elastically supported, a plate spring is sufficiently displaced by a small driving force in the vertical directions, the projection amount of a head during the displacement is small, and the posture change of the magnetic head is small.

The above and further objects and features of the invention will more fully be apparent from the following detailed description with accompanying drawings.

BRIEF DESCRIPTION OF THE DRAWINGS

FIG. 18 is an perspective view of showing an operation state where a magnetic tape contacts with a rotary cylinder in which the magnetic head device of FIG. 16 is mounted;

FIG. 31 is a side view showing the main portions of Embodiments 5 and 6 of the invention;

FIG. 49 is a sectional side view of a rotary magnetic head device of Embodiment 11 of the invention;

FIG. 14 is a graph showing results of a frequency response analysis according to the data of Embodiment 40;

FIG. 117 is a longitudinal section view showing a rotary magnetic head device of Embodiment 43 of the invention;

FIG. 118 is a longitudinal section view showing a rotary magnetic head device of Embodiment 44 of the invention;

FIG. 119 is a characteristic graph showing the displacement of a lower magnet B used in Embodiment 44;

FIG. 120 is a characteristic graph showing the temporal variation of the output of a current amplifier used in Embodiment 44;

FIG. 121 is a characteristic graph showing the temporal variation of the output of an integrator used in Embodiment 44;

FIG. 122 is a longitudinal section view showing a rotary magnetic head device of Embodiment 45 of the invention;

FIG. 123 is a longitudinal section view showing a rotary magnetic head device of Embodiment 46 of the invention;

FIG. 124 is an exploded perspective view of a rotary member used in Embodiment 46;

FIG. 125 is a plan view of an upper plate spring used in Embodiment 46;

FIG. 126 is a plan view of a middle plate spring used in Embodiment 46;

FIG. 127 is a plan view of a lower plate spring used in Embodiment 46;

FIG. 128 is a partial section view showing the inside of a rotary cylinder used in Embodiment 46;

Figure 129:
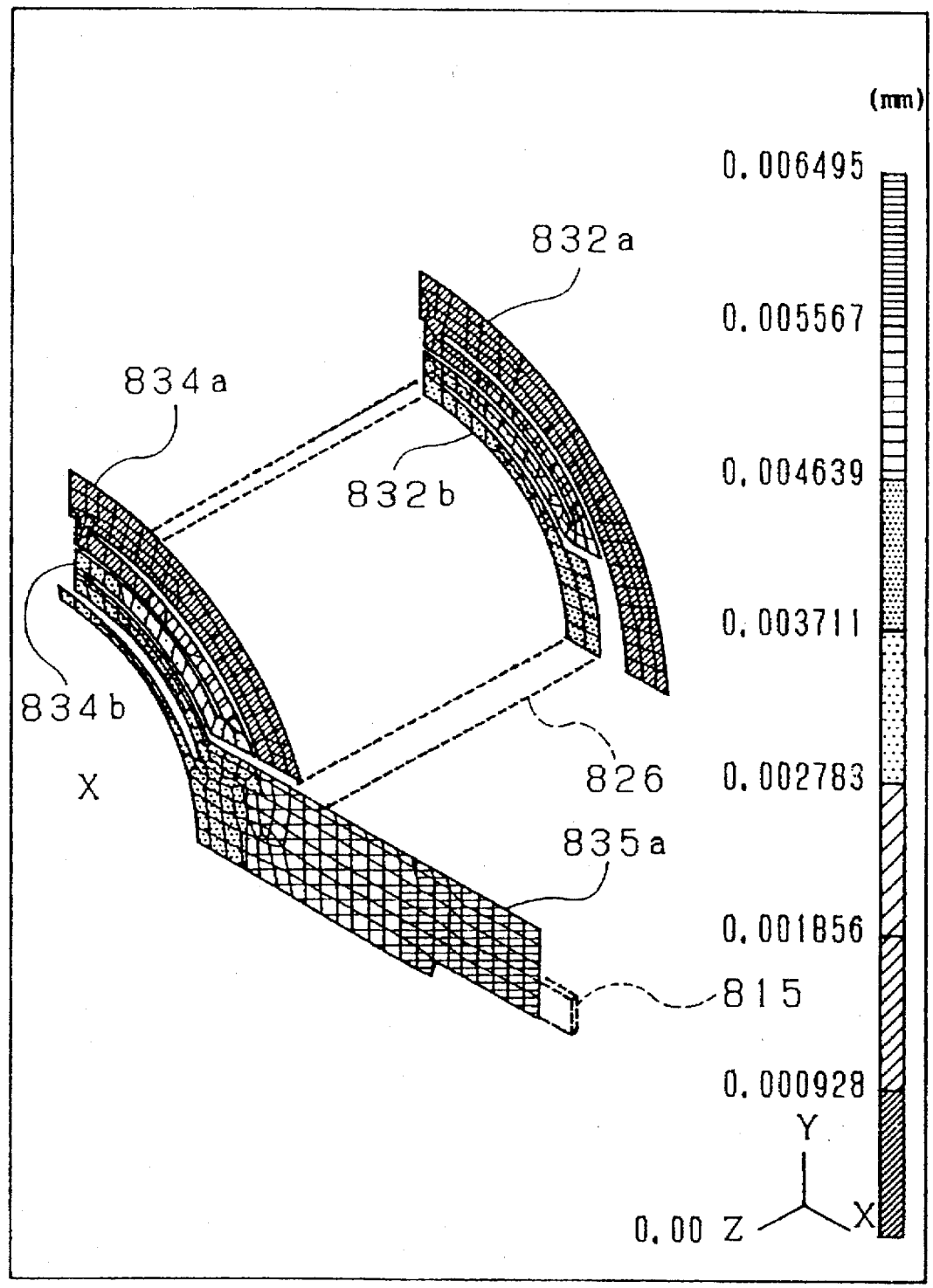
Figure 131:
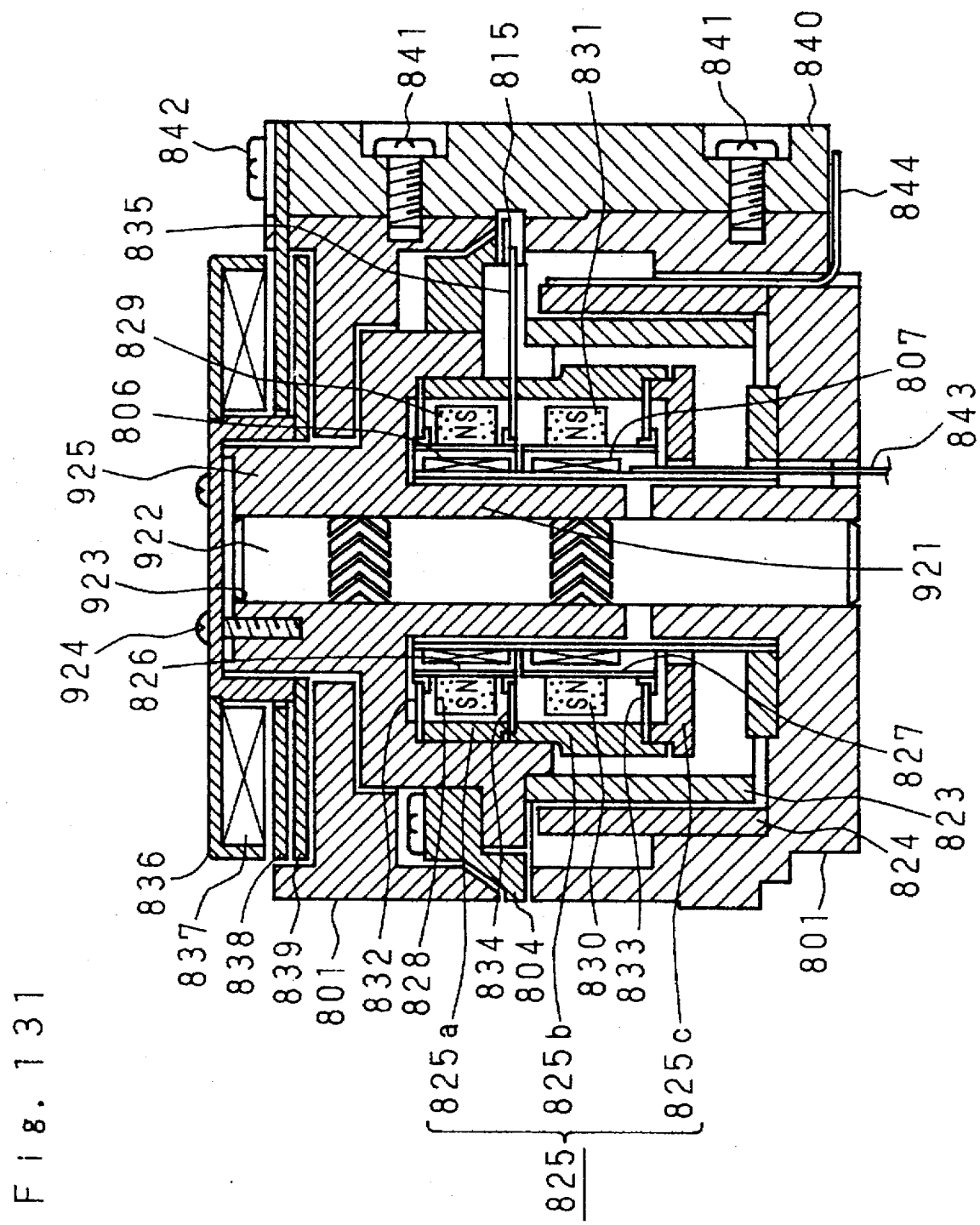
Figure 132:
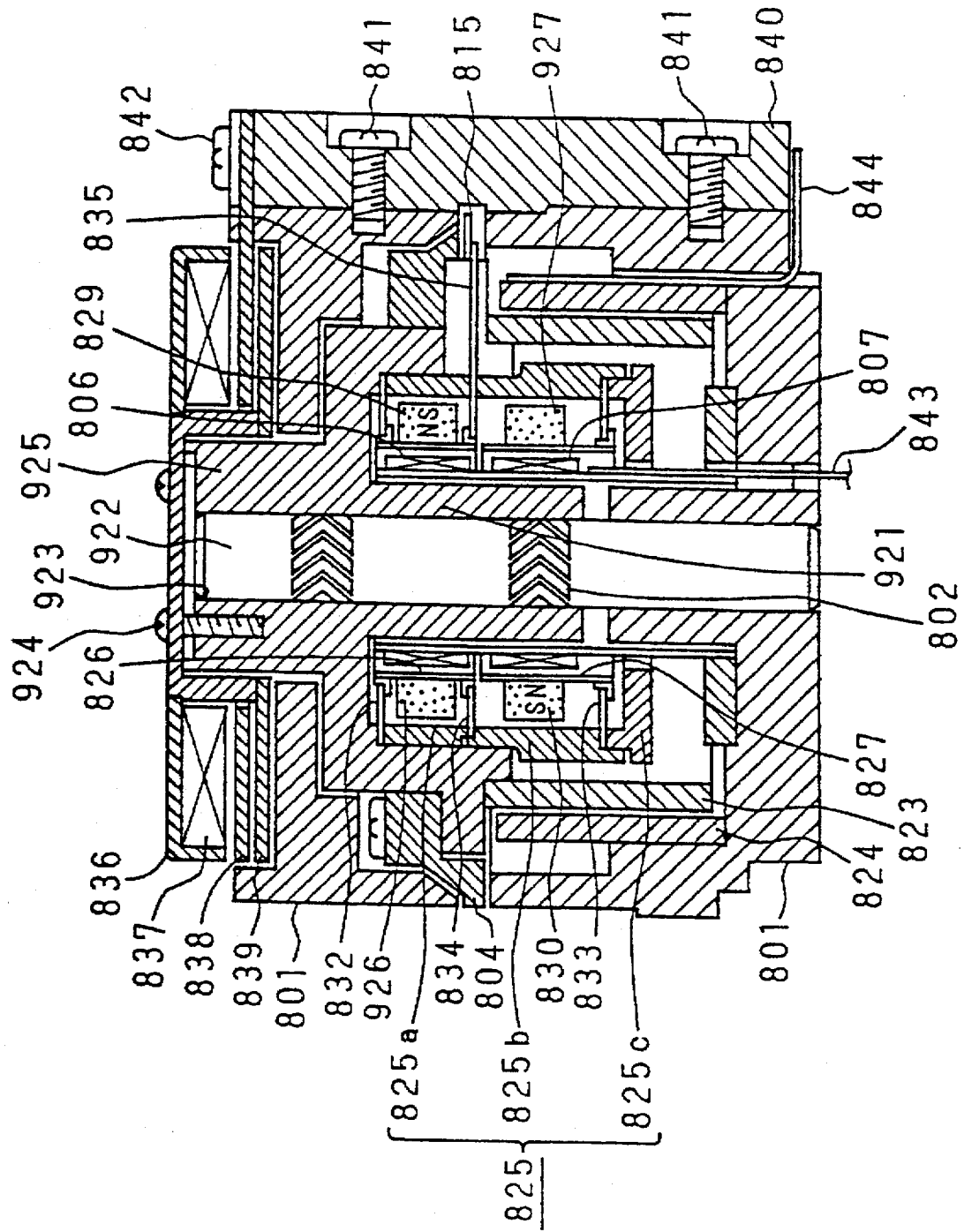

FIG. 129 is a diagram showing results of a numerical analysis of the operation states of the upper and lower plate springs used in Embodiment 46;

FIG. 130 is a side view showing a deformation state in the operation of the upper plate spring used in Embodiment 46;

FIG. 131 is a longitudinal section view showing a rotary magnetic head device of Embodiment 47 of the invention; and FIG. 132 is a longitudinal section view showing a rotary magnetic head device of Embodiment 48 of the invention.

DESCRIPTION OF THE PREFERRED EMBODIMENTS

Embodiment 1

Figure 22:
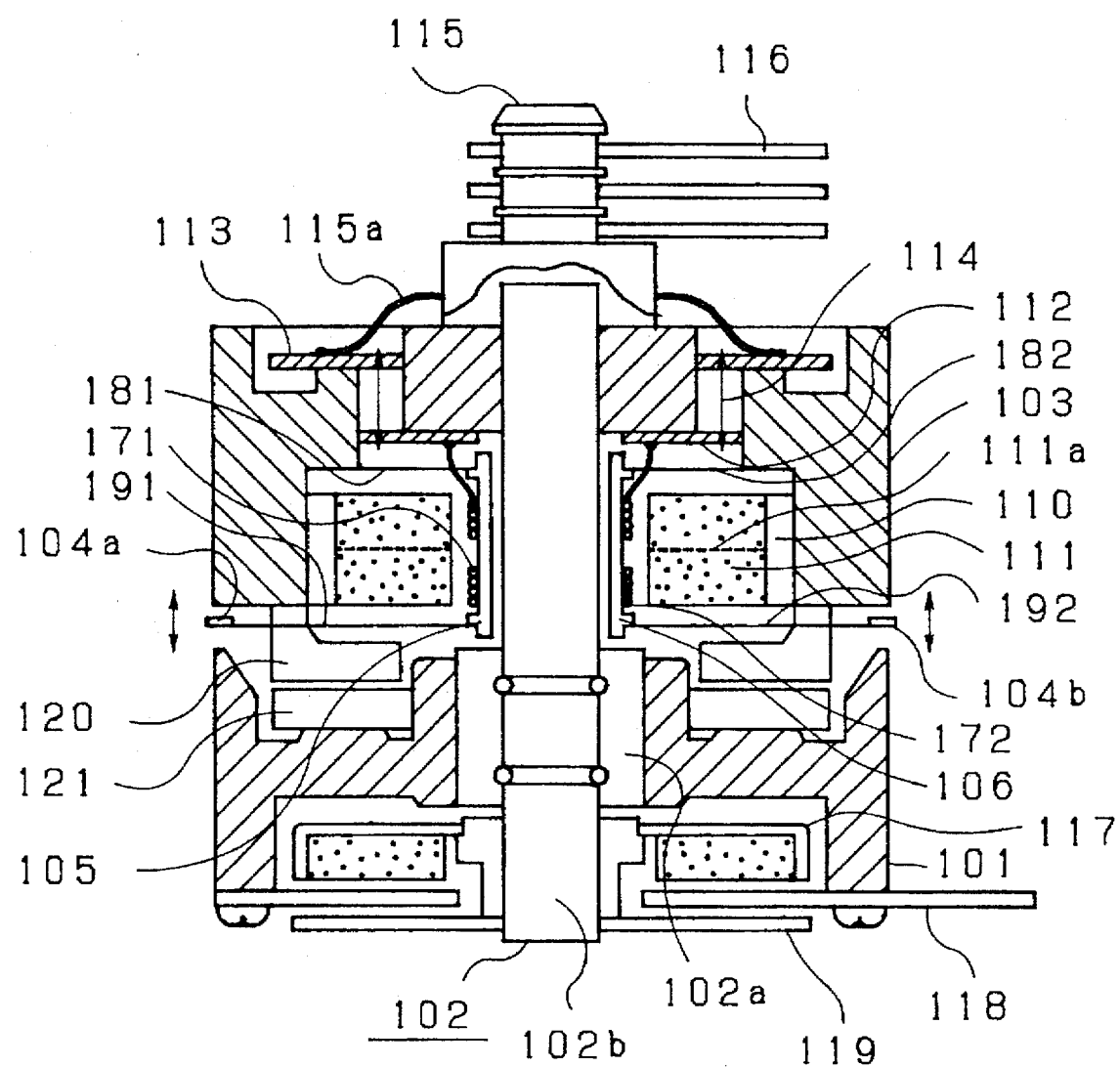
FIG. 22 is a section view of a rotary magnetic head device of Embodiment 1 of the invention.

Embodiment 1 will be described. Embodiment 1 is a system in which a pair of magnetic heads are disposed at the opposite positions or so as to form an angle of 180 deg., and the wrap angle of a magnetic tape is greater than 180 deg. FIG. 22 is a section view of a rotary magnetic head device of the invention. In the figure, 101 is a stationary cylinder having an outer face on which a guide groove (lead) for guiding a magnetic tape is formed, 102 is a shaft-integrated bearing, 102a is a bearing portion which is pressingly inserted into and fixed to the stationary cylinder 101, and 102b is a rotating shaft which is pressingly inserted into and fixed to a rotary cylinder 103 and rotatable in any direction with respect to the stationary cylinder 101.

Figure 23:
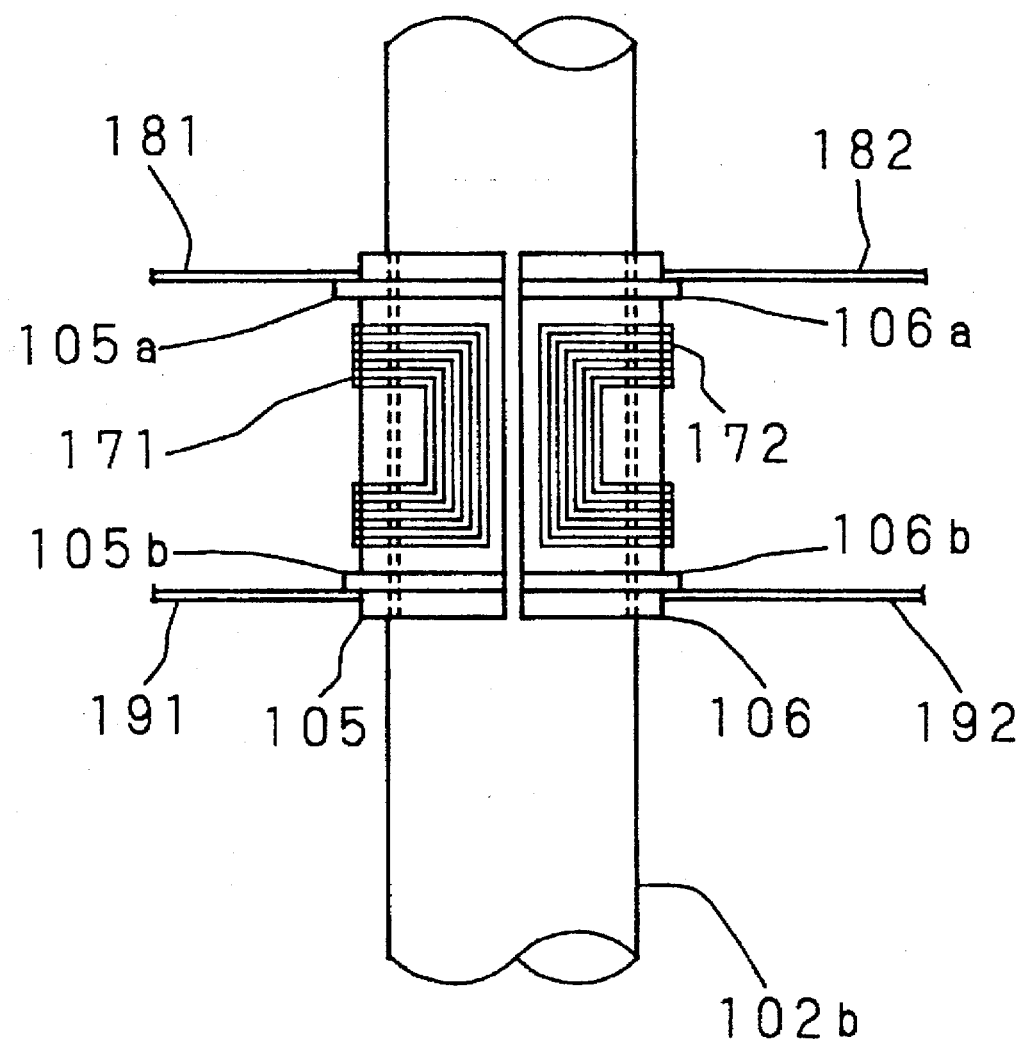
FIG. 23 is a side view showing the main portions of Embodiment 1 of the invention.

The reference numeral 105 is a first semicylindrical bobbin which is concentric with the rotating shaft 102b. As shown in FIG. 23, step portions 105a and 105b are formed at the both ends of the bobbin in the axial direction of the rotating shaft 102b, respectively. The reference numeral 106 is a second semicylindrical bobbin which is concentric with the rotating shaft 102b. As shown in FIG. 23, step portions 106a and 106b are respectively formed at the both ends of the bobbin in the axial direction of the rotating shaft 102b. The first and second semicylindrical bobbins 105 and 106 constitute a cylinder. The reference numeral 171 is a substantially rectangular first coil which is fixedly attached to the outer race of the first bobbin 105, and 172 is a substantially rectangular second coil which is fixedly attached to the outer face of the second bobbin 106.

Figure 24:
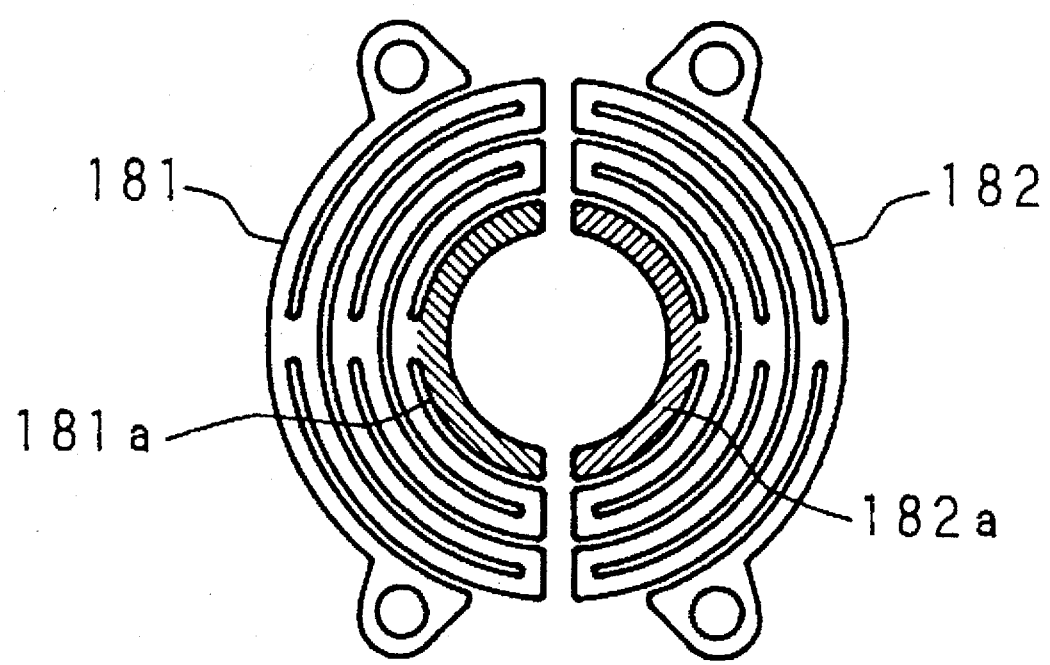
FIG. 24 is a plan view of a first plate spring used in Embodiment 1 of the invention.
Figure 25:
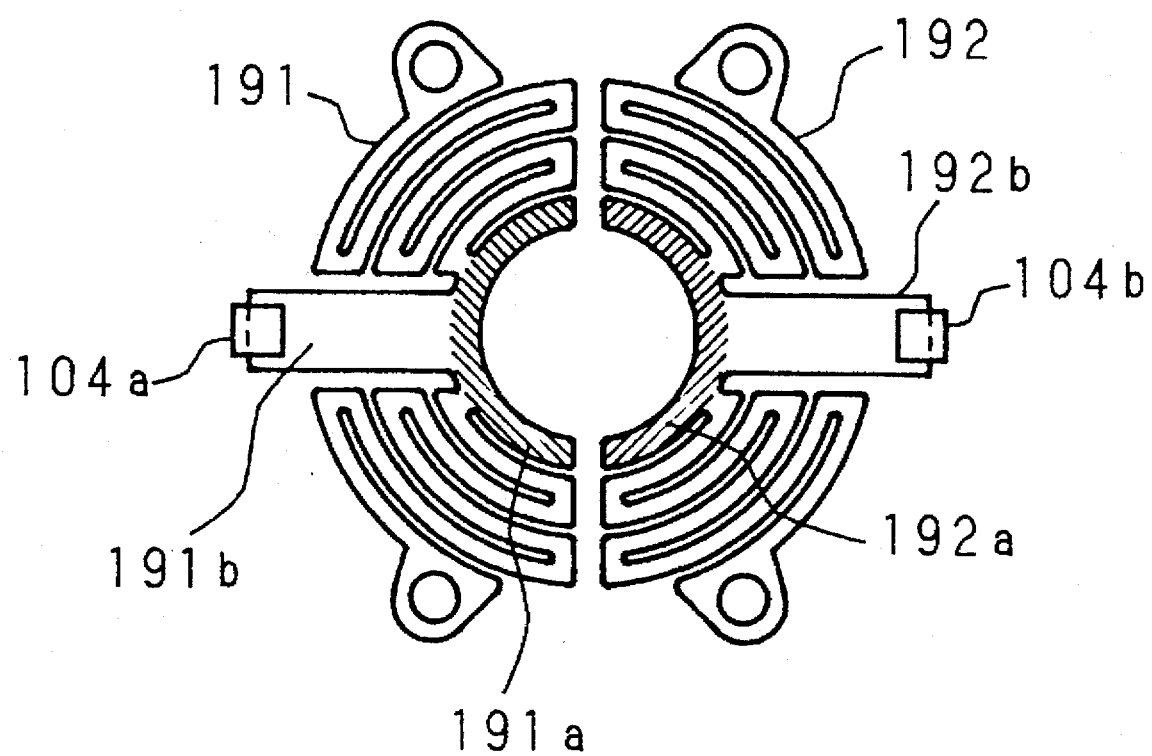
FIG. 25 is a plan view of a second plate spring used in Embodiments 1 and 5 of the invention.

The reference numeral 181 is a first plate spring A which is fixed at an outer periphery portion to the rotary cylinder 103, and fixedly attached at an inner periphery portion to the first bobbin 105, and 182 is a first plate spring B which is fixed at an outer periphery portion to the rotary cylinder 103, and fixedly attached at an inner periphery portion to the second bobbin 106. The step portion 105a of the first bobbin 105 and the step portion 106a of the second bobbin 106 shown in FIG. 23 are fixedly attached to inner periphery portions 181a and 182a of the plate springs which are hatched in FIG. 24, respectively. The inner periphery portions 181a and 182a are swingable in the direction perpendicular to the sheet in FIG. 24, with respect to the respective outer periphery portions. The reference numeral 191 is a second plate spring A which is fixed at an outer periphery portion to the rotary cylinder 103, and fixedly attached at an inner periphery portion to the first bobbin 105, and 192 is a second plate spring B which is fixed at an outer periphery portion to the rotary cylinder 103, and fixedly attached at an inner periphery portion to the second bobbin 106. The step portion 105b of the first bobbin 105 and the step portion 106b of the second bobbin 106 shown in FIG. 23 are fixedly attached to inner periphery portions 191a and 192a of the plate springs which are hatched in FIG. 25, respectively. The inner periphery portions 191a and 192a are swingable in the direction perpendicular to the sheet in FIG. 25, with respect to the respective outer periphery portions. As shown in FIG. 25, the second plate spring A 191 and the second plate spring B 192 respectively hold magnetic heads 104a and 104b disposed at the opposite positions or so as to form an angle of 180 deg., namely at the front ends of plate portions 191b and 192b which elongate from the inner periphery portions 191a and 192a toward the respective outer periphery portions. The magnetic heads 104a and 104b are swingable in the axial direction of the rotating shaft 102b while being respectively integral with the inner periphery portions 191a and 192a.

Figure 26:
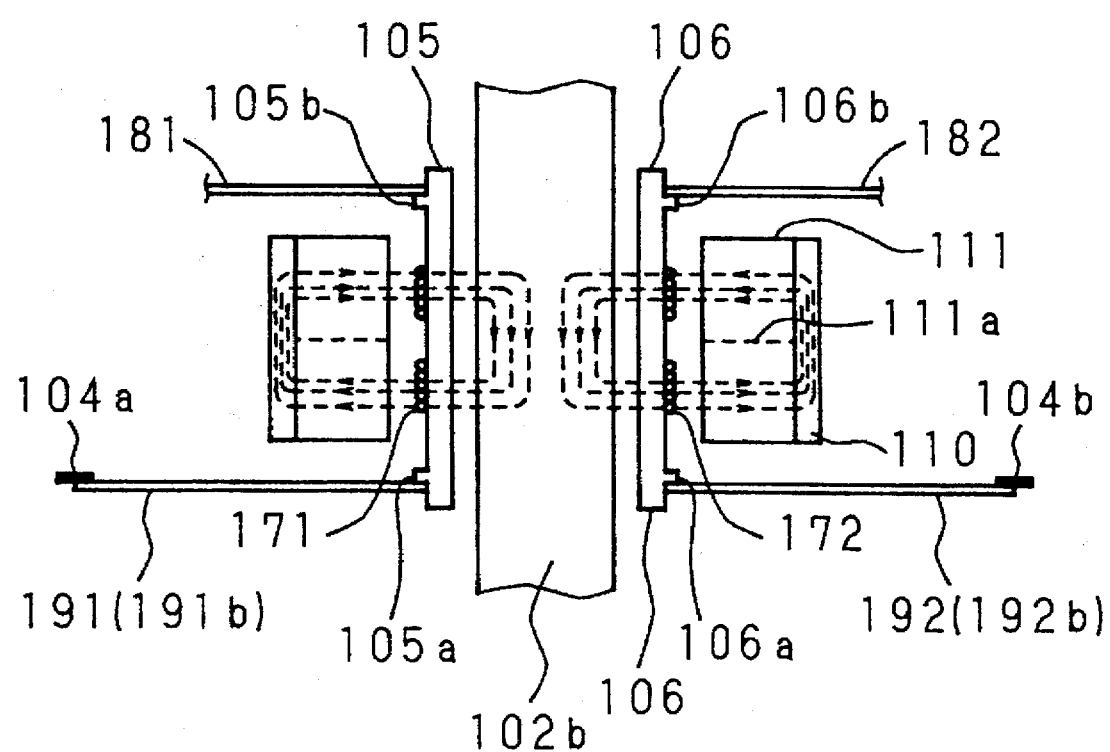
FIG. 26 shows a magnetic circuit of a magnetic lead moving device used in Embodiment 1 of the invention.

The reference numeral 110 is a cylindrical back yoke which is fixedly attached to the inside of the rotary cylinder 103, and 111 is a cylindrical magnet which is fixedly attached to the inner face of the back yoke 110 and is magnetized in the radial direction. In the magnet 111, as shown in FIG. 22, the magnetic poles are separated from each other by a boundary 111a in the axial direction of the rotating shaft 102b. As shown in FIG. 26, the magnet 11 produces a magnetic circuit in the first and second coils 171 and 172 so that magnetic fluxes intersect the coils in the directions perpendicular to those of the respective coils.

The reference numeral 112 is a first base plate which is fixed to the inside of the rotary cylinder 103 and to which ends of the coils 171 and 172 are connected, and 113 is a second base plate which is fixed to the upper end face side of the rotary cylinder 103 and connected to the first base plate 112 though pins 114. The reference numeral is a slip ring having three electrodes fixed to the upper end portion of the rotary cylinder 103. The electrodes are connected to the coils 171 and 172 through lead wires 115a, the second base plate 113, the pins 114, and the first base plate 112. The reference numeral 116 is a brush which pressingly contacts with the outer face of the slip ring 115 to externally supply the electric power, 117 is a rotor of a motor which rotor is pressingly fitted onto the rotating shaft 102b, 118 is a stator of the motor which stator is attached to the stationary cylinder 101, 119 is a rotary yoke which is fixed to the rotating shaft 102b at a position opposite to the rotor 117 of the motor, 120 is a disk-like rotational rotary transformer attached to the rotary cylinder, and 121 is a disk-like fixed rotary transformer which is fixed to the stationary cylinder 101 at a position opposite to the rotational rotary transformer 120.

The operation of the magnetic heads 104a and 104b in which they swing in the axial direction of the rotating shaft 102b in the above configuration will be described. In FIGS. 22 and 26, when a current flows from the brush 116 to the first coil 171 through the slip ring 115, an electromagnetic force is generated in the first coil 171, and the first bobbin 105 to which the first coil 171 is fixedly attached moves in the axial direction of the rotating shaft 102b, to a position at which the electromagnetic force balances with the resilient forces of the first and second plate springs A 181 and 191. This causes the magnetic head 104a fixedly attached to the front end of the plate portion 191b of the second plate spring A 191, to move in the axial direction of the rotating shaft 102b. Similarly, when another current flows through the second coil 172, the magnetic head 104b fixedly attached to the front end of the plate portion 192b of the second plate spring B 192 to which the second bobbin 106 is fixedly attached is caused to move. In this case, the moving direction of the magnetic head 104a or 104b is uniquely decided depending upon the direction of the current flowing through the first coil 171 or the second coil 172. Therefore, by changing the direction of the current flowing through the first coil 171 or the second coil 172, the magnetic head 104a or 104b can be swung. Furthermore, by controlling the level of the current flowing through the first coil 171 or the second coil 172, the displacement distance of the magnetic head 104a or 104b can be controlled.

Figure 1:
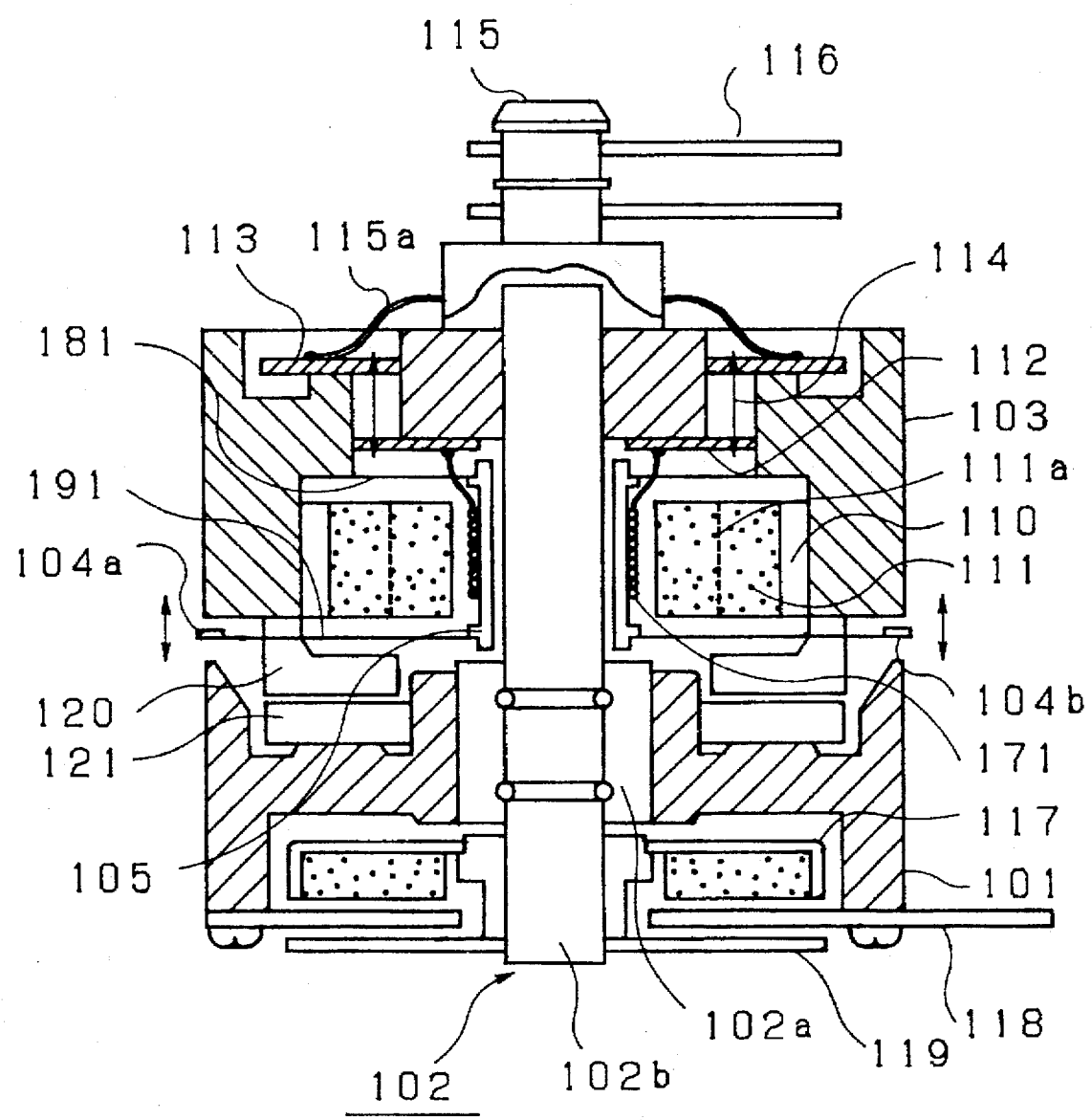
FIG. 1 is a section view of a prior art rotary magnetic head device.
Figure 2:
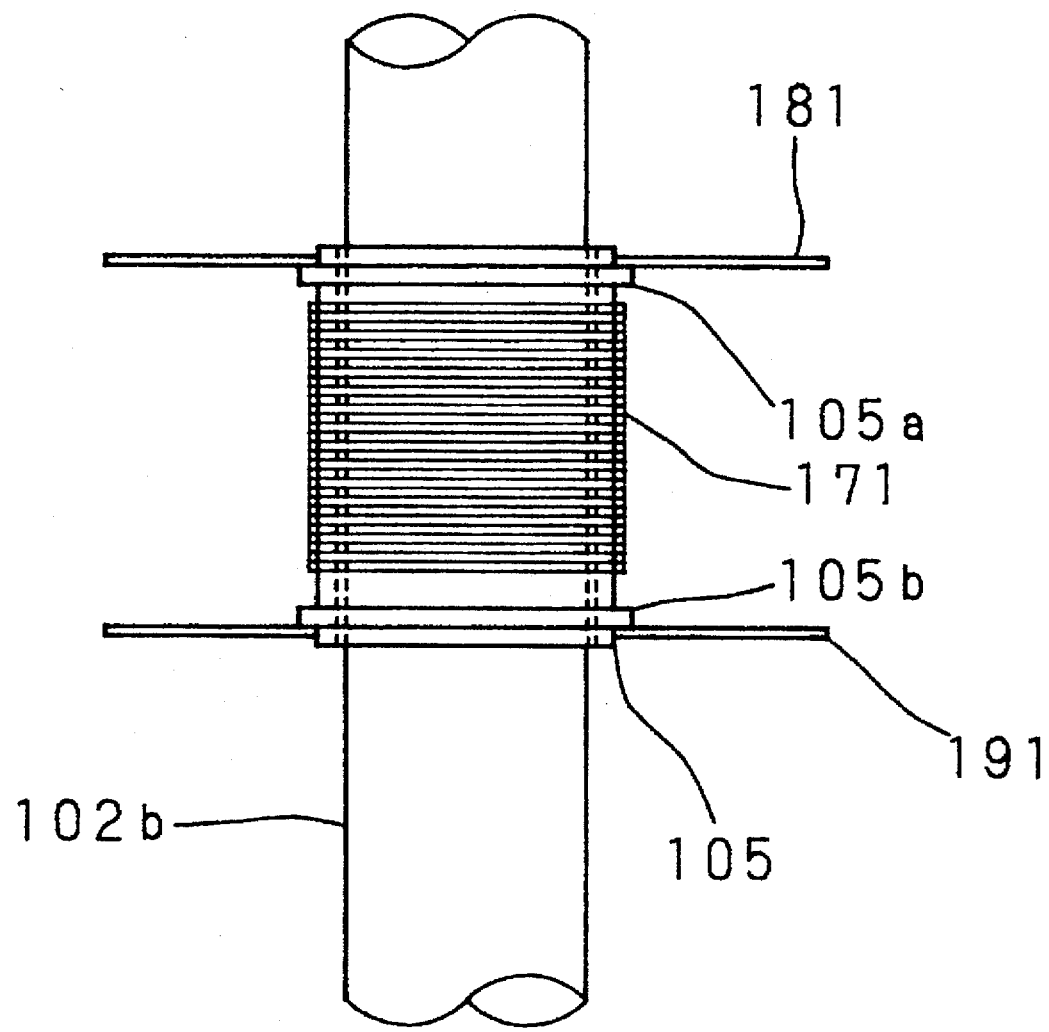
FIG. 2 is a side view showing the main portions of the prior art example.
Figure 3:
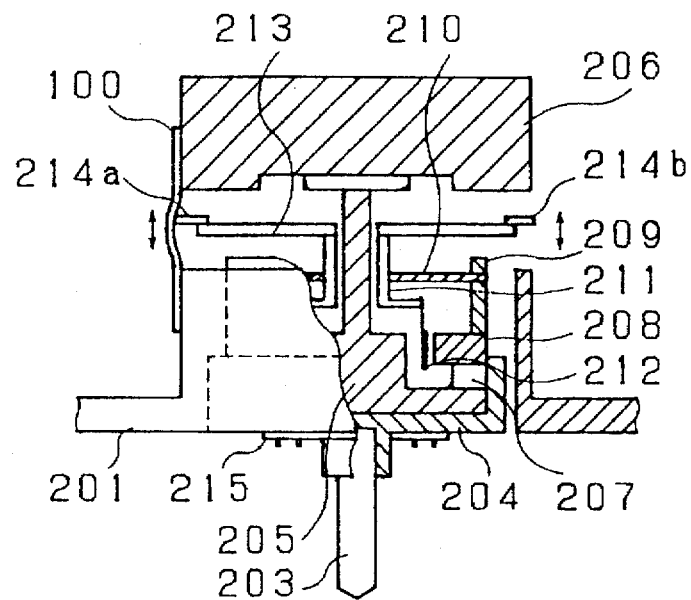
FIG. 3 is a section view of a prior art rotary magnetic head device.
Figure 4:
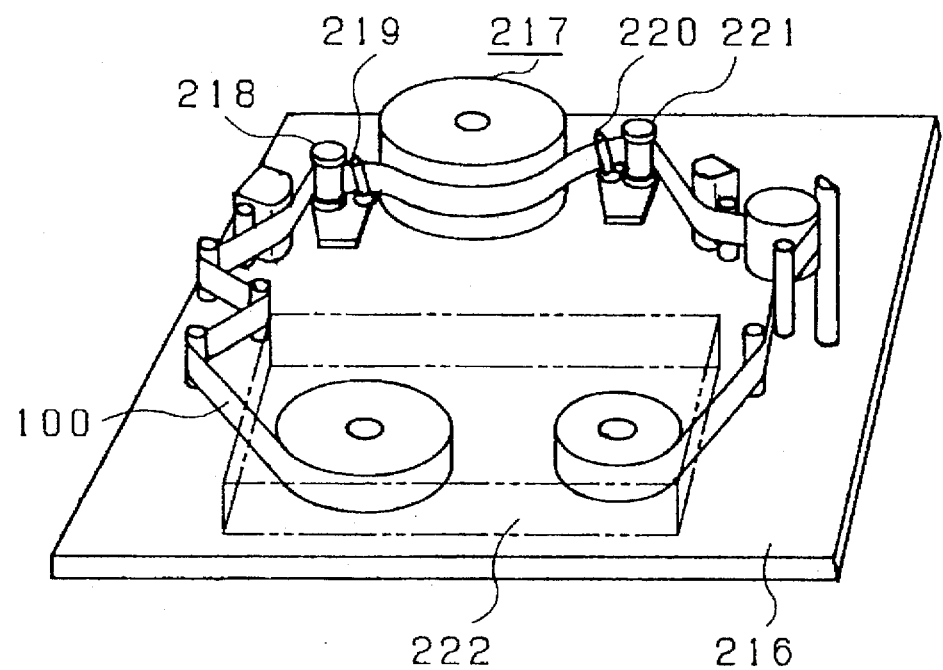
FIG. 4 is a perspective view showing the main portions of a conventional magnetic recording/reproduction apparatus.
Figure 5:
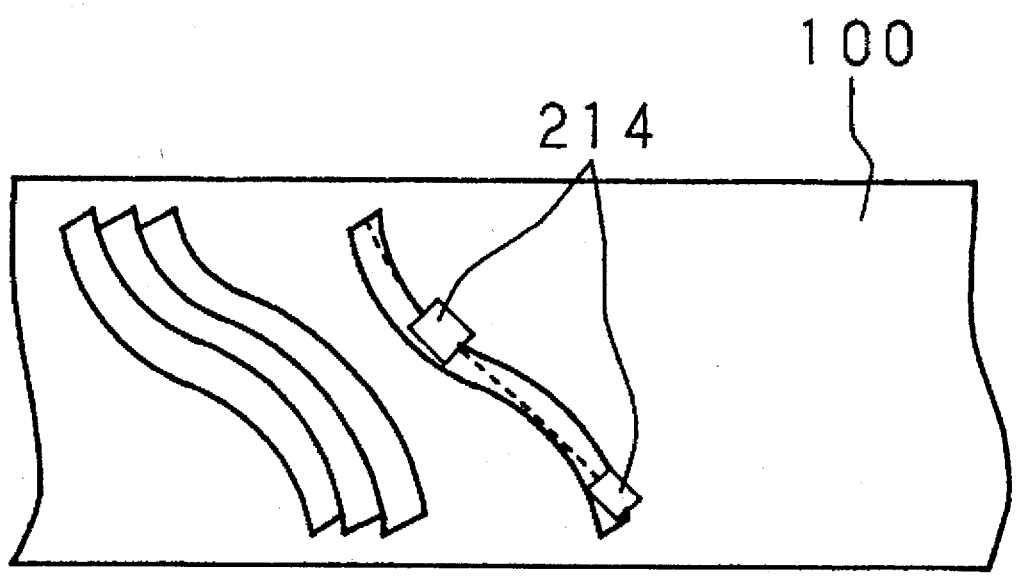
FIG. 5 is a diagram showing the operation of a magnetic head for performing the reproduction on a magnetic tape having a track curve.
Figure 6:
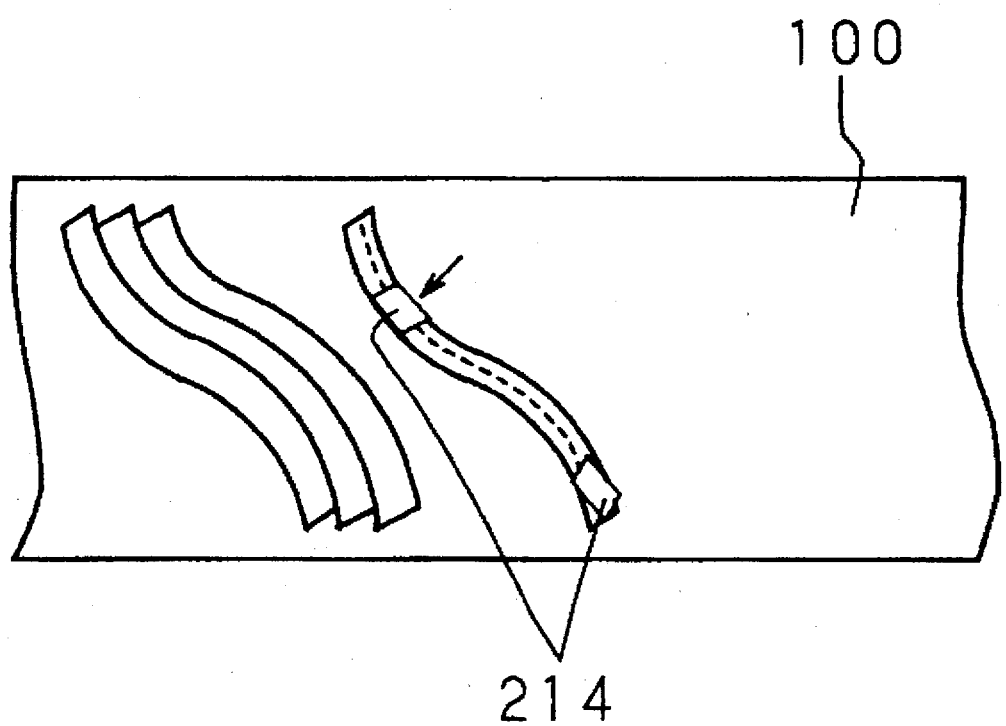
FIG. 6 is a diagram showing the operation of a magnetic head for performing the reproduction on a magnetic tape having a track curve.
Figure 7:
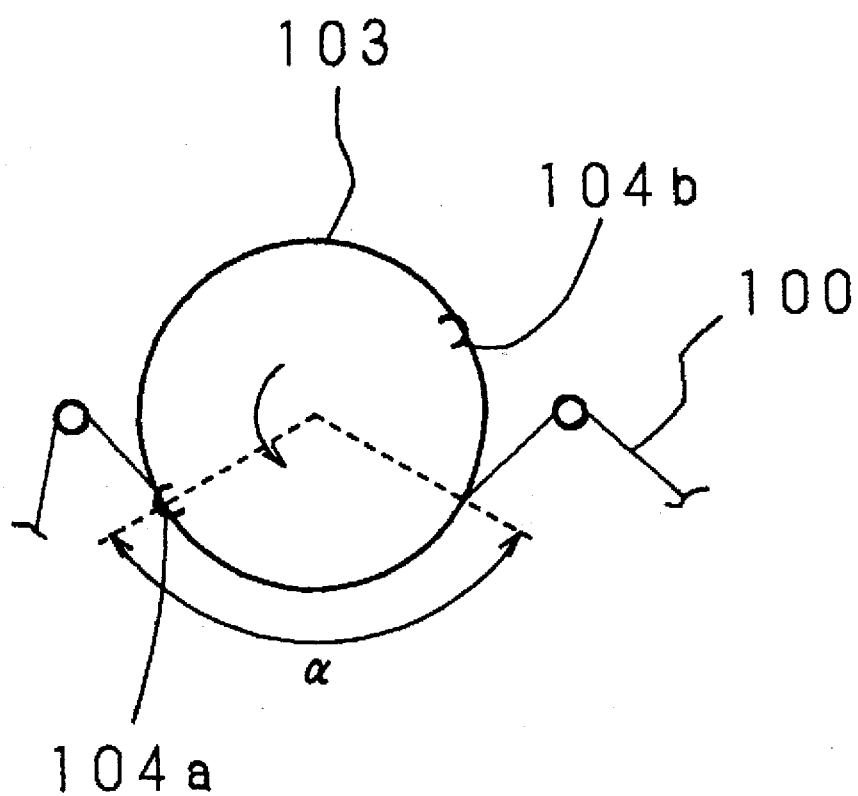
FIG. 7 is a front view showing a magnetic tape wound on a rotary head drum.

Next, the reproduction conducted on a magnetic tape where there exists a track curve will be described. A case will be first described where the wrap angle α of a magnetic tape 100 on the rotary cylinder 103 is 180 deg. or less as shown in FIG. 7. In a period where the magnetic head 104a contacts with the magnetic tape 100 and a reproduced signal is obtained, a driving current flows through the first coil 171 on the basis of an error signal detected from the reproduced signal, and the magnetic head 104a is driven in the axial direction of the rotating shaft 102b while being integral with the first bobbin 105, so that the magnetic head 104a follows the curved track. In a period where the magnetic head 104a departs from the magnetic tape 100 and the magnetic head 104b has not yet contacted with the magnetic tape 100, no driving current flows through both the first and second coils 71 and 172. In a period where the magnetic head 104b contacts with the magnetic tape 100 and a reproduced signal is obtained, a driving current flows through the second coil 172 on the basis of an error signal detected from the reproduced signal, and the magnetic head 104b is driven in the axial direction of the rotating shaft 102b while being integral with the second bobbin 106, so that the magnetic head 104b follows the curved track.

Figure 8:
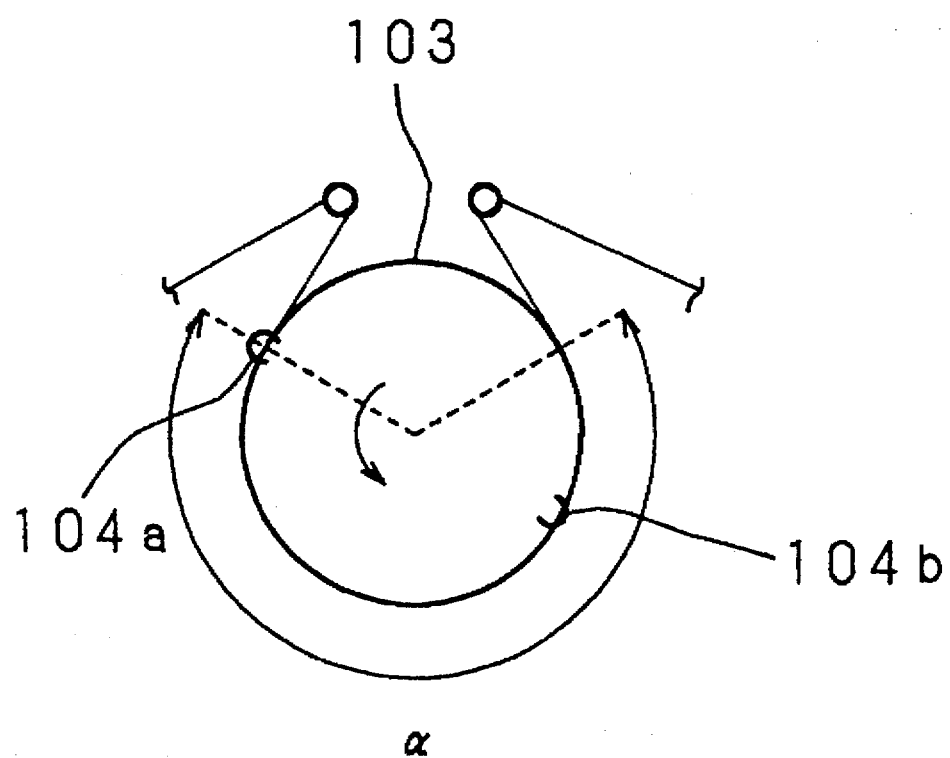
FIG. 8 is a front view showing a magnetic tape wound on a rotary head drum.
Figure 9:
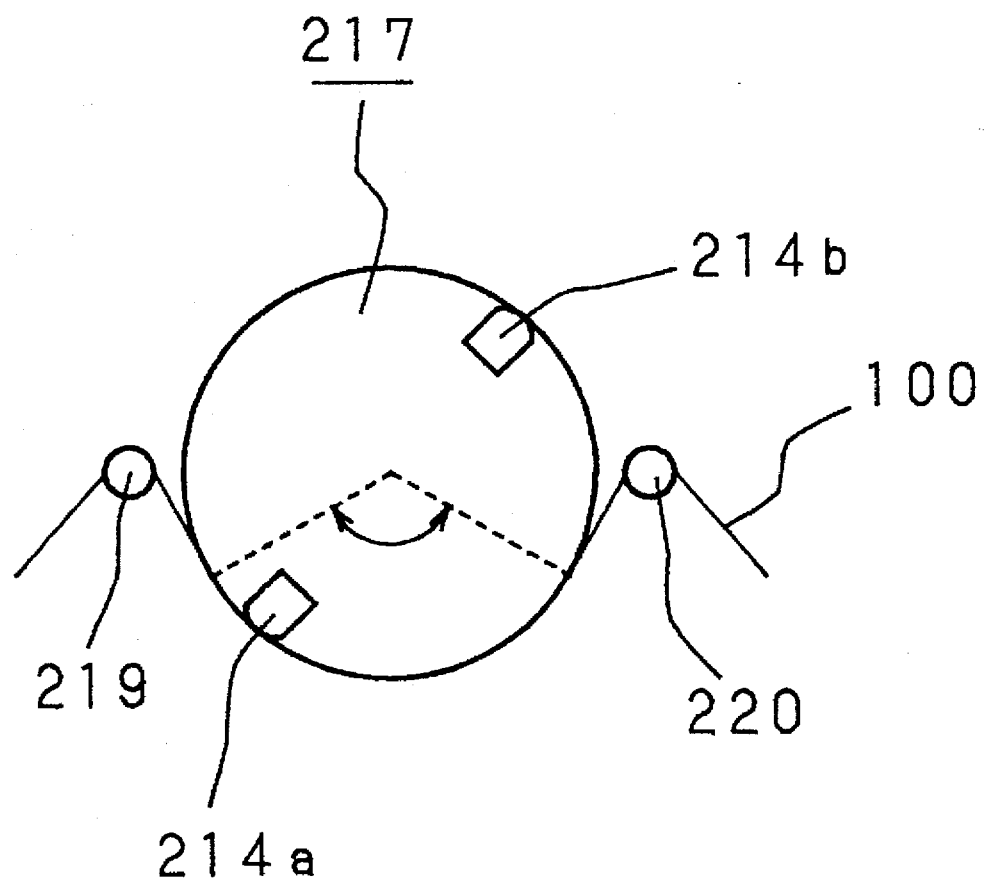
FIG. 9 is a front view showing a magnetic tape wound on a rotary magnetic head device.

Next, a case where the wrap angle α of the magnetic tape 100 on the rotary cylinder 103 is greater than 180 deg. as shown in FIG. 8 will be described. In a period when only the magnetic head 104a contacts with the magnetic tape 100 and a reproduced signal is obtained, a driving current flows through the first coil 171 in the same manner as the above-described case of FIG. 7, and the magnetic head 104a is driven in the axial direction of the rotating shaft 102b while being integral with the first bobbin 105, so that the magnetic head 104a follows the curved track. In a period when also the magnetic head 104b contacts with the magnetic tape 100, the magnetic heads 104a and 104b simultaneously contact with the magnetic tape 100. In this period, driving current flows through the first and second coils 171 and 172 on the basis of an error signal obtained from the reproduced signal, and the magnetic heads 104a and 104b are driven so that they follow the curved track. In this period, since the first plate spring A 181 and the second plate spring A 191 bend independently from the first plate spring B 182 and the second plate spring B 192, the magnetic heads 104a and 104b are driven in the axial direction of the rotating shaft 102b while being integral with the first bobbin 105 or the second bobbin 108, in such a manner that their movements do not interfere with each other. In this way, the above-described configuration enables the magnetic heads to follow a curved track during the reproduction process even in a case where the wrap angle α is 180 deg. or less or in a case where the wrap angle α is greater than 180 deg.

Embodiment 2

Figure 27:
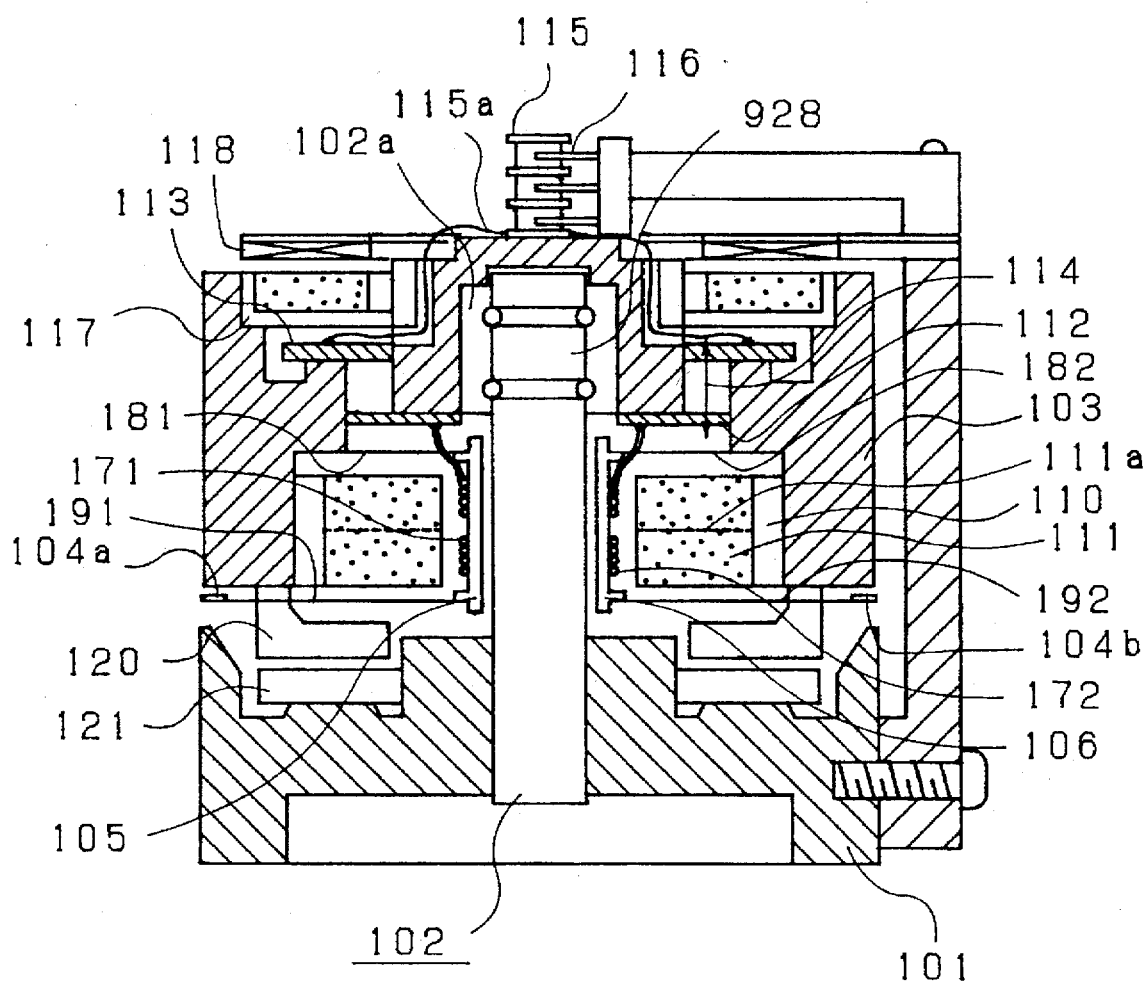
FIG. 27 is a section view of a rotary head drum used in Embodiment 2 of the invention.

As Embodiment 2, a rotary magnetic head device in which the shaft mechanism of Embodiment 1 is modified will be described. FIG. 27 is a section view of the rotary magnetic head device of Embodiment 2. In the figure, 928 is a stationary shaft which is pressingly inserted into the stationary cylinder 101. The rotor 117 of the motor is pressingly inserted into and fixed to the rotary cylinder 103, and the stator 118 of the motor is attached to the flange end face of the rotary cylinder 103. The other configurational points are the same as those of Embodiment 1, components identical with or corresponding to those of Embodiment 1 are designated with the same reference numerals, and their description is omitted. In the rotary magnetic head device, the magnetic heads can follow a curved track during the reproduction process even in a case where the wrap angle α is greater than 180 deg.

Embodiment 3

Figure 28:
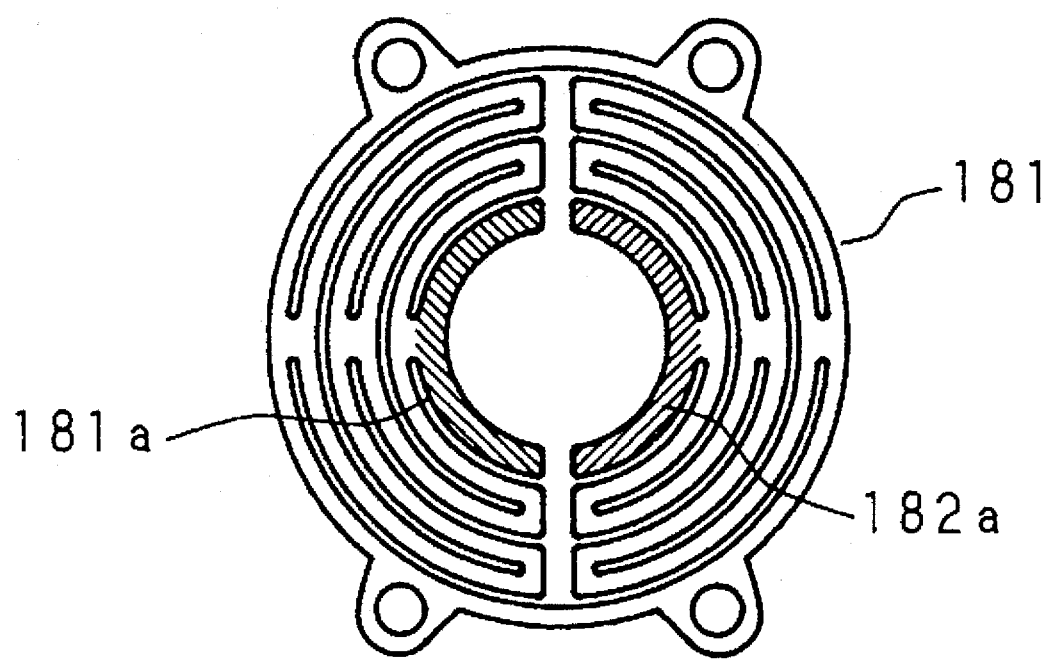
FIG. 28 is a plan view of a first plate spring used in Embodiment 3 of the invention.
Figure 29:
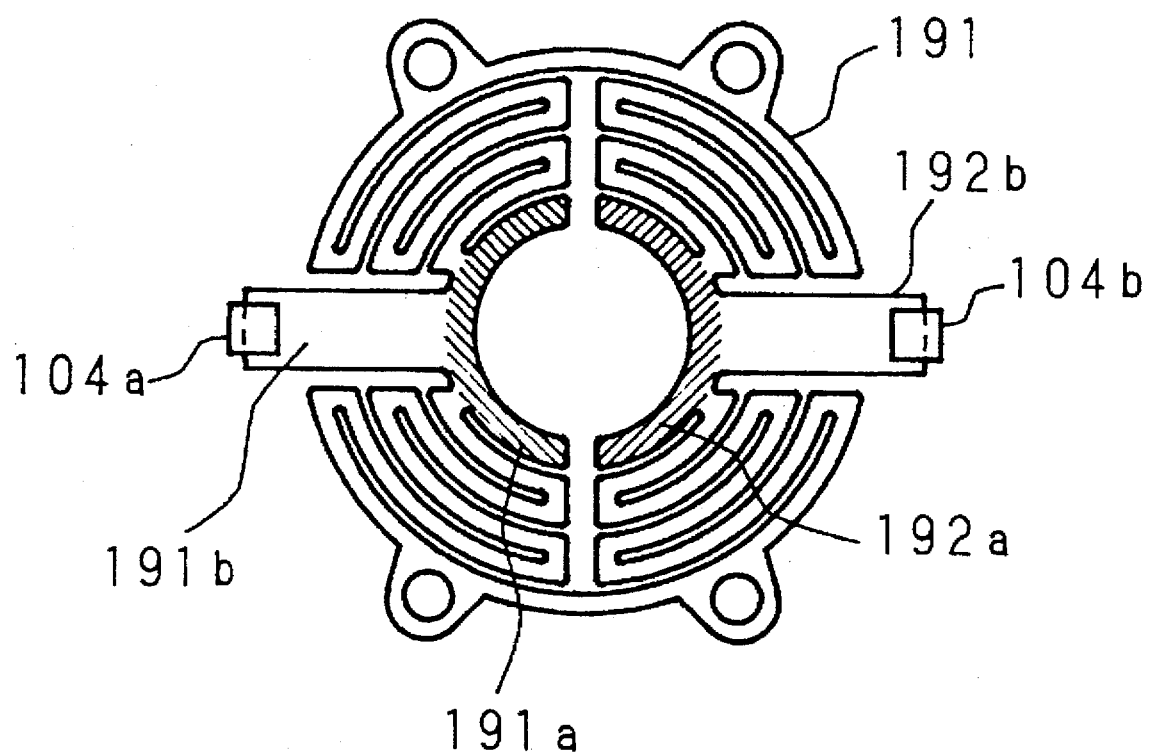
FIG. 29 is a plan view of a second plate spring used in Embodiments 3 and 6 of the invention.

Embodiment 3 will be described. In Embodiment 3, the first plate springs and second plate springs used in Embodiment 1 are replaced with a first plate spring and second plate spring each of which consists of a single plate spring. In FIGS. 28 and 29, 181 is the first plate spring consisting of a single plate spring which is fixed at an outer periphery portion to the rotary cylinder 103 and fixedly attached at inner periphery portions 181a and 182a to the first and second bobbins 105 and 106. The step portion 105a of the first bobbin 105 and the step portion 106a of the second bobbin 106 shown in FIG. 23 are fixedly attached to the inner periphery portions 181a and 182a of the plate springs which are hatched in FIG. 28, respectively. The inner peripheries 181a and 182a are independently swingable in the direction perpendicular to the sheet in FIG. 28, with respect to the outer periphery. In FIG. 29, 191 is a second plate spring. In the same manner as the first plate spring 181, the second plate spring 191 consists of a single plate spring which is fixed at an outer periphery portion to the rotary cylinder 103 and fixedly attached at inner periphery portions 191a and 192a to the first and second bobbins 105 and 106. The magnetic heads 104a and 104b are respectively held at the front ends of the plate portions 191b and 192b which elongate from the inner periphery portions 191a and 192a toward the outer periphery portion. The step portion 105b of the first bobbin 105 and the step portion 106b of the second bobbin 106 shown in FIG. 23 are fixedly attached to the inner periphery portions 191a and 192a of the plate springs which are hatched in FIG. 29, respectively. The inner periphery portions 191a and 192a are independently swingable in the direction perpendicular to the sheet in FIG. 29, with respect to the outer periphery portion. The other configurational points are the same as those of Embodiment 1.

According to this configuration, in each of the first and second plate springs 181 and 191, the center portions are connected to the different bobbins, but the outer periphery portion is constructed as one body. Therefore, the springs can easily be attached to the rotary cylinder 103. As shown in FIGS. 28 and 29, each of the first and second plate springs 181 and 191 is formed into one body only at the outer periphery portion. When the first and second coils 171 and 172 are driven by different currents, therefore, the first and second bobbins 105 and 106 can independently move in such a manner that their movements do not interfere with each other, whereby an excellent tracking operation can be conducted even in a case where the wrap angle α is greater than 180 deg.

Embodiment 4

Figure 30:
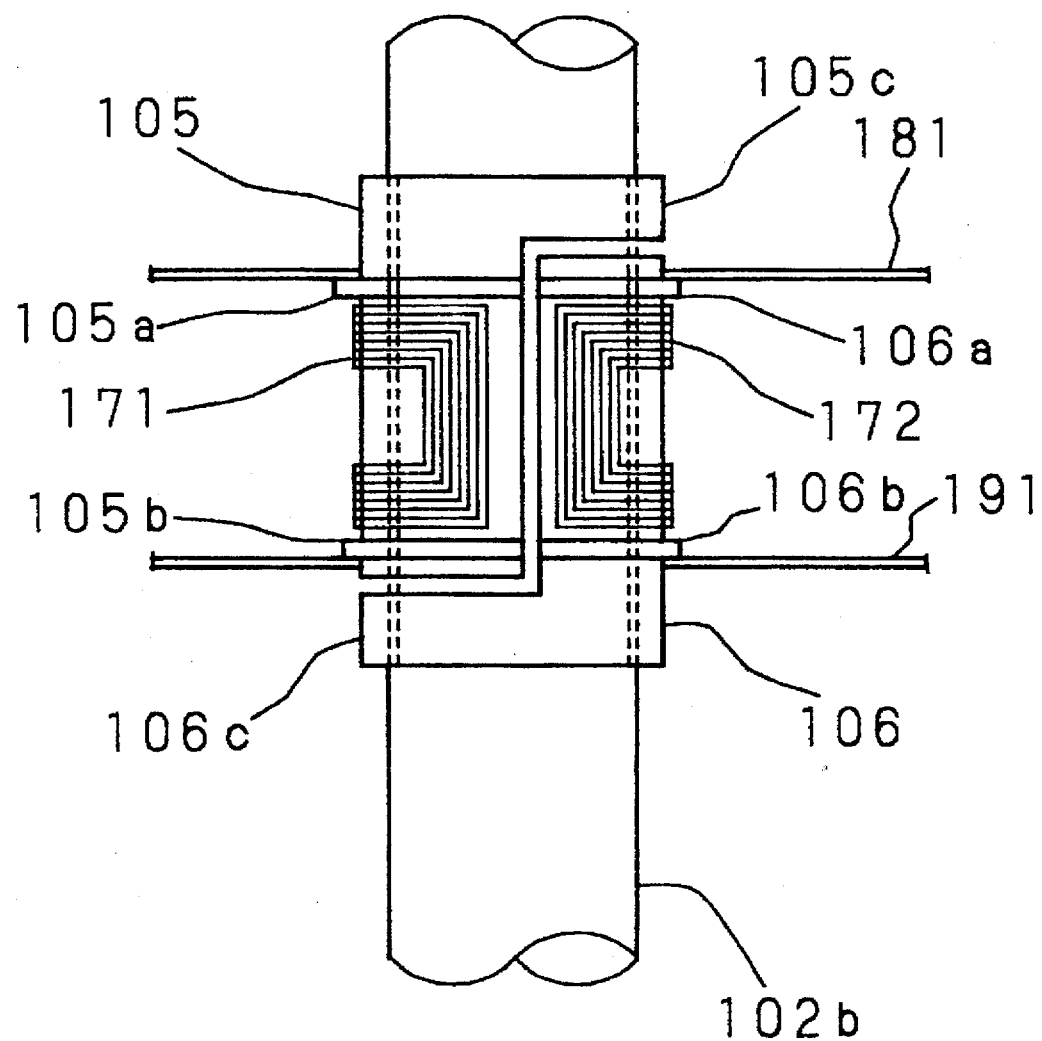
FIG. 30 is a side view showing the main portions of Embodiment 4 of the invention.
Figure 31:
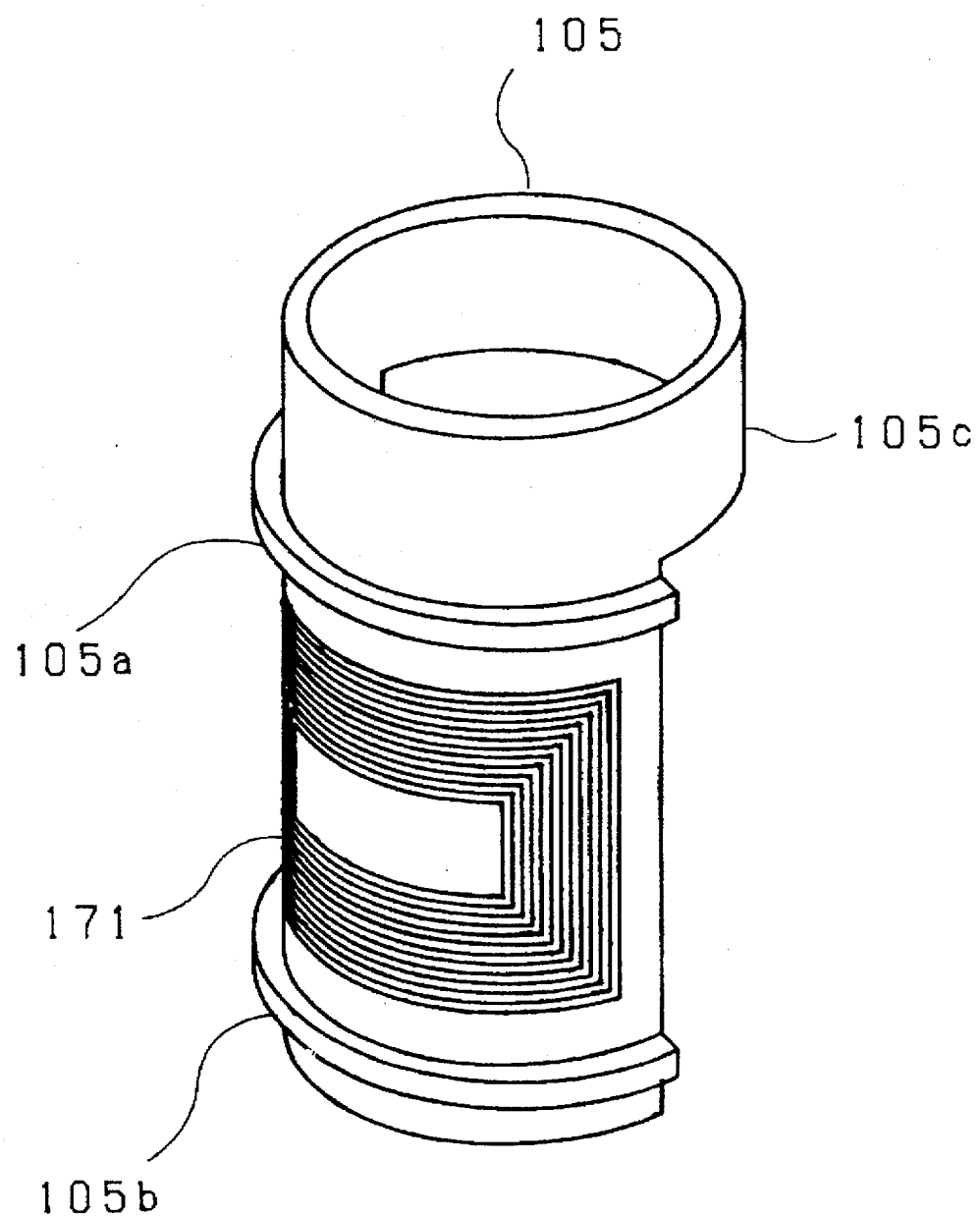
FIG. 31 is a perspective view showing the main portions of Embodiment 4 of the invention.
Figure 105:
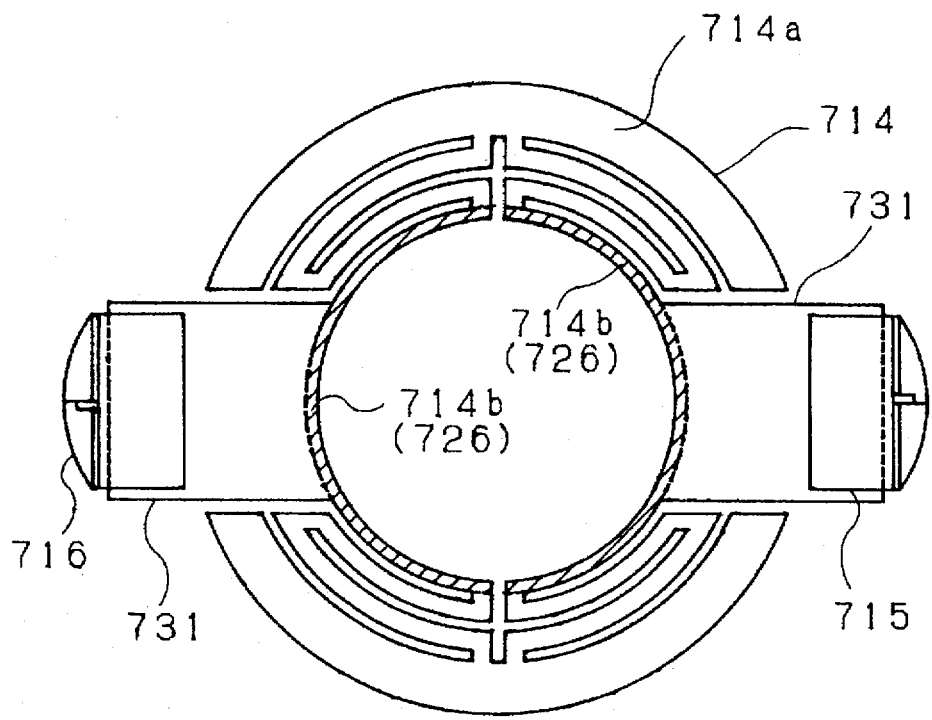
FIG. 105 is a plan view of an upper plate spring used in Embodiment 40.

Embodiment 4 will be described. In Embodiment 4, bobbins which are characteristic of the invention have another configuration. In FIGS. 30 and 31, 105 is a first bobbin which is molded from plastic. The first bobbin 105 has a semicylindrical portion and a fully cylindrical portion 105c which are continuously formed. The reference numeral 106 is a second bobbin having a shape which is the same as that of the first bobbin 105. The second bobbin 106 is disposed so that the combination of the first and second bobbins 105 and 106 forms a cylinder about the rotating shaft 102b. The bobbins respectively have step portions 105a and 105b and 106a and 106b which are formed in the vicinity of the boundary between the semicylindrical portion and the cylindrical portion. The step portions 105a and 105b and 106a and 106b are fixedly attached to the inner periphery portions of the first and second plate springs 181 and 191 which have been described in conjunction with Embodiments 1 and 3. The other configurational points are the same as those of Embodiments 1 and 3.

According to this configuration, in each of the first and second bobbins 105 and 106, the semicylindrical portion and the cylindrical portion 105c (106c) are formed into one body, and therefore the post-molding deformation caused in the plastic molding process can be suppressed by the cylindrical portion 105c, thereby enabling the dimensional accuracy of the inner diameter of the semicylindrical portion to be stably ensured. Furthermore, the cylindrical portion 105c can suppress a change in the cylinder diameter of the semicylindrical portion due to a change in environmental conditions.

Embodiment 5

Figure 34:
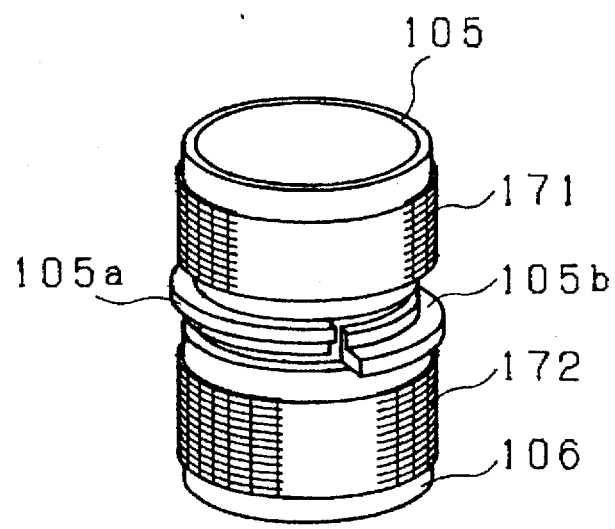
FIG. 34 is a perspective view showing the main portions of Embodiments 5 and 6 of the invention.
Figure 32:
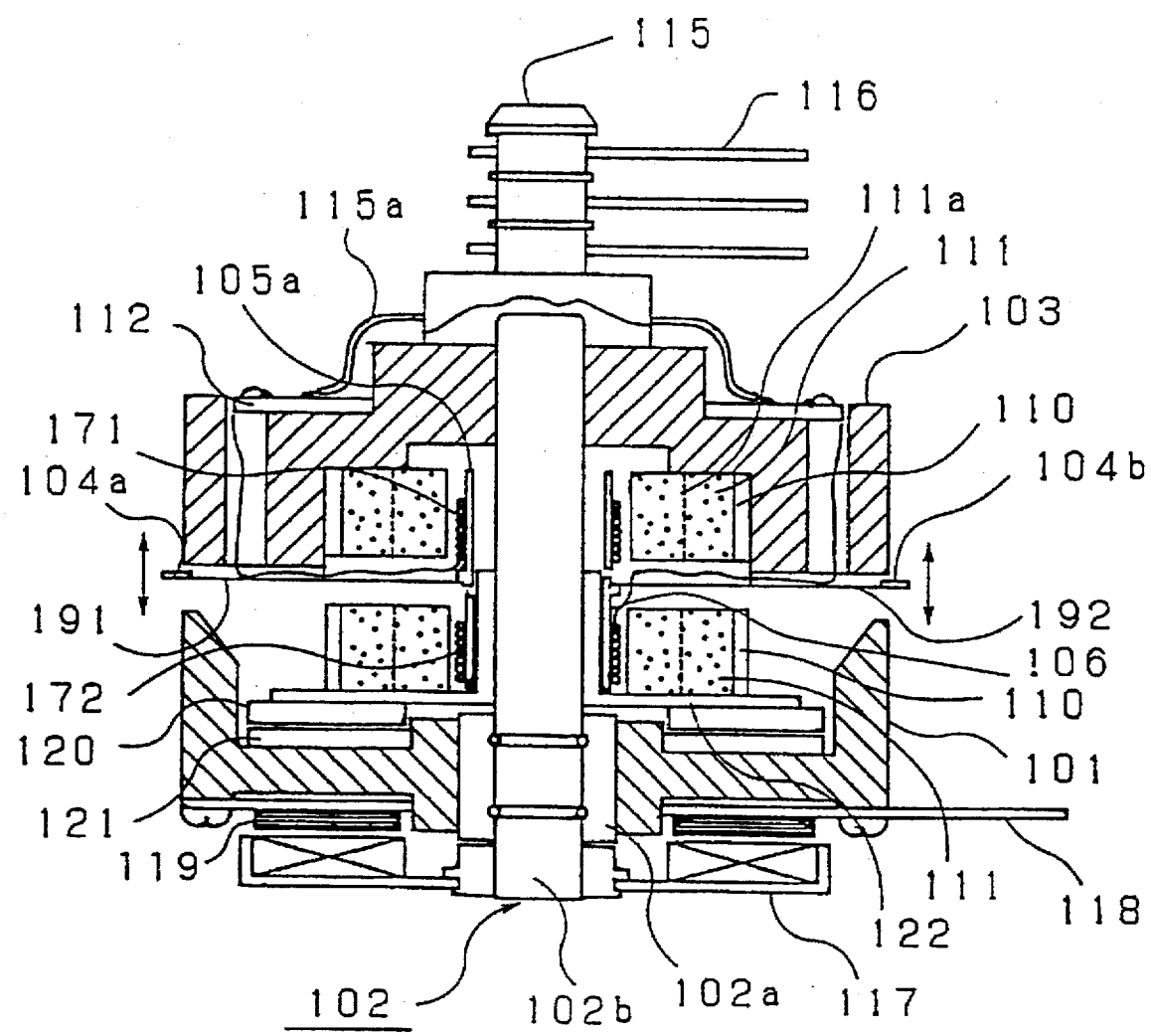
FIG. 32 is a section view of a rotary magnetic head device of Embodiment 5 of the invention.
Figure 33:
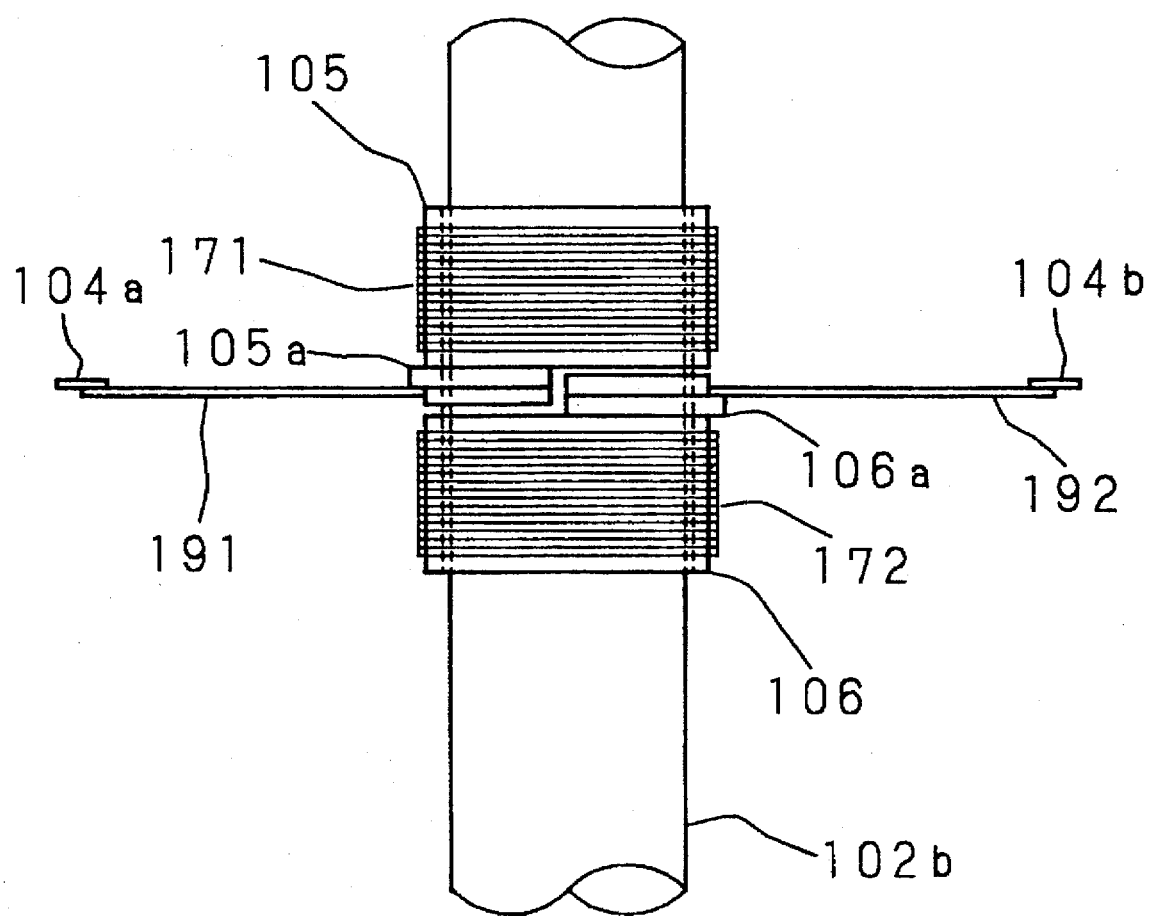
FIG. 33 is a side view showing the main portions of Embodiments 5 and 6 of the invention.

Embodiment 5 will be described with reference to FIG. 32 which is a section view of a rotary magnetic head device. In the figure, 101 is a stationary cylinder having an outer face on which a guide groove (lead) for guiding a magnetic tape is formed, 102 is a shaft-integrated bearing, 102a is a bearing portion which is pressingly inserted into and fixed to the stationary cylinder 101, and 102b is a rotating shaft which is pressingly inserted into and fixed to a rotary cylinder 103 and rotatable in any direction with respect to the stationary cylinder 101. The reference numeral 105 is a first bobbin which is concentric with the rotating shaft 102b and has a semicylindrical step portion 105a formed as shown in FIGS. 33 and 34 at the lower end face side of the bobbin, and 106 is a second bobbin which is concentric with the rotating shaft 102b and has a semicylindrical step portion 106a formed as shown in FIGS. 33 and 34 at the upper end face side of the bobbin. The second bobbin 106 is disposed under the first bobbin 105 in the axial direction of the rotating shaft 102b, and connected in parallel with the first bobbin 105. The portion under the step portion 105a of the first bobbin 105 and that above the step portion 106a of the second bobbin 106 are fixedly attached to the inner periphery portions 191a and 192a of the second plate spring A 191 and second plate spring B 192 shown in FIG. 25. The first and second bobbins 105 and 106 can swing in the vertical direction as viewed in FIG. 33. The second plate spring A 191 and the second plate spring B 192 respectively hold magnetic heads 104a and 104b disposed at the opposite positions or so as to form an angle of 180 deg., namely at the front ends of plate portions 191b and 192b which elongate from the inner periphery portions 191a and 192a toward the respective outer periphery portions. The magnetic heads 104a and 104b are swingable in the axial direction of the rotating shaft 102b while being respectively integral with the inner periphery portions 191a and 192a.

The reference numeral 110 is a cylindrical back yoke which is fixedly attached to the inside of the rotary cylinder 103, and 111 is a cylindrical magnet which is fixedly attached to the inner face of the back yoke 110 and is magnetized in the radial direction. The magnet 111 produces a magnetic circuit in the first and second coils 171 and 172 so that magnetic fluxes intersect the coils in the directions perpendicular to those of the respective coils. The reference numeral 112 is a base plate which is fixed to the upper end face side of the rotary cylinder 103 and to which ends of the coils 171 and 172 are connected, and 115 is a slip ring having three electrodes which are fixed to the upper end portion of the rotary cylinder 103 and connected to the coils 171 and 172 through lead wires 115a and the base plate 112. The reference numeral 116 is a brush which pressingly contacts with the outer face of the slip ring 115 to externally supply the electric power, 117 is a rotor of a motor which rotor is pressingly fitted onto the rotating shaft 102b, 118 is a stator of the motor which stator is attached to the stationary cylinder 101, 119 is a rotary yoke which is fixed to the rotating shaft 102b at a position opposite to the rotor 117 of the motor, 120 is a disk-like rotational rotary transformer attached to the rotary cylinder 103, and 121 is a disk-like fixed rotary transformer which is fixed to the stationary cylinder 101 at a position opposite to the rotational rotary transformer 120.

The operation of the magnetic heads 104a and 104b in which they swing in the axial direction of the rotating shaft 102b in the above configuration will be described. In FIGS. 32 and 33, when a current flows from the brush 116 to the first coil 171 through the slip ring 115, an electromagnetic force is generated in the first coil 171, and the first bobbin 105 on which the first coil 171 is wound moves in the axial direction of the rotating shaft 102b, to a position at which the electromagnetic force balances with the resilient force of the second plate spring A 191. This causes the magnetic head 104a fixedly attached to the front end of the plate portion 191b of the second plate spring A 191, to move in the axial direction of the rotating shaft 102b. Similarly, when another current flows through the second coil 172, the magnetic head 104b fixedly attached to the front end of the plate portion 192b of the second plate spring B 192 on which the second bobbin 106 is wound is caused to move. In this case, the moving direction of the magnetic head 104a or 104b is uniquely decided depending upon the direction of the current flowing through the first coil 171 or the second coil 172. Therefore, by changing the direction of the current flowing through the first coil 171 or the second coil 172, the magnetic head 104a or 104b can be swung. Furthermore, by controlling the level of the current flowing through the first coil 171 or the second coil 172, the displacement distance of the magnetic head 104a or 104b can be controlled.

Next, the reproduction conducted on a magnetic tape where there exists a track curve will be described. A case will be first described where the wrap angle α of a magnetic tape 100 on the rotary cylinder 103 is 180 deg. or less as shown in FIG. 7. In a period where the magnetic head 104a contacts with the magnetic tape 100 and a reproduced signal is obtained, a driving current flows through the first coil 171 on the basis of an error signal detected from the reproduced signal, and the magnetic head 104a is driven in the axial direction of the rotating shaft 102b while being integral with the first bobbin 105, so that the magnetic head 104a follows the curved track. In a period where the magnetic head 104a departs from the magnetic tape 100 and the magnetic head 104b has not yet contacted with the magnetic tape 100, no driving current flows through both the first and second coils 171 and 172. In a period where the magnetic head 104b contacts with the magnetic tape 100 and a reproduced signal is obtained, a driving current flows through the second coil 172 on the basis of an error signal detected from the reproduced signal, and the magnetic head 104b is driven in the axial direction of the rotating shaft 102b while being integral with the second bobbin 106, so that the magnetic head 104b follows the curved track.

Next, a case where the wrap angle α of the magnetic tape 100 on the rotary cylinder 103 is greater than 180 deg. as shown in FIG. 8 will be described. In a period when only the magnetic head 104a contacts with the magnetic tape 100 and a reproduced signal is obtained, a driving current flows through the first coil 171 in the same manner as the above-described case of FIG. 7, and the magnetic head 104a is driven in the axial direction of the rotating shaft 102b while being integral with the first bobbin 105, so that the magnetic head 104a follows the curved track. In a period when also time magnetic head 104b contacts with time magnetic tape 100, the magnetic heads 104a and 104b simultaneously contact with time magnetic tape 100. In this period, driving currents flow through the first and second coils 171 and 172 on the basis of an error signal obtained from time reproduced signal, and the magnetic heads 104a and 104b are driven so that they follow the curved track. In this period, since the second plate spring A 191 and the second plate spring B 192 bend independently from each other, the magnetic heads 104a and 104b are driven in the axial direction of the rotating shaft 102b while being integral with the first bobbin 105 or the second bobbin 106, in such a manner that their movements do not interfere with each other. In this way, the above-described configuration enables the magnetic heads to follow a curve track during the reproduction process even in a case where the wrap angle α is 180 deg. or less of in a case where the wrap angle α is greater than 180 deg. Since the first and second bobbins 105 and 106 are formed into a fully cylindrical shape, they have a high strength, thereby suppressing a problem in that, when handled, such a bobbin is deformed.

Embodiment 6

Embodiment 6 will be described. In Embodiment 6, the second plate springs A 191 and B 192 used in Embodiment 5 are replaced with a single plate spring. In FIGS. 33 and 34, 105 is a first bobbin which is concentric with the rotating shaft 102b and has a semicylindrical step portion 105a formed at the lower end face side of the bobbin, and 106 is a second bobbin which is concentric with the rotating shaft 102b and has a semicylindrical step portion 106a at the upper end face side of the bobbin. The second bobbin 106 is disposed under the first bobbin 105 in the axial direction of the rotating shaft, and connected in parallel with the first bobbin 106. The portion under the step portion 105a of the first bobbin 105 and that above the step portion 106a of the second bobbin 106 are fixedly attached to inner periphery portions 191a and 192a of the second plate spring 191 shown in FIG. 29. The first and second bobbins 105 and 106 can swing in the vertical direction as viewed in FIG. 33. The second plate spring 191 holds magnetic heads 104a and 104b disposed at the opposite positions or so as to form an angle of 180 deg., namely at the front ends of plate portions 191b and 192b which elongate from the inner periphery portions 191a and 192a toward the respective outer periphery portions. The magnetic heads 104a and 104b are swingable in the axial direction of the rotating shaft 102b while being respectively integral with the inner periphery portions 191a and 192a. The other configurational points are the same as those of Embodiment 5.

According to this configuration, in the second plate spring 191, the center portions are connected to the different bobbins, but the outer periphery portion is constructed as one body. Therefore, the spring can easily be attached to the rotary cylinder 103. As shown in FIG. 29, the second plate spring 191 is formed into one body only at the outer periphery portion. When the first and second coils 171 and 172 are driven by different currents, therefore, the first and second bobbins 105 and 106 can independently move such a manner that their movements do not interfere with each other, whereby an excellent tracking operation can be conducted even in a case where the wrap angle α on the rotary cylinder 103 is greater than 180 deg. Since the first and second bobbins 105 and 106 are formed into a fully cylindrical shape, they lave a high strength, thereby suppressing a problem in that, when handled, such a bobbin is deformed.

Embodiment 7

Figure 35:
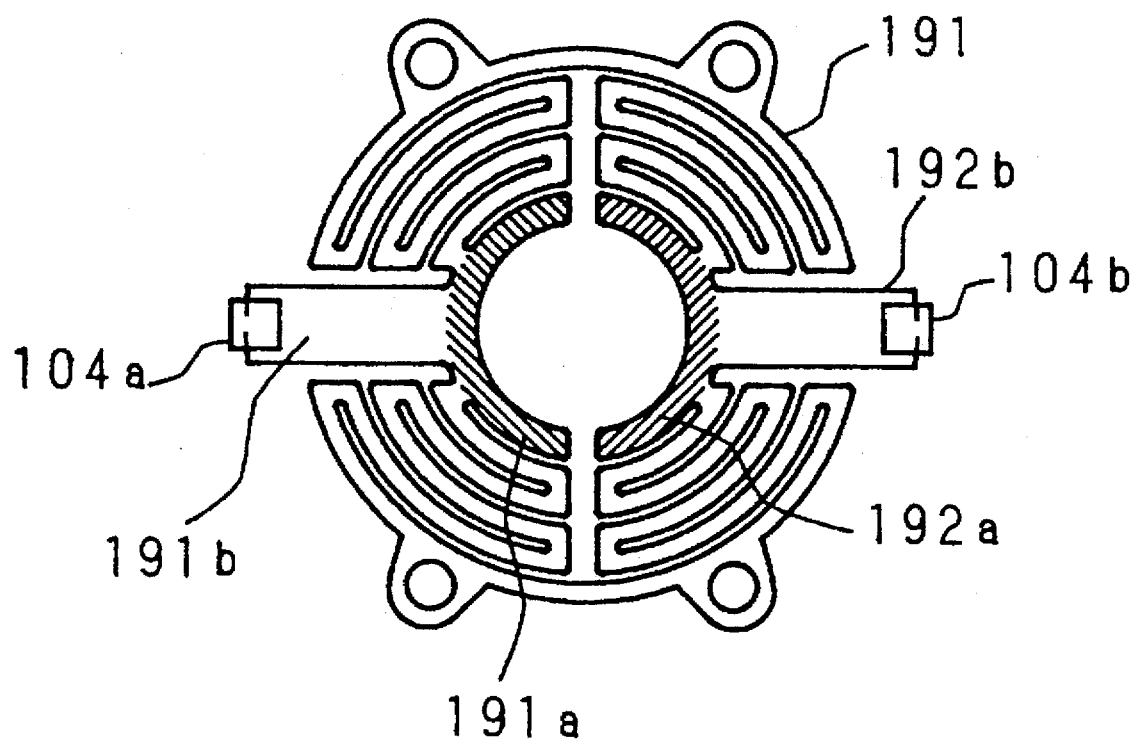
FIG. 35 is a view showing a state of fixedly attaching magnetic heads to a second plate spring in Embodiment 7 of the invention.

In Embodiments 1 to 6 described above, one magnetic head is held by the front end of a plate spring such as that shown in FIG. 25 or 29. Alternatively, as shown in FIG. 35, two or more magnetic heads may be held by the front end of a plate spring.

In this configuration, the band width of signals which are to be handled by one magnetic head can be reduced. When the band width of signals which are to be handled by one magnetic head is fixed, it is possible to perform a recording/reproduction of a broader band width.

In Embodiments 3 to 7, the shaft mechanism of the rotary magnetic head device is of the rotary type. Alternatively, the shaft mechanism may be of the stationary type.

Embodiment 8

Figure 36:
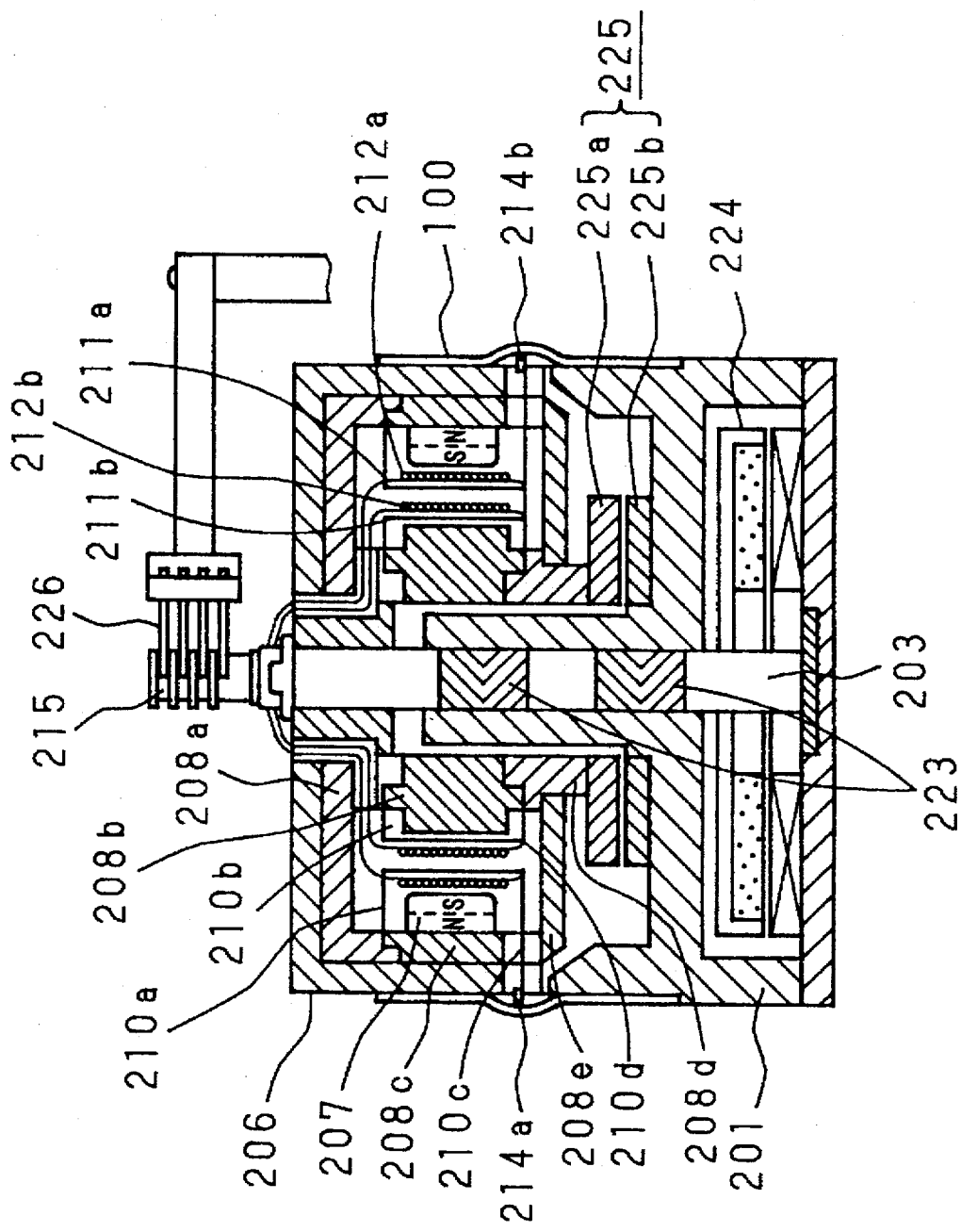
FIG. 36 is a sectional side view of a rotary magnetic head device of Embodiment 8 of the invention.

FIG. 36 is a section view showing an embodiment of the invention. In the figure, 201 is a stationary cylinder which has a lead for adequately holding a magnetic tape 100 while slanting it, and a sleeve at the center, and 206 is a cylindrical rotary cylinder made of a nonmagnetic material. A rotating shaft 203 having a wedge-like groove 223 formed on the outer face is pressingly inserted into and fixed to the rotary cylinder 206, and rotatably supported by the stationary cylinder 201. A lubricant is poured into the space between the wedge-like groove 223 and the sleeve of the stationary cylinder 201. The reference numeral 208a is a first yoke which has a substantially disk-like shape and is fixedly attached to the inside of the rotary cylinder 206 and made of a magnetic material, 208b is a second cylindrical yoke which is concentric with the rotating shaft 203, fixedly attached to the first yoke 208a and made of a magnetic material, 208c is a third cylindrical yoke which opposes the second yoke 208b and is fixedly attached to the first yoke 208a and made of a magnetic material, 208d is a fourth cylindrical yoke which is fixedly attached to the second yoke 208b and made of a magnetic material, and 208e is a fifth yoke which is made of a disk-like magnetic material. The fifth yoke 208e closes the annular groove formed by the first to fourth yokes 208a to 208d, so as to form a magnetic path. In the third yoke 208c and the rotary cylinder 206, windows are formed through which magnetic heads 214a and 214b attached to third and fourth plate springs 210c and 210d (described later) respectively protrude.

Figure 37:
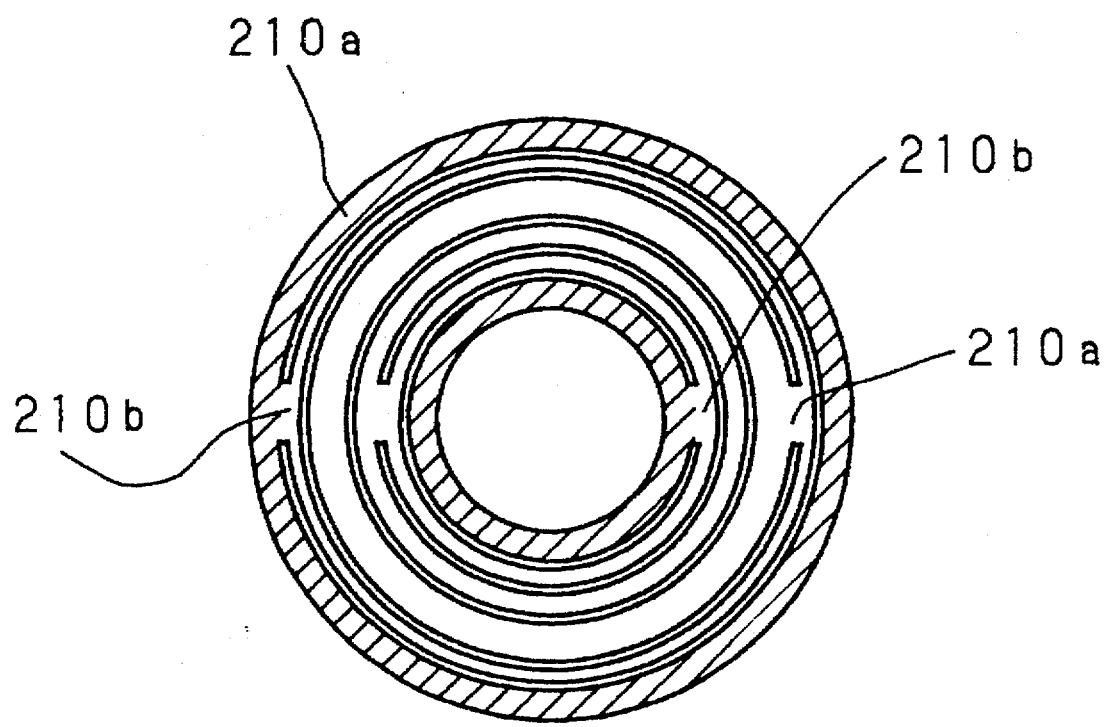
FIG. 37 is a front view of a plate spring member used in Embodiment 8 of the invention.
Figure 38:
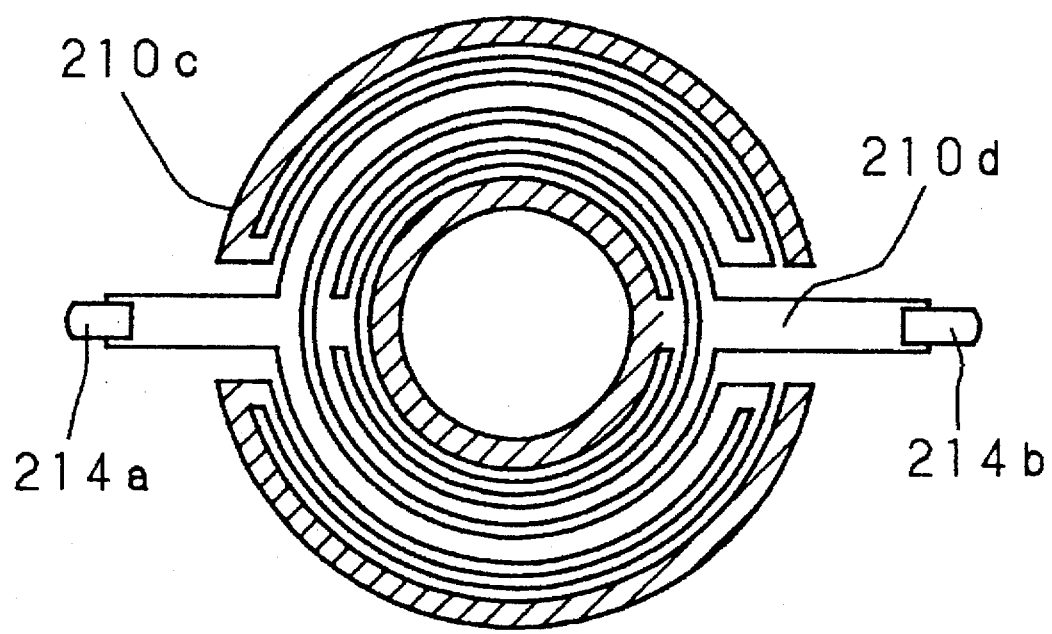
FIG. 38 is a front view of a plate spring member used in Embodiment 8 of the invention.
Figure 39:
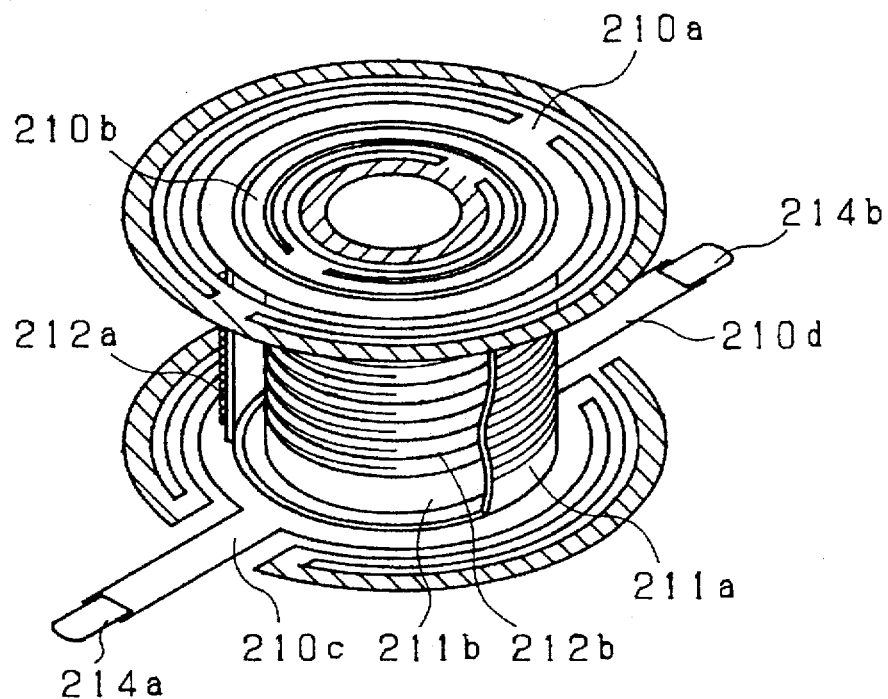
FIG. 39 is a perspective view of a magnetic head moving unit used in Embodiment 8 of the invention.

The reference numeral 207 is a hollow cylindrical permanent magnet which is fixedly concentrically attached to the inside of the third yoke 208c and is magnetized in the radial direction. The reference numeral 210a is a first plate spring which is fixed at an outer periphery portion (the hatched portion in FIG. 37) to the first yoke 208a as shown in FIG. 37 and made of a nonmagnetic material, 210b is a second plate spring which is fixed at an inner periphery portion to the first yoke 208a as shown in FIG. 37 and made of a nonmagnetic material, 210c is the third plate spring which is fixed at an outer periphery portion (excluding a part of the portion) to the third yoke 208c as shown in FIG. 38 and made of a nonmagnetic material, and 210d is the fourth plate spring which is fixed at an inner periphery portion to the second yoke 208b and made of a nonmagnetic material. The reference numeral 211a is a first cylindrical bobbin which is fixedly attached at the both ends to the inner peripheries of the first and third plate springs 210a and 210c and made of a nonmagnetic material, 212a is a first coil which is formed by an insulated wire wound on the outer face of the first bobbin 211a, 211b is a second cylindrical bobbin which is fixedly attached at the both ends to the outer peripheries of the second and fourth plate springs 210b and 210d and made of a nonmagnetic material, 212b is a second coil which is formed by an insulated wire wound on the outer face of the second bobbin 211b, 214a is the magnetic head which is fixedly attached to the front end of the extended portion of the third plate spring 210c and protrudes from the rotary cylinder 206 by a given length, and 214b is the magnetic head which is fixedly attached to the front end of the extended portion of the fourth plate spring 210d and protrudes from the rotary cylinder 206 by a given length. FIG. 39 is a perspective view showing movable portions of the magnetic heads 214. The reference numeral 225a is a disk-like rotational rotary transformer fixedly attached to the fifth yoke 208e, 225b is a disk-like fixed rotary transformer fixedly attached to the stationary cylinder 201, 215 is a slip ring fixedly attached to the first yoke 208, and 226 is a brush for externally supplying the electric power.

In the description of FIG. 36, the element 207 is a permanent magnet. The element 207 may be realized by any configuration as far as it can generate a magnetic force, and, for example, may be a configuration in which a current flows through a coil to generate an electromagnetic force. The permanent magnet 207 and the first to fifth yokes 208a to 208e are not required to fully run around the rotating shaft 203, and the magnetic circuit may be formed in a circular arc.

Then, the operation will be described. First, a bearing portion of the rotary magnetic head device 217 will be described. When a motor 224 rotates, the rotating shaft 203 fixed to the motor 224 coaxially rotates inside the sleeve of the stationary cylinder 201, thereby causing the wedge-like groove 223 formed on the rotating shaft 203 to perform the pumping action. This pumping action produces a pressure in the lubricant so that the rotating shaft 203 stably rotates without contacting with the stationary cylinder 201.

Figure 40:
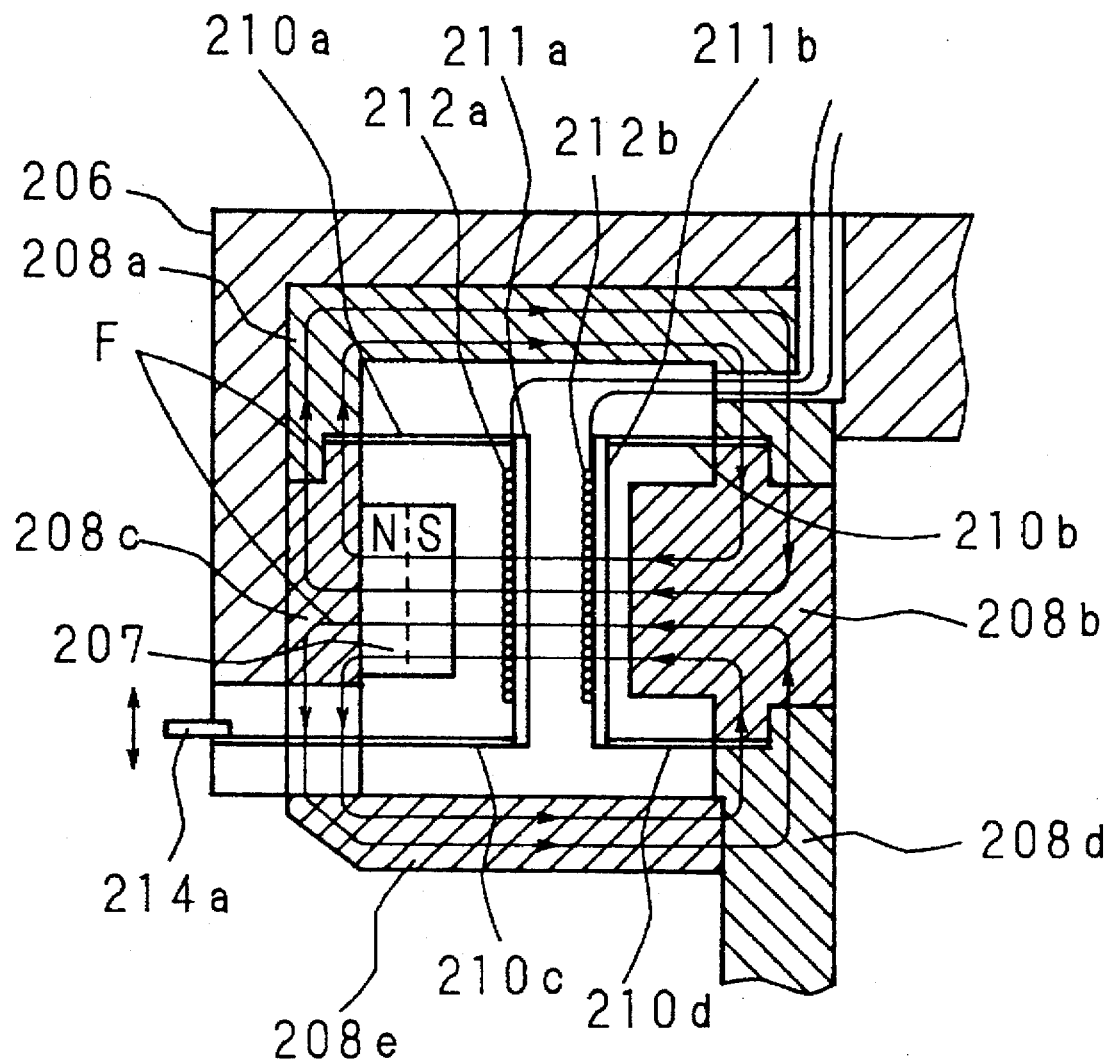
FIG. 40 is a view showing a magnetic circuit of the magnetic head moving unit used in Embodiment 8 of the invention.

Next, the movements of the two magnetic heads 214a and 214b in the axial direction will be described. As shown in FIG. 40, the permanent magnet 207 generates magnetic fluxes F in the magnetic path constituted by the first to fifth yokes 208a to 208e. When a current is supplied from the brush 226 through the slip ring 215 to the first coil 212a which intersects with the magnetic fluxes F, a driving force due to the electromagnetic force is generated in the first coil 212a so that the first bobbin 211a on which the first coil 212a is wound is moved in the axial direction of the rotating shaft 203 to a position at which the generated driving force balances with the resilient forces of the first and third plate springs 210a and 210c. This causes also the magnetic head 214a fixedly attached to the extended portion of the third plate spring 210c to move in the axial direction of the rotating shaft 203. Similarly, when another current flows through the second coil 212b, also the magnetic head 214b fixedly attached to the extended portion of the fourth plate spring 210d to which the second bobbin 211b is fixedly attached is caused to move independently from the magnetic head 214a in the axial direction of the rotating shaft 203. In this case, the moving direction of the magnetic head 214a or 214b is uniquely decided depending upon the direction of the current flowing through the first coil 212a or the second coil 212b. Therefore, by changing the direction of the current flowing through the first coil 212a or the second coil 212b, the magnetic head 214a or 214b can respectively be moved in axial direction of the rotating shaft 203. Furthermore, by controlling the level of the current flowing through the first coil 212a or the second coil 212b, the moving distance of the magnetic head 214a or 214b can be controlled.

Figure 10:
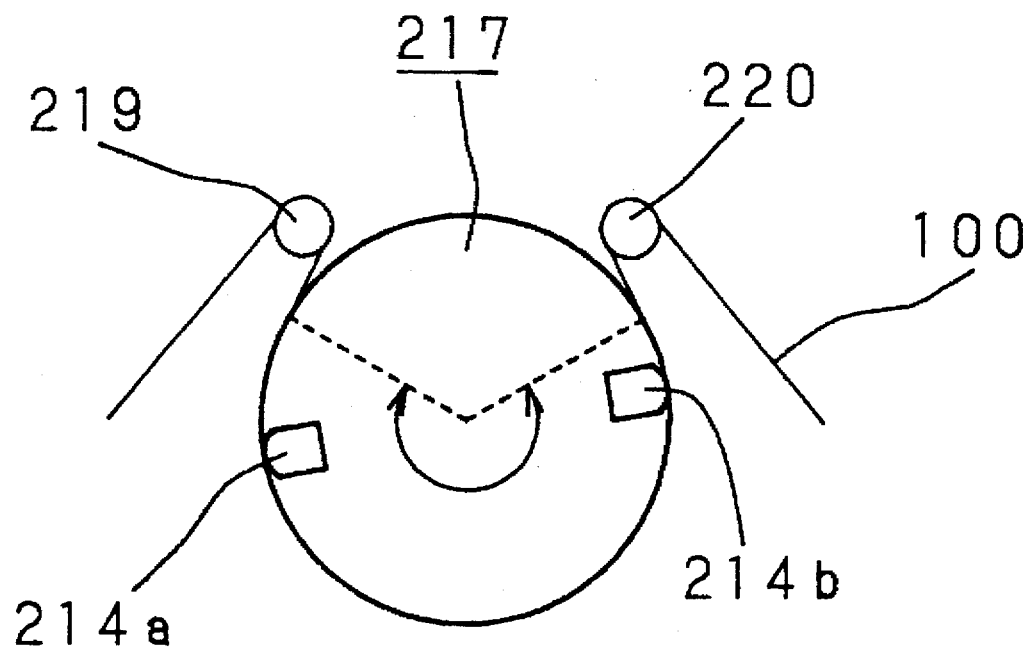
FIG. 10 is a front view showing a magnetic tape wound on a rotary magnetic head device.
Figure 41:
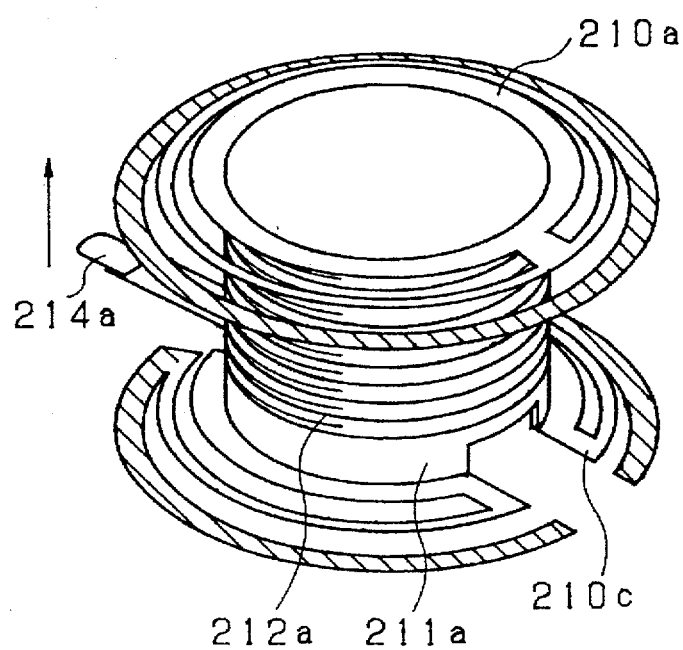
FIG. 41 is a view showing the operation of the magnetic head moving unit used in Embodiment 8 of the invention.
Figure 42:
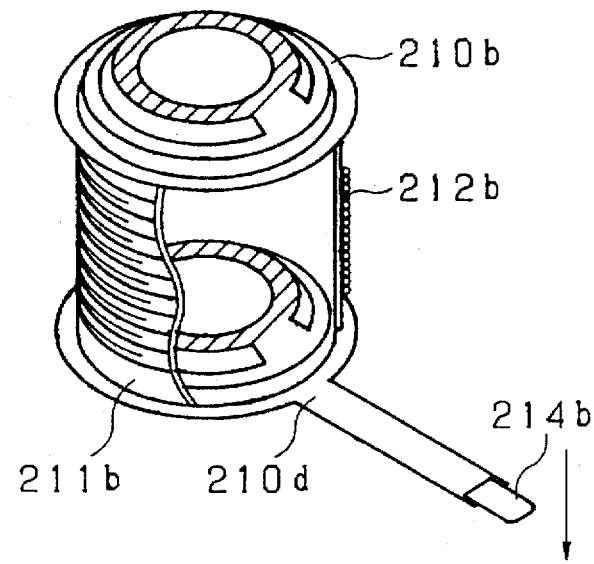
FIG. 42 is a view showing the operation of the magnetic head moving unit used in Embodiment 8 of the invention.

Next, the reproduction process in the rotary magnetic head device in which a magnetic tape 100 having a track curve is wound by a wrap angle of 180 deg. or more and will be described. In a case where the magnetic tape 100 is wound on the rotary magnetic head device 217 by an angle of 180 deg. or more as shown in FIG. 10, when the motor 224 is driven to rotate the rotary cylinder 206, namely, the magnetic heads 214 under the slate where, for example, the magnetic head 214a is positioned in the vicinity of the tape entrance and reproduces a recorded signal, also the other magnetic head 214b contacts with the magnetic tape 100 to reproduce another recorded signal. Therefore, the relative positional relationship between the record track and the magnetic head 214a is detected, and a current of an adequate level is supplied through the slip ring 215, thereby moving the magnetic head 214a in the axial direction of the rotating shaft 203 as shown in FIG. 41, so as to accurately follow the curved recording track. Therefore, it is possible to obtain a stable output signal. Similarly, when a current other than that supplied to the first coil 212a is supplied to the second coil 212b through the slip ring 215, the magnetic head 214b is moved in the axial direction of the rotating shaft 203 as shown in FIG. 42, so that also the magnetic head 214b can accurately follow the curved recording track. Therefore, it is possible to obtain a stable output signal.

Embodiment 9

Figure 43:
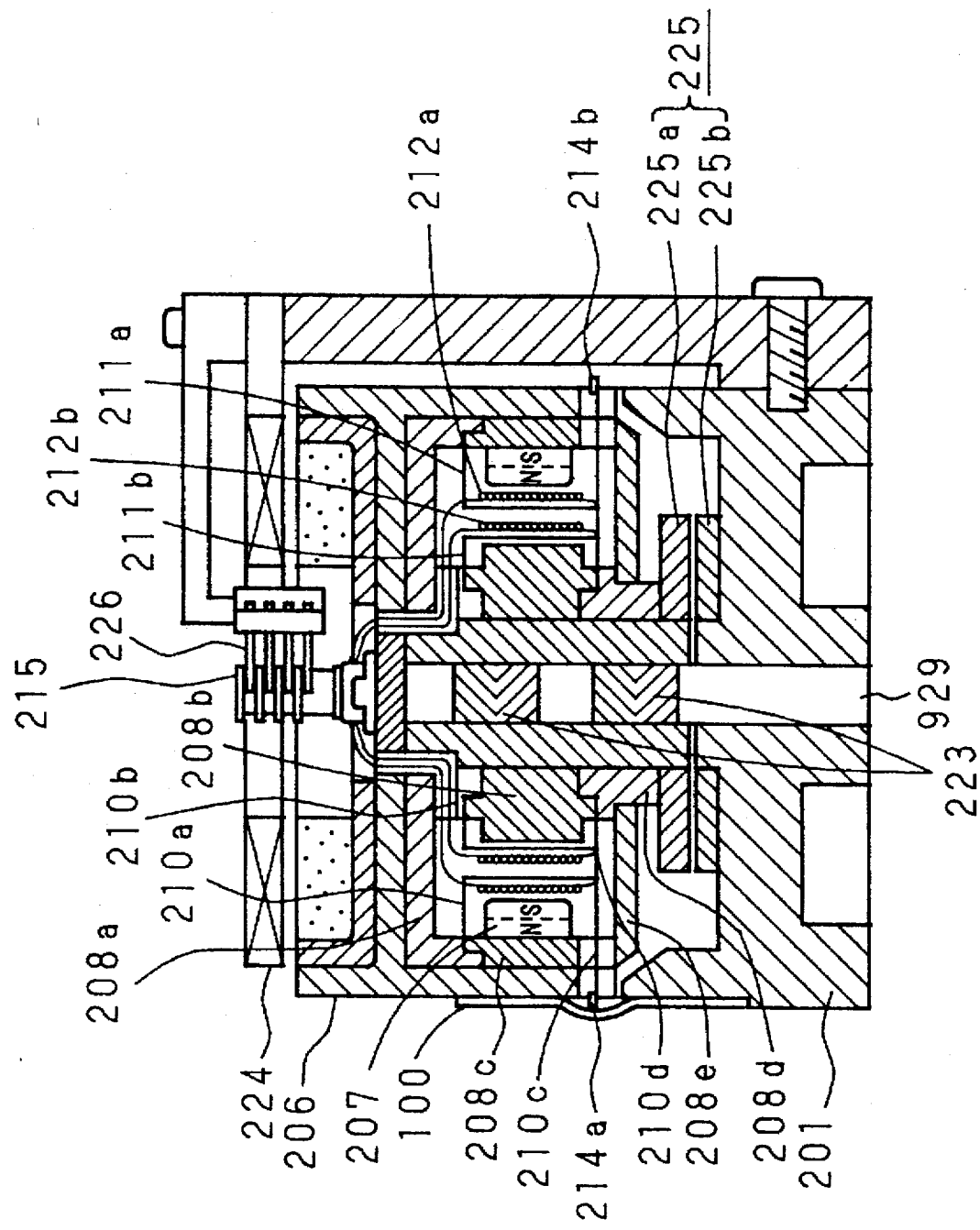
FIG. 43 is a sectional side view of a rotary magnetic head device of Embodiment 9 of the invention.

As Embodiment 9, a rotary magnetic head device in which the shaft mechanism of Embodiment 8 is modified will be described. FIG. 43 is a section view of the rotary magnetic head device of Embodiment 9. In the figure, 929 is a stationary shaft which is pressingly inserted into the stationary cylinder 201. The rotor of the motor is pressingly inserted into and fixed to the rotary cylinder 206, and the stator 224 of the motor is attached to the flange end face of the rotary cylinder 206. The other configurational points are the same as those of Embodiment 8, components identical with or corresponding to those of Embodiment 8 are designated with the same reference numerals, and their description is omitted. In the rotary magnetic head device, the magnetic heads can follow a curved track during the reproduction process even in a case where the wrap angle α is greater than 180 deg.

Embodiment 10

Figure 44:
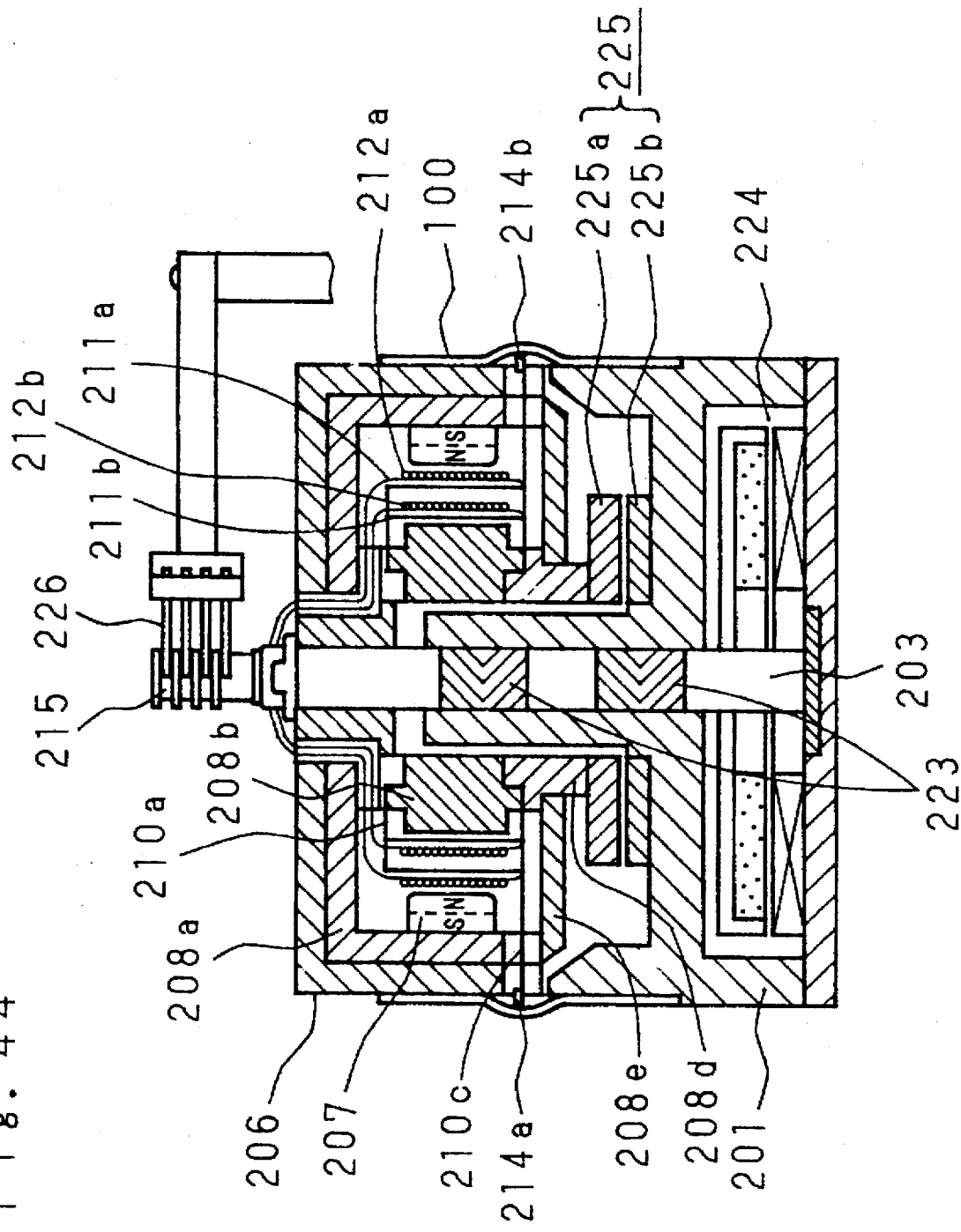
FIG. 44 is a sectional side view of a rotary magnetic head device of Embodiment 10 of the invention.

FIG. 44 is a section view showing a rotary magnetic head device according to Embodiment 10 of the invention. In FIG. 44, components identical with or corresponding to those of FIG. 36 are designated with the same reference numerals, and their description is omitted. In the figure, 206 is a rotary cylinder, 208a is a first yoke which is attached to the inside of the rotary cylinder 206, made of a magnetic material and has a substantially U-like section, 208b is a second cylindrical yoke which is concentric with the rotating shaft 203, fixedly attached to the first yoke 208a and made of a magnetic material, 208d is a third cylindrical yoke which is fixedly attached to the second yoke 208b and made of a magnetic material, and 208e is a fourth yoke which is made of a flat plate-like and annular magnetic material. The fourth yoke 208e closes the annular groove formed by the first to third yokes 208a, 208b and 208d, so as to form a magnetic path. In the first yoke 208a and the fourth yoke 208e, windows are formed through which magnetic heads 214a and 214b attached to a second plate spring 210c (described later) respectively protrude.

Figure 45:
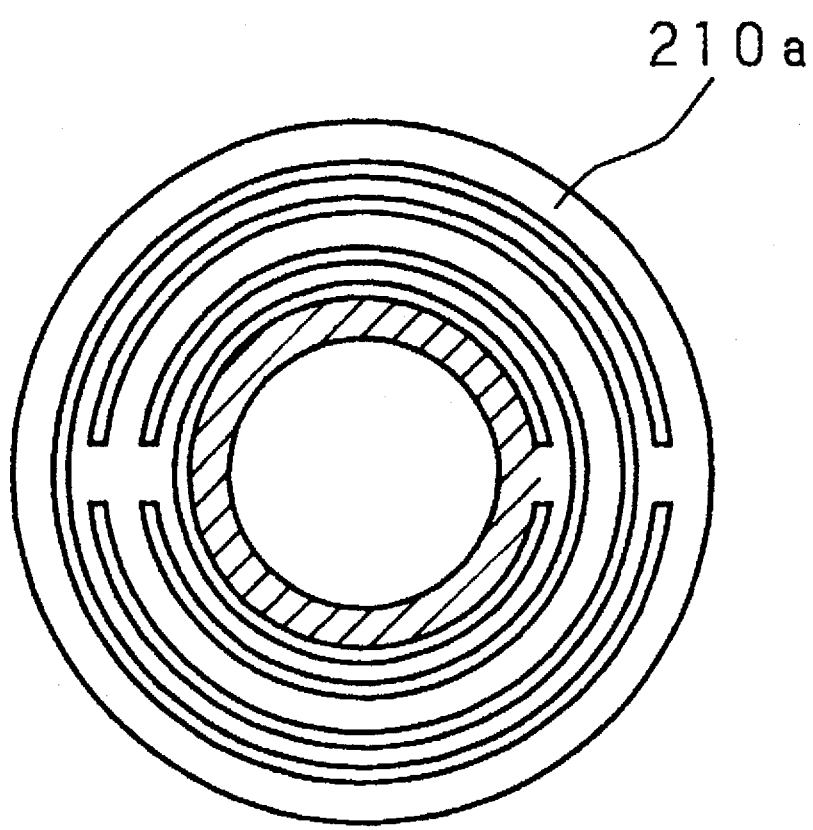
FIG. 45 is a front view of a plate spring member used in Embodiment 10 of the invention.
Figure 46:
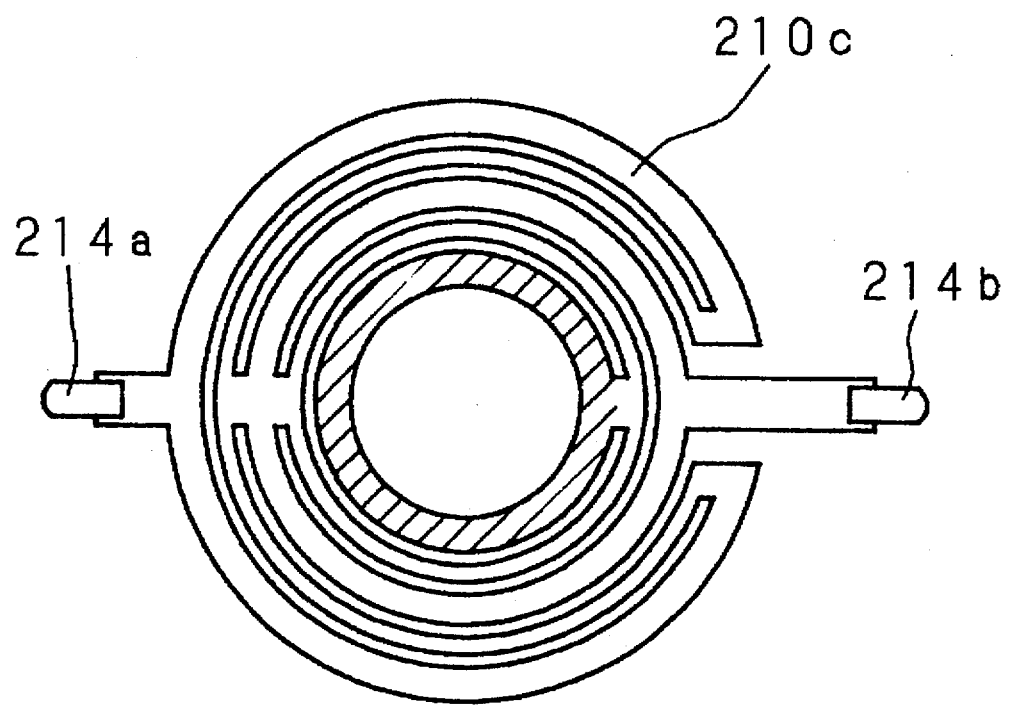
FIG. 46 is a front view of a plate spring member used in Embodiment 10 of the invention.

The reference numeral 207 is a hollow cylindrical permanent magnet which is fixedly concentrically attached to the inside of the first yoke 208a and is magnetized in the radial direction. The reference numeral 210a is a first plate spring which has a substantially disk-like shape as shown in FIG. 45. One end of the first bobbin 211a is fixedly concentrically attached to the outer periphery of the first plate spring 210a, and one end of the second bobbin 211b is fixedly concentrically attached to the vicinity of the inner periphery of the first plate spring 210a. The inner periphery portion (the hatched portion in FIG. 44) of the first plate spring 210a is fixedly attached to the first yoke 208a. The reference numeral 210c is a second plate spring which has a substantially disk-like shape as shown in FIG. 46. The other end of the first bobbin 211a is fixedly concentrically attached to the outer periphery of the second plate spring 210c, and the other end of the second bobbin 211b is fixedly concentrically attached to the vicinity of the inner periphery of the second plate spring 210c. The inner periphery portion of the second plate spring 210c is fixed to time second yoke 208b. The reference numeral 214a is a magnetic head which is fixedly attached to the front end of the extended portion of the outer periphery of the second plate spring 210c and protrudes from the rotary cylinder 206 by a given length, and 214b is a magnetic head which is fixedly attached to the front end of the extended portion in the vicinity of the inner periphery of the second plate spring 210c and protrudes from the rotary cylinder 206 by a given length.

Figure 48:
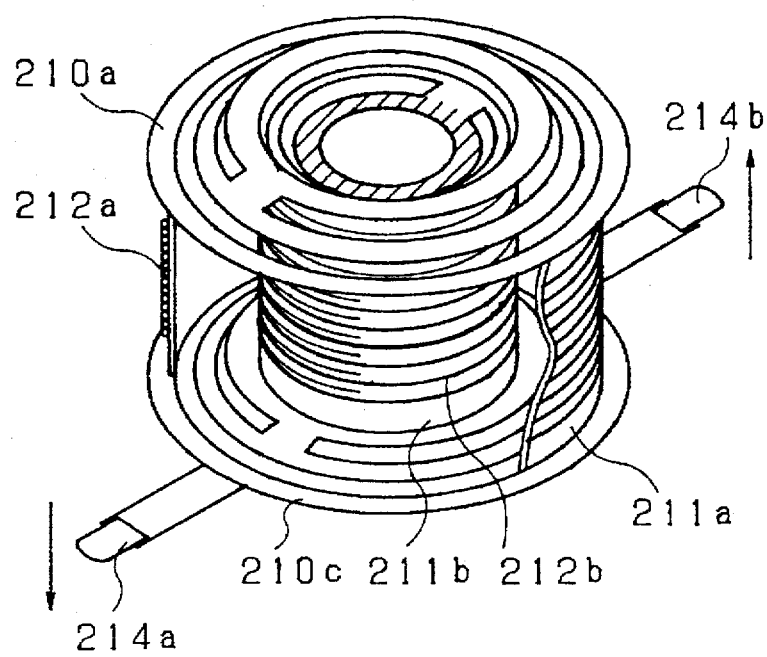
FIG. 48 is a view showing the operation of the magnetic head moving unit used in Embodiment 10 of the invention.
Figure 47:
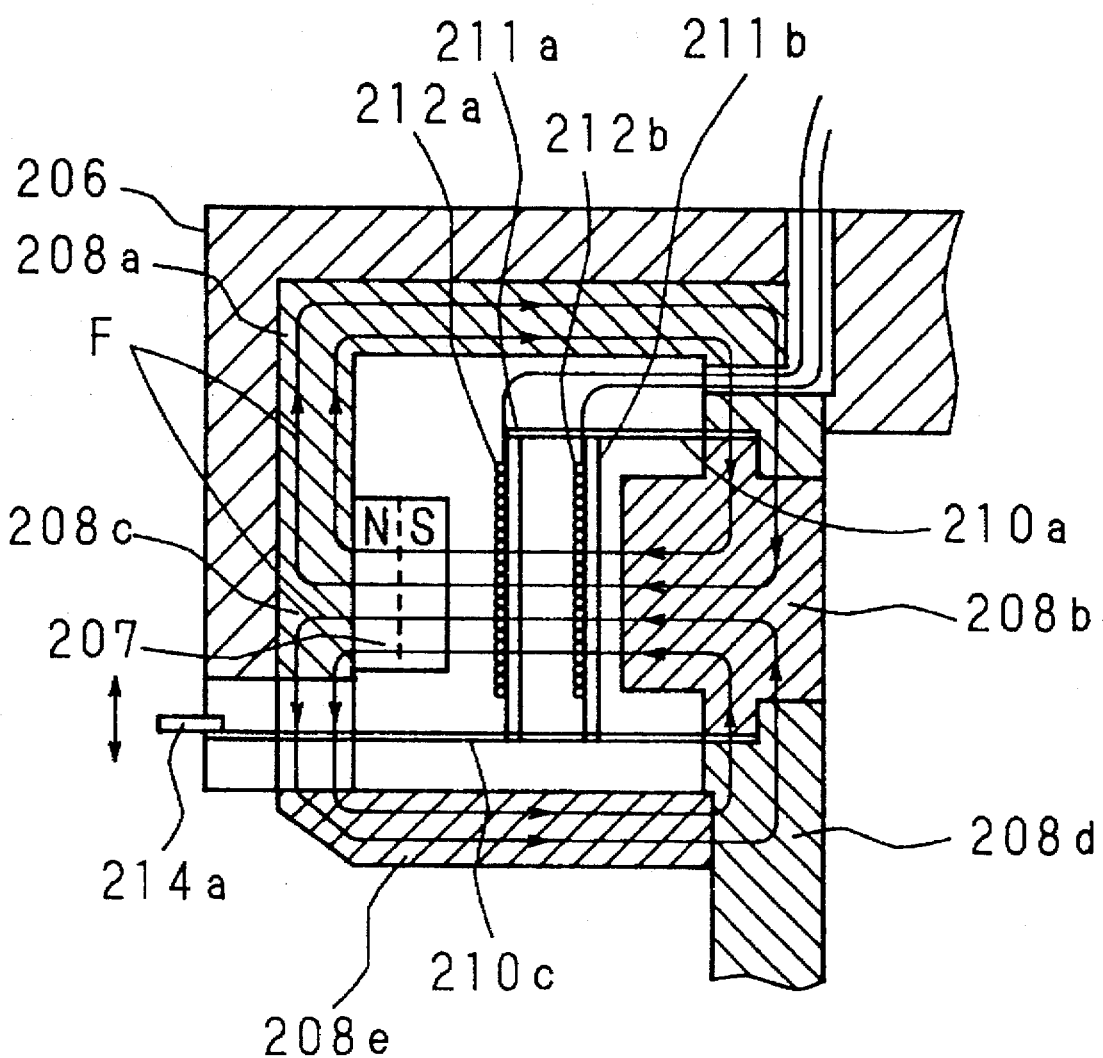
FIG. 47 is a view showing a magnetic circuit of the magnetic head moving unit used in Embodiment 10 of the invention.

Then, the operation will be described. As shown in FIG. 47, the permanent magnet 207 generates magnetic fluxes F in the magnetic path constituted by the first to fourth yokes 208a, 208b, 208d and 208e. When a current is supplied from the brush 226 connected to the external through the slip ring 215 to the first coil 212a which intersects with the magnetic fluxes F, a driving force due to the electromagnetic force is generated in the first coil 212a so that the first bobbin 211a on which the first coil 212a is wound is moved in the axial direction of the rotating shaft 203 to a position at which the generated driving force balances with the resilient force of a spring constituted by the outer periphery portions of the first and second plate springs 210a and 210c. This causes also the magnetic head 214a fixedly attached to the extended portion of the outer periphery of the second plate spring 210c to move in the axial direction of the rotating shaft 203 as shown in FIG. 48. Similarly, when another current flows through the second coil 212b, a driving force due to the electromagnetic force is generated in the second coil 212b so that the second bobbin 211b on which the second coil 212b is wound is moved in the axial direction of the rotating shaft 203 to a position at which the generated driving force balances with the resilient force of a spring constituted by the inner periphery portions of the first and second plate springs 210a and 210c. This causes the magnetic head 214b fixedly attached to the extended portion of the vicinity of the inner periphery of the second plate spring 210c, to move independently from the magnetic head 214a in the axial direction of the rotating shaft 203. In this configuration, the number of plate springs can be reduced. In addition to the effects attained by Embodiment 8, therefore, the embodiment can attain further effects that the production cost is reduced and the workability in the assembling process can be improved.

Embodiment 11

Figure 50:
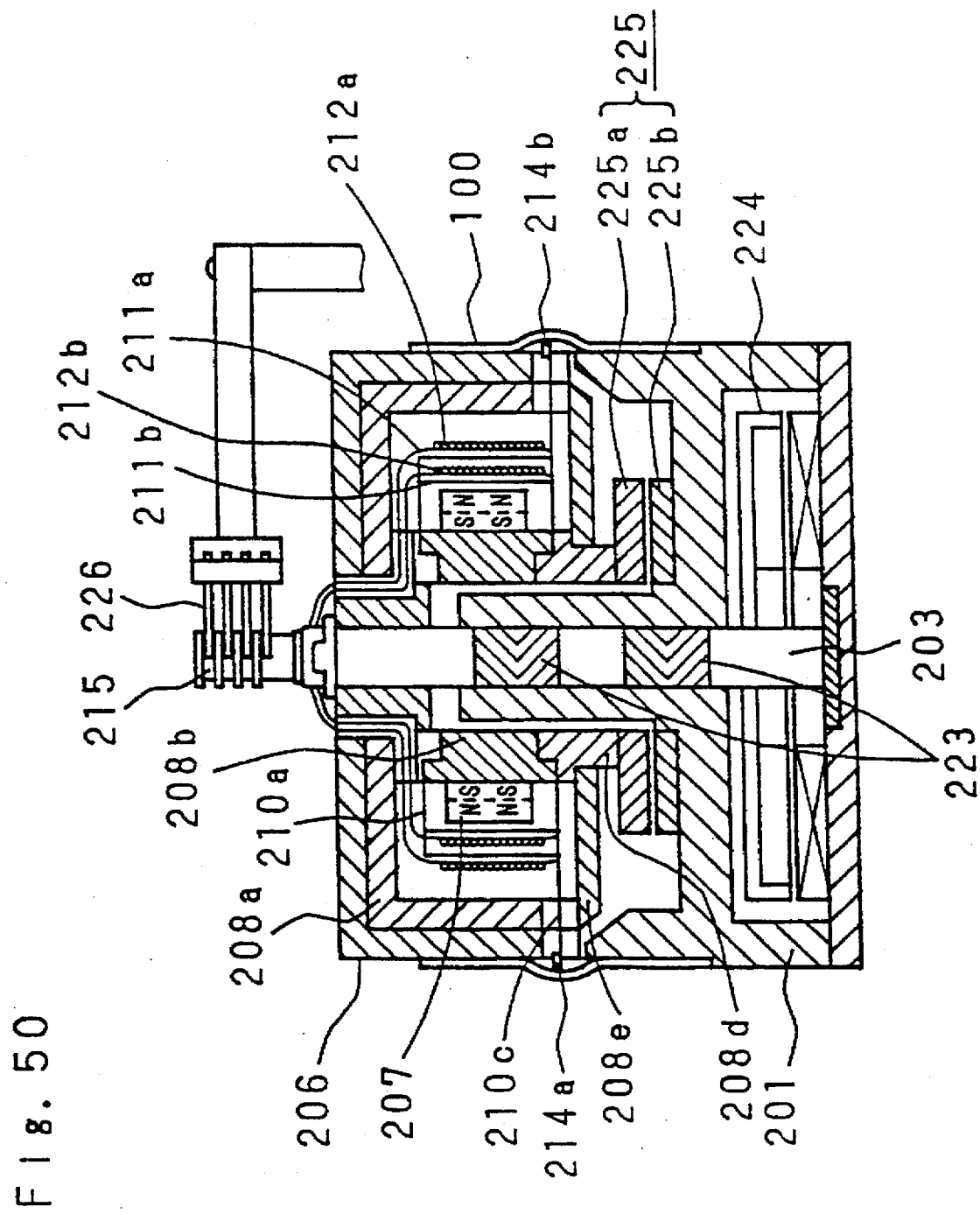
FIG. 50 is a sectional side view of the rotary magnetic head device of Embodiment 11 of the invention.
Figure 51:
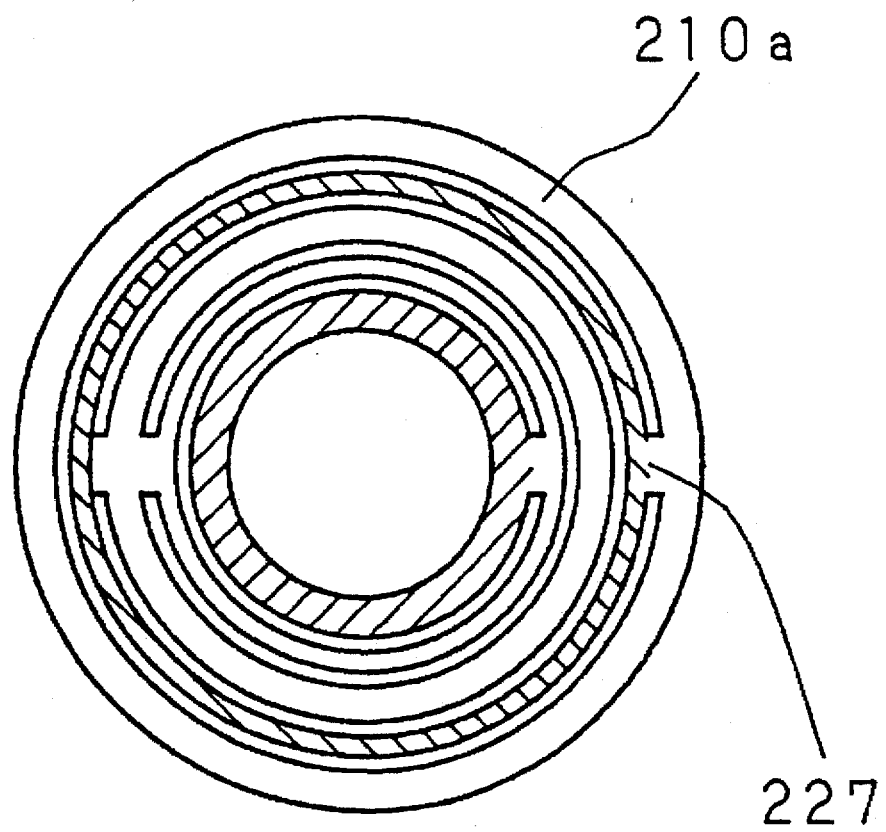
FIG. 51 is a front view of a plate spring member used in Embodiment 12 of the invention.
Figure 52:
FIG. 52 is a section view of the plate spring member used in Embodiment 12 of the invention.
Figure 53:
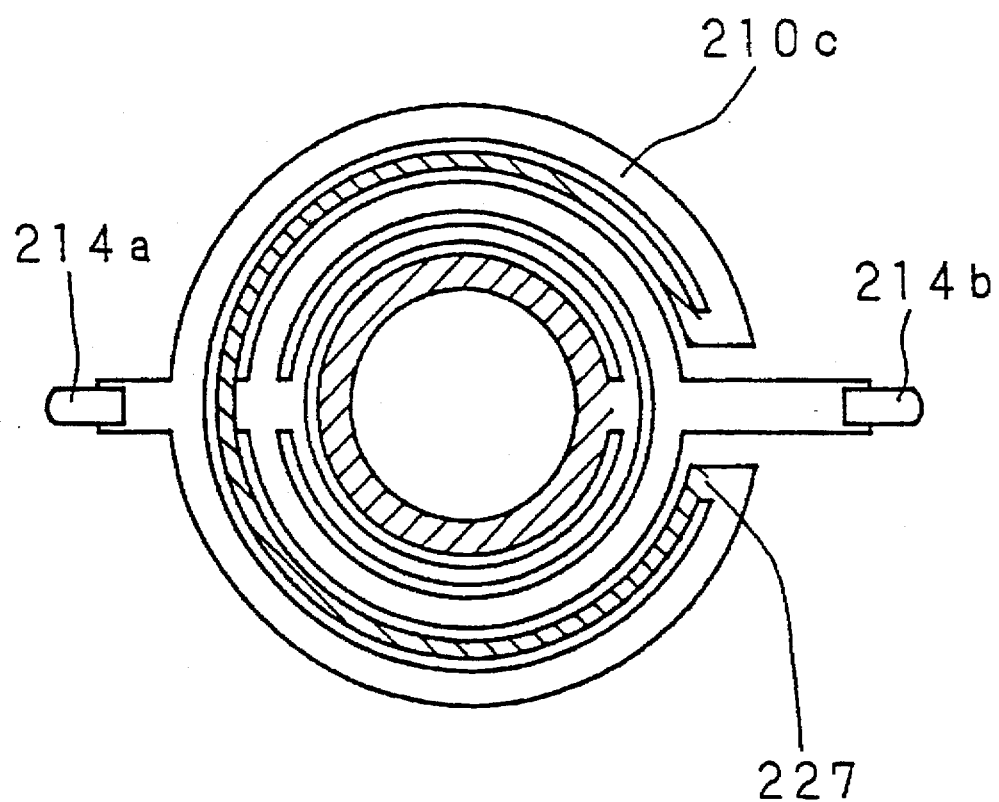
FIG. 53 is a front view of a plate spring member used in Embodiment 12 of the invention.
Figure 54:
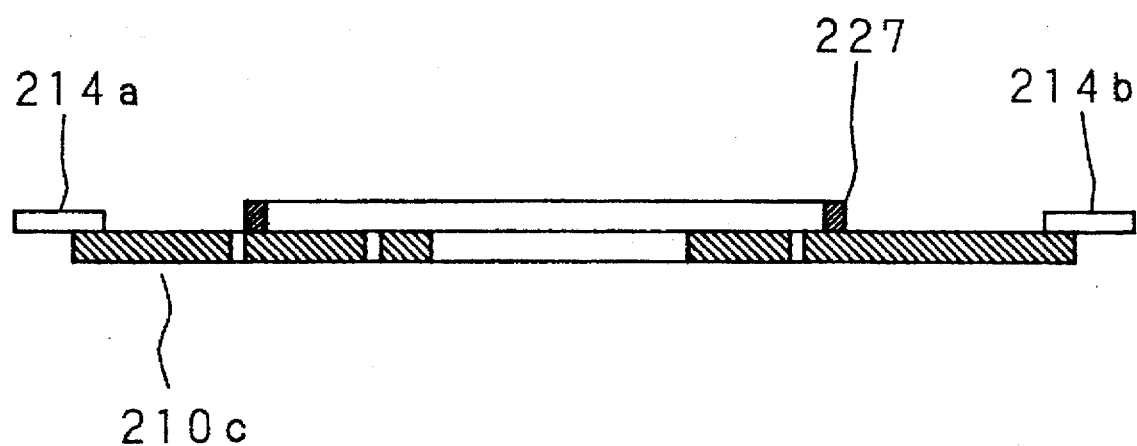
FIG. 54 is a section view of the plate spring member used in Embodiment 12 of the invention.

FIGS. 49 and 50 show an embodiment in which the permanent magnet 207 is disposed on the inner face of the second bobbin 211b. The embodiment operates in the same manner as described above, and has the following advantages. Since the permanent magnet 207 is further separated from the magnetic heads 214, the magnetic heads 214 are less affected by the magnetic field generated by the permanent magnet 207. Since the first and second bobbins 211a and 211b can be disposed in the vicinity of the outer periphery, the extended portions of the third and fourth plate springs 210c and 210d are shortened, thereby reducing the deflecting amounts of the springs. Therefore, the combination of the first bobbin 211a and the magnetic head 214a, and that of the second bobbin 211b and the magnetic head 214b can respectively be moved in a more closely united state, so that they are more precisely controlled. Accordingly, the magnetic heads 214a and 214b can accurately follow a curved track so as to obtain a further stable output signal.

Embodiment 12

In Embodiment 10, the first and second plate springs 210a and 210c have a substantially disk-like shape. According to the embodiment, in the first and second plate springs 210a and 210c, a damping material 227 is applied on a portion between the portion for fixedly attaching the first bobbin 211a and that for fixedly attaching the second bobbin 211b, as shown in FIGS. 51 to 54. When the first coil 212a is energized by a current to drive the first bobbin 211a, namely, the magnetic head 214a, the vibration is transmitted to the portions of the first and second plate springs 210a and 210c to which the second bobbin 211b is fixedly attached. When the magnetic head 214b is driven, similarly, the vibration is transmitted to the portions of the first and second plate springs 210a and 210c to which the first bobbin 211a is fixedly attached. The damping materials 227 applied on the first and second plate springs 210a and 210c absorb these vibrations so that, when both the magnetic heads 214a and 214b are moved, their movements do not interfere with each other, whereby the two magnetic heads 214 can be controlled more precisely. Therefore, it is possible to obtain a further stable output.

In the embodiment of FIGS. 51 to 54, a damping material is partly applied on the first and second plate springs 210a and 210c. Alternatively, a damping material may be applied on the whole area of each of time plate springs.

Embodiment 13

Figure 55:
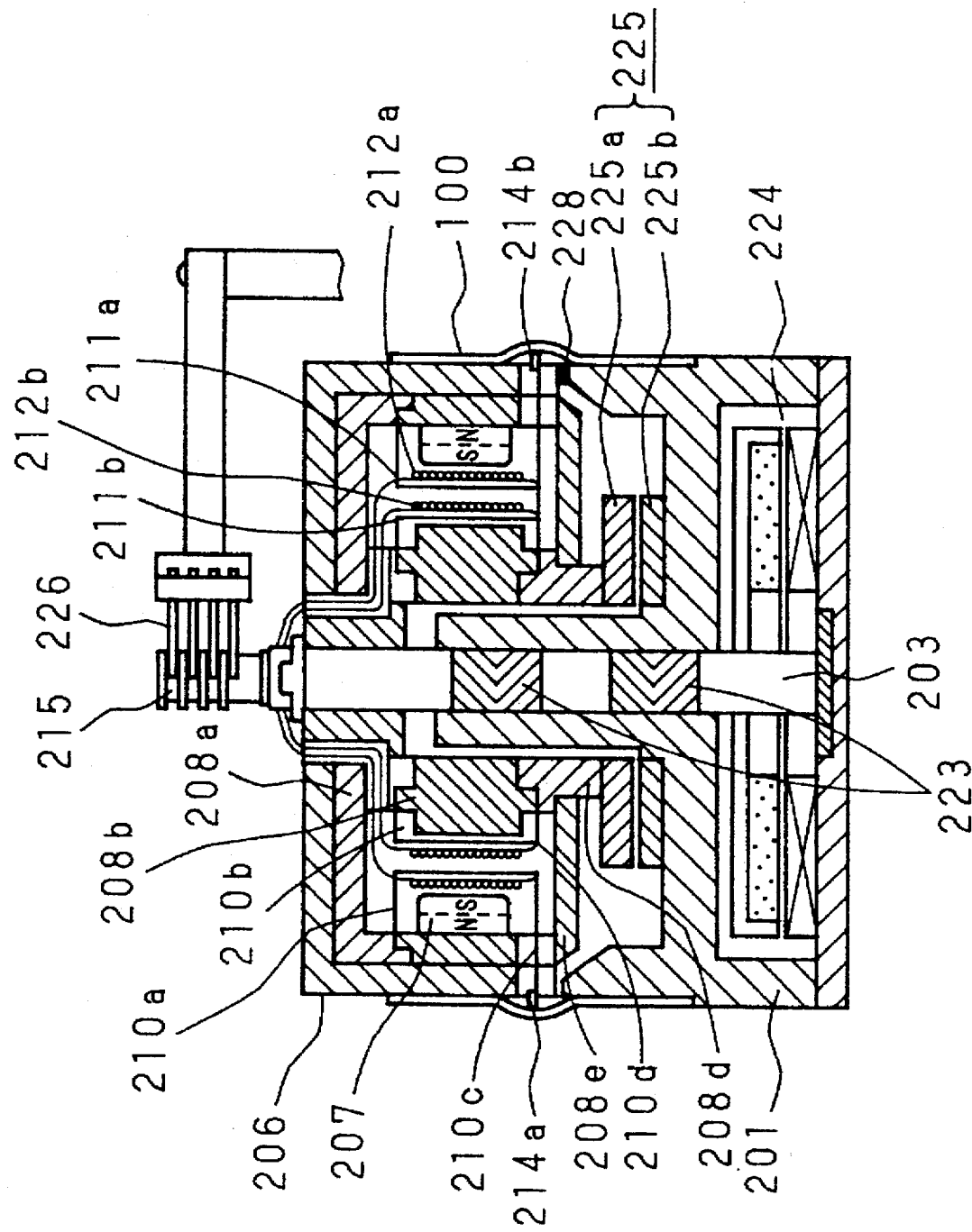
FIG. 55 is a sectional side view of a rotary magnetic head device of Embodiment 13 of the invention.
Figure 56:
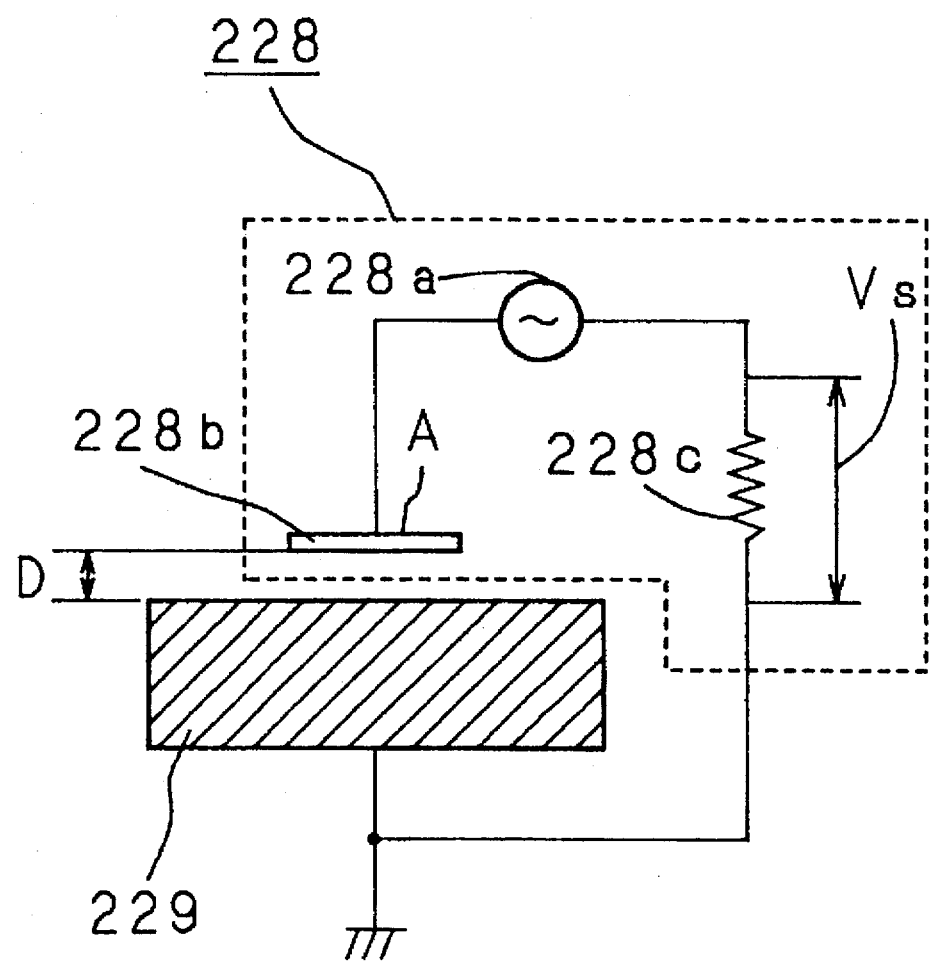
FIG. 56 is a diagram showing the principle of a displacement sensor used in the rotary magnetic head device of Embodiment 13 of the invention.

FIG. 55 is a section view showing the configuration of a rotary magnetic head device according to Embodiment 13 of the invention. In FIG. 55, components identical with or corresponding to those of FIG. 36 are designated with the same reference numerals, and their description is omitted. In the figure, 228 is a capacitance type noncontacting displacement sensor which is attached to the stationary cylinder 201 so as to oppose the vicinity of the extended portion of the third or fourth plate spring 210c or 210d. In the displacement sensor 228, as shown in FIG. 56, an AC current 228a flows, and the electrostatic capacitance between a measuring electrode 228b and a measurement surface 229 is detected in terms of a voltage appearing across a resistor 228c. When the dielectric constant of the medium (e.g., air) between the measuring electrode 228b and the measurement surface 229 is indicated by K, the distance between the measuring electrode 228b and the measurement surface 229 is indicated by D, and the area of the measuring electrode is indicated by H, the dielectric constant C can be expressed by the following expression:

$$C=K \cdot H/D$$

The expression can be transformed as:

$$D=K \cdot H/C$$

According to this expression, the displacement can be measured. Namely, the displacement sensor 228 can detect a voltage $V_S$ which corresponds to the displacement of the front end of the extended portion of the third or fourth plate spring 210c or 210d, i.e., that of the magnetic head 214a or 214b.

Figure 57:
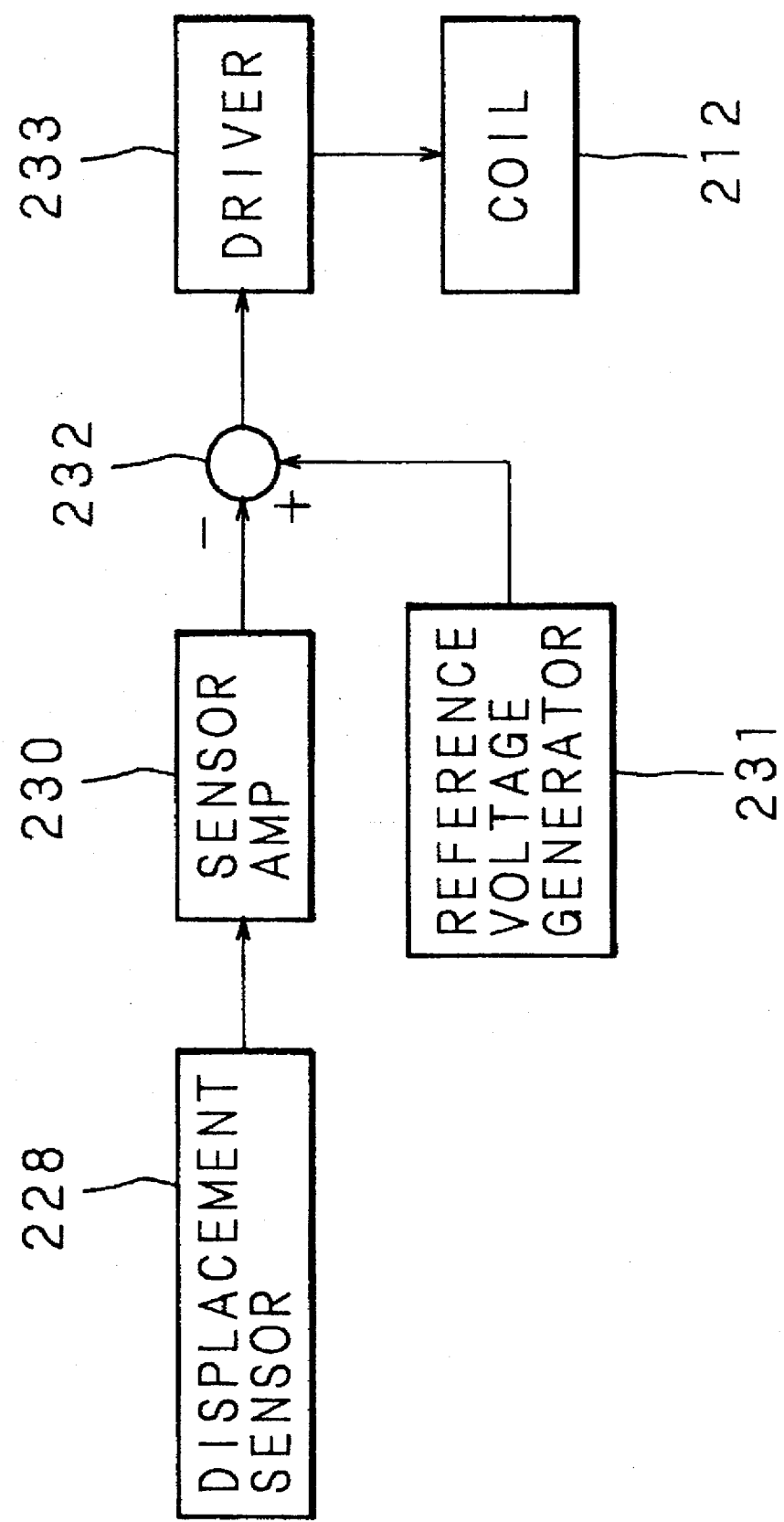
FIG. 57 is a block diagram showing a magnetic head position control circuit of the rotary magnetic head device of Embodiment 13 of the invention.

FIG. 57 is a block diagram showing a magnetic head position control circuit of the rotary magnetic head device. In FIG. 57, components identical with those of FIG. 55 are designated with the same reference numerals. In the figure, 230 is a sensor amplifier for amplifying the voltage $V_S$ detected by the displacement sensor 228, 231 is a reference voltage generator which, when the magnetic head 214 is at a reference position, supplies the voltage $V_S$ output by the displacement sensor 228, as a reference voltage $V_{ref}$, 232 is a subtracter for outputting a voltage $V_{op}$ which is obtained by subtracting the voltage $V_S$ output by the displacement sensor 228 from the reference voltage $V_{ref}$ output by the reference voltage generator 231, and 233 is a driver which controls the current supplied to the first or second coil 212a or 212b so that the output voltage $V_{op}$ or the subtracter 232 becomes zero, thereby moving the magnetic head 214.

Next, the operation will be described. First, the displacement sensor 228 detects the displacement of the magnetic head 214a or 214b, and outputs the voltage $V_S$ the level of which corresponds to the displacement. The voltage $V_S$ is amplified by the sensor amplifier 230, and then subtracted in the subtracter 232 from the reference voltage $V_{ref}$ of the reference voltage generator 231. The driver 233 supplies the current to the first or second coil 212a or 212b so that the voltage $V_{op}$ of the subtracter 32 becomes zero. Therefore, the height of the magnetic head 214a or 214b is set to a given height or a reference height which corresponds to the reference voltage $V_{ref}$ of the reference voltage generator 231. In this way, in addition to the effects attained by Embodiment 8 shown in FIG. 36, the embodiment can attain a further effect that the height of the magnetic head 214a or 214b can easily be set to the reference height, thereby enabling a signal to be recorded at a reference position separated from the lower end of the tape by a given length.

In Embodiments 10 to 13, the shaft mechanism of the rotary magnetic head device is or the rotary type. Alternatively, the shaft mechanism may be of the stationary type.

Embodiment 14

Figure 58:
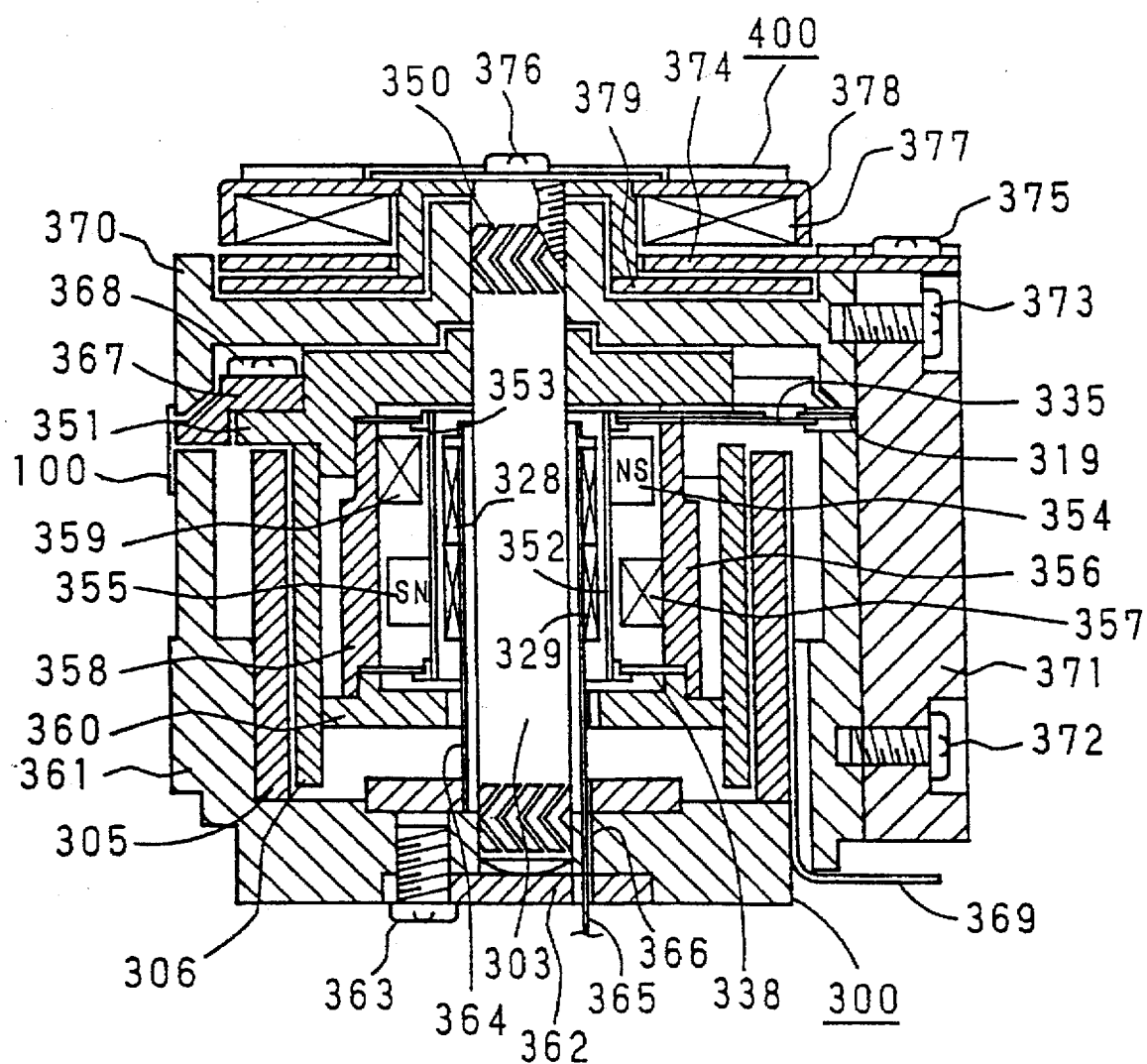
FIG. 58 is a section view of a rotary magnetic head device of Embodiments 14 and 16 of the invention.
Figure 59:
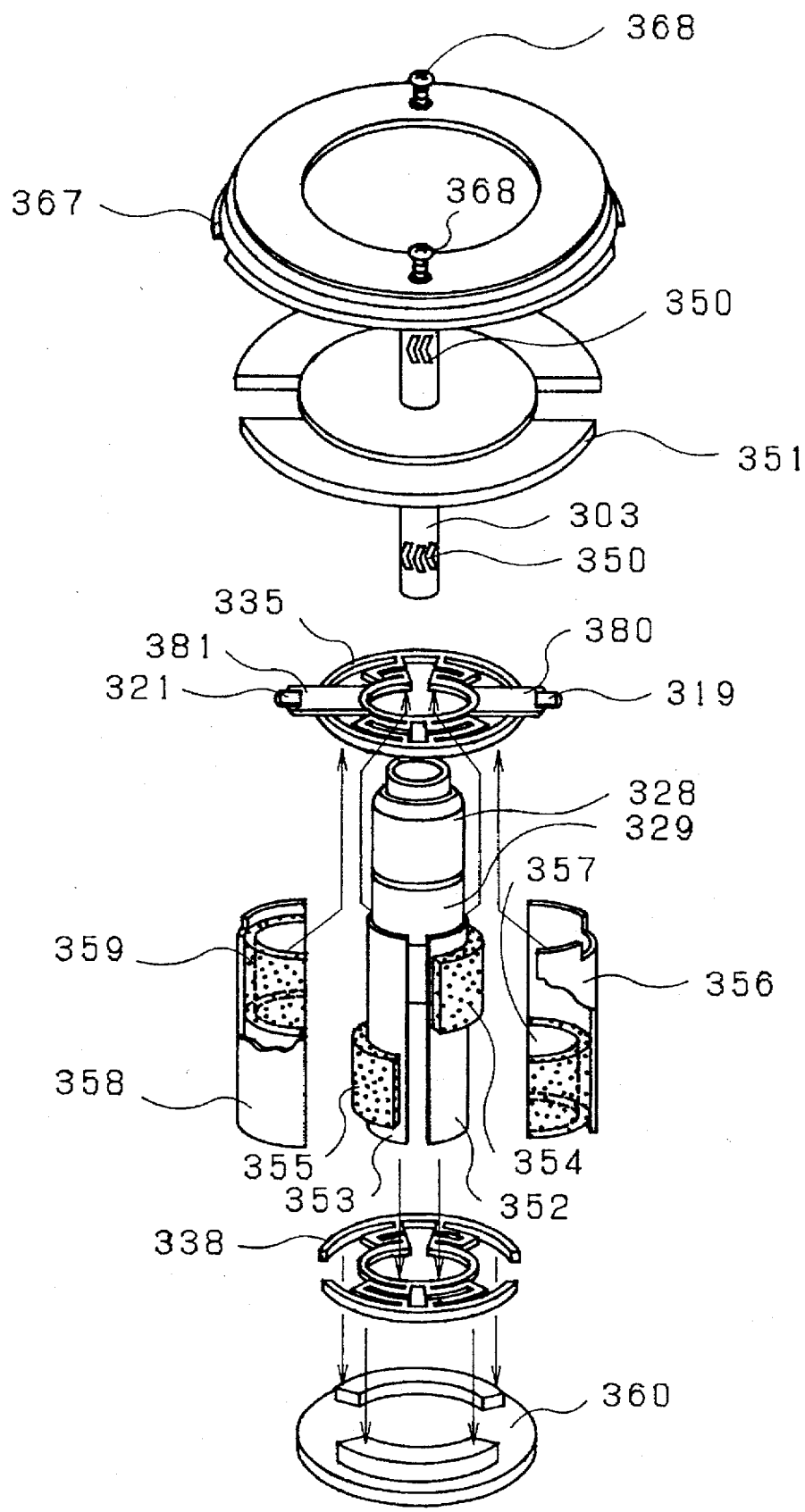
FIG. 59 is an exploded perspective view showing a head moving unit used in the rotary magnetic head device of FIG. 58.

FIG. 58 is a section view showing a rotary magnetic head device according to Embodiment 14 of the invention, and FIG. 59 is an exploded perspective view illustrating the configuration of a head moving mechanism. In FIGS. 58 and 59, components identical with or corresponding to those of FIGS. 11 to 15 are designated with the same reference numerals, and their description is omitted.

Figure 11:
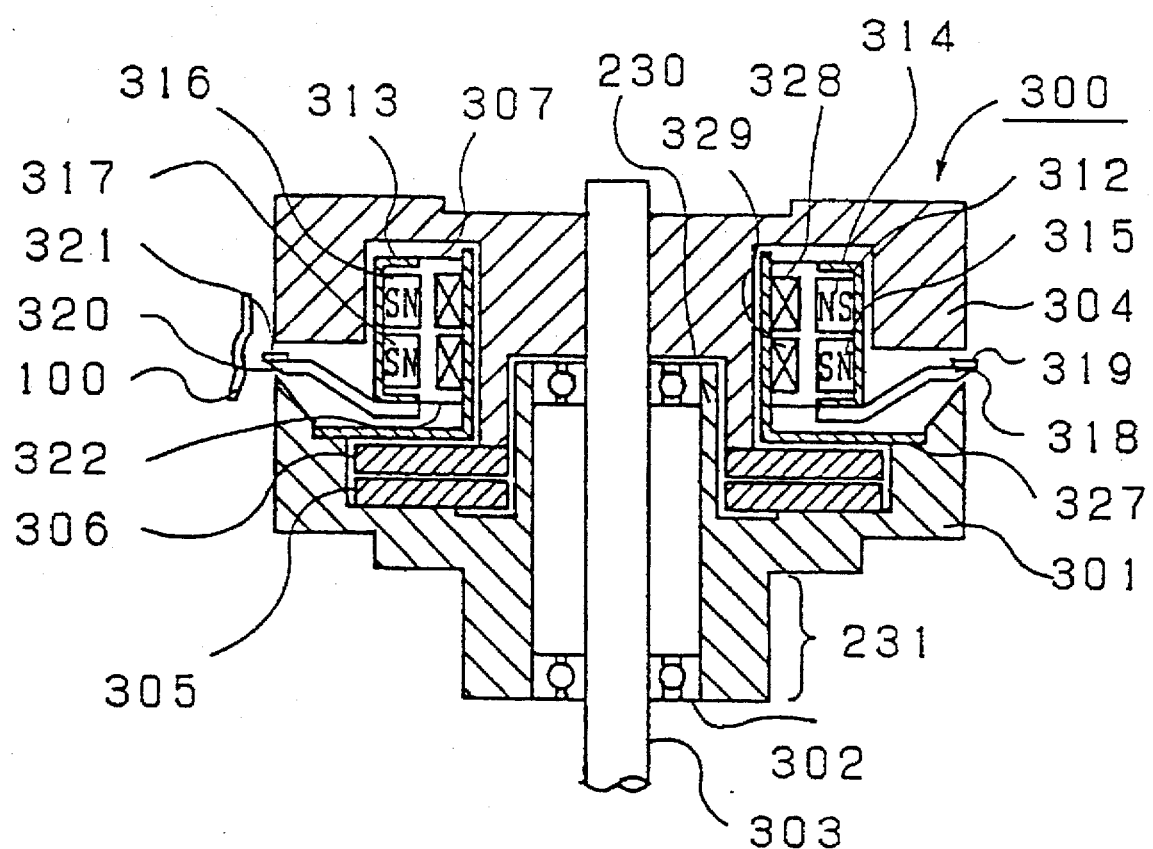
FIG. 11 is a section view of a rotary magnetic head device which is a first prior art example.

In the figure, 350 is a pressure bearing which corresponds to the bearing 302 of FIG. 11 and in which spiral grooves are formed on a rotating shaft 303, and 351 is a rotary cylinder having a stepped disk-like flange which is attached to a given position of the rotating shaft 303 so as to be integral therewith. The reference numeral 352 is a semicylindrical holder A which corresponds to the bobbin 336 of FIG. 13 and is attached to an inner periphery portion of a first plate spring 335. A first magnetic head 319 is attached to one end of the outer periphery portion of the first plate spring 335. The reference numeral 353 is a semicylindrical holder B which forms a cylinder in combination with the holder A 352 and is attached to an inner periphery portion of the first plate spring 335. A second magnetic head 321 is attached to one end of the outer periphery portion of the first plate spring 335. The reference numeral 354 is a first sectorial magnet C which is attached to an outer periphery portion of the holder A 352 and corresponds to the first magnet A 314 of FIG. 11, and 355 is a second sectorial magnet C which corresponds to the second magnet B 317 of FIG. 11. The reference numeral 356 is a first semicylindrical yoke which cooperates at one end of the yoke with the rotary cylinder 351 to sandwich and fix the outer periphery portion of the first plate spring 335, and 357 is a first balancer which is attached to the inner periphery side of the first yoke 356 so as to oppose the second magnet C 355 by an angle of 180 deg. The reference numeral 358 is a second semicylindrical yoke opposing the first yoke 356, and 359 is a second balancer which is attached to the second yoke 358 so as to oppose the first magnet C 354 by an angle of 180 deg.

The reference numeral 360 is a third ring-like yoke to which the first and second yokes 356 and 358 are respectively positioned and fixed under the state where a second plate spring 338 is sandwiched. The first holder A 352 and the first holder B 353 are fixedly attached to the inner periphery side of the second plate spring 338. The reference numeral 361 is a first stationary cylinder which corresponds to the stationary cylinder 301 or FIG. 11, and 362 is a thrust bearing stand which is fixed by screws 363 to the first stationary cylinder 361 so as to support an end face of the rotating shaft 303. The reference numeral 364 is a cylindrical bobbin which has one end fixed to the first stationary cylinder 361 and is coaxial with the rotating shaft 303. First and second coils 328 and 329 are attached to outer periphery portions of the second bobbin 364 to be positioned so that they oppose the first magnet C 354 and the second balancer 359, and the second magnet C 355 and the first balancer 357, respectively. The reference numeral 365 designates coil lead wires by which the terminals of the first and second coils 328 and 329 are led out via a through hole 366 formed in the thrust bearing stand 362, and 367 is a ring which is fastened by screws 368 to an outer periphery portion of the rotary cylinder 351 and is adjusted so as to be deviated by a given accuracy with respect to the rotating shaft 303. The outer face of the ring 367 slidingly contacts with the magnetic tape 100. The reference numeral 369 designates lead wires of a primary rotary transformer 305 disposed in the first stationary cylinder 361.

The reference numeral 370 is a second stationary cylinder, and the magnetic tape 100 is slidingly guided on its outer periphery portion. Its inner periphery portion is rotatably supported by the bearing 350. The reference numeral 371 is a supporting block for positioning the first and second stationary cylinders 361 and 370 at given locations using screws 372 and 373, and 400 is a driving motor. The driving motor 400 consists of a coil base plate 374 which is fixed at one end by a screw 375 to the supporting block 371, a driving magnet 377 which is fixed by a screw 376 to the end face of the rotating shaft 303 so as to be integral therewith, a yoke 378 to which the driving magnet 377 is attached, and a back yoke 379 for reducing the eddy-current loss.

Figure 60:
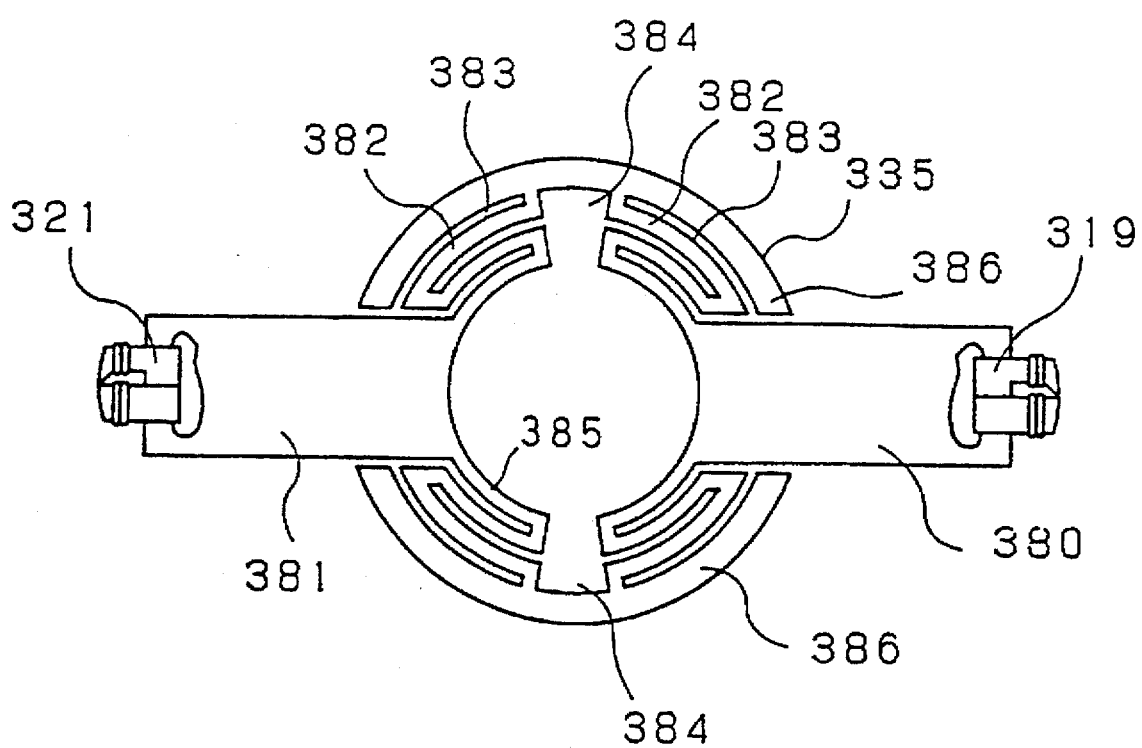
FIG. 60 is a plan view of a plate spring on which magnetic heads are mounted and which is used in the rotary magnetic head device of FIG. 58.
Figure 61:
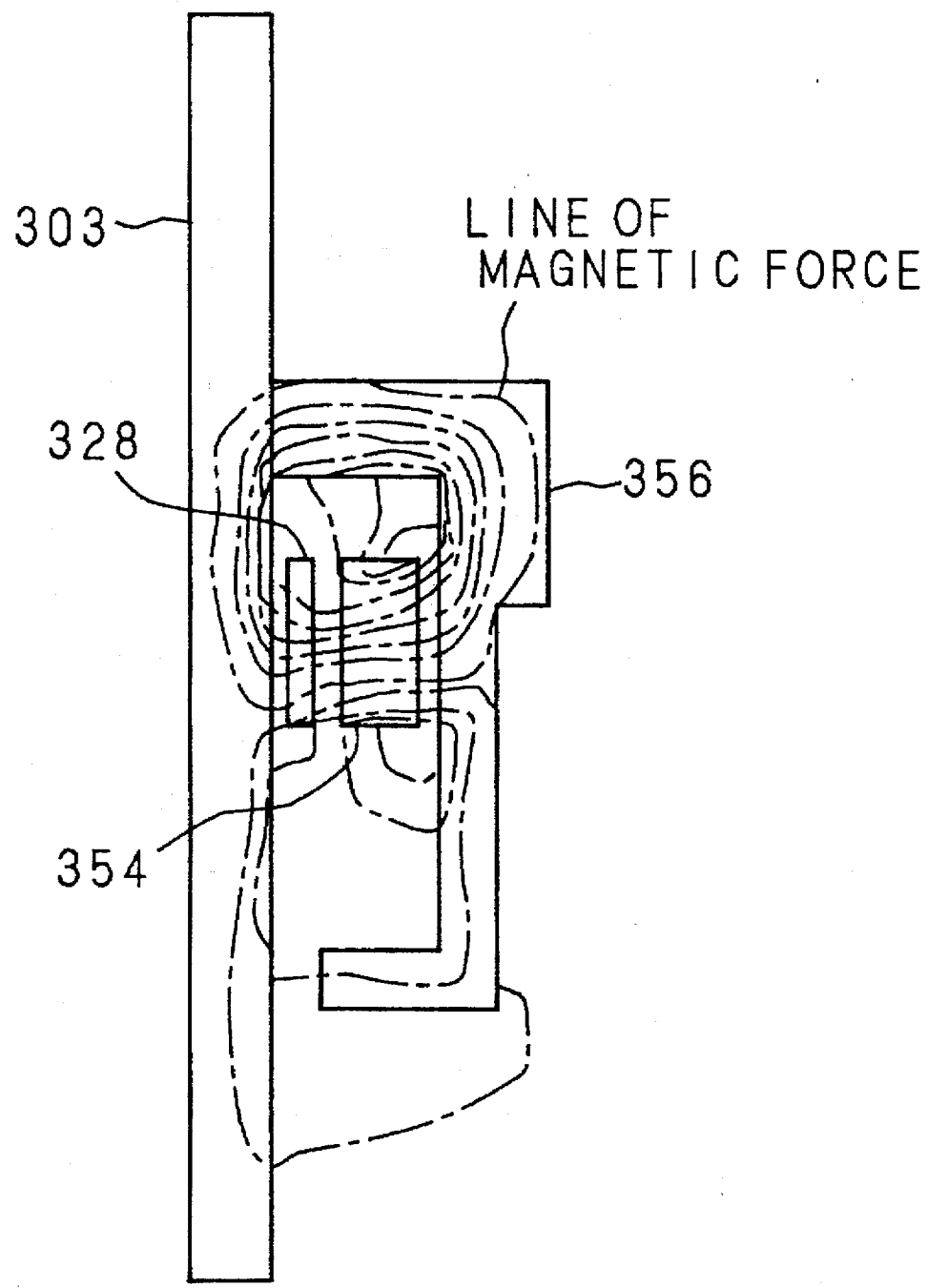
FIG. 61 is a view illustrating the analysis according to the finite element method and conducted on a magnetic circuit of the rotary magnetic head device of FIG. 58.

The shape of the first plate spring 335 to which the first and second magnetic heads 319 and 321 are attached will be described. FIG. 60 is a plan view of the first plate spring 335. In the figure, 380 and 381 are extended portions of the first plate spring 335, 382 are jimbal springs, 383 designates cut-away portions which are formed in narrow intervals in order to make the arms 382 longer, 384 designates two cut-away portions which are formed in order to enable the first and second magnetic heads 319 and 321 to operate independently from each other, 385 is an inner periphery portion which is to be fixedly supported, and 386 is an outer periphery portion supported as the inner periphery portion.

Next, the operation of the embodiment will be described. Principally, the embodiment operates in the same manner as the prior art example, or the embodiment is of the electromagnetic drive type. Regarding the first magnetic head 319, when a driving current is supplied to the first coil 328 intersecting with the magnetic field in the magnetic circuit formed by the first magnet C 354, a driving force is generated and its direction is the axial direction of the rotating shaft 303. The holder A 352 which is a movable portion and to which the first magnet C 354 is attached, is moved in the axial direction by this driving force. Since the first magnetic head 319 is disposed at the front end of the extended portion 380 formed in the first plate spring 335 which moves together with the bobbin, the first magnetic head 319 is moved in the axial direction of the rotating shaft 303.

In contrast, the driving force of the first coil 328 does not affect the holder B 353 which is independent from the holder A 352. Regarding the second magnetic head 321, when a driving current is supplied to the second coil 329 intersecting with the magnetic field in the magnetic circuit formed by the second magnet C 355, a driving force is generated in the axial direction of the rotating shaft 303. The holder B 353 which is a movable portion and to which the second magnet C 355 is attached, is moved in the axial direction by this driving force. Since the second magnetic head 321 is disposed at the front end of the extended portion 381 formed in the first plate spring 335 which moves together with the bobbin, the second magnetic head 321 is moved in the axial direction of the rotating shaft 303.

FIG. (61 shows an example of a magnetic circuit in the above configuration which has been analyzed according to the finite element method.

In the figure, shown is a magnetic circuit which is formed by the first magnet C 354, the first yoke 356, the rotary cylinder 351, the rotating shaft 303, and the first coil 328. In the magnetic field in the first coil 328 which is disposed between the rotating shaft 303 and the first magnet C 354, lines of magnetic force are substantially parallel with each other. Therefore, it can be anticipated that stable magnetic properties are obtained even when the first magnet C 354 moves in the axial direction.

Figure 62:
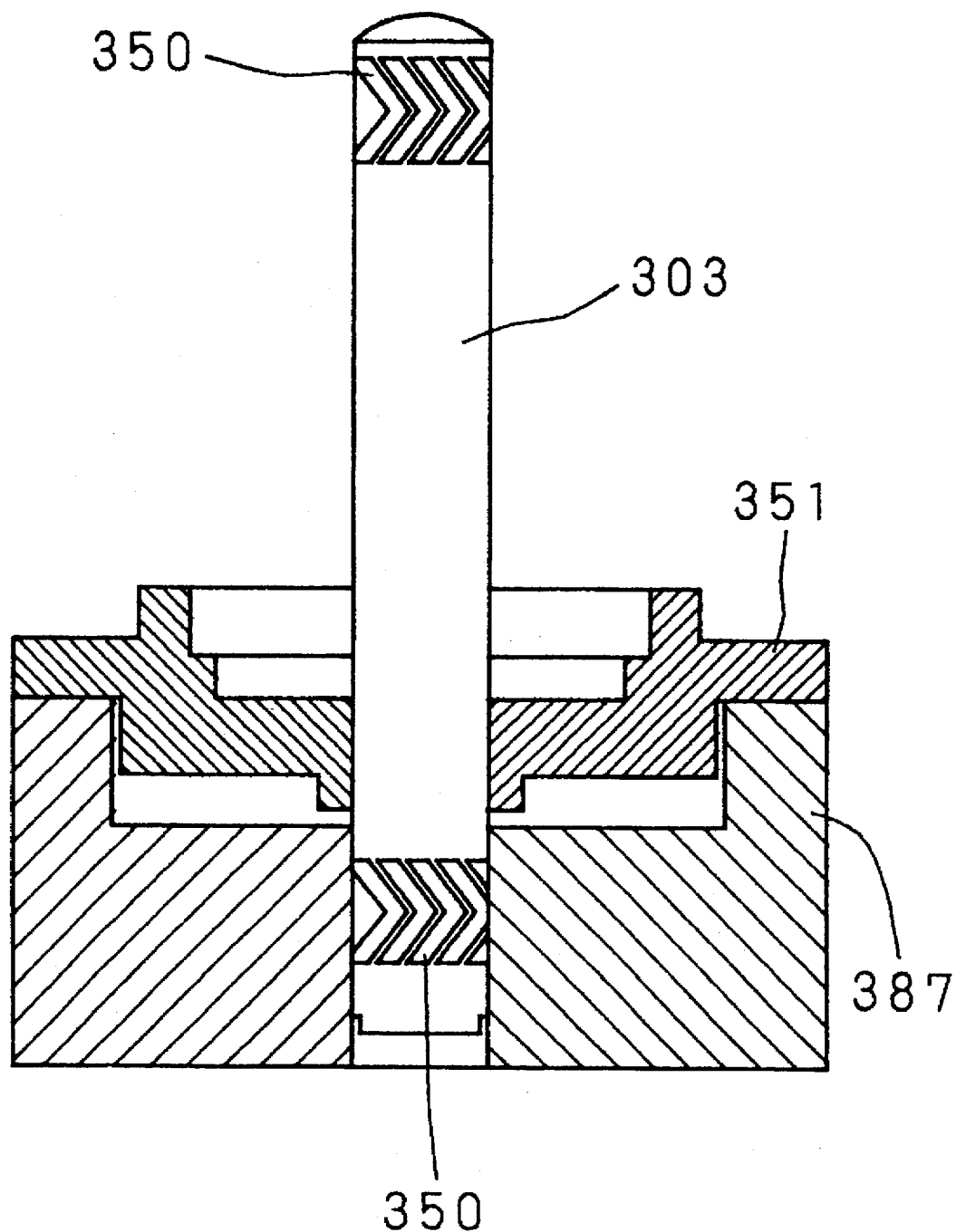
FIG. 62 is a section view showing a jig for assembling the rotary magnetic head device of FIG. 58.

A manner of assembling the above configuration in which the rotary magnetic head device and the head moving device are combined into one body will be described with reference to FIG. 62. In the figure, the rotary cylinder 351 which is previously fixed to the rotating shaft 303 and finished to a given accuracy is fixed to a jig 387 employing the rotating shaft 303 as the fitting reference. Following the procedure described in conjunction with the configuration shown In FIGS. 58 and 59, the head moving device is assembled while using mainly adhesives. Then, the jig 387 is removed, and the head moving device is attached to the first stationary cylinder 361. Thereafter, the second stationary cylinder 370 and the driving motor 400 are mounted, thereby completing the assembling at the given accuracy.

Embodiment 15

Figure 63:
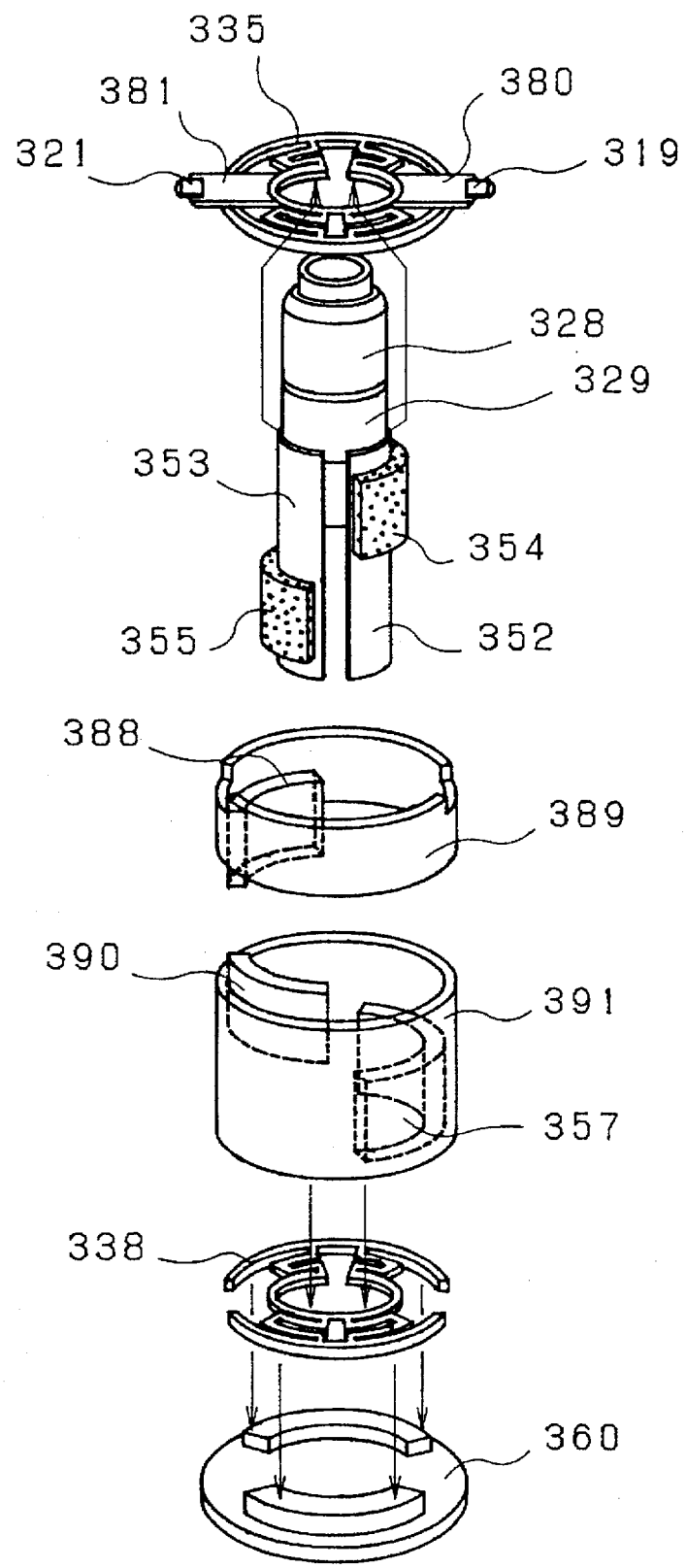
FIG. 63 is an exploded perspective view showing a lead moving unit used in a rotary magnetic head device of Embodiment 15 of the invention.

FIG. 63 is an exploded perspective view showing a head moving device of a rotary magnetic head device according to Embodiment 15 of the invention. In FIG. 63, components identical with or corresponding to those of FIGS. 58 to 61 showing Embodiment 14 are designated with the same reference numerals, and their description is omitted. In the figure, 388 is a third sectorial balancer A which is one of two divisions obtained by dividing in the circumferential direction the second balancer 359 of Embodiment 14. The reference numeral 389 is a fourth cylindrical yoke A having an inner periphery portion to which the upper half of the third balancer A 388 is attached, 390 is a third balancer B which is the other of the two divisions, and 391 is a fourth cylindrical yoke B having an inner periphery portion to which the lower half of the third balancer B 390 and the first balancer 357 described in Embodiment 14 are attached.

Figure 64:
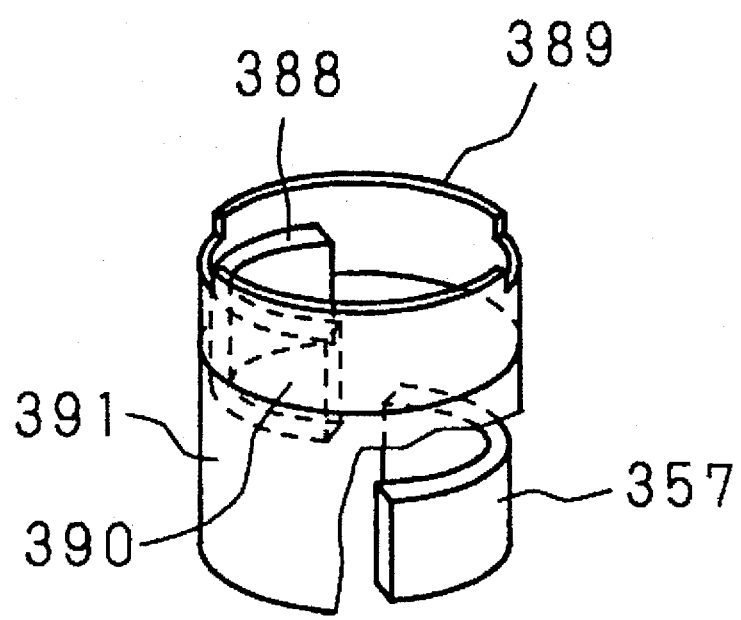
FIG. 64 is a perspective view showing an assembled state of split yokes to which an balancer is attached.

Next, the operation of the embodiment will be described. The fourth yoke A 389 to which the third balancer A 388 is attached is sandwiched by the outer periphery portion of the first plate spring 335 in combination with the rotary cylinder 351 and is fixed in such a manner that the fourth yoke A 389 does not interfere with the first and second magnets C 354 and 355. Then, the fourth cylindrical yoke B 391 whose inner periphery portion the third balancer B 390 and the first balancer 357 are attached to is mounted so as not to interfere with the first and second magnets C 354 and 355. It will be appreciated that, as a result of this assembling, the combination of the third balancers A 388 and B 390 has the same shape as the second balancer 359 as shown in FIG. 64. FIG. 64 is a partial fragmental view of the fourth cylindrical yoke B 391 which is partially cut away after the assembling.

Embodiment 16

The configuration or FIG. 58 may be modified so that, after the third yoke 360 is concentrically attached to the rotating shaft 303 using a jig (not shown), the outer periphery portion of the third yoke 360 is fixed by an adhesive to a secondary rotary transformer 306 an end of which is fixed to the rotary cylinder 351. In the figure, the third yoke 360 is formed as one body. Alternatively, a member separated from the third yoke 360 may be disposed, and the third yoke 360 may be fixed through this member to the secondary rotary transformer 306.

Embodiment 17

Figure 65:
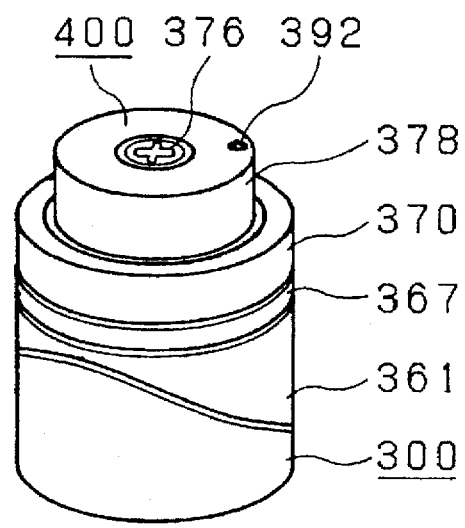
FIG. 65 is a perspective view showing a rotary magnetic head device of Embodiment 17 of the invention.
Figure 66:
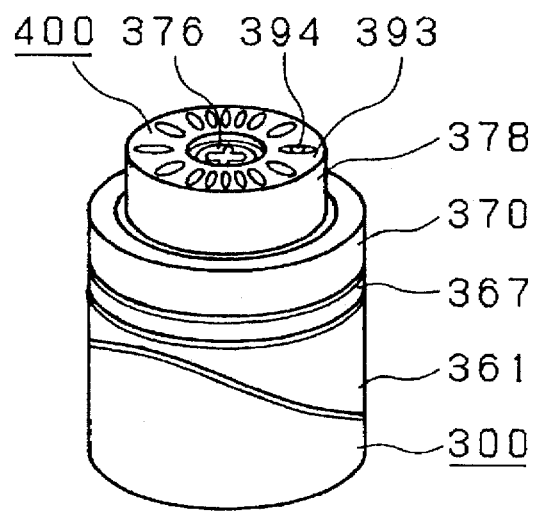
FIG. 66 is a perspective view showing a rotary magnetic head device of Embodiment 16 of the invention.

The configuration of FIG. 58 may he modified so that a notch 392 which is used for finely adjusting the rotation balance is formed on the yoke 378 of the driving motor 400. FIG. 65 is a diagrammatic perspective view of a cylinder device 300. Depending on the degree of unbalance measured in a rotation unbalance test, the notch is formed at a given position. Alternatively, a base plate 393 which is used for finely adjusting the rotation balance may be disposed as shown in FIG. 66, and the adjustment may be conducted by providing solder or weights 394.

Embodiment 18

In the configuration of FIG. 58, the rotary cylinder 351 is not integrated with the ring 367. Alternatively, the rotary cylinder 351 may be integrated with the ring 367, and the machining process may be performed after the rotary cylinder 351 is pressingly fitted onto the rotating shaft 303, thereby attaining the given accuracy.

Embodiment 19

In the configuration of FIG. 58, the first balancer 367 and the second balancer 359 have a substantially same size as the second magnet C 355 and the first magnet C 354, respectively. The same effects can be achieved even when the balancers are replaced with adequate weighty bodies by which the balance is attained.

Embodiment 20

In the configuration of FIG. 58, the rotating shaft 303 is made of a magnetic material. A modification wherein a magnetic film is coated on at least a portion of the surface of a shaft made of a nonmagnetic material which portion constitutes a magnetic circuit can achieve the same effects.

Embodiment 21

Figure 12:
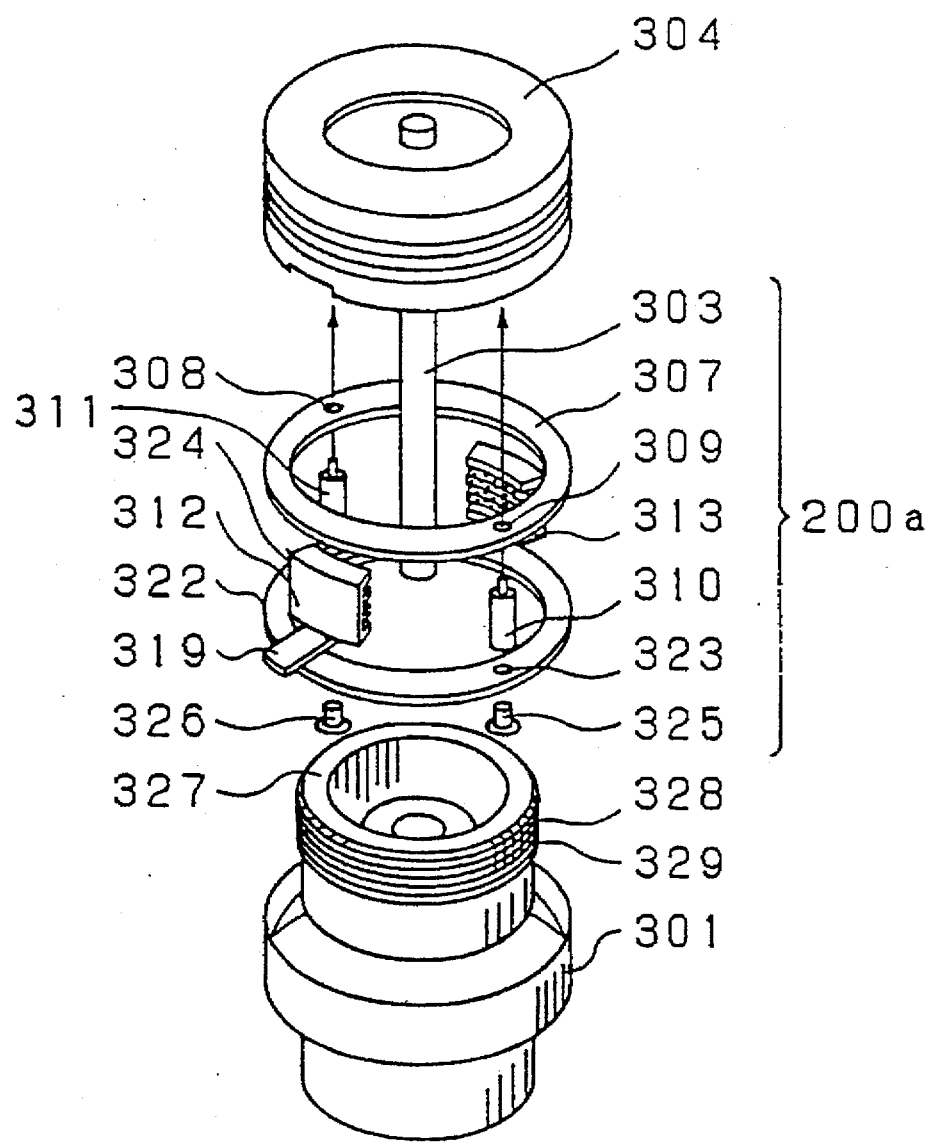
FIG. 12 is an exploded perspective view showing a head moving unit of the rotary magnetic head device of FIG. 11.
Figure 13:
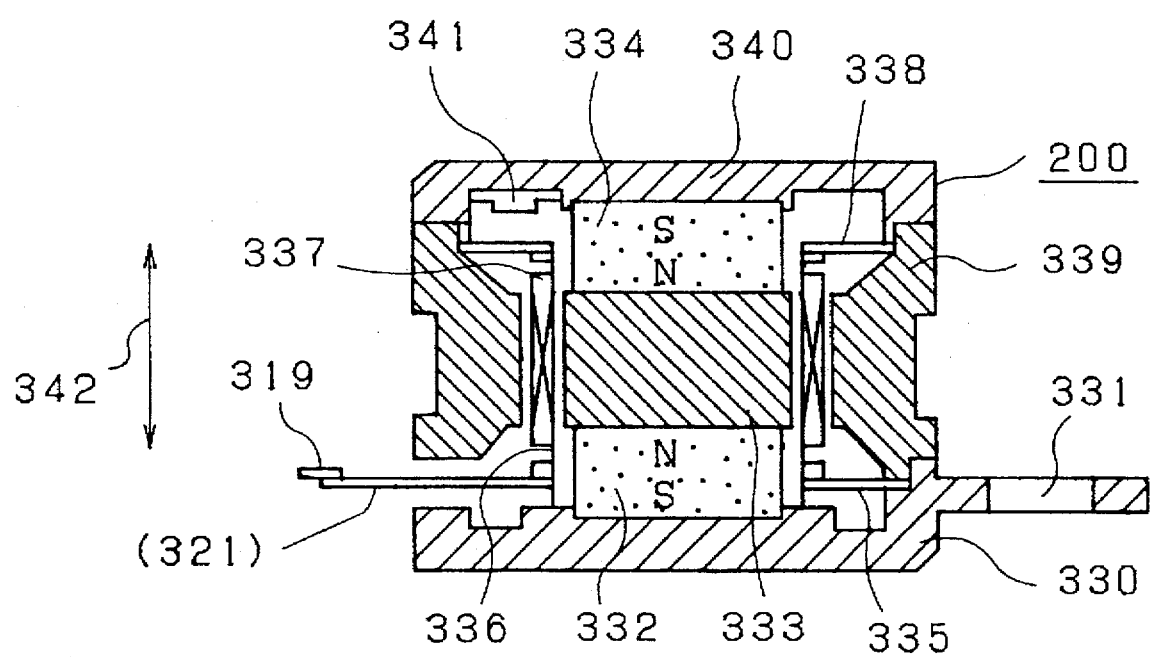
FIG. 13 is a section view of a head moving unit which is a second prior art example.
Figure 14:
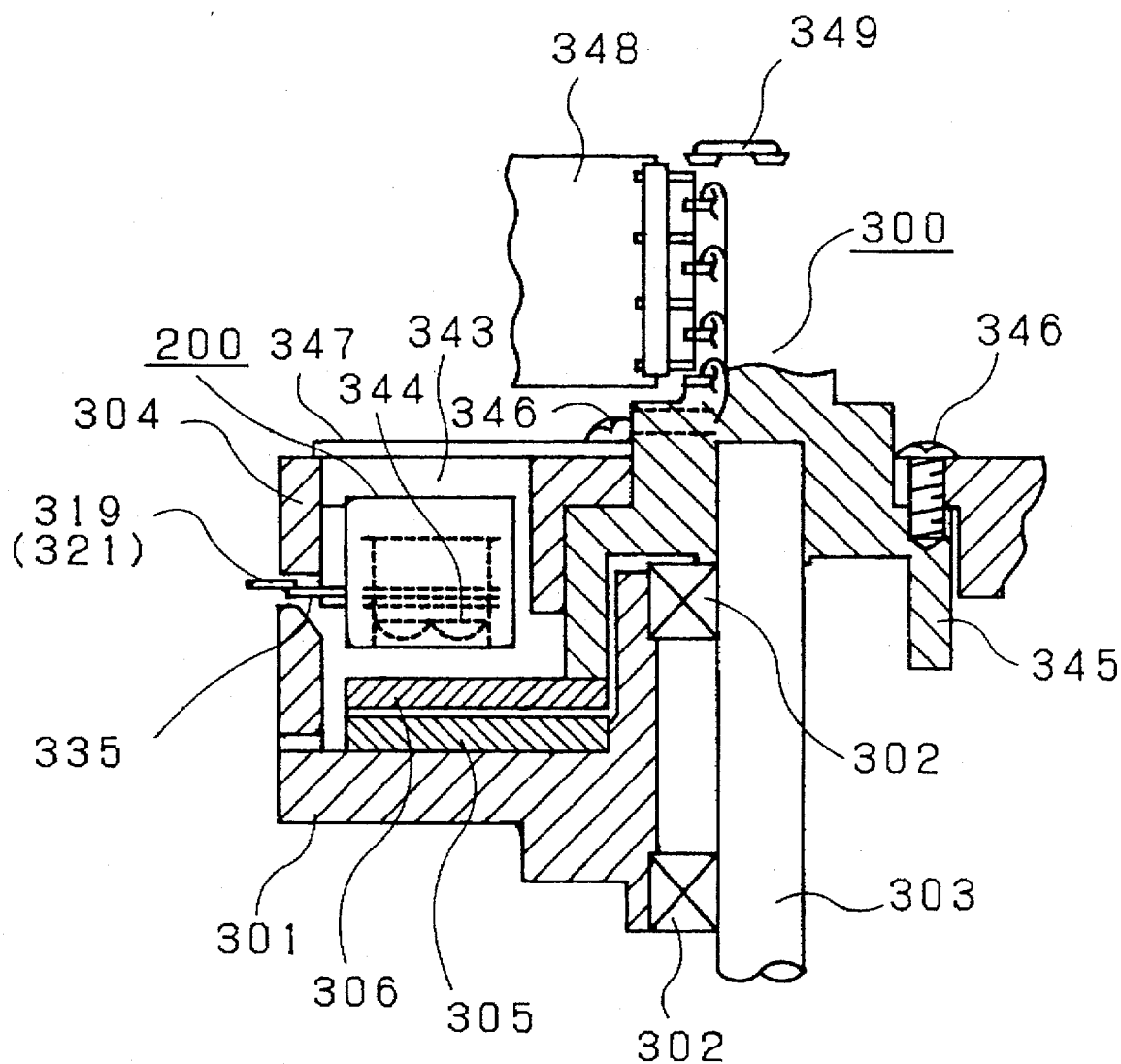
FIG. 14 is a section view showing the main portions of the rotary magnetic head device to which the head moving unit of FIG. 13 is attached.
Figure 15:
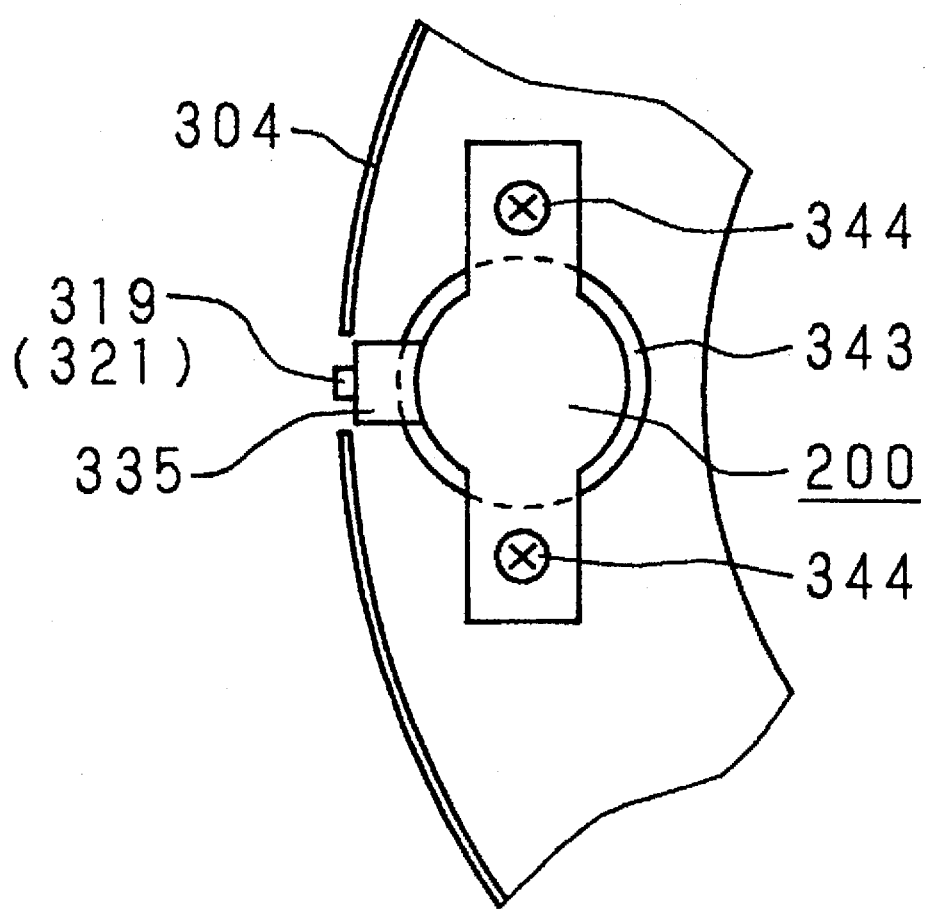
FIG. 15 is a plan view showing the main portions of the rotary magnetic head device to which the head moving unit of FIG. 13 is attached.
Figure 67:
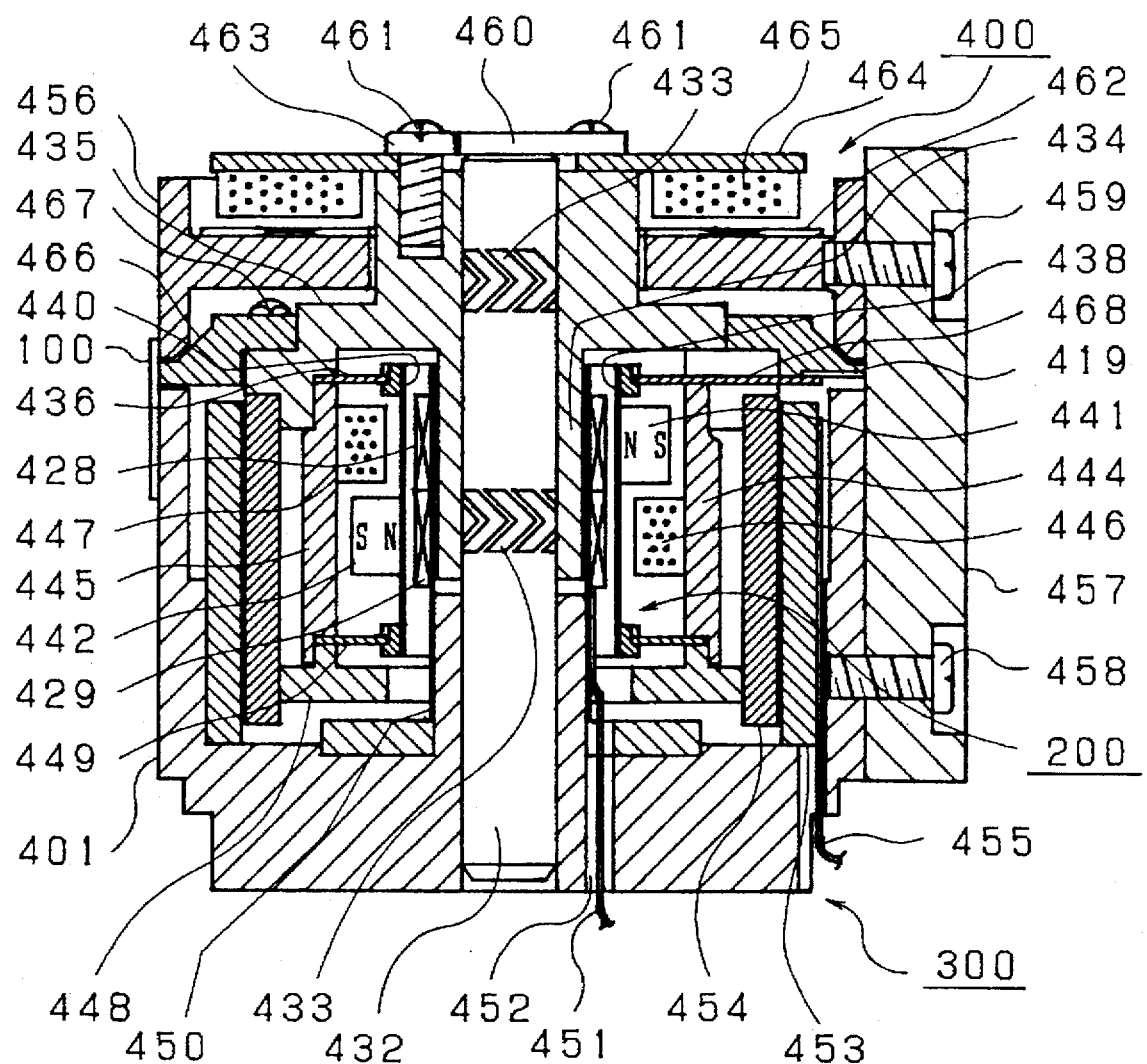
FIG. 67 is a longitudinal section view showing a rotary magnetic head device of Embodiment 21 of the invention.
Figure 68:
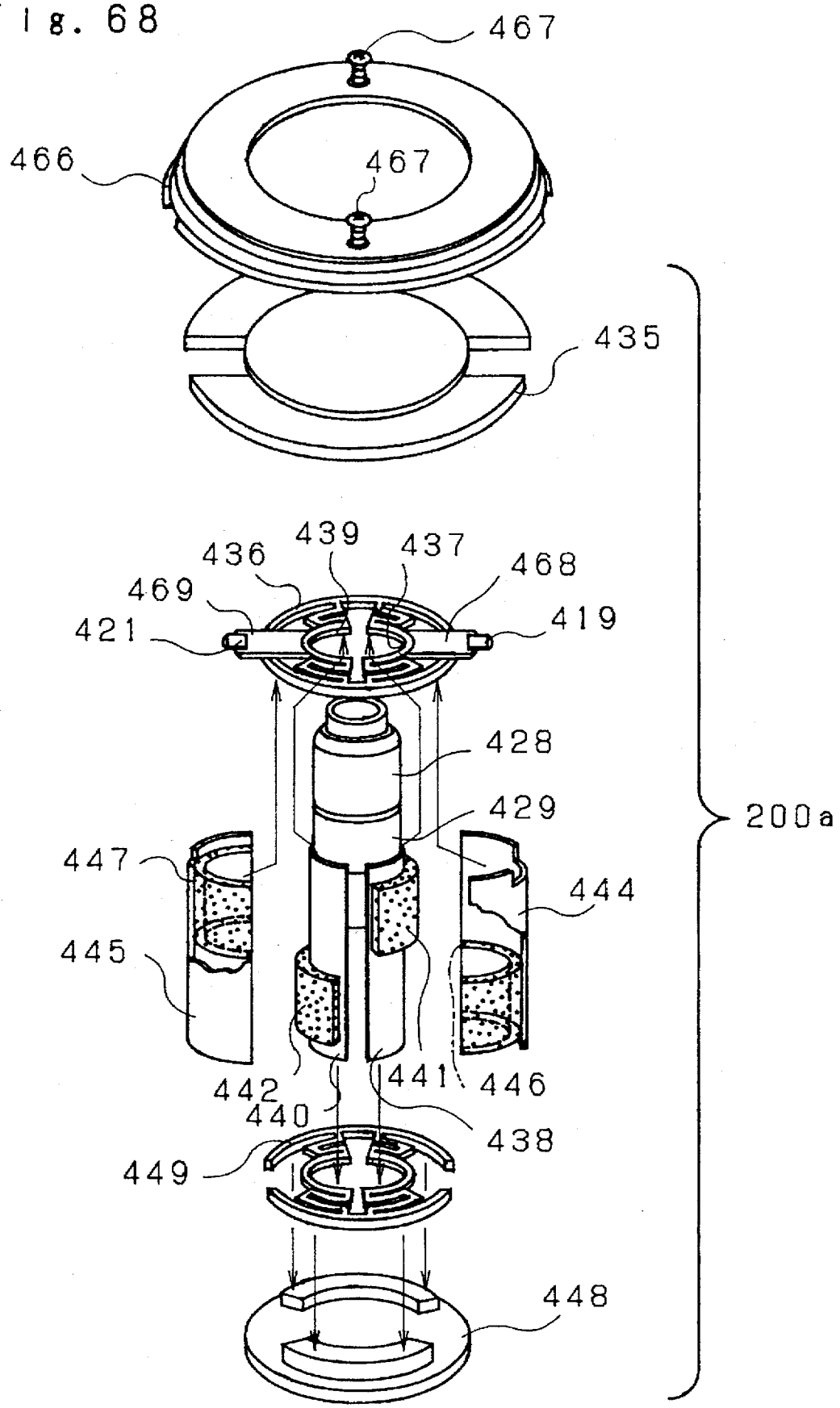
FIG. 68 is an exploded perspective view showing a head moving unit used in a rotary magnetic head device of Embodiment 21.

Embodiment 21 of the invention will be described with reference to FIGS. 67 to 71. FIG. 67 is a section view showing a rotary magnetic head device, and FIG. 68 is an exploded perspective view illustrating the configuration of a head moving mechanism. Components identical with or corresponding to those of FIGS. 11 and 12 are designated with the same reference numerals, and their description is omitted.

In FIG. 67, 432 is a stationary shaft which is pressingly inserted into and fixed to a stationary cylinder 401, 433 is a pressure bearing which corresponds to the bearing 402 of FIG. 11 and in which spiral grooves are formed on the stationary shaft 432, 434 is a bearing supporting portion which is formed so as to support the pressure bearing 433, and 435 is a rotary cylinder having a stepped disk-like flange which is rotatably attached to a given position of the stationary shaft 432. The reference numeral 436 is a first plate spring having a flat portion which is perpendicular to the axial direction of the stationary shaft 432. A semicylindrical holder A 438 is fixedly attached to an inner periphery portion 437 of the first plate spring 436, and a semicylindrical holder B 440 is fixedly attached to an inner periphery portion 439 of the first plate spring 436. A first magnetic head 419 is attached to an extended portion 468 which is integral with the inner periphery portion 437, and a second magnetic head 421 is attached to an extended portion 469 which is integral with the inner periphery portion 439.

The reference numeral 441 is a first sectorial magnet which is attached to an outer periphery portion of the holder A 438 and corresponds to the first magnet A 414 of FIG. 11, and 442 is a second sectorial magnet which is attached to an outer periphery portion of the holder B 440 and corresponds to the second magnet B 417 of FIG. 11. The second magnet 442 is separated from the first magnet 441 in the axial direction of the stationary shaft 432 by a given distance. The reference numeral 444 is a first semicylindrical yoke which cooperates at one end with the rotary cylinder 435 to sandwich and fix an outer periphery portion 486 of the first plate spring 436, and 445 is a second semicylindrical yoke opposing the first yoke 444. Although the first and second yokes 444 and 445 are longitudinally separated from each other in view of the workability of the assembling process, the two yokes constitute a cylindrical yoke.

The reference numeral 446 is a first balancer which is disposed in the inner periphery side of the first yoke 444 so as to oppose the second magnet 442 by an angle of 180 deg., and 447 is a second balancer which is disposed in the second yoke 445 so as to oppose the first magnet 441 by an angle of 180 deg.

The reference numeral 448 is a third ring-like yoke to which the first and second yokes 444 and 445 are respectively positioned and fixed under the state where a second plate spring 449 is sandwiched. The holder A 438 and the holder B 440 are fixedly attached to the inner periphery side of the second plate spring 449. The third yoke 448 constitutes a magnetic circuit in combination with the first yoke of 444 and 445. The first and second plate springs 436 and 449 function as supporting members so as to elastically support the holders 438 and 440 in the axial direction.

The reference numeral 450 is a bobbin which is fixed to the stationary cylinder 401 and coaxial with the stationary shaft 432. First and second coils 428 and 429 are fixedly attached to an outer periphery portion of the second bobbin 450. The first coil 428 is positioned in the outer periphery portion so as to oppose the first magnet 441 and the second balancer 447, and the second coil 429 is positioned in the outer periphery portion so as to oppose the second magnet 442 and the first balancer 446. The reference numeral 451 designates coil lead wires by which the terminals of the first and second coils 428 and 429 are led out via a through hole 452 formed in the stationary cylinder 401.

The reference numeral 453 is a primary rotary transformer fixed to the stationary cylinder 401, 454 is a secondary rotary transformer fixed to the rotary cylinder 435 and the third yoke 448, and 455 designates lead wires of the primary rotary transformer 453 disposed in the stationary cylinder 401.

The reference numeral 456 is an upper stationary cylinder having an outer periphery portion on which the magnetic tape 100 is slidingly guided, 457 is a supporting block for positioning the stationary cylinder 401 and the upper stationary cylinder 456 at respective given locations using screws 458 and 459, 460 is a thrust bearing which is fixed by screws 461 to the rotary cylinder 435 and which is slidingly supported by an end face of the stationary shaft 432 in order to perform the positioning of the rotary cylinder 435 in the axial direction.

The reference numeral 400 is a driving motor which consists of a coil base plate 462 attached to the upper stationary cylinder 456, a yoke 464 which is fixed by a screw 463 to the end face of the rotary cylinder 435, and a driving magnet 465 which is attached to the yoke 464 so as to oppose the coil base plate 462. The reference numeral 466 is a ring which is fastened by screws 467 to an outer periphery portion of the rotary cylinder 435 and is deviated by a given accuracy with respect to the stationary shaft 432. The ring 466 slidingly contacts with the magnetic tape 100 at the outer periphery portion where the magnetic heads 419 and 421 are not positioned.

The shape of the first plate spring 436 to which the first and second magnetic heads 419 and 421 are attached will be described in detail with reference to FIG. 69. In the figure, 437 and 439 are inner periphery portions, and 468 and 469 are extended portions which are respectively integral with the inner periphery portions 437 and 439. The reference numeral 470 designates jimbal springs, 471 designates cut-away portions which are formed in narrow intervals in order to make the jimbal springs 470 longer, 472 designates two cut-away portions which are formed in order to enable the first and second magnetic heads 419 and 421 to operate independently from each other, and 473 is an outer periphery portion which is held by the first and second yokes 444 and 445.

Next, the operation of the embodiment will be described. Principally, the embodiment operates in the same manner as the prior art example, or the embodiment is of the electromagnetic drive type. The first magnetic head 419 is driven in the following manner: When a driving current is supplied to the first coil 428 intersecting with the magnetic field in the magnetic circuit formed by the first magnet 441, a driving force is generated in the axial direction. This driving force causes the holder A 438 which is a movable portion and to which the first magnet 441 is attached, to move in the axial direction. The first magnetic head 419 is disposed at the front end of the extended portion 468 formed in the first plate spring 431 which moves together with the bobbin, and therefore the first magnetic head 419 moves in the axial direction.

Regarding the rotation portion which is constituted by the rotary cylinder 485, the driving motor 400, etc., an allowance for deviation of the dynamic balance (an eccentric load of the rotation portion) is preset, and the balancing is performed so that the deviation becomes lower than the preset allowance. This balancing is highly precisely performed because, when the deviation exceeds the preset allowance, there arise several problems in that an abnormal noise is produced and that the life of the bearing is shortened.

By the way, the driving force of the first coil 428 does not affect the holder B 440 which is independent from the holder A 438. When a driving current is supplied to the second coil 429 intersecting with the magnetic field in the magnetic circuit formed by the second magnet 442, the second magnet 442 is moved in the axial direction.

Since the second magnet 442 is attached to the holder B 440, the holder B 440 is moved in the axial direction. The second magnetic head 421 is disposed at the front end of the extended portion 468 of the first plate spring 436 which moves together with the holder B 440, and therefore the second magnetic head 421 moves in the axial direction.

Figure 70:
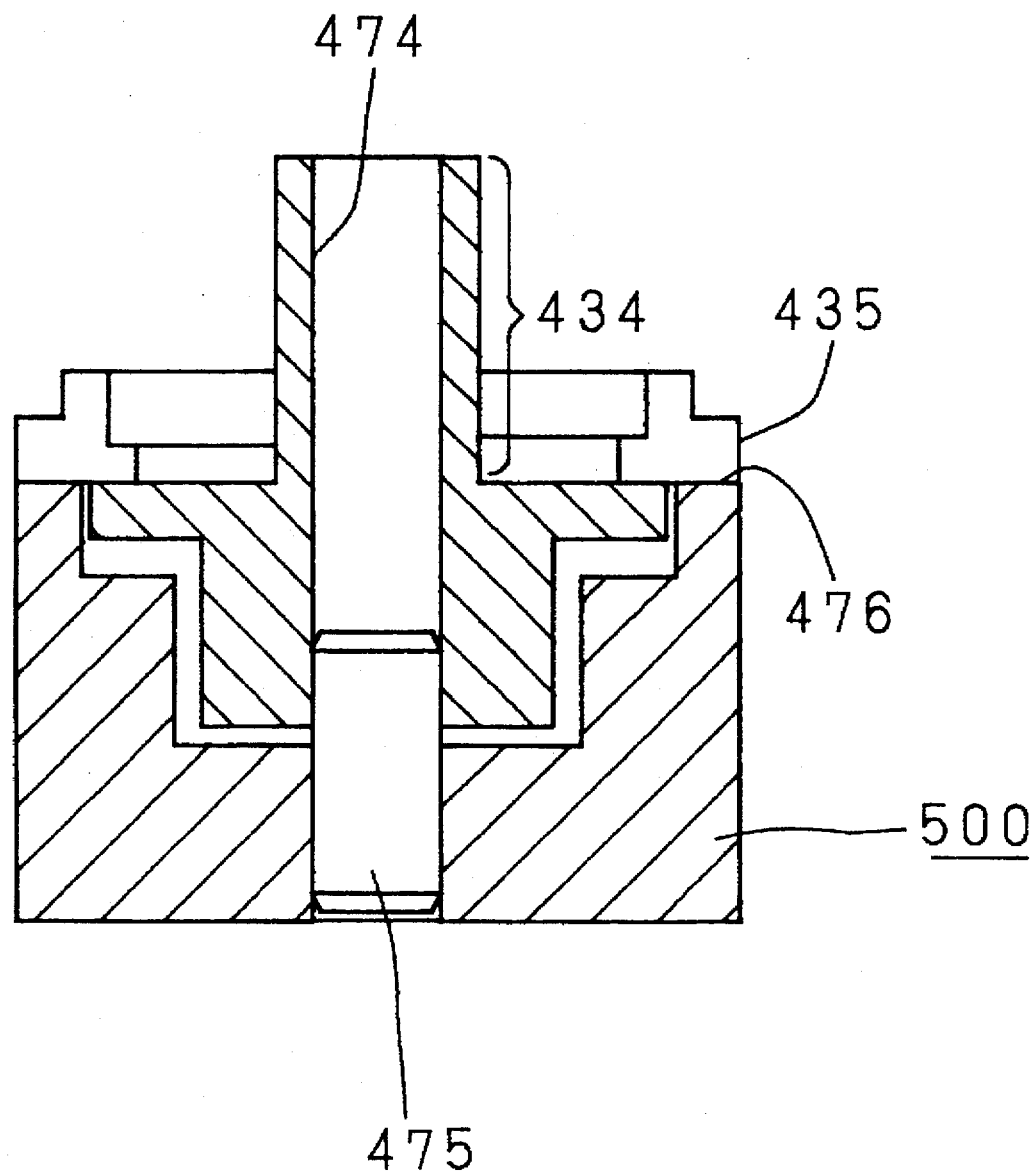
FIG. 70 is a section view showing a mounting table for assembling the rotary magnetic head device of Embodiment 21.

A manner of assembling the above configuration in which the rotary magnetic head device and the head moving device are combined into one body will be described with reference to FIGS. 70 and 71. In FIG. 70, the rotary cylinder 435 which is previously finished at a given accuracy is fixed to a mounting reference face 476 of a mounting table 500 employing a shaft 475 fitted into a hole 474 as the reference. Following the procedure described in conjunction with the configuration shown in FIGS. 67 and 68, a head moving unit 200a is assembled while using mainly adhesives.

Figure 71:
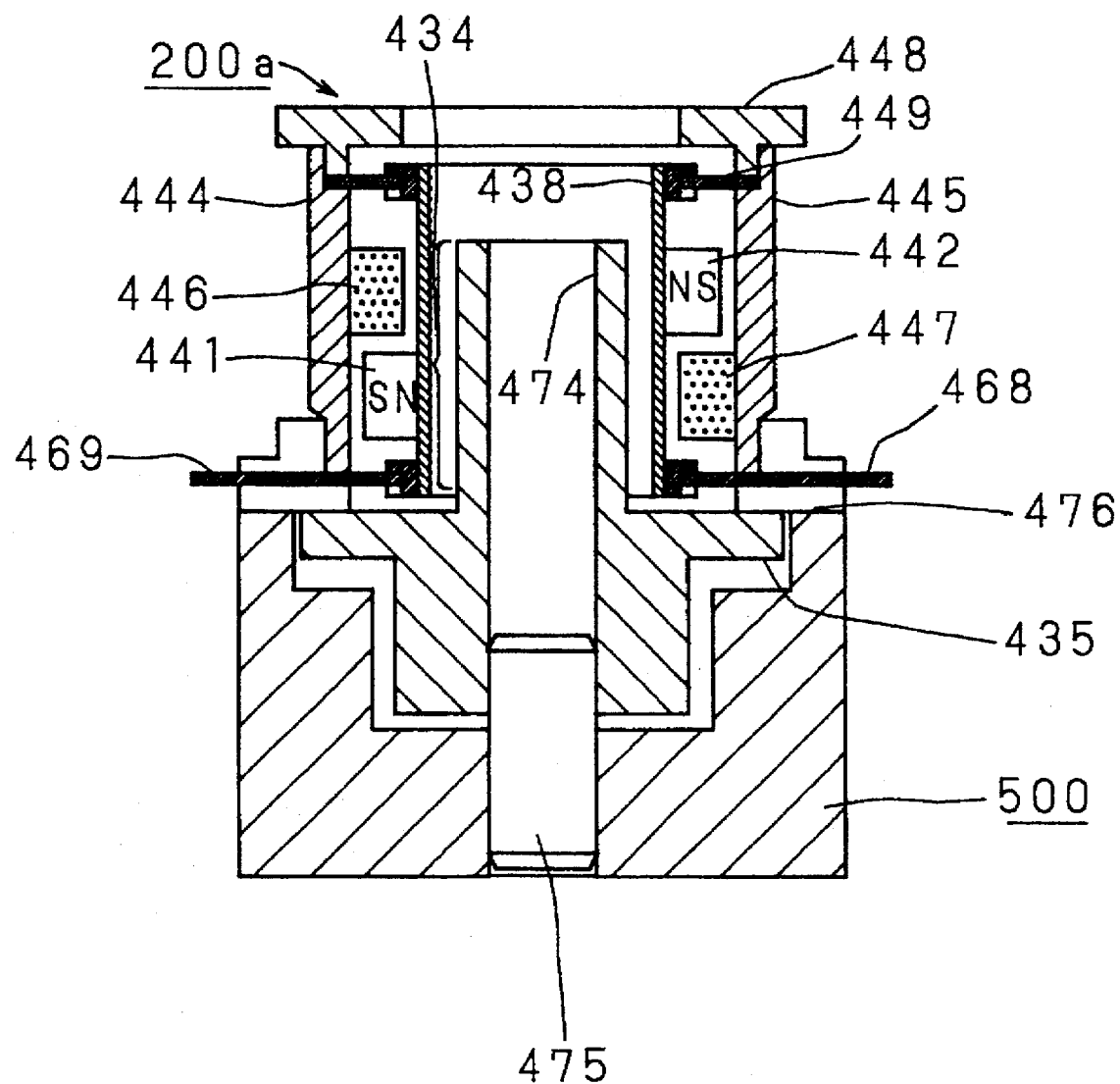
FIG. 71 is a section view showing a state of assembling the rotary magnetic head device with the mounting table of FIG. 70.

The assembled mead moving unit 200a is shown in FIG. 71. After the assembling, the mounting table 500 is removed, and the head moving device is attached to the stationary cylinder 401 to which the stationary shaft 432 is previously attached. Thereafter, the rotary transformers 453 and 454, the upper stationary cylinder 456 and the driving motor 400 are mounted, thereby completing the assembling of the rotary magnetic head device.

The employment of the cylindrical rotary transformers can eliminate the nesting state in the assembling process, thereby improving the workability in the assembling process.

Embodiment 22

Figure 72:
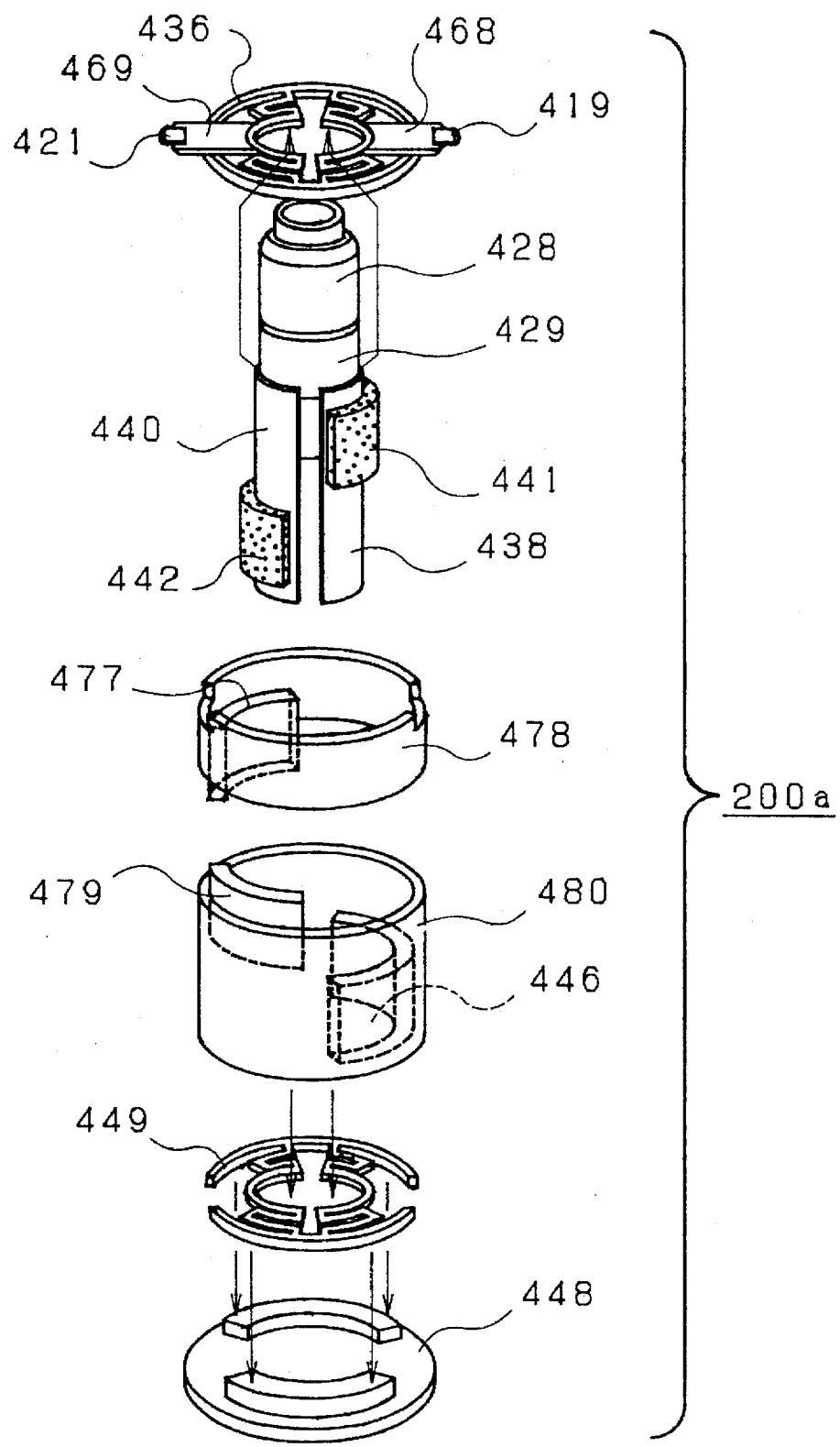
FIG. 72 is an exploded perspective view showing a head moving unit used in a rotary magnetic head device of Embodiment 22 of the invention.

FIG. 72 is an exploded perspective view illustrating of a head moving unit in Embodiment 22 of the invention. Components identical with or corresponding to those of FIGS. 67 to 71 are designated with the same reference numerals, and their description is omitted. Embodiment 22 is effective in the assembling of a configuration in which the angle of sector of each of the magnets is smaller than 120 deg. In FIG. 72, 477 is a third sectorial balancer A which is one of two divisions obtained by dividing in the circumferential direction the second balancer 447 of Embodiment 21. The reference numeral 478 is a fourth cylindrical yoke A having an inner periphery portion to which the upper half of the third balancer A 477 is attached, 479 is a third sectorial balancer B which is the other of the two divisions, and 480 is a fourth cylindrical yoke B having an inner periphery portion to which the lower half of the third balancer B 479 and the first balancer 446 described in Embodiment 21 are attached.

Figure 73A:
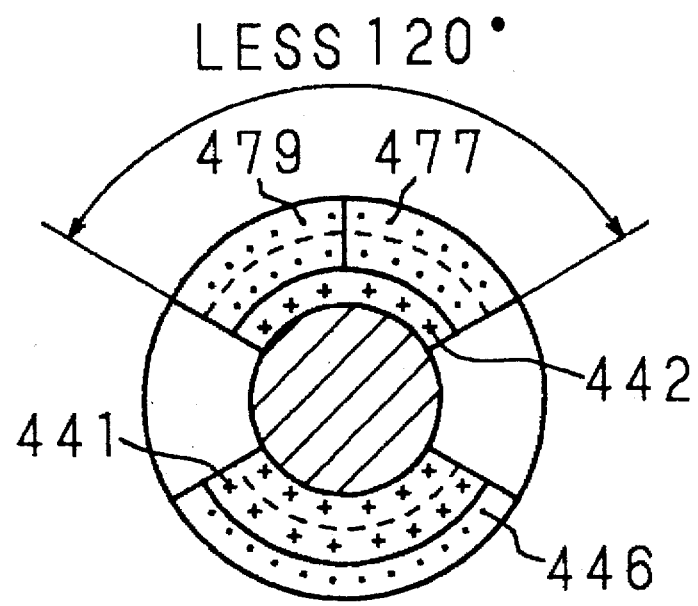
FIGS. 73(a) and (b) are diagrammatic plan views showing the positional relationship between magnets and balancers of FIG. 72.
Figure 73B:
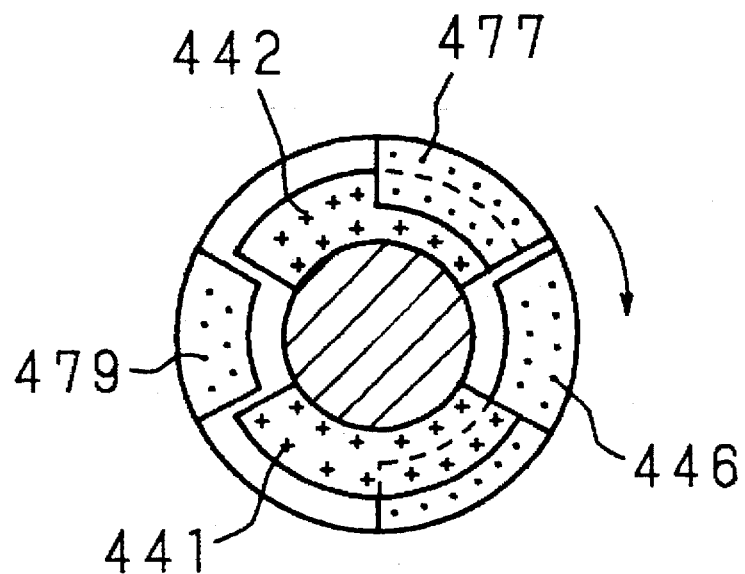

Next, the operation of the embodiment will be described. The fourth yoke A 478 to which the third balancer A 477 is attached is disposed so as not to interfere with the first and second magnets 441 and 442. The outer periphery portion of the first plate spring 436 is sandwiched to be held by the fourth yoke A 478 and the rotary cylinder 435. Then, the fourth cylindrical yoke B 480 having the inner periphery portion to which the third balancer B 479 and the first balancer 446 are attached is inserted so as not to interfere with the first and second magnets 441 and 442, as shown in FIG. 73, and then turned so as to be positioned as shown in FIG. 73(a). FIG. 73(a) is a diagram showing the relationship between the magnets and the balancers in the assembling process, and FIG. 73(b) is a diagram showing that in the insertion process.

Figure 74:
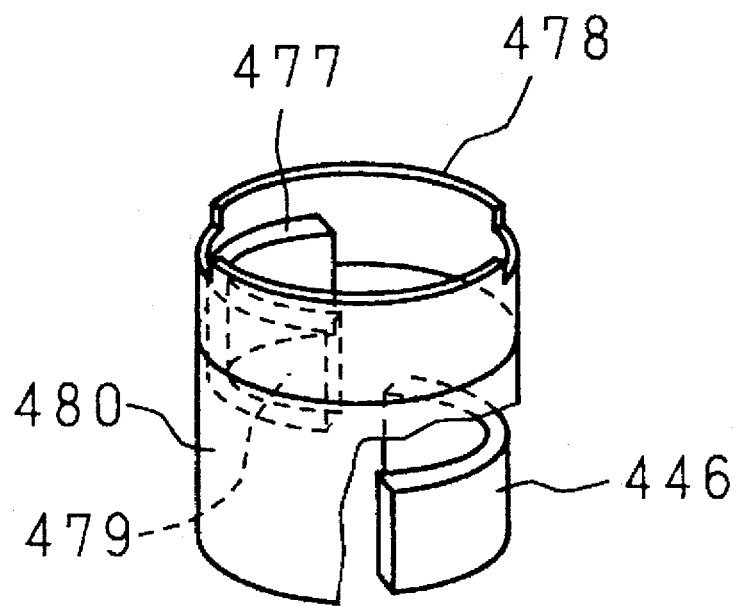
FIG. 74 is a perspective view showing an assembled state of split yokes to which an balancer is attached.

FIG. 74 is a partial fragmental view of the fourth cylindrical yoke B 480 which is partially cut away. As shown in FIG. 74, the third balancers A 477 and B 479 are assembled into the shape same as the second balancer 447. When the angle of sector of the magnet is small or smaller than 120 deg., it is possible to use cylindrical yokes which can previously attain concentricity, thereby improving the workability in the assembling process.

Embodiment 23

In Embodiment 21 shown in FIG. 67, the third yoke 448 is formed as one body. Alternatively, a member separated from the third yoke 448 may be disposed, and the third yoke 448 may be fixed through this member to the secondary rotary transformer 454.

Embodiment 24

Figure 75:
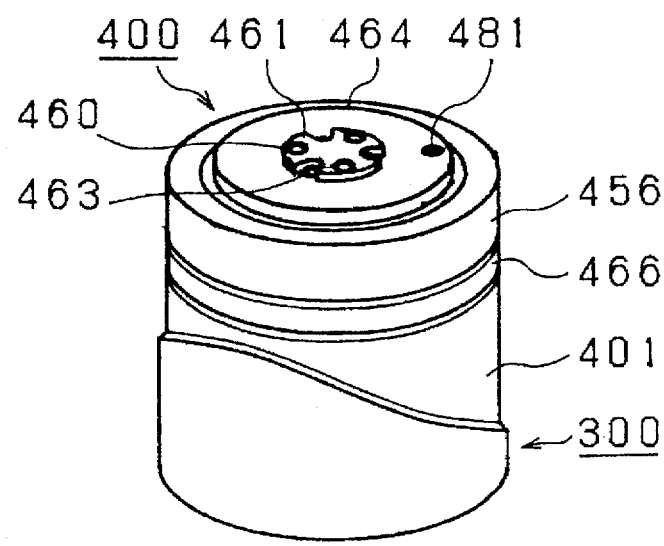
FIG. 75 is a perspective view showing a rotary magnetic head device of Embodiment 24 of the invention.

Embodiment 21 shown in FIG. 67 may be modified so that a notch 481 which is used for finely adjusting the rotation balance is formed on the yoke 464 of the driving motor 400 as shown in FIG. 75 that is a perspective view of a rotary magnetic head device 300. Depending on the degree of unbalance measured in a rotation unbalance test, the notch 481 is formed at a given position.

Figure 76:
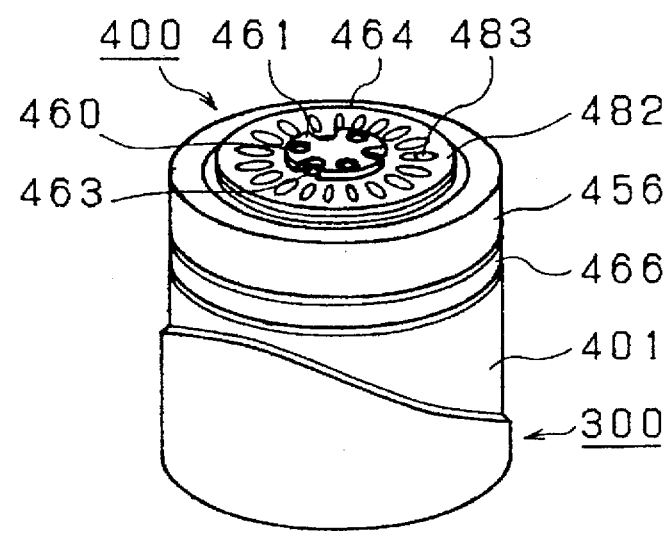
FIG. 76 is a perspective view showing another configuration of Embodiment 24.

Alternatively, a base plate 482 which is used for finely adjusting the rotation balance may be disposed as shown in FIG. 76, and the adjustment may be conducted by providing weights 483 such as those made of solder.

Embodiment 25

In Embodiment 21 shown in FIG. 67, the rotary cylinder 435 is not integrated with the ring 466. Alternatively, they may be made of a magnetic material so as to be formed as one body, thereby attaining the given accuracy.

Embodiment 26

In Embodiment 21 embodiment shown in FIG. 67, the first balancer 446 and the second balancer 447 have the substantially same size as the second magnet 442 and the first magnet 441, respectively. The same effects can be achieved even when the balancers are replaced with adequate weighty bodies by which the balance is attained.

Embodiment 27

In Embodiment 21 shown in FIG. 67, the pressure bearing 433 is disposed on the stationary shaft 432. Alternatively, a bearing is disposed in the fitting hole 474 of the rotary cylinder 435. Also in this alternative, the same effects can be achieved.

Embodiment 28

Figure 77:
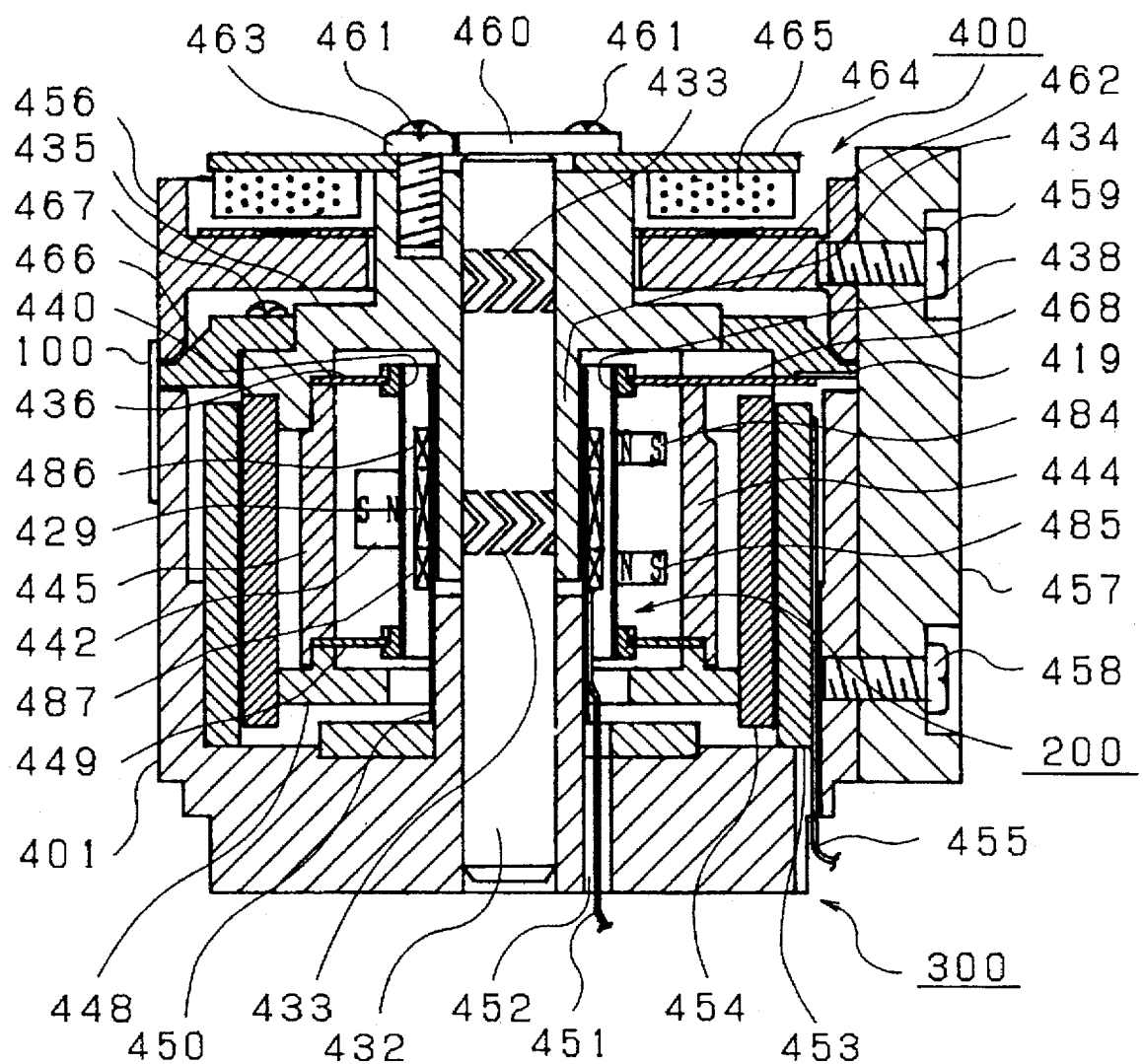
FIG. 77 is a section view showing a rotary magnetic head device of Embodiment 28 of the invention.

In Embodiment 21 shown in FIG. 67, the balancers 447 and 446 are respectively disposed in order to attain the rotation balance of the two magnets 441 and 442. Alternatively, the first magnet 441 or the second magnet 442 may be split. FIG. 77 is a section view of a rotary magnetic head device 300 in which the first magnet 441 is split. In the figure, 484 is a first magnet A, and 485 is a first magnet B. The combination of the magnet A 484 and the magnet B 485 corresponds to the first magnet 441 shown in FIG. 67. The reference numeral 486 is a first coil A, and 487 is a first coil B. The combination of the coil A 486 and the coil B 487 corresponds to the first coil 428 shown in FIG. 67.

Embodiment 29

Figure 69:
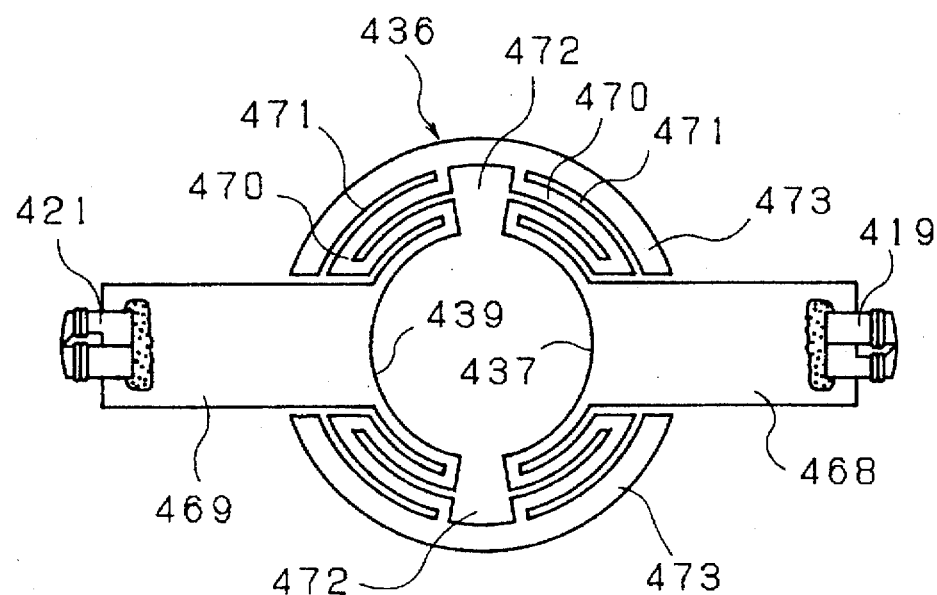
FIG. 69 is a plan view of a plate spring on which magnetic heads are mounted and which is used in the rotary magnetic head device of Embodiment 21.
Figure 78:
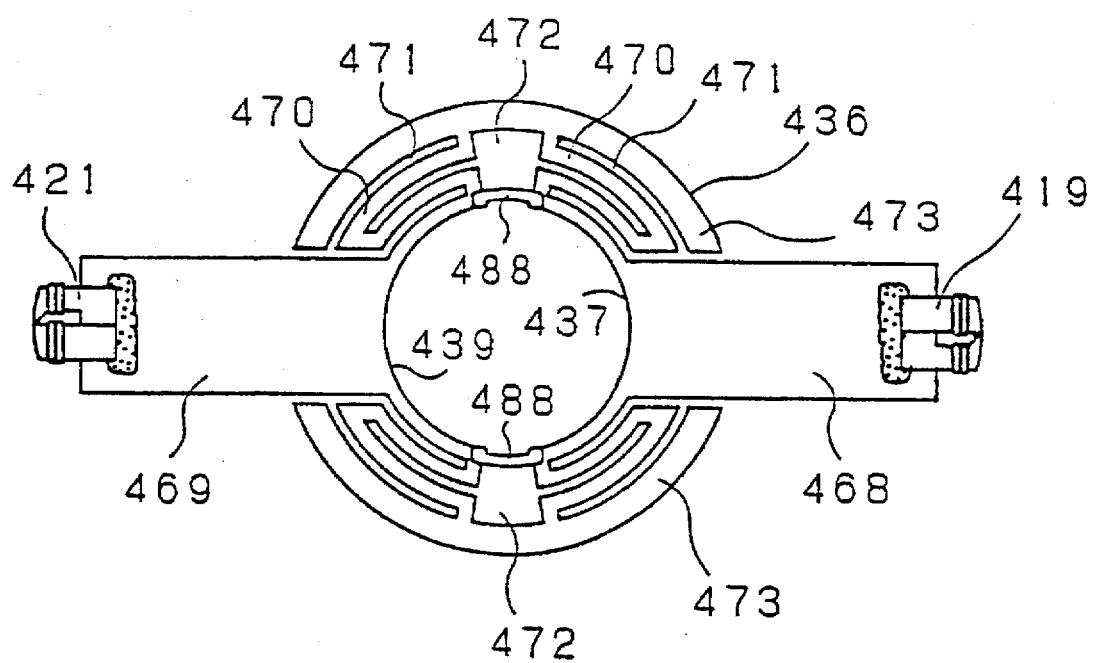
FIG. 78 is a plan view of a plate spring on which magnetic heads are mounted and which is used in a rotary magnetic head device of Embodiment 29 of the invention.

The first plate spring 436 in the embodiment and shown in FIG. 69 is provided with the two cut-away portions 472 in order that the two magnetic heads 419 and 421 operate independently from each other. Alternatively, as shown in FIG. 78, the inner periphery portions 437 and 439 may be bridged by a connecting member 488 which is difficult to deform against tension and compression but easy to deform in the thickness direction. The provision of the connecting member 488 can further assure the relative positional accuracy of the two magnetic heads 419 and 421.

Embodiment 30

Embodiment 30 of the invention will be described with reference to FIGS. 79 to 82.

Figure 79:
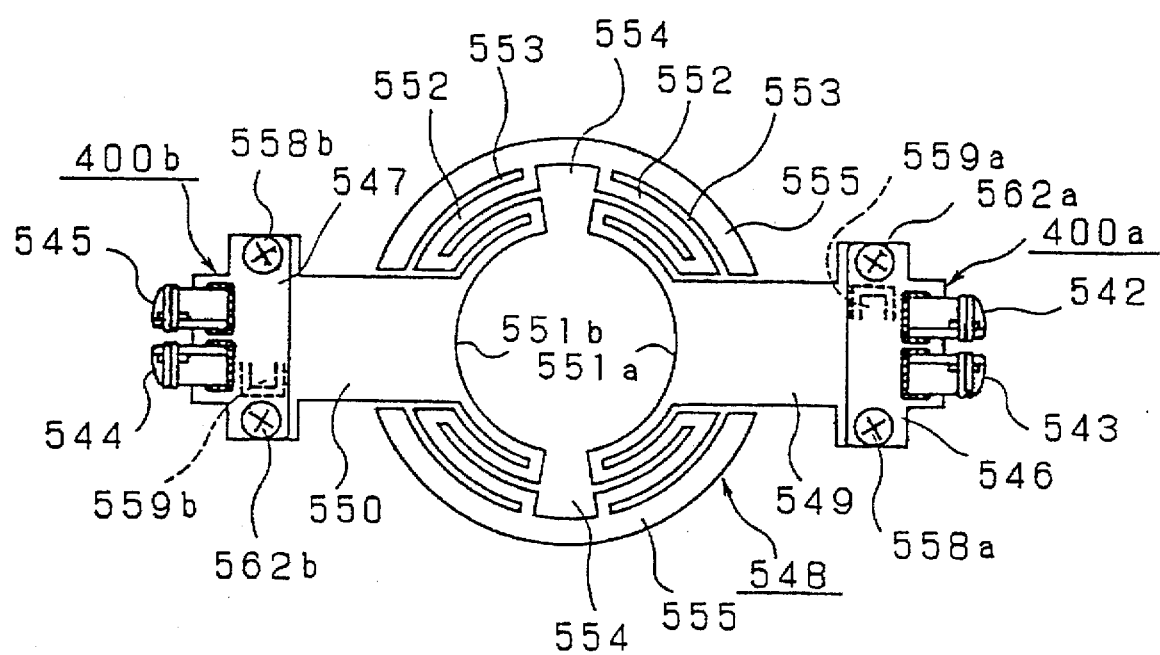
FIG. 79 is a plan view showing a head attaching portion in rotary magnetic lead devices of Embodiments 30, 34 and 35 of the invention.
Figure 80:
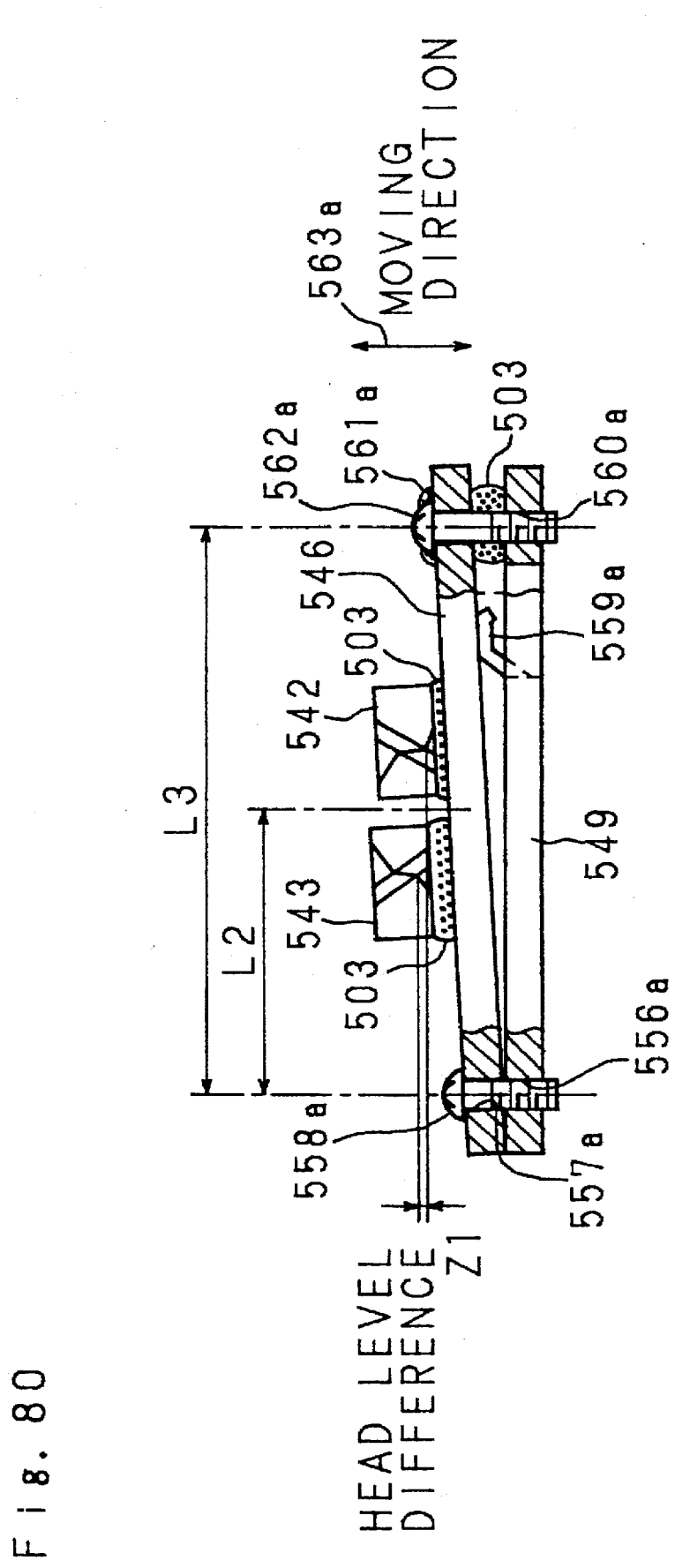
FIG. 80 is a section view showing the main portions as viewed from the head side of FIG. 79.
Figure 81:
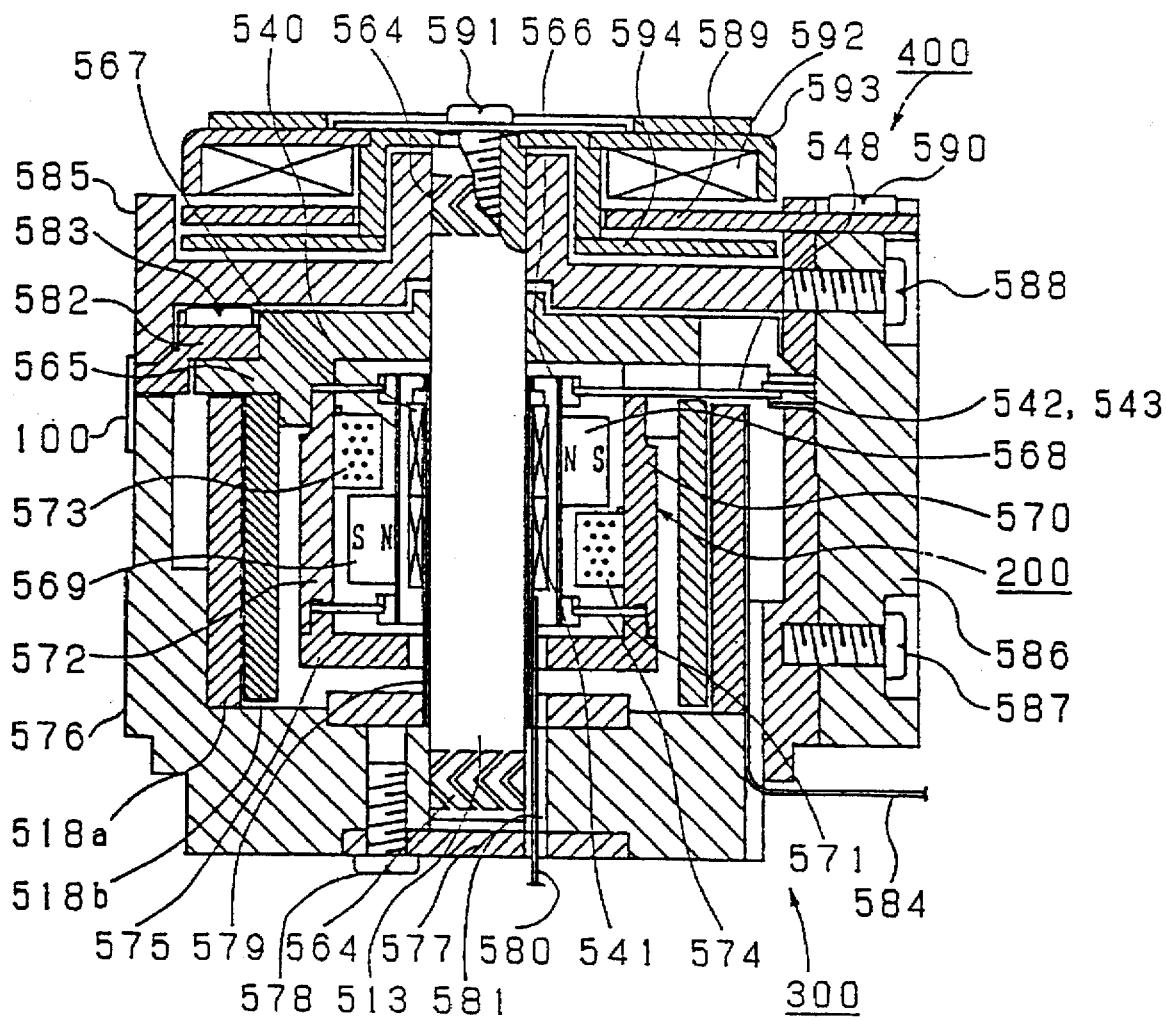
FIG. 81 is a section view of the rotary magnetic head device in which the head attaching portion of FIG. 79 is mounted.
Figure 82:
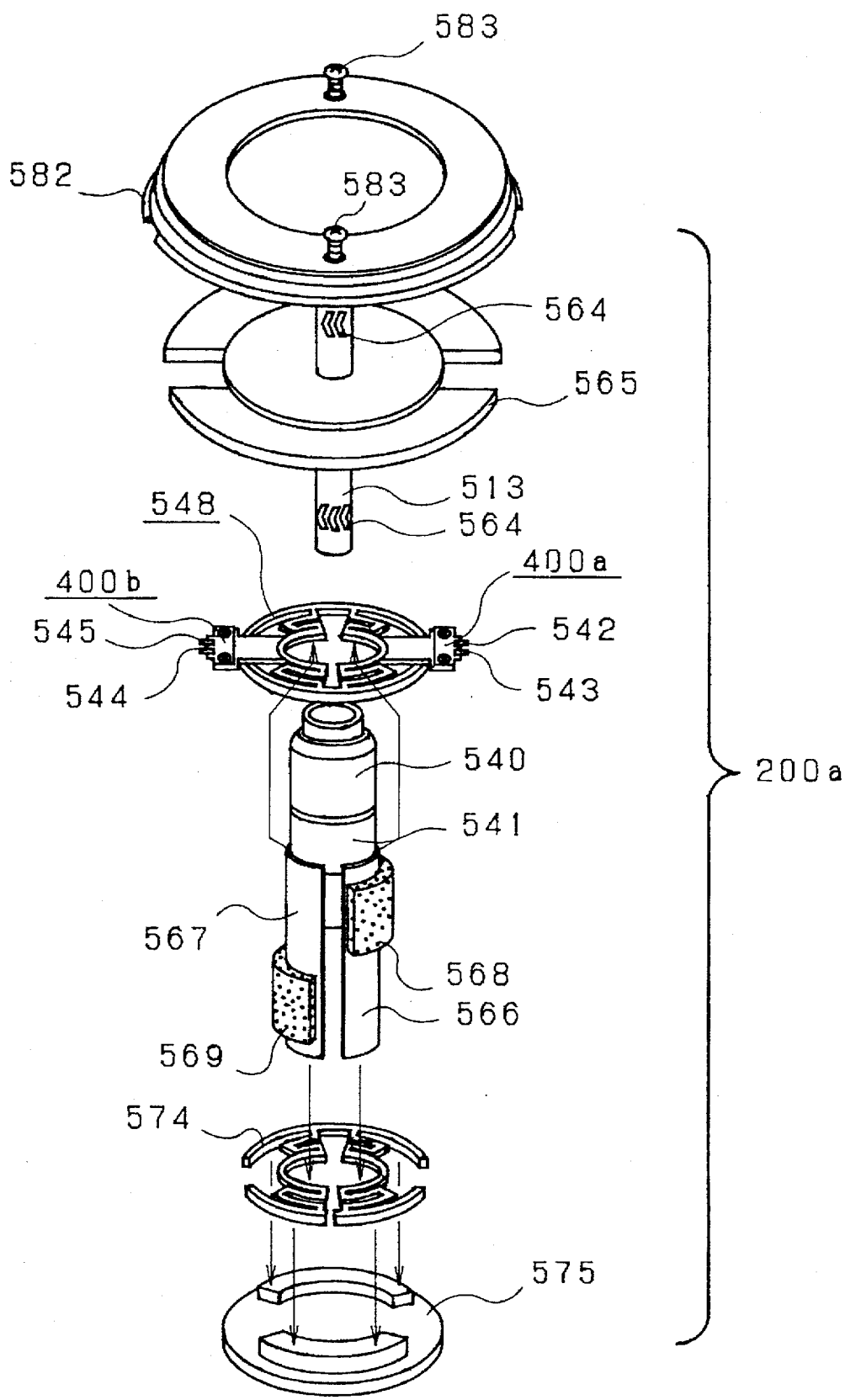
FIG. 82 is an exploded perspective view of the rotary magnetic head device of FIG. 81.

FIG. 79 is a plan view showing a supporting mechanism of a rotary magnetic head device of Embodiment 30, FIG. 80 is a front view showing the main portion as viewed from the head side of FIG. 79, FIG. 81 is a section view of a rotary magnetic head device in which the supporting mechanism of FIG. 79 is mounted, and FIG. 82 is an exploded perspective view of the rotary magnetic head device of FIG. 81. Components identical with or corresponding to those of the prior art device of FIGS. 11, 12, and 16 to 20 are designated with the same reference numerals, and their description is omitted.

In FIGS. 79 to 82, 542 is a first magnetic head A, 543 is a second magnetic head A which is disposed in proximity of the first magnetic head A 542, 544 is a first magnetic head B which is disposed at the position opposite to that of the first magnetic head A 542 or so as to form an angle of 180 deg. about the center, and 545 is a second magnetic head B which is disposed in proximity of the first magnetic head B 544. The reference numeral 546 is a first head supporting table on which the first and second magnetic heads A 542 and 543 are mounted in a given positional relationship, 547 is a second head supporting table on which the first and second magnetic heads B 544 and 545 are mounted in a given positional relationship, 548 is a first plate spring which is elastic in the thickness direction but difficult to deform in the plane direction, 549 is a first extended portion as a head supporting base plate which is one projection integral with and protruding from an inner periphery portion 551a of the first plate spring 548, 550 is a second extended portion which is the other projection, 552 designates jimbal springs, and 553 designates cut-away portions which are formed in narrow intervals in order to make the jimbal springs 552 longer.

The reference numeral 554 designates two notches which are formed in order that the first and second head supporting tables 546 and 547 operate independently from each other, 555 is an outer periphery portion to be held, 556a is a tapped hole formed at one end of the first extended portion 549, 557a is a hole formed at one end of the first head supporting table 546, 558a is a screw for fastening the first head supporting table 546 to the tapped hole 556a of the first extended portion 549 through the hole 557a, 559a is a resilient portion which is formed by partly punching the first extended portion 549, 560a is a tapped hole formed in the vicinity of the other end of the first extended portion 549, and 561a is a hole formed in the vicinity of the other end of the first head supporting table 546. The reference numeral 562a is a screw for adjustment of height which is passed through the hole 561a and the tapped hole 560a formed in the vicinity of the other end of the first extended portion 549 so that the first head supporting table 546 is moved by the pressing force in a moving direction 563a about time rotation center which is the portion where the first head supporting table 546 is fastened by the screw 558a. The reference numeral 400a is a first head unit consisting of the first head supporting table 546 to which the two magnetic heads 542 and 543 are attached.

In the configuration of FIG. 79, magnetic heads are attached to the second extended portion 550 in the same manner as those attached to first extended portion 549. The components such as a tapped hole 556b in the side of the second extended portion, 550 are designated in the figure by time same reference numerals while replacing "a" with "b".

Figure 19:
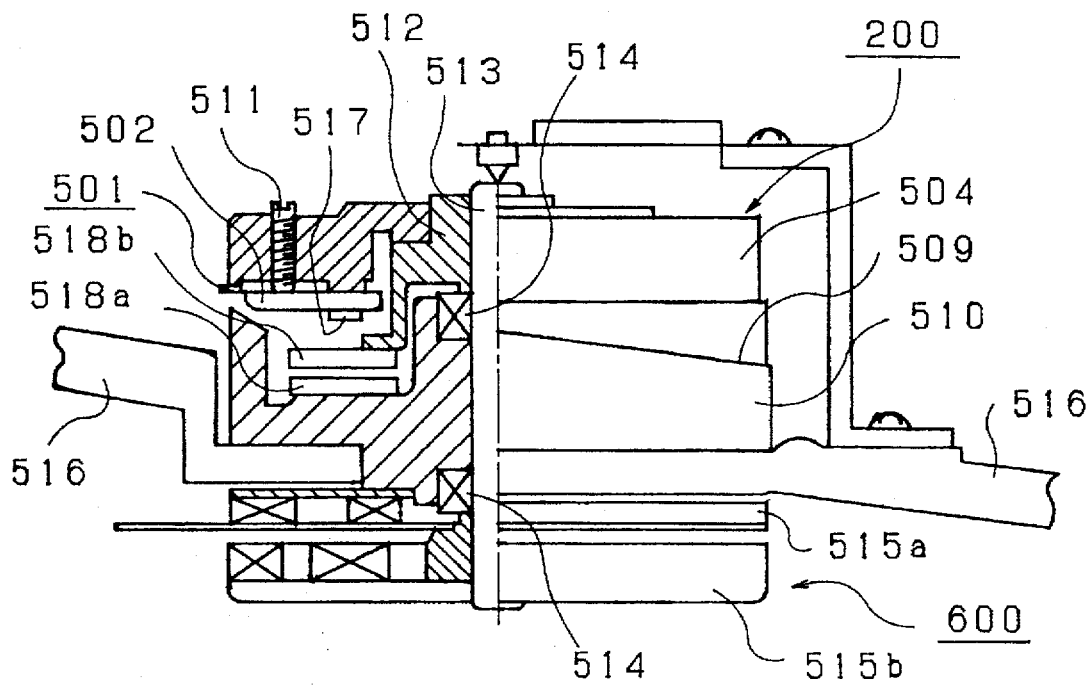
FIG. 19 is a section view of a rotary magnetic head device in which the magnetic head device of FIG. 16 is mounted.
Figure 20:
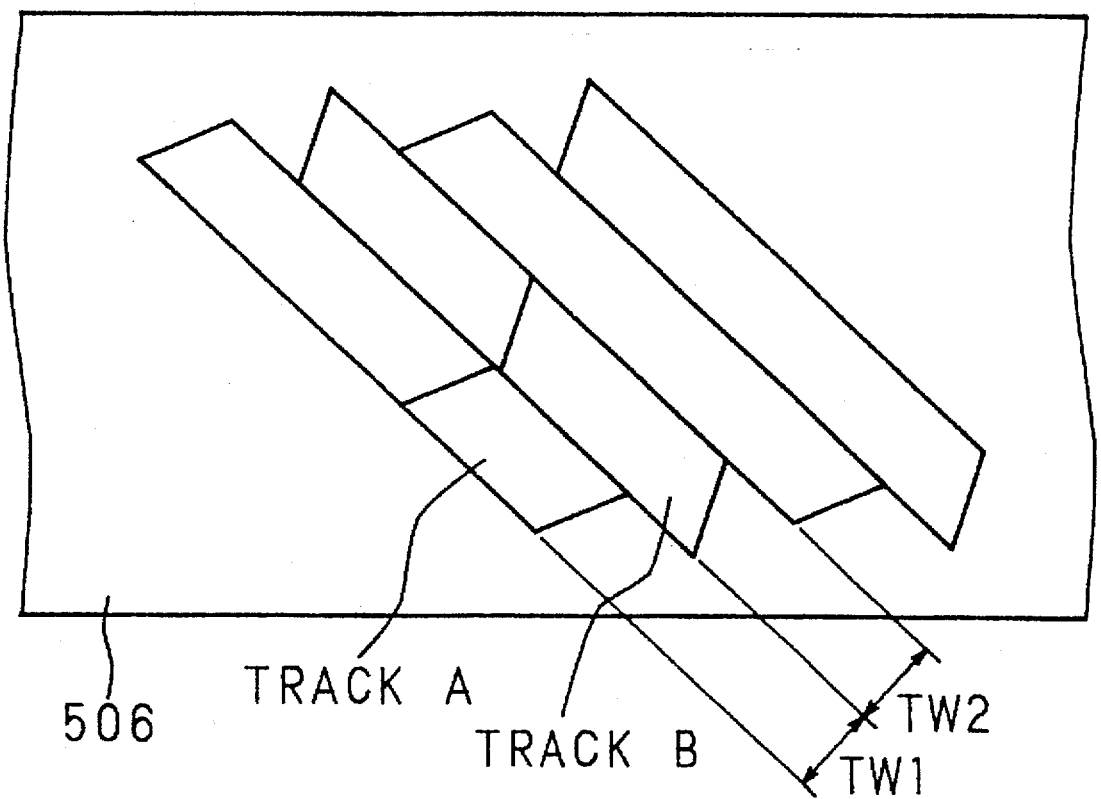
FIG. 20 is a diagram showing the relationship between a head level difference error and a track width.
Figure 21:
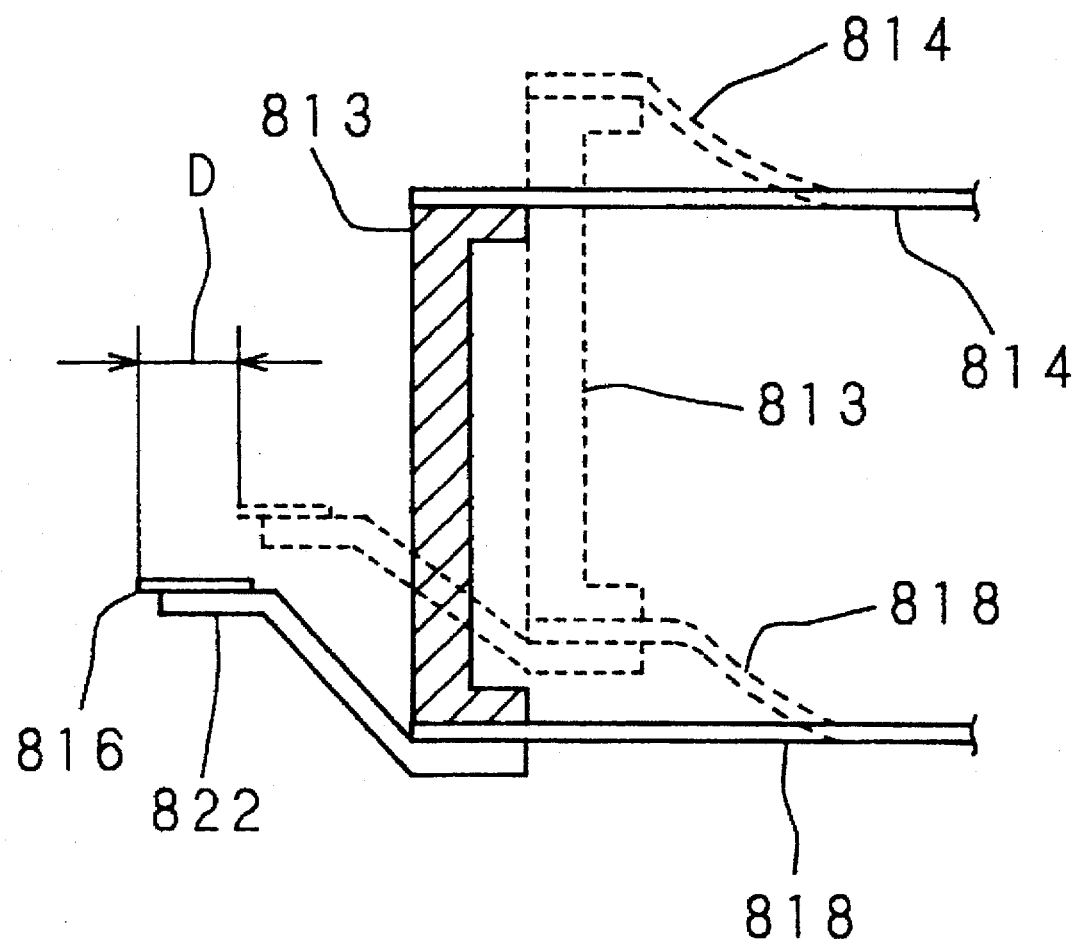
FIG. 21 is a view showing a deformation state in the operation of upper and lower plate springs used in the prior art example.

In FIGS. 81 and 82, 564 is a pressure bearing which corresponds to the bearing 514 of FIG. 19 and in which spiral grooves are formed on a rotating shaft 513, and 565 is a rotary cylinder having a stepped disk-like flange which is attached to a given position of the rotating shaft 513 so as to be integral therewith. The reference numeral 566 is a semicylindrical holder A attached to the inner periphery portion 551a which is integral with the first extended portion 549, and 567 is a semicylindrical holder B which pairs with the holder A 566 to form a cylinder and is attached to the inner periphery portion 551b. The reference numeral 568 is a first sectorial magnet C which is attached to an outer periphery portion of the holder A 566 and corresponds to the first magnet A 526 of FIG. 11, and 569 is a second sectorial magnet C which corresponds to the second magnet B 529 of FIG. 11. The reference numeral 570 is a first semicylindrical yoke which cooperates at one end with the rotary cylinder 565 to sandwich and fix an outer periphery portion 555 of the first plate spring 548, 571 is a first block member which is attached to an inner periphery side of the first yoke 570 so as to oppose the second magnet C 569 by an angle of 180 deg., 572 is a second semicylindrical yoke which opposes the first semicylindrical yoke 570, and 573 is a second block member which is attached to the second yoke 572 so as to oppose the first magnet C 568 by an angle of 180 deg.

The reference numeral 574 is a second annular plate spring which is attached at an inner periphery portion to the other ends of the holder A 566 and the holder B 567, 575 is a third ring-like yoke which cooperates with the first and second yokes 570 and 572 to sandwich and fix an outer periphery portion of the second supporting base plate 574, 576 is a first stationary cylinder which corresponds to the component 510 of FIGS. 19 and 11, 577 is a thrust bearing stand which is fixed by screws 578 to the first stationary cylinder 576 so as to support an end face of the rotating shaft 513, and 579 is a cylindrical bobbin which is fixed at one end to the first stationary cylinder 576 and coaxial with the rotating shaft 513. The bobbin 579 positions the first coil 540 so as to oppose the first magnet C 568, and a second coil 541 so as to oppose the second magnet C 569.

The reference numeral 580 designates coil lead wires by which the terminals of the first and second coils 540 and 541 are led out via a through hole 581 formed in the thrust bearing stand 577, and 582 is a ring which is fastened by screws 583 to the outer periphery portion of the rotary cylinder 565 so as to be deviated by a given accuracy with respect to the rotating shaft 513, and slidingly contacts with a magnetic tape 100 at an outer periphery portion. The reference numeral 584 designates lead wires of the primary rotary transformer 518a disposed in the first stationary cylinder 576, 585 is a second stationary cylinder having all outer periphery portion over which the magnetic tape 100 is slidingly guided, and an inner periphery portion which is rotatably supported by the bearing 564, and 586 is a supporting block for positioning the first and second stationary cylinders 576 and 585 at respective given locations using screws 587 and 588.

The reference numeral 400 is a driving motor which consists of a coil base plate 589 fixed at one end to the supporting block 586, a driving magnet 592 which is integrally fixed to an end face of time rotating shaft 513 by a screw 591, a yoke 593 to which the driving magnet 592 is attached, and a back yoke 594 for reducing the eddy-current loss.

Then, the operation will be described in detail with reference to the drawings.

The magnetic head mounting portion is configured as shown in FIGS. 79 and 80. The description of the operation will be conducted together with the description of the operation of the rotary magnetic head device.

Generally, the Embodiment 30 shown in FIGS. 81 and 82 operates in the same manner as the prior art example, or the embodiment is of the electromagnetic drive type. Regarding the first and second magnetic heads A 542 and 543, when a driving current is supplied to the first coil 540 intersecting with the magnetic field in the magnetic circuit formed by the first magnet C 568, a driving force is generated in the axial direction. This driving force causes the holder A 566 which is a movable portion and to which the first magnet C 568 is attached, to move in the axial direction. The magnetic heads 542 and 543 are disposed at the front end of the first extended portion 549 formed in the first plate spring 548 which moves together with the bobbin, and therefore the magnetic heads 542 and 543 move in the axial direction.

In contrast, the driving force of the first coil 540 does not affect the holder B 567 which is independent from the holder A 566. Regarding the first and second magnetic heads B 544 and 545, when a driving current is supplied to the second coil 541 intersecting with the magnetic field in the magnetic circuit formed by the second magnet C 569, a driving force is generated in the axial direction. This driving force causes the holder B 567 which is a movable portion and to which the second magnet C 569 is attached, to move in the axial direction. The magnetic heads 544 and 545 are disposed at the front end of the second extended portion 550 formed in the first plate spring 548 which moves together with the bobbin, and therefore the first and second magnetic heads B 544 and 545 move in the axial direction.

Figure 83:
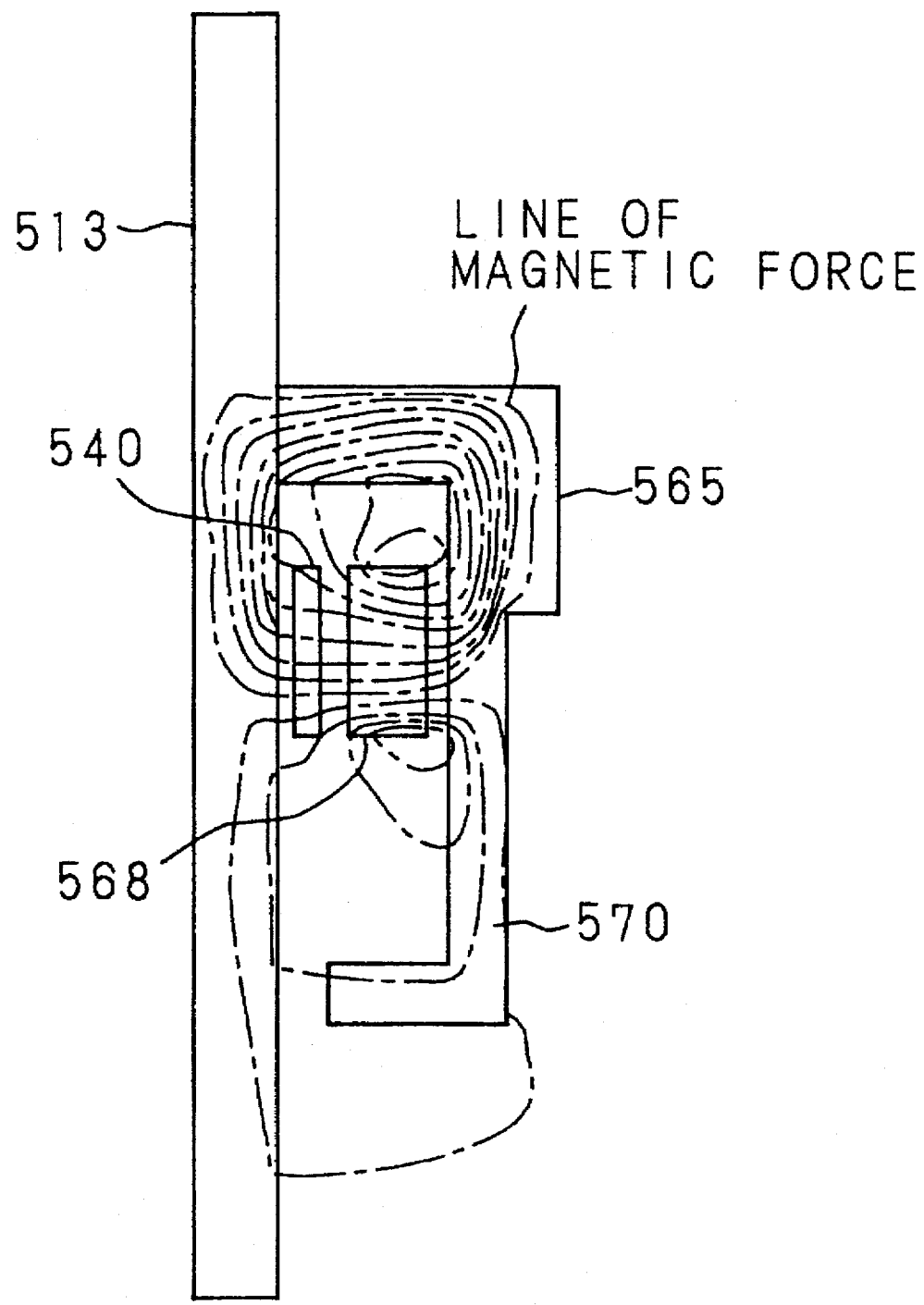
FIG. 83 shows an example of a magnetic circuit in the rotary magnetic head device of FIG. 81 which has been analyzed according to the finite element method.

FIG. 83 shows an example of a magnetic circuit in the above configuration which has been analyzed according to the finite element method. From FIG. 83, it will be noted that the configuration is quite adequate.

In time figure, a magnetic circuit which is formed by the first magnet C 568, the first yoke 570, the rotary cylinder 565, the rotating shaft 513, and the first coil 540 is shown. In the magnetic field in the first coil 540 which is disposed between the rotating shaft 513 and the first magnet C 568, lines of magnetic force are substantially parallel with each other. Therefore, it can be anticipated that stable magnetic properties are obtained even when the first magnet C 568 moves in the axial direction, proving that this magnetic circuit is an excellent one.

Figure 84:
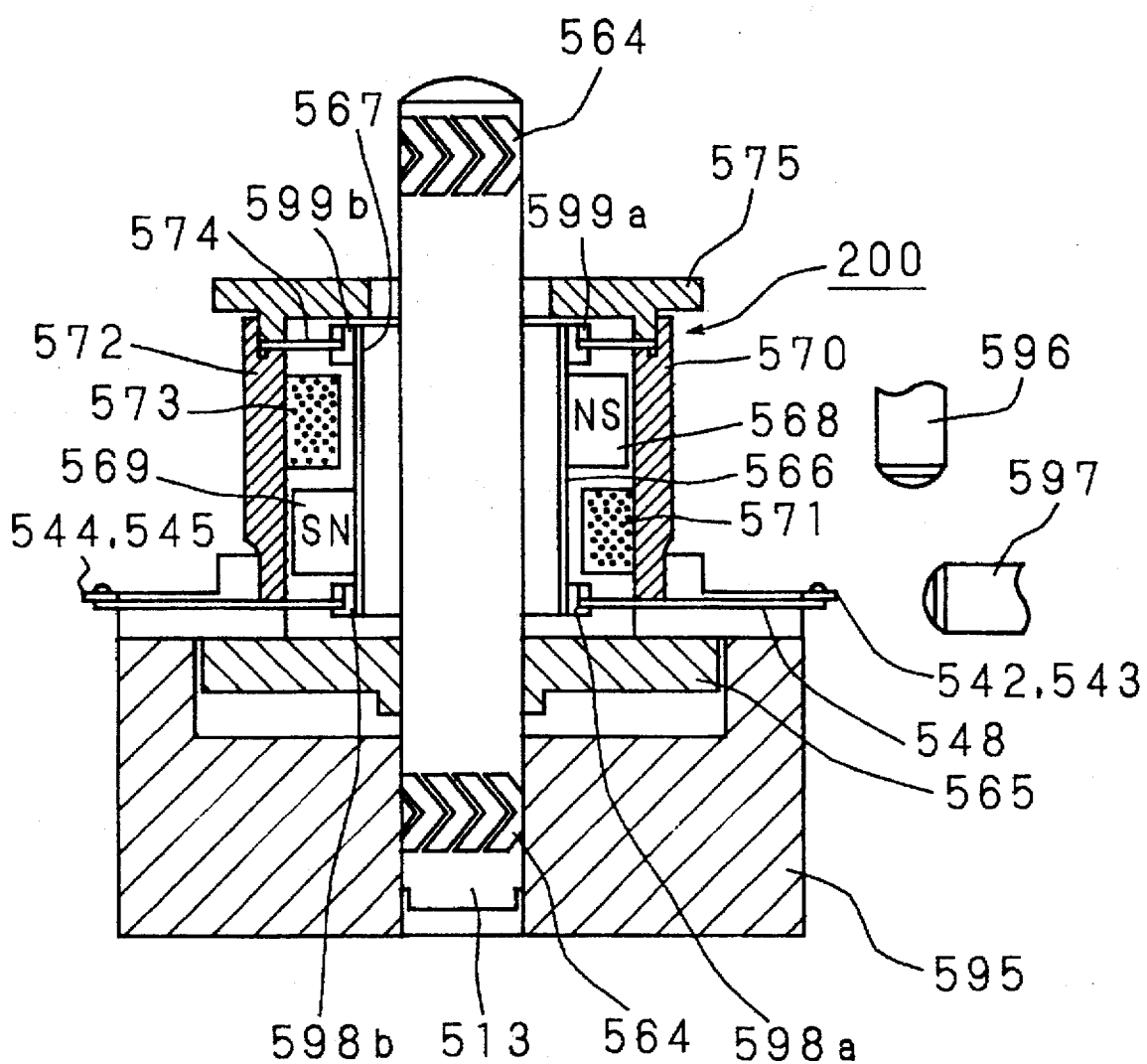
FIG. 84 is a section view showing the head level difference adjustment in the assembling of the rotary magnetic head device of FIG. 81.

A method of adjusting the level difference of the magnetic leads in the assembling process of the rotary magnetic head device having such a head moving device will be described with reference to FIGS. 80 and 84. FIG. 84 is a section view illustrating the assembling or the head moving device.

As shown in FIG. 80, the first head supporting table 46 is moved in the moving direction 563a by adjusting the advancing distance of the screw 562a employing the first plate spring 548 as the reference, so that the head level difference Z of the first and second magnetic heads A 542 and 543 has a given value Z1. Regarding the first and second magnetic heads B 544 and 545, the adjustment is conducted in the same manner. Namely, the second head supporting table 547 is moved in the moving direction 563b by adjusting the advancing distance of the screw 562b employing the first plate spring 548 as the reference, so that the head level difference Z of the first and second magnetic heads B 544 and 545 has the given value Z1.

In the method described above, a limit is naturally placed upon the head level difference accuracy because the first plate spring 548 used as the reference may be deviated from a plane perpendicular to the rotating shaft 513 during the assembling process of the head moving device (such a deviation is referred to as an assembly error). As shown in FIG. 84, therefore, the adjusting process may be conducted after the head moving device 200 has been assembled.

In FIG. 84, 595 is a holding table which is disposed in, for example, a magnetic head alignment apparatus (not shown) and which is supported while employing the rotating shaft 513 as the reference, 596 is an objective lens of a microscope which is used for performing the positioning (projection amount) in the radial direction of the magnetic heads and provided in the alignment apparatus, and 597 is an objective lens of an interference microscope which is used for adjusting the postures of the magnetic heads or the head level difference and provided in the alignment apparatus. The manner of adjusting the first and second magnetic heads A 542 and 543 will be described.

A first inner periphery ring A 598a and a second inner periphery ring A 598b are previously adhered and fixed to inner periphery portions of the first plate spring 548. Then, the first plate spring 548 is attached to the rotary cylinder 565 by positioning the fitting locations of the outer periphery portion. Thereafter, the holder A 566 and holder B 567 to which the first and second magnets C 568 and 569 are attached while employing the rotating shaft 513 as the reference are adhered and fixed to inner periphery portions of the first and second inner periphery rings A 598a and 598b, respectively.

Then, the outer periphery portion of the first plate spring 548 is sandwiched and fixed between the first yoke 570 to which the first block member 571 is previously attached, and the second yoke 572 to which the second clock member 573 is previously attached.

The second plate spring 574 to which first and second inner periphery rings B 599a and 599b are previously attached at the inner periphery portion is adhered and fixed to the other ends of the holder A 566 and holder B 567 while employing the rotating shaft 513 as the reference, so that the fitting locations of the outer periphery portions are positioned by the first and second yokes 570 and 572. Finally, the outer periphery portion of the second plate spring 574 is sandwiched between the third yoke 575 and the first and second yokes 570 and 572 while employing the rotating shaft 513 as the reference.

In this way, time lead moving device 200 is assembled. After this assembling process, the head level difference is adjusted while employing the rotating shaft 513 as the reference, whereby the adjusting and positioning can be conducted highly precisely.

The alignment apparatus may be used in the checking process which is to be conducted after the head level difference has been adjusted while employing the first plate spring 548 as the reference.

Figure 16:
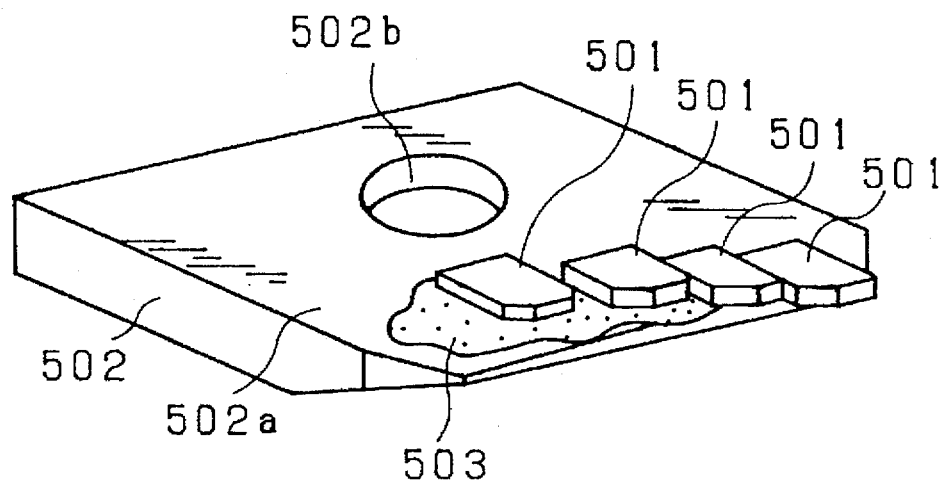
FIG. 16 is an perspective view of magnetic head device which is a fifth prior art example.
Figure 17:
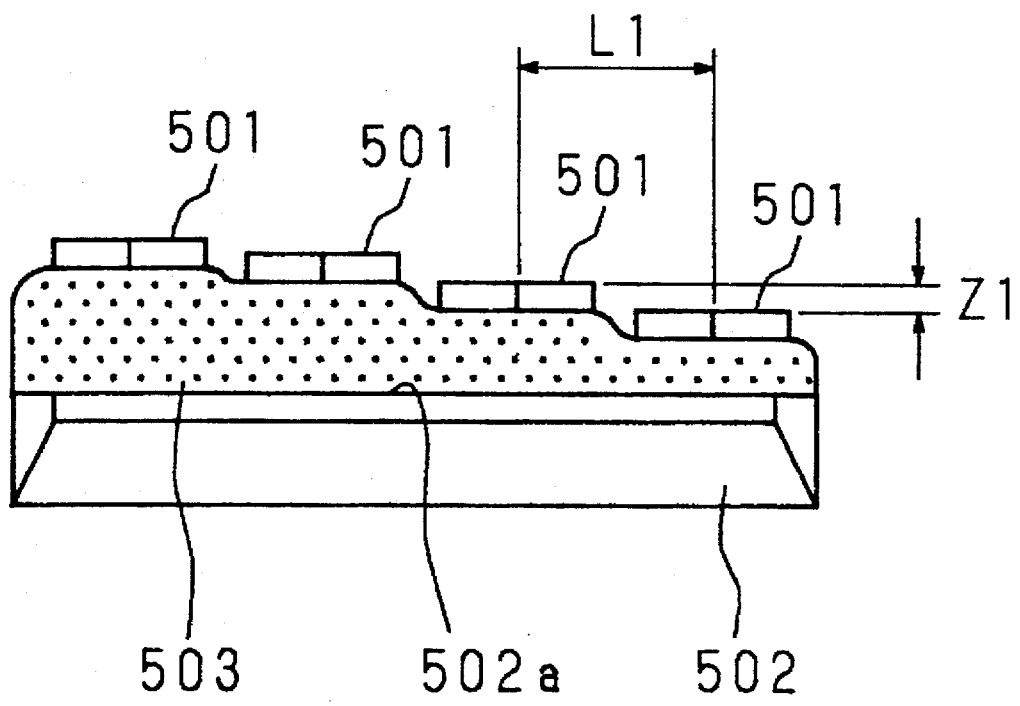
FIG. 17 is a front view as viewed in the head gap direction in FIG. 16.
Figure 18:
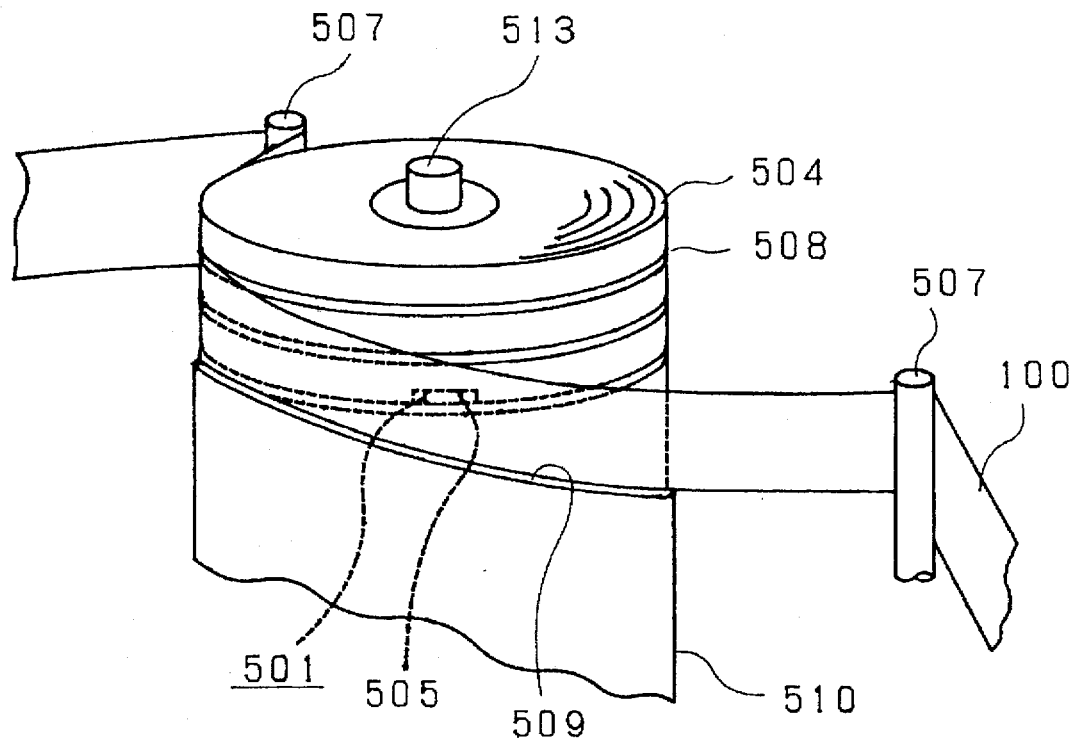
FIG. 18 is an perspective view of a magnetic head device which is a fifth prior art example.

The necessity of the apparatus will be described in detail by illustrating the accuracy employed in the process in which the magnetic heads are positioned and fixed in the above prior art device using an adhesive 503 as shown in FIGS. 16 and 17. For the sake of simplicity, the description will be done referring to FIG. 85.

Figure 85:
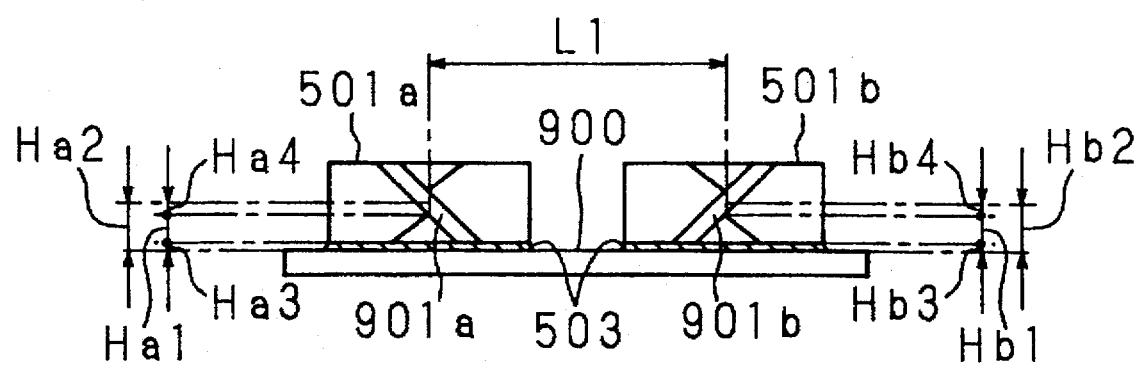
FIG. 85 is a front view showing the main portions of a head to illustrate the head level difference accuracy.

In FIG. 85, when a left magnetic head 501a is adhered by the adhesive 503, the height Ha2 from a head mounting reference plane 900 which functions as the magnetic head adhering reference plane to a given position of a head gap 901a is the sum of the thickness Ha3 of the adhesive, the height Ha1, and a gap reference height Ha4 from the lower end of the head gap 901a to the given position of the head gap 901a. Generally, the gap reference height Ha4 is set to be a half of the width of a track to be recorded on the magnetic tape 100.

Similarly, a right magnetic head 501b is then adhered by the adhesive 503, so that it is separated from the left magnetic head 501a by a given gap distance L1 and that a given head level difference Z1 is attained. The head level difference Z, which depends on the gap distance L1, the tape speed, the drum rotation speed, etc., can be expressed by the following expression while employing the head mounting reference plane 900 as the reference:

$$Z = Hb2 - Ha2 \tag{4}$$

Since the adhesive 503 in the left and right sides respectively have the thicknesses of Ha3 and Hb3, the above expression can be rewritten as follows:

$$Z = (Hb1 + Hb3 + Hb4) - (Ha1 + Ha3 + Ha4) = (Hb1 - Ha1) + (Hb3 - Ha3) + (Hb4 - Ha4) \tag{5}$$

Because the gap reference height Ha4 equals the gap reference height Hb4 (Ha4=Hb4), the expression is:

$$Z = (Hb1 - Ha1) + (Hb3 - Ha3) \tag{6}$$

By adjusting the thicknesses of Ha3 and Hb3 of the adhesive 503 in the left and right sides, and the heights Ha1 and Hb1 of the lower ends of the gaps, the difference ($\Delta Z1$) between the head level difference Z of Equation 6 and the head level difference Z1 to be set can be suppressed to a value as small as several microns.

Referring to FIG. 84, a head level difference error ($\Delta Z2$) is caused by a deviation in parallelism of the mounting plane of the rotary cylinder 565 of the head moving device 200 from the head mounting reference plane 900, and another head level difference error ($\Delta Z3$) with respect to the rotating shaft 513 is caused by a deviation in perpendicularity of the mounting plane of the rotary cylinder 565 from the rotation direction of the rotating shaft 513. Therefore, the total of the head level difference errors is expressed by the following expression and may have a large value depending upon an assembly accuracy:

$$\Delta Z = \Delta Z1 + \Delta Z2 + \Delta Z3 \tag{7}$$

Accordingly, the head level difference between the two magnetic heads in the head moving device 200 is measured as shown in FIG. 84 while employing the rotating shaft 513 as the reference, and the head supporting tables 546 and 547 are moved by operating the screws 562 so that the total error ($\Delta Z$) of Equation 7 is canceled.

In Embodiment 30, in order to provide a resiliency, the resilient portions 559 which are punched-out portions are formed In the first plate spring 548. Alternatively, a resilient body may be disposed in each of the spaces between the first and second extended portions 549 and 550 of the first plate spring 548, and the first and second head supporting tables 546 and 547.

The screws 562 may be provided with a spring so that a pretension is applied between the head supporting tables 546 and 547 and the first plate spring 548.

The configuration of Embodiment 30 includes the screws 562. Another configuration in which no adjusting screw is used may be employed. For example, the head supporting tables 546 and 547 may be adhered and fixed to the first plate spring 548 after the adjusting process. This alternative configuration can achieve the same effects.

In the embodiment, the bearings of the rotary magnetic head device are of the pressure bearing type. Depending upon the size of the rotary magnetic head device and the rotation speed, etc., usual ball bearings may be used while achieving the same effects.

Embodiment 31

Figure 86:
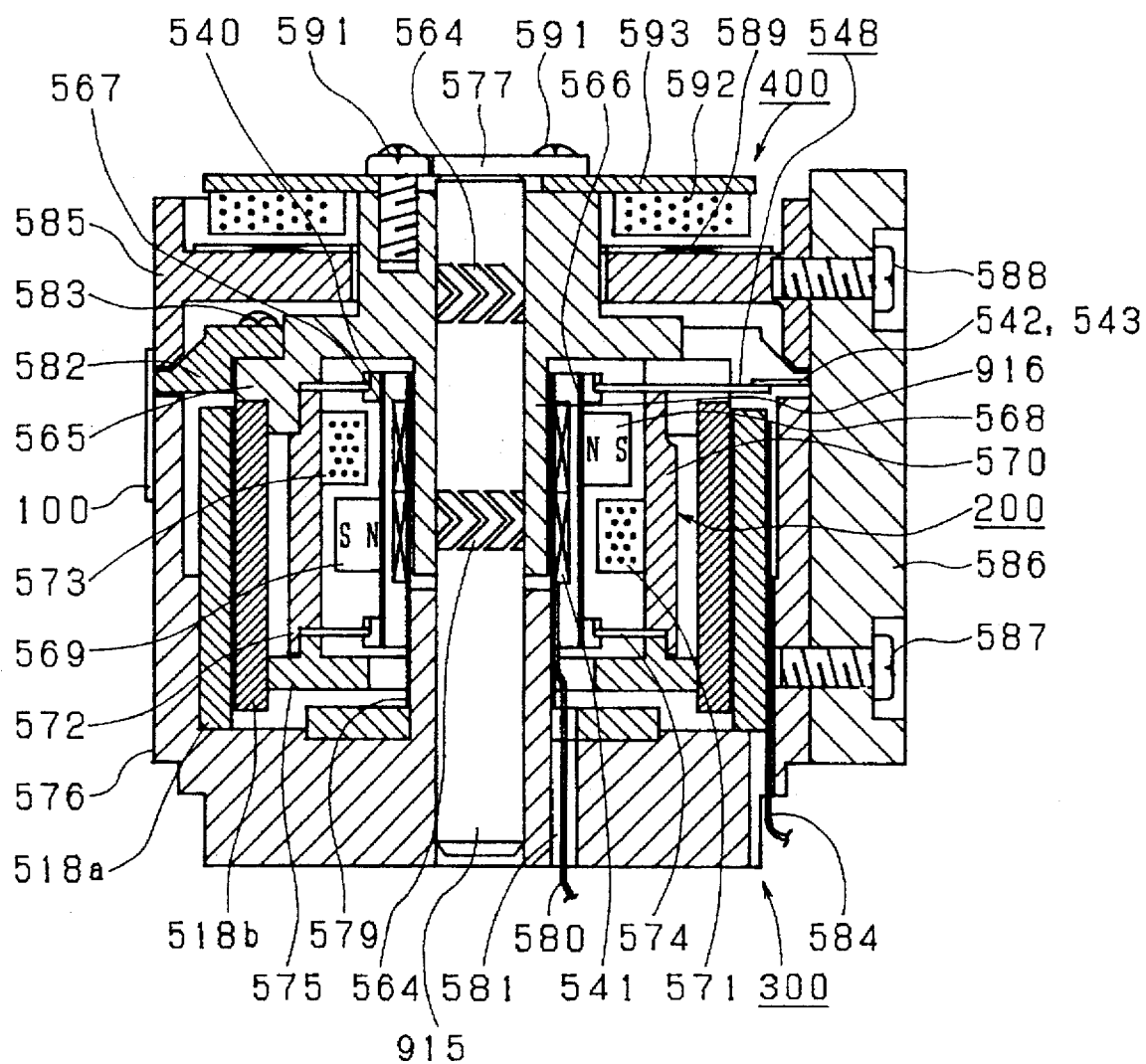
FIG. 86 is a section view of a rotary magnetic head device of Embodiment 31 of the invention.
Figure 87:
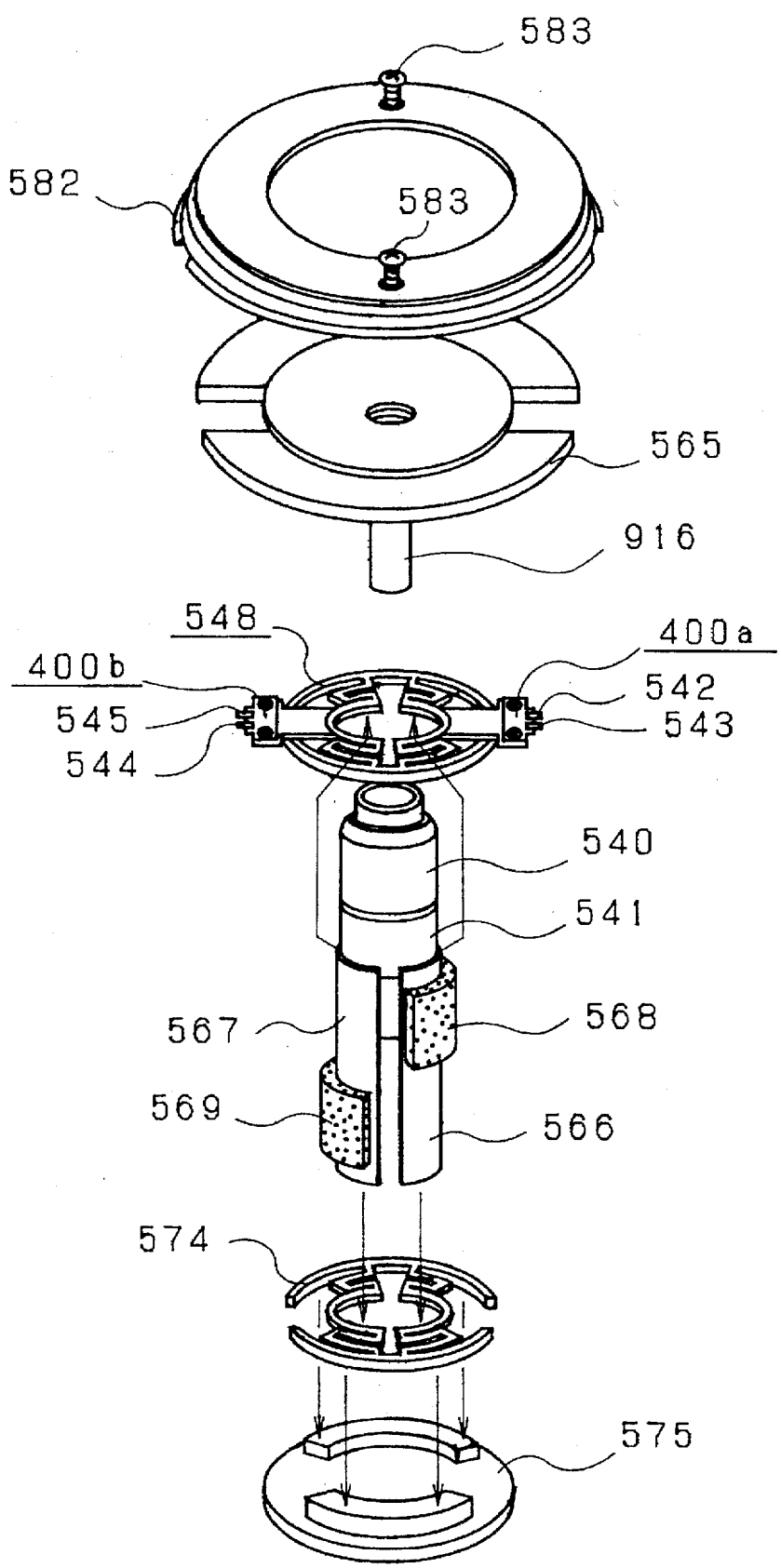
FIG. 87 is an exploded perspective view of the rotary magnetic head device or FIG. 86.

As Embodiment 31, a rotary magnetic head device in which the shaft mechanism of Embodiment 30 is modified will be described. FIG. 86 is a section view of the rotary magnetic head device of Embodiment 31, and FIG. 87 is an exploded perspective of the rotary magnetic head device of FIG. 86. In FIG. 86, 915 is a stationary shaft which is pressingly inserted into the stationary cylinder 576. As shown in FIGS. 86 and 87, the rotary cylinder 565 having a stepped disk-like rotary cylinder 565 is provided with a bearing supporting portion 916 for supporting the pressure bearing 564 so that it is rotatably supported at a given position of the stationary shaft 915. The other configurational points are the same as those of Embodiment 30. Components identical with or corresponding to those of Embodiment 30 are designated with the same reference numerals, and their description is omitted. Also this configuration of the shaft-stationary type can achieve the same effects as Embodiment 30.

The rotary magnetic head device having the first and second stationary cylinders 576 and 585 has been described. The rotary magnetic head device may be modified so that the ring 582 functions as a rotary cylinder to guide the magnetic tape 100, while achieving the same effects.

The rotary cylinder 565 and the ring 582 are formed separately. When they are made of a material which can constitute a magnetic path, they can be formed as one body, achieving the same effects.

Embodiment 32

Figure 88:
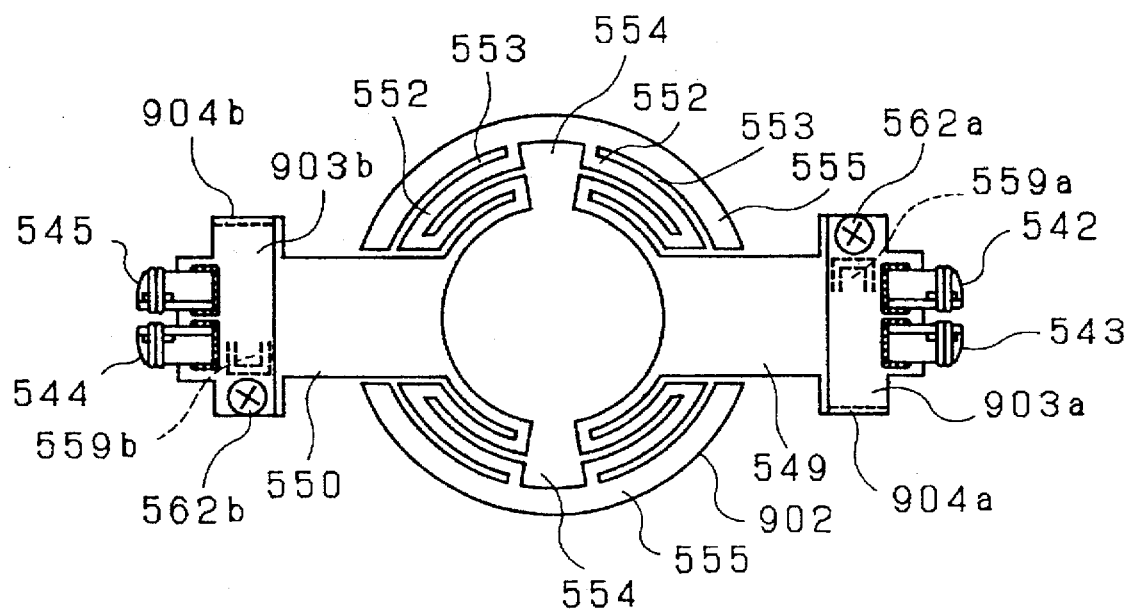
FIG. 88 is a plan view showing a head attaching portion of a rotary magnetic head device of Embodiment 32 of the invention.
Figure 89:
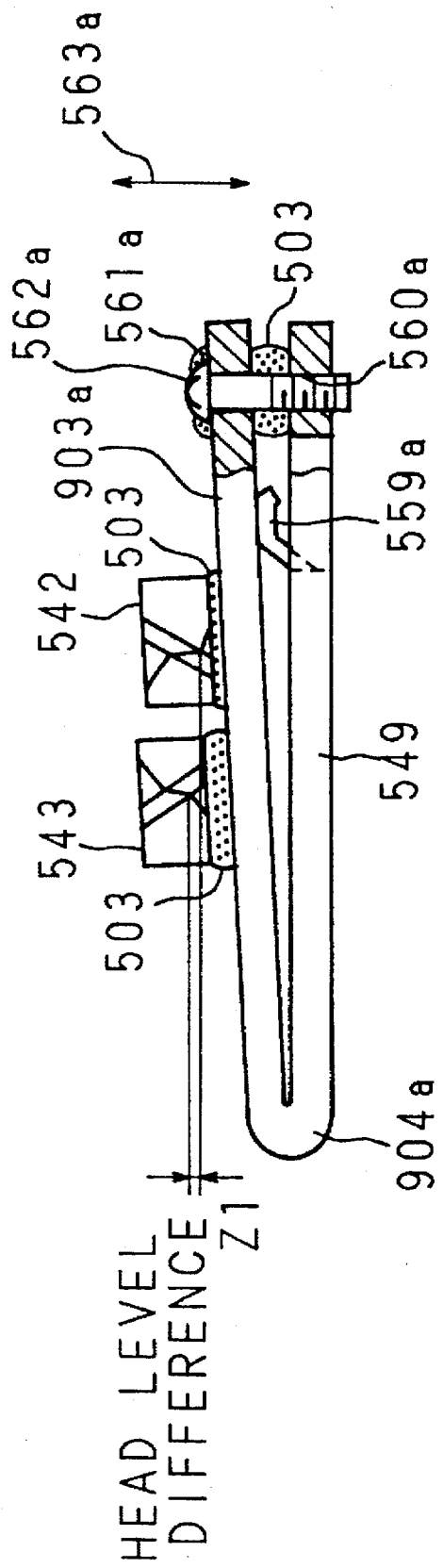
FIG. 89 is a section view showing the main portions as viewed from the head side or FIG. 88.

FIG. 88 is a plan view showing a supporting mechanism used in Embodiment 32 of the invention, and FIG. 89 is a front view showing the main portion as viewed from the front of the heads.

In FIGS. 88 and 89, components identical with or corresponding to those of FIGS. 79 to 85 showing Embodiment 30 are designated with the same reference numerals, and their description is omitted.

In FIG. 88, 902 is a first plate spring, 903a is a first head supporting table which is formed by folding the front end of the first extended portion 549, and 904a is the folding portion which functions also as a rotation fulcrum of the first head supporting table 903a. The first head supporting table 903a is provisionally fixed by the screw 562a, and the first and second magnetic heads A 542 and 543 are then stuck to the first head supporting table 903a so that these heads are located at respective given head positions. Thereafter, a fine adjustment is performed by operating the screw 562a so as to attain the given head level difference while employing the first plate spring 902 as the reference.

In Embodiment 32, the head supporting tables are formed by folding the respective tongues. A configuration in which the head supporting tables are formed by another joining method such as welding can achieve the same effects.

Figure 90:
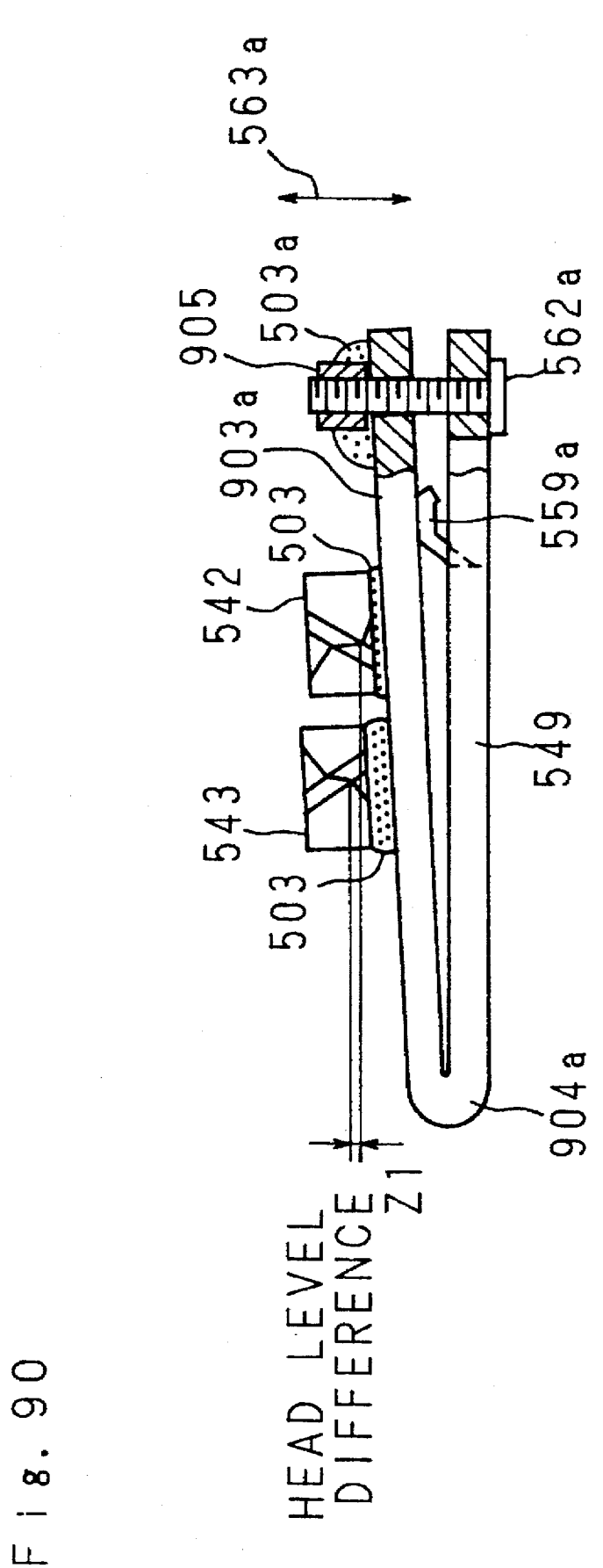
FIG. 90 is a section view showing time main portions as viewed from the head side in another configuration of the head attaching portion in Embodiment 32.

The screws 562 may be operated by fastening nuts 905. This alternative is shown in FIG. 90.

Embodiment 33

Figure 91:
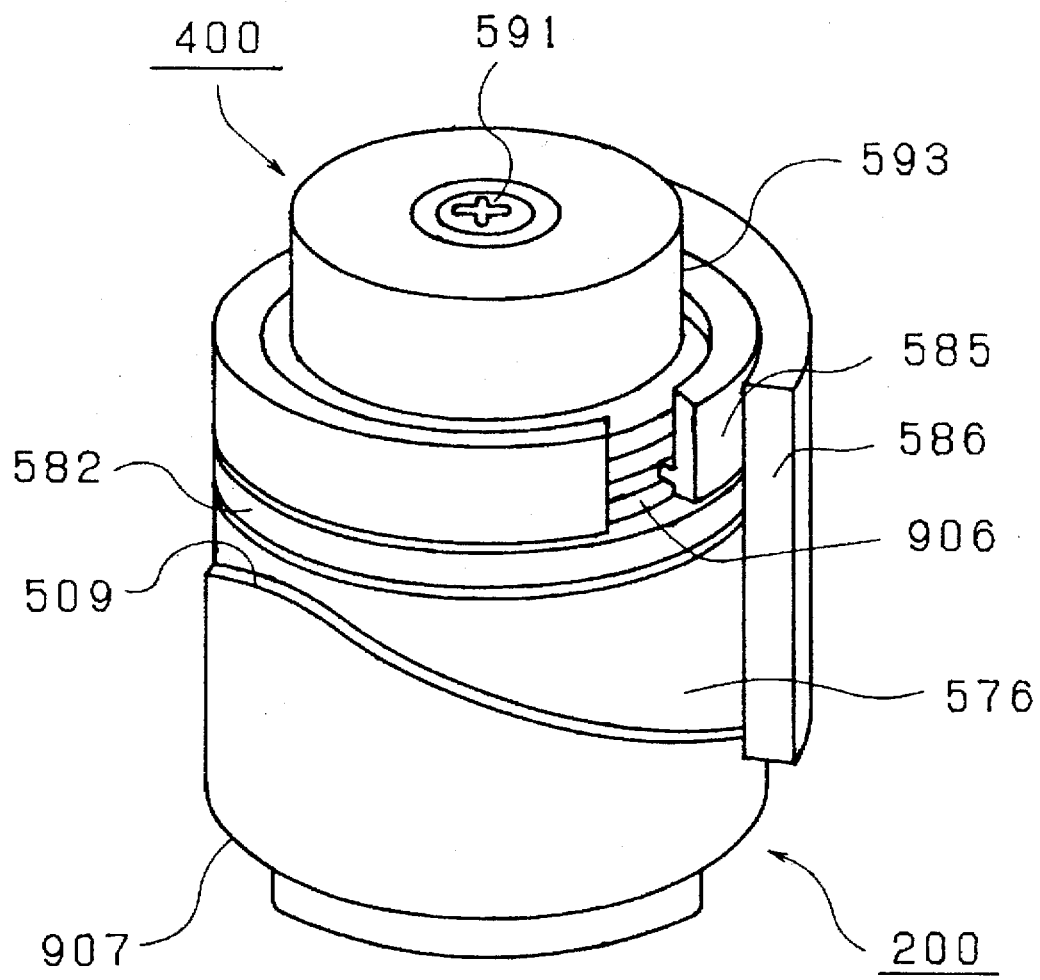
FIG. 91 is a perspective view of a rotary magnetic head device of Embodiment 33 of the invention.

FIG. 91 is a perspective view showing a rotary magnetic head device of Embodiment 33 of the invention. In FIG. 91, components identical with or corresponding to those of FIGS. 79 to 85 showing Embodiment 30 and FIGS. 88 to 90 showing Embodiment 32 are designated with the same reference numerals, and their description is omitted.

In the figure, 906 is a notched portion formed at a location of the outer periphery of the second stationary cylinder 585 of the rotary magnetic head device 300 over which location the magnetic tape 100 does not slide, and 907 is a mounting portion by which the rotary magnetic head device 300 is mounted to a deck chassis (not shown).

In Embodiment 33, the notched portion 906 is formed on the outer face of the second stationary cylinder 585. In place of the notched portion, a notched hole may be formed in such a manner that the outer face remains. In this case, the notched hole may be located at a position over which the magnetic tape 100 slides, whereby achieving the same effects.

The head level difference can be adjusted by the method described in conjunction with Embodiment 30.

Embodiment 34

FIG. 80 is a section view showing the main portions of Embodiment 34 of the invention, as viewed from the front of the heads. The configuration has been described in conjunction with Embodiment 30, and therefore the operation will be described hereinafter.

The first head supporting table 546 is moved in the moving direction 563a by operating the screw 562a, so that the head level difference between the magnetic heads A 542 and 643 is adjusted. The resilient portion 559a which is formed by partly punching the first extended portion 549 is provided in order that, when the head level difference is adjusted by moving the first, head supporting table 546 in the moving direction 563a, a repulsive force with respect to the moving direction 563a is generated between the first extended portion 549 and the first head supporting table 546.

In Embodiment 34, the first extended portion 549 of the first plate spring 548 is provided with the punched-out portion. Alternatively, a resilient body such as rubber, a spring, or the like may be interposed between the first extended portion 549 and the first head supporting table 546. Also this alternative can achieve the same effects.

Embodiment 35

FIG. 80 is a section view showing the main portions of Embodiment 35 of the invention, as viewed from the front of the heads. The configuration has been described in conjunction with Embodiment 30, and therefore the operation will be described hereinafter.

The first head supporting table 546 is moved in the moving direction 563a by operating the screw 562a, so that the head level difference between the magnetic heads A 542 and 543 is adjusted. If the distance between the screw 558a which, when the head level difference is adjusted by moving the first head supporting table 546 in the moving direction 563a, functions as a rotation fulcrum and the intermediate point of the magnetic heads 542 and 543 is indicated by L2, and the distance between the screw 558a and the screw 562a is indicated by L3, the moving distance D of the screw 562a can approximately be expressed by the following expression using the deviation $\Delta Z1$ of the initial level difference Z from the preset head level difference Z1 shown in Equation 8:

$$D = L3/L2 \times \Delta Z1 \tag{8}$$

Therefore, the screw 562a can attain the moving distance D which is L3/L2 times as long as the head level difference adjusting distance $\Delta Z1$, thereby allowing the head level difference to be precisely adjusted. When the embodiment is applied to a rotary magnetic head device corresponding to a narrow track for a digital VTR or the like, the effect is further enhanced. It is obvious that, as the value of L3/L2 is further increased in accordance with the configuration of the head moving mechanism, the adjustment is further facilitated.

Embodiment 36

Figure 92:
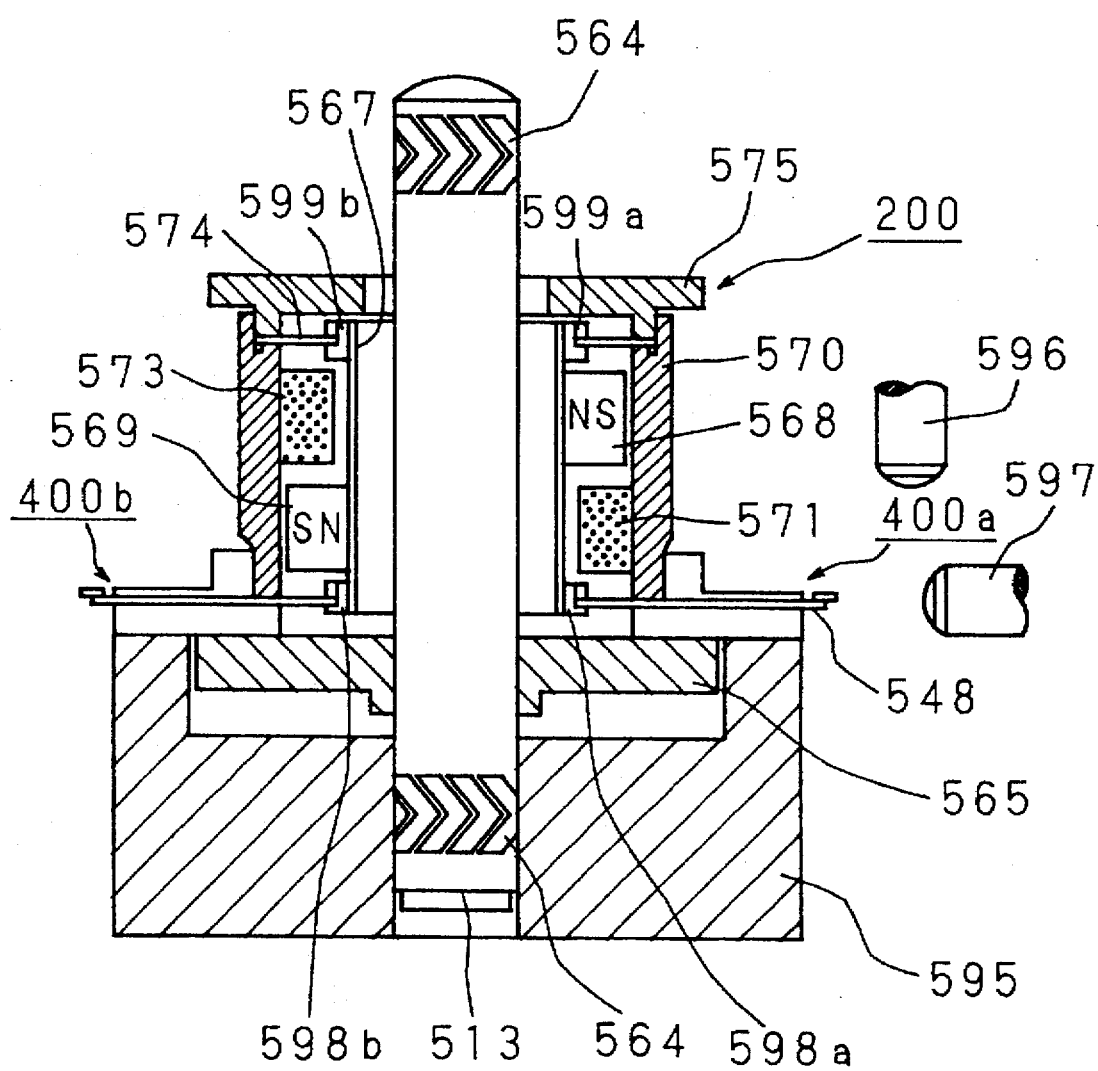
FIG. 92 is a section view showing the head level difference adjustment in the assembling of a rotary magnetic head device of Embodiment 34 of the invention.

FIG. 92 is a section view illustrating the assembly or a head moving device used in Embodiment 36 of the invention. Components identical with or corresponding to those of FIGS. 79 to 85 showing Embodiment 30 are designated with the same reference numerals, and their description is omitted.

In FIG. 92, the head moving device 200 is assembled while employing the rotating shaft 513 held on the holding table 595 as the datum reference, and the first and second head units 400a and 400b shown in FIG. 79 are then respectively attached according to the method described in conjunction with Embodiment 30. Since fragile magnetic heads are attached in the latter half of the assembling process, the magnetic heads can be prevented from being damaged.

Furthermore, since magnetic heads are mounted only on head moving devices 200 which have passed the property evaluation, the yield can be improved.

Although not illustrated, when the head unit is to be attached, at least a holding mechanism for fixing the first plate spring 548, for example a pin for urging the head unit in the direction opposite to that in which the head unit is attached is disposed.

In Embodiments 33 to 36, the shaft mechanism of the rotary magnetic head device is of the rotary type. Alternatively, the shaft mechanism may be of the stationary type.

Embodiment 37

Figure 93:
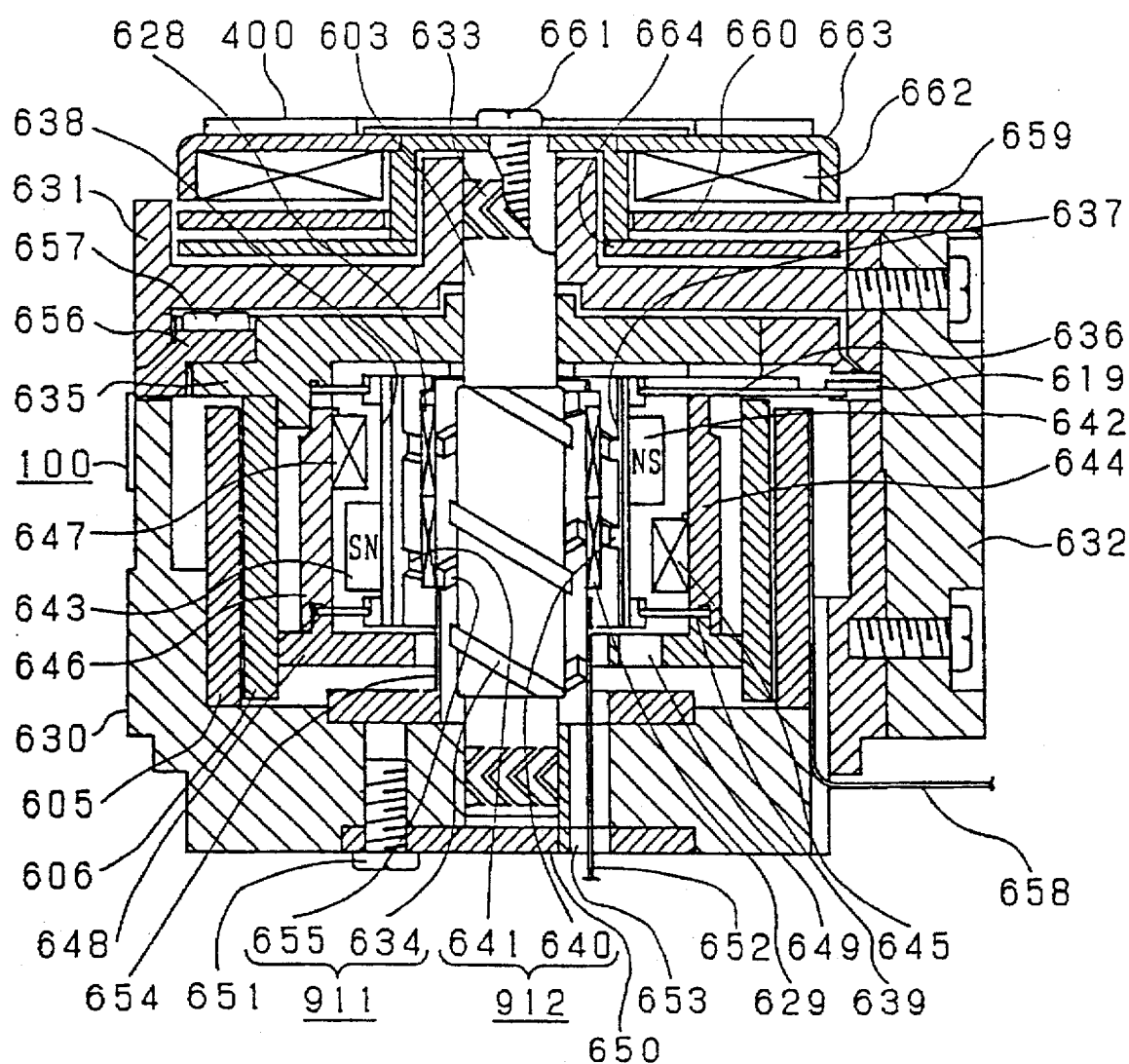
FIG. 93 is a section view of a rotary magnetic head unit of Embodiment 37 of the invention.
Figure 94:
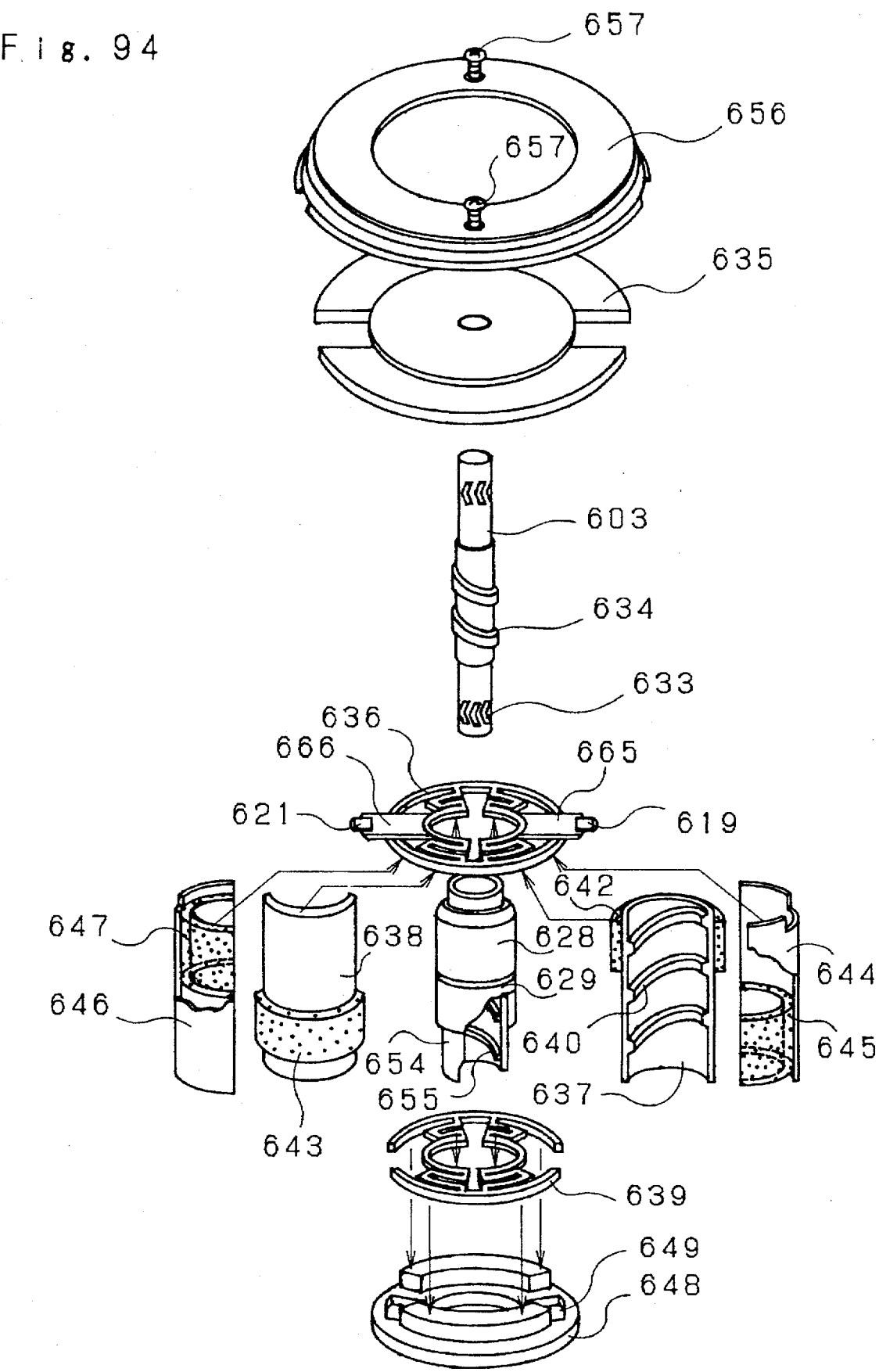
FIG. 94 is an exploded perspective view showing a head moving unit of the rotary magnetic head device of Embodiment 37 shown in FIG. 93.

FIG. 93 is a section view showing a rotary magnetic head device of Embodiment 37 of the invention, and FIG. 94 is an exploded perspective view illustrating the configuration of a head moving mechanism. Components identical with or corresponding to those of FIGS. 11 and 12 are designated with the same reference numerals, and their description is omitted.

In the figures, 630 is a first stationary cylinder which corresponds to the stationary cylinder 601 of FIG. 11, and 631 is a secondary stationary cylinder which is fixed to the first stationary cylinder 630 by a supporting block 632. The magnetic tape 100 is slidingly guided on the outer faces of the first and second stationary cylinders 630 and 631.

The reference numeral 633 is a pressure bearing which corresponds to the bearing 602 of FIG. 11 and in which spiral grooves are formed on the rotating shaft 603. The rotating shaft 603 is supported through the pressure bearing 633 by the first and second stationary cylinders 630 and 631.

The reference numeral 634 is a spiral rib A which is formed at a given position of the outer periphery of the rotating shaft 603, 635 is a rotary cylinder having a stepped disk-like flange which is attached to a given position of the rotating shaft 603 so as to be integral therewith, and 636 is a first annular plate spring having an outer periphery which is positioned by the rotary cylinder 635. A first magnetic head 619 is attached to one end of the first plate spring 636, and a second magnetic head 621 is attached to the other end of the first plate spring 636. The reference numeral 637 is a semicylindrical holder A attached to an inner periphery portion of the first plate spring 636 to which the first magnetic head 619 is attached at one end of the outer periphery portion. The reference numeral 638 is a semicylindrical holder B which is disposed at the axially symmetrical position about the rotating shaft 603 with respect to the holder A 637. The holder B 638 is attached to an inner periphery portion of the first plate spring 636 to which the second magnetic head 621 is attached at one end of the outer periphery portion. The reference numeral 639 is a second annular plate spring to which the holder A 637 is attached at one inner periphery portion and the holder B 638 is attached at another inner periphery portion.

The reference numeral 640 is a spiral rib B which is formed on the inner face of the holder A 637 so as to be parallel with the rib A 634 in the circumferential direction, and 641 is a spiral rib C which is formed on the inner race of the holder B 638 so as to be parallel with the rib B 640 in the circumferential direction. The rib B 640 and the rib C 641 constitute a second air-guide mechanism 912.

The reference numeral 642 is a first sectorial magnet C which is attached to an outer periphery portion of the holder A 637 and corresponds to the first magnet A 614 of FIG. 11, and 643 is a sectorial second magnet C which corresponds to the second magnet B 617 of FIG. 11. The reference numeral 644 is a first semicylindrical yoke which cooperates at one end with the rotary cylinder 635 to sandwich and fix an outer periphery portion of the first plate spring 636. The reference numeral 645 is a first balancer which is attached to the inner periphery side of the first yoke 644 so as to oppose the second magnet C 643 by an angle of 180 deg., and 646 is a second semicylindrical yoke which opposes the first yoke 644 and cooperates with the rotary cylinder 635 to sandwich an outer periphery portion of the first plate spring 636. The reference numeral 647 is a second balancer which is attached to the second yoke 646 so as to oppose the first magnet C 642 by an angle of 180 deg., 648 is a third ring-like yoke which is attached at an outer periphery portion to the inner periphery of a secondary core 606 of the rotary transformer, and which cooperates with the first and second yokes 644 and 646 to sandwich and fix an outer periphery portion of the second plate spring 639, and 649 is a first through hole formed in the third yoke 648.

The reference numeral 650 is a thrust bearing stand which is fixed by a first screw 651 to the first stationary cylinder 630 so as to support an end face of the rotating shaft 603, and 652 designates lead wires of the first and second coils 628 and 629 which are led out via a second through hole 653 formed in the thrust bearing stand 650. The reference numeral 654 is a hollow cylindrical bobbin which is fixed at one end to the first stationary cylinder 630 and coaxial with the rotating shaft 603. The bobbin 654 performs the positioning of the first coil 628 so that it opposes the first magnet C 642 and the second balancer 647 in the radial direction, and the positioning of the second coil 629 so that it opposes the second magnet C 643 and the first balancer 645 in the radial direction. The reference numeral 655 is a rib D which is disposed inside the bobbin 654 and forms a spiral elongating in the circumferential direction and opposite to the rib A 634. The rib D 655 and the rib A 634 constitute a first air-guide mechanism 911.

The reference numeral 656 is a ring which is fastened by second screws 657 to an outer periphery portion of the rotary cylinder 635 and is adjusted so as to be deviated by a given accuracy with respect to the rotating shaft 603. The outer face of the ring 658 slidingly contacts with the magnetic tape 100. The reference numeral 658 designates lead wires of a primary rotary transformer 605 disposed in the first stationary cylinder 630, and 400 is a driving motor. The driving motor 400 consists of a coil base plate 680 having one end which is fixed by a third screw 659 to the supporting block 632, a driving magnet 662 which is fixed by a fourth screw 661 to the end face of the rotating shaft 603 so as to be integral therewith, a yoke 663 to which the driving magnet 662 is attached, and a back yoke 664 for reducing the eddy-current loss.

Figure 95:
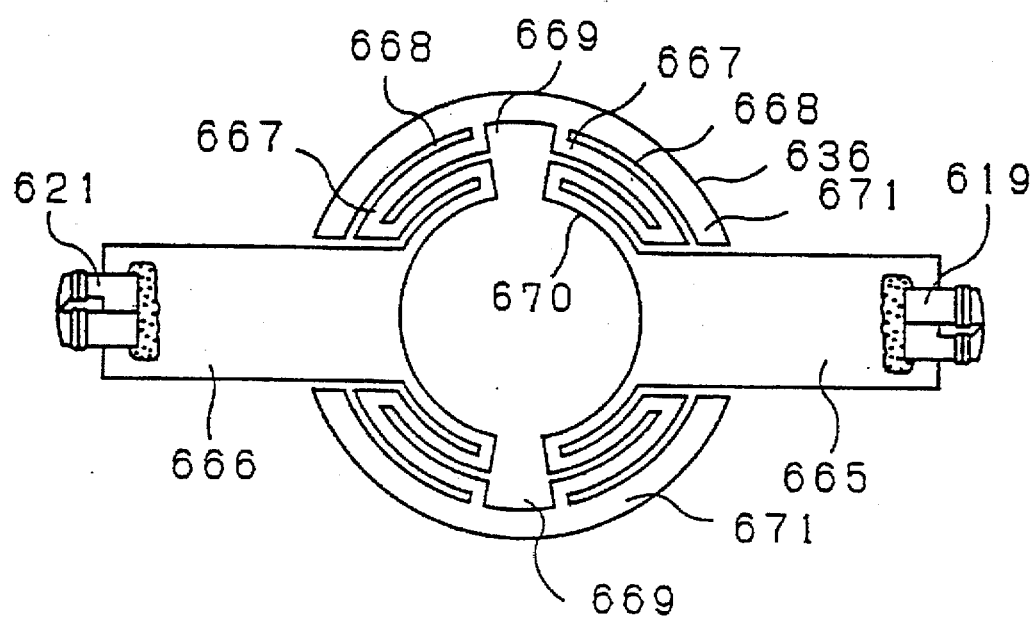
FIG. 95 is a plan view of a plate spring on which magnetic heads are mounted and which is used in the rotary magnetic head device of Embodiment 37.

The shape of the first plate spring 636 to which the first and second magnetic heads 619 and 621 are attached will be described with reference to FIG. 95 which is a plan view of the first plate spring 636. In the figure, 665 and 666 are tongues formed in the first plate spring 636, 667 designates arms, 668 designates cut-away portions which are formed in narrow intervals in order to make the arms 667 longer, 669 designates two cut-away portions which are formed in order to enable the first and second magnetic heads 619 and 621 to operate independently from each other, 670 is an inner periphery portion, and 671 is an outer periphery portion which is to be fixedly supported.

Next, the operation of the embodiment will be described.

Principally, the embodiment is of the electromagnetic drive type and operates in the same manner as the prior art example. Regarding the first magnetic head 619, when a driving current is supplied to the first coil 628 intersecting with the magnetic field in the magnetic circuit, formed by the first magnet C 642, a driving force is generated in the axial direction of the rotating shaft 603. This driving force causes the holder A 637 which is a movable portion and to which the first magnet C 642 is attached, to move in axial direction. Since the magnetic head 619 is disposed the front end of the tongue 665 formed in the first plate spring 636 which moves together with the holder A 637, magnetic head 619 moves in the axial direction of the rotating shaft 603.

in contrast, the driving force of the first coil 628 does not affect the holder B 638 which is independent from the holder A 637. Regarding the second magnetic head 621, when a driving current is supplied to the second coil 629 intersecting with the magnetic field in the magnetic circuit formed by the second magnet C 643, a driving force is generated in the axial direction of the rotating shaft 603. This driving force causes the holder B 638 which is a movable portion and to which the second magnet C 643 is attached, to move in the axial direction. Since the second magnetic head 621 is disposed at the front end of the tongue 666 formed in the first plate spring 636 which moves together with the holder B 638, the magnetic head 621 moves in the axial direction of the rotating shaft 603.

Figure 96:
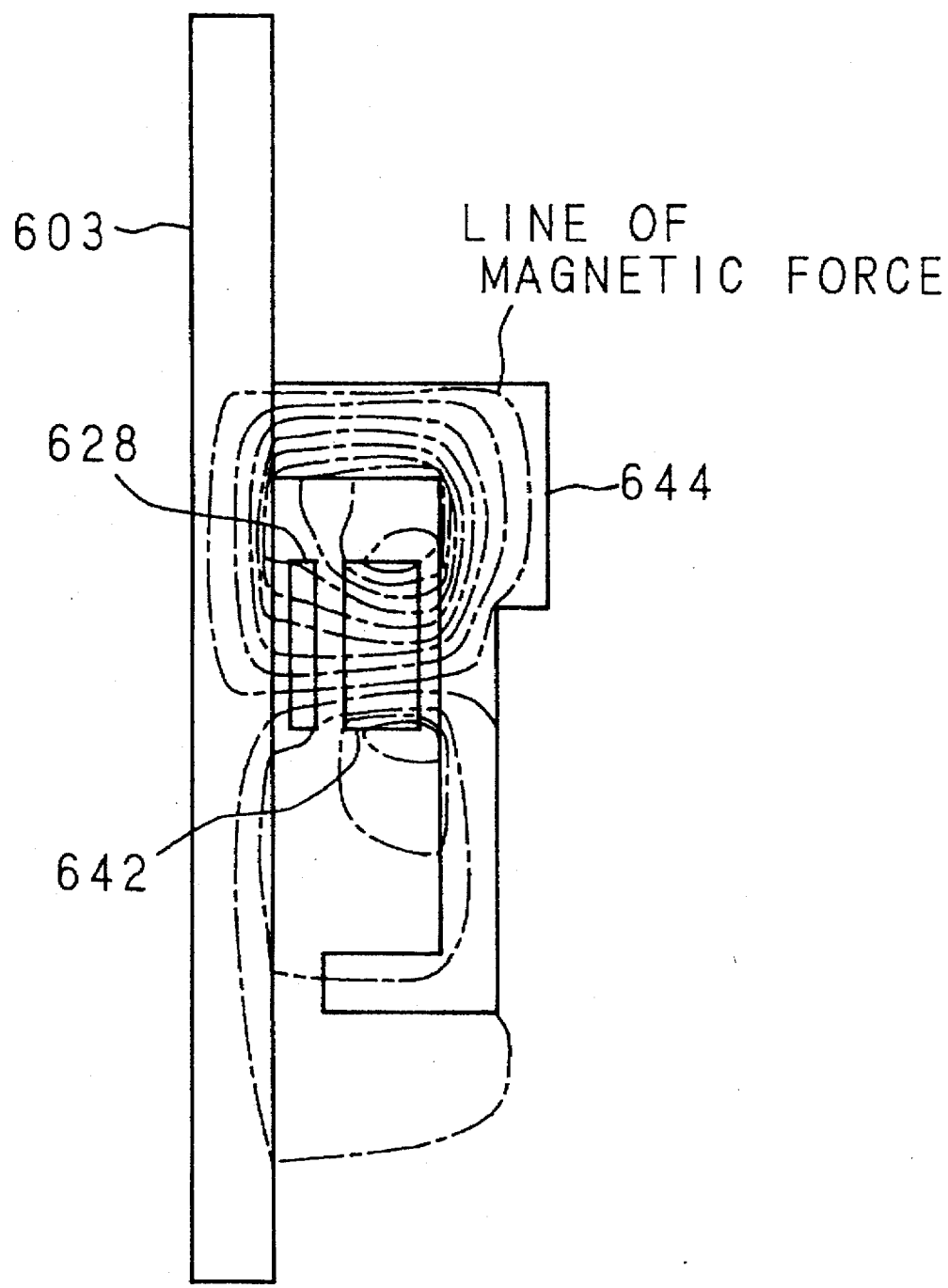
FIG. 96 shows an example of a magnetic circuit in the rotary magnetic head device or Embodiment 37 which has been analyzed according to the finite element method.

FIG. 96 shows an example of a magnetic circuit in the above configuration which has been analyzed according to the finite element method.

In the figure, shown is a magnetic circuit which is formed by the first magnet C 642, the first yoke 644, the rotary cylinder 632, the rotating shaft 603, and the first coil 628. In the magnetic field in the first coil 628 which is disposed in the space between the rotating shaft 603 and the first magnet C 642, lines of magnetic force are substantially parallel with each other. Therefore, it can be anticipated that stable magnetic properties are obtained even when the first magnet C 642 moves in the axial direction.

A manner of accelerating the heat radiation by forced convention in driving coils of a head moving device mounted in such a rotary magnetic head device will be described with reference to FIGS. 97 and 98.

Figure 97A:
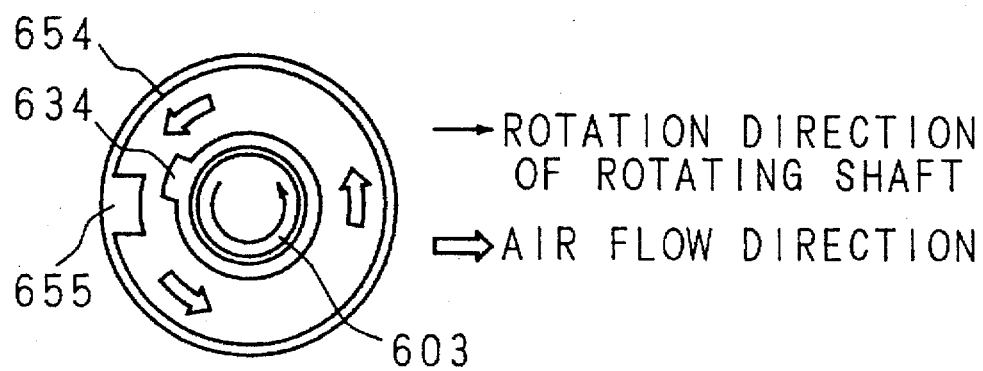
FIGS. 97(a), (b) and (c) are diagrams illustrating a mechanism for generating an air flow with the rotation of the rotating shaft in Embodiment 37, a mechanism for guiding air by a rib formed on the rotating shaft, and a mechanism for guiding air by a rib formed on the inner face of a bobbin.
Figure 97B:
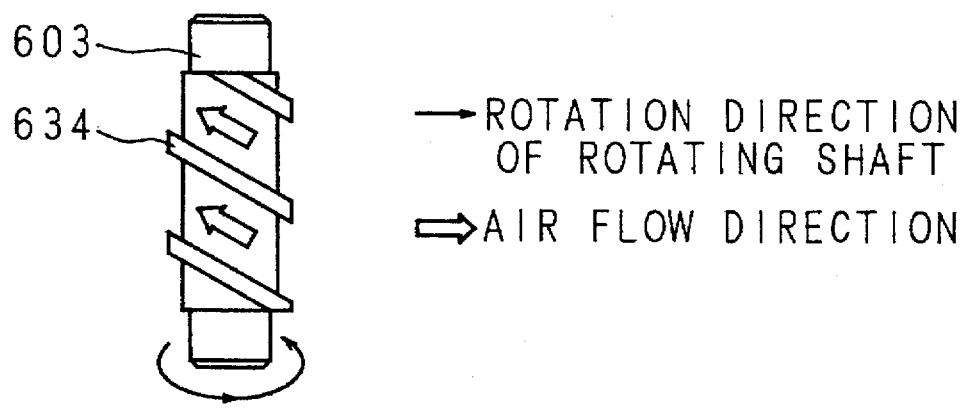
Figure 97C:
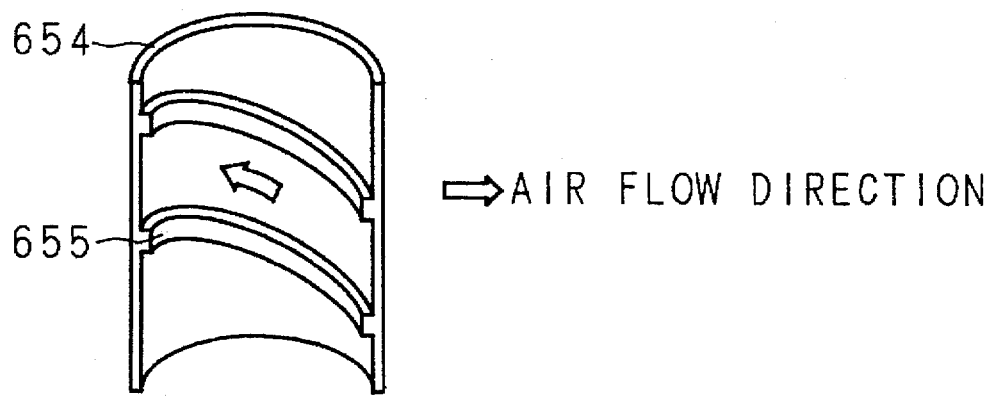

FIG. 97 illustrates the first air-guide mechanism 911 which produces an air flow for accelerating the heat radiation by forced convention in the above rotary magnetic head device. FIG. 97(a) is a section view along a plane perpendicular to the rotating shaft 603, FIG. 97(b) is a view illustrating an air flow in the vicinity of the rotating shaft 603, and FIG. 97(c) is a view illustrating an air flow on the inner face of the bobbin 654.

As shown in FIG. 97(a), in the space between the rotating shaft 603 and the bobbin 654, the high speed rotation of the rotating shaft 603 and the spiral rib A 634 formed on the rotating shaft 603 causes an air flow to be generated in the direction along the rotation direction of the rotating shaft 603. However, the velocity of the air flow is lower than that of the surface and rib A 634 of the rotating shaft 603 which rotates at a high speed. When viewed from the surface and rib A 634 of the rotating shaft 603, therefore, the air flow moves in the direction opposite to the rotation direction of the rotating shaft 603. As shown in FIG. 97(b), this air flow is upwardly guided along the rotating shaft 603 by the spiral rib A 634.

On the other hand, the bobbin 654 does not rotate. Therefore, the air flow which is generated in the space between the rotating shaft 603 and the bobbin 654 and flows in the direction along the rotation direction of the rotating shaft 603 is upwardly guided along the rotating shaft 603 by the rib D 655 that is disposed on the inner face of the bobbin 654 and forms a spiral elongating in the direction opposite to the rib A 634 formed on the rotating shaft 603.

In this way, air flows into the space between the rotating shaft 603 and the bobbin 654 via the first and second through holes 649 and 653, etc., and flows upwardly in the space.

Similarly, in the second air-guide mechanism 912 constituted by the rib B 640 and rib C 641 respectively formed on the inner faces of the holder A 637 and holder B 638 which rotate together with the rotating shaft 603, an air flow is generated as a result of the same action, and therefore air flows upwardly in the space between the holder A 637 and holder B 638 and the coils 628 and 629.

Figure 98:
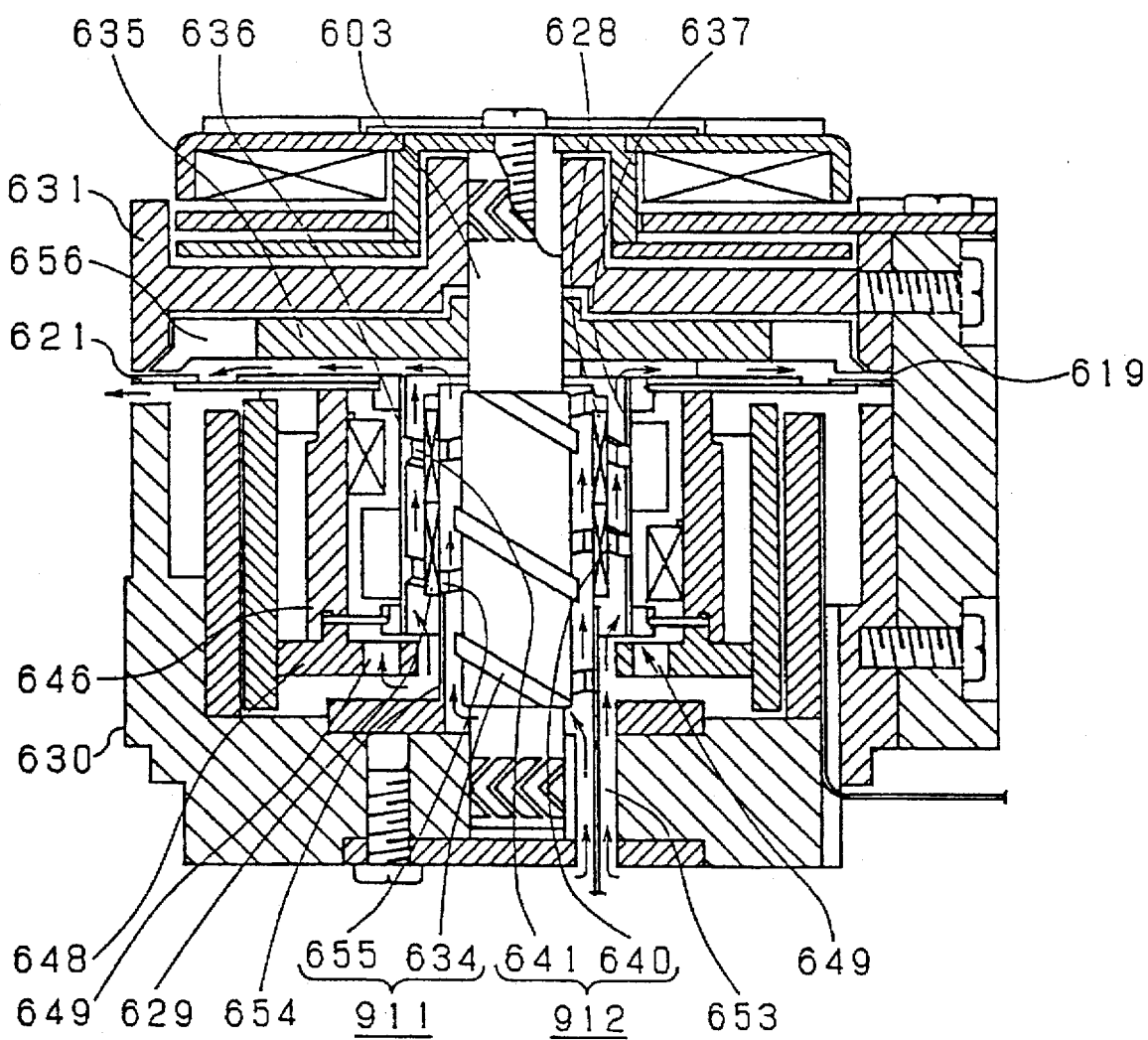
FIG. 98 is a view illustrating paths of air flows which are guided into the rotary magnetic head device of Embodiment 37.

FIG. 98 is a view illustrating paths of air flows which are guided for accelerating the heat radiation of the driving coils of the head moving device in the rotary magnetic head device. In the figure, the paths and directions of are flows are indicated by arrows.

As shown in FIG. 98, air is introduced from the second through hole 653 formed in the first stationary cylinder 630 into the rotary magnetic head device. A portion of the air introduced from the second through hole 653 is guided into the space between the rotating shaft 603 and the bobbin 654, and is sent along the inner faces of the first and second coils 628 and 629 toward the ring 656 by the rib A 634 and rib D 655. Another portion of the air introduced from the second through hole 653 enters the first through hole 649 formed in the third yoke 648, and the space between the third yoke 648 and the bobbin 654, and then guided into the space between the inner faces of the holder A 637 and holder B 638 and the outer face of the bobbin 654 to be sent along the outer faces of the first and second coils 628 and 629 toward the rotary cylinder 635 by the rib B 640 and rib D 641.

The air cools both the inner and outer faces of each of the first and second coils 628 and 629, and then is sent toward the rotary cylinder 635. Thereafter, the air is guided toward the outer periphery from the spaces between the ring 656 and time first and second yokes 644 and 646, and discharged outside the rotary magnetic head device from the spaces between the ring 656 and the first and second stationary cylinders 630 and 631. In this way, the first and second coils 628 and 629 are prevented from being overheated.

Figure 99:
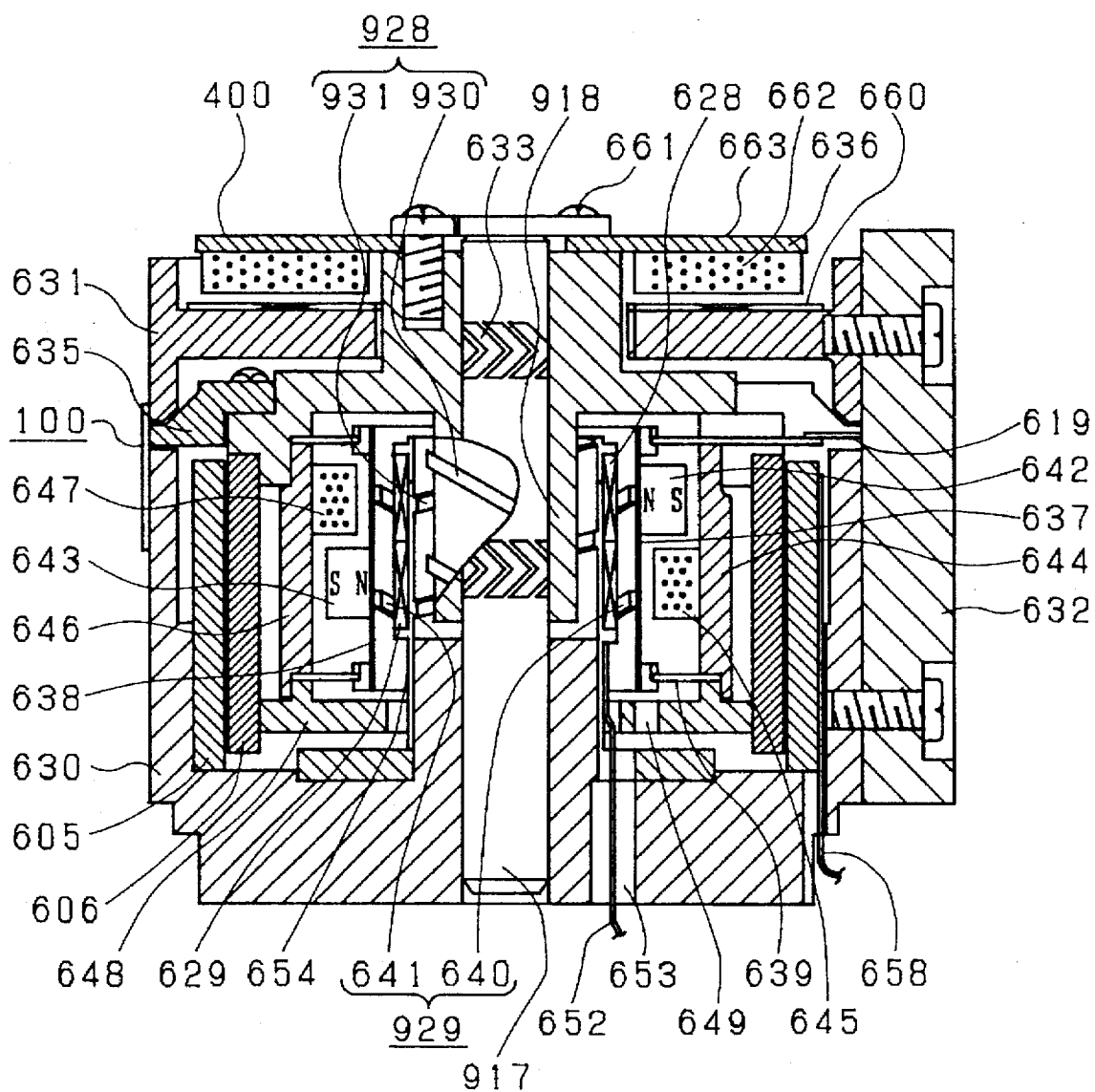
FIG. 99 is a section view of a rotary magnetic head device of Embodiment 38 of the invention.

As Embodiment 38, a rotary magnetic head device in which the shaft mechanism of Embodiment 37 is modified will be described. FIG. 99 is a section view of the rotary magnetic head device of Embodiment 38. In the figure, 917 is a stationary shaft which is pressingly inserted into the stationary cylinder 630. A rotary cylinder 635 having a stepped disk-like flange is provided with a bearing supporting portion 918 for supporting the pressure bearing 633 so that it is rotatably supported at a given position of the stationary shaft 917. In Embodiment 37, the spiral rib A 634 is formed on the outer periphery of the rotating shaft 603. By contrast, in the embodiment, a spiral rib A 930 is formed on a given position of the outer periphery or the bearing supporting portion 918. In the same manner as Embodiment 37, a spiral rib D 931 is formed on the inner face of the bobbin 654, and a first air-guide mechanism 928 is constituted in the space between the stationary shaft 917 and the bobbin 654 by the rib A 930 and rid D 931. The spiral rib B 640 formed on the inner face of the holder A 637, and the spiral rib C 641 formed on the inner face of the holder B 638 constitute a second air-guide mechanism 929. The other configurational points are the same as those of Embodiment 37. Therefore, components identical with or corresponding to those of Embodiment 37 are designated with the same reference numerals, and their description is omitted. Also in this configuration of the stationary shaft type, the same effects as those of Embodiment 37 can be achieved.

Embodiment 39

Figure 100:
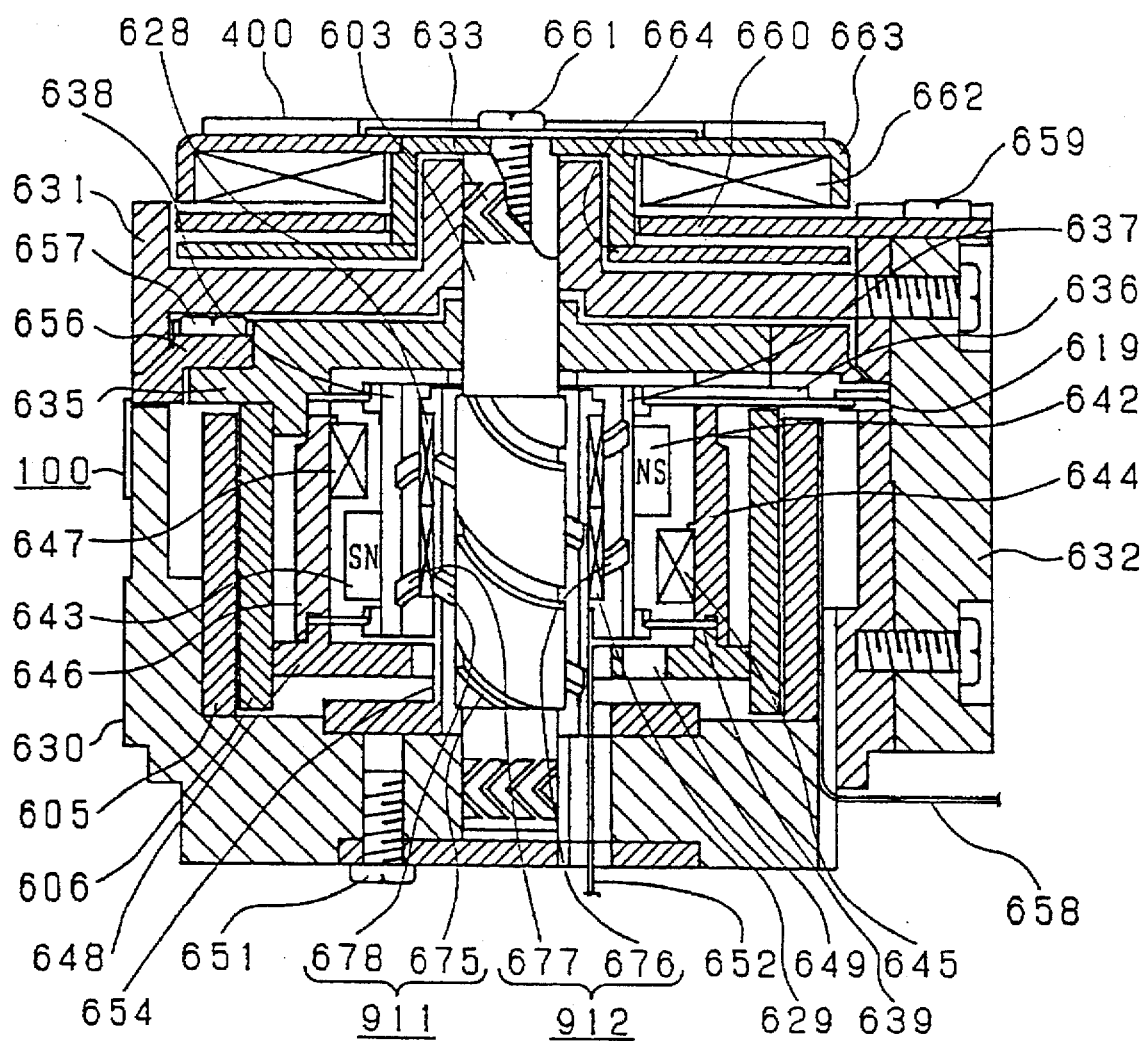
FIG. 100 is a section view of a rotary magnetic head device of Embodiment 39 of the invention.

FIG. 100 shows Embodiment 39 of the invention. In the figure, 675 is a spiral groove A which is formed at a given position of the outer periphery of the rotating shaft 603, 676 is a spiral groove B which is formed on the inner face of the holder A 637 so as to be parallel with the groove A 675 in the circumferential direction, 677 is a spiral groove C which is formed on the inner face of the holder B 638, and 678 is a groove D which is disposed inside the bobbin 654 and forms a spiral elongating in the circumferential direction and opposite to the groove A 675.

In Embodiment 37, the first air-guide mechanism 911 is constituted by the rib A 634 and rib D 651, and the second air-guide mechanism 912 is constituted by the rib B 640 and rib C 641. By contrast, in Embodiment 39, the first air-guide mechanism 911 is constituted in the space between the rotating shaft 603 and the bobbin 654 by the groove A 675 and the groove D 678, and the second air-guide mechanism 912 is constituted in the space between the holders A, B 637, 638 and the bobbin 654 by the groove B 676 and the groove C 677. This configuration is expected to achieve the same effects.

In Embodiment 39, the shaft mechanism of the rotary magnetic head device is of the rotary type. Alternatively, the shaft mechanism may be of the stationary type.

Embodiment 40

Embodiment 40 of the invention will be described with reference to FIGS. 101 to 114.

Figure 101:
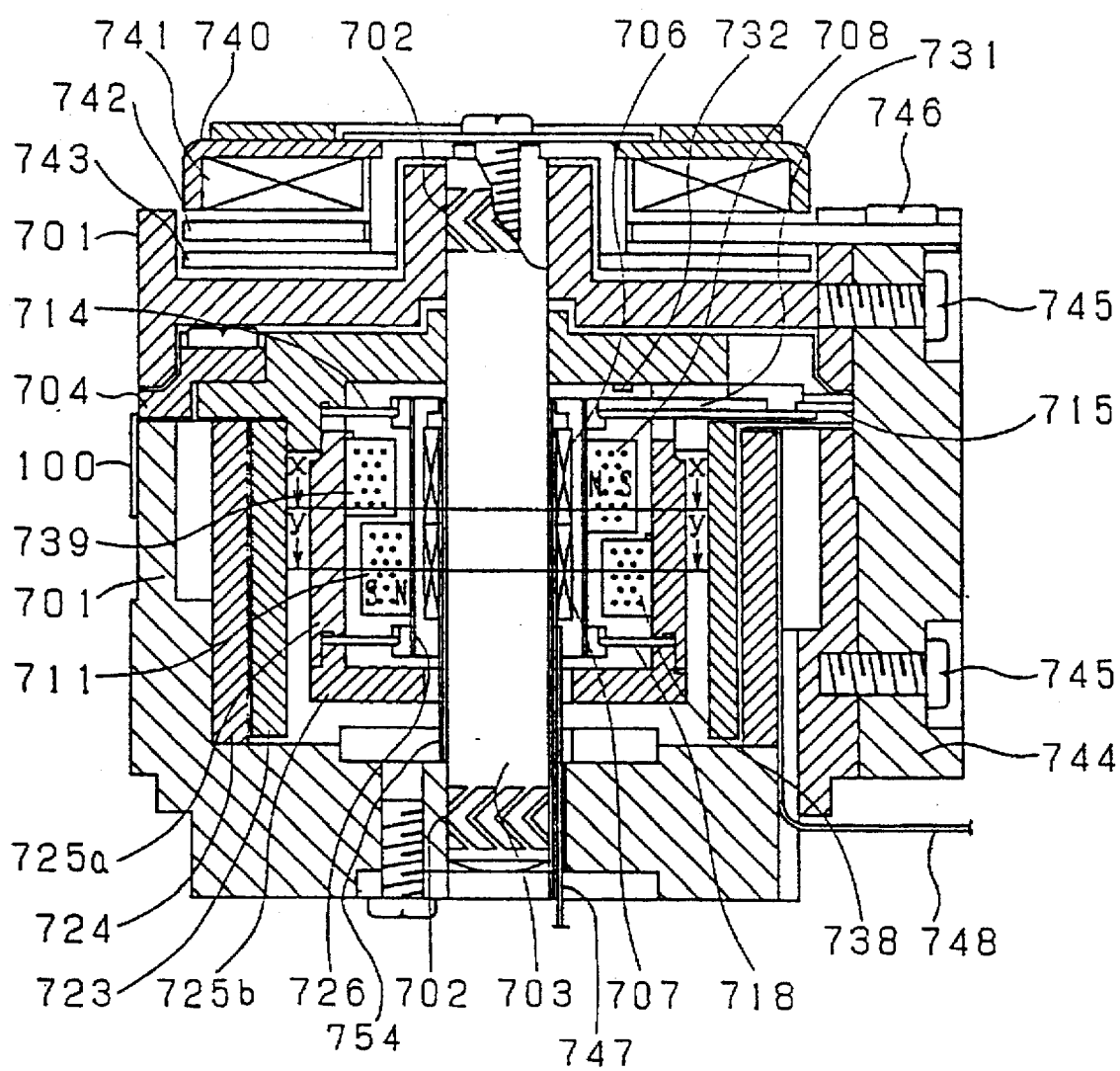
FIG. 101 is a longitudinal section view of a rotary magnetic head device of Embodiment 40 of the invention.

FIG. 101 is a longitudinal cross section view of a rotary magnetic head device of Embodiment 40. Components identical with or corresponding to those of FIG. 11 are designated with the same reference numerals. A stationary cylinder 701 is divided into two portions, or upper and lower portions, and the two portions are made integral with each other by a stationary cylinder holder 744. A spiral bearing portion 702 is formed on an outer periphery portion of a rotating shaft 703. The reference numeral 754 is a hollow cylindrical bobbin which is coaxial with the rotating shaft 703 having one end fixed to the stationary cylinder 701. The reference numeral 704 is a rotary cylinder fixedly attached to the rotating shaft 703, and 725a and 725b are stationary bodies fixed to the rotary cylinder 704. An upper plate spring 714 is pressingly contacted with and fixed between the rotary cylinder 704 and the stationary body 725a, and a lower plate spring 718 is pressingly contacted with and fixed between the stationary bodies 725a and 725b. The stationary bodies 725a and 725b are integral with each other so as to constitute a stationary body 725 and form a magnetic path as described below.

Figure 102:
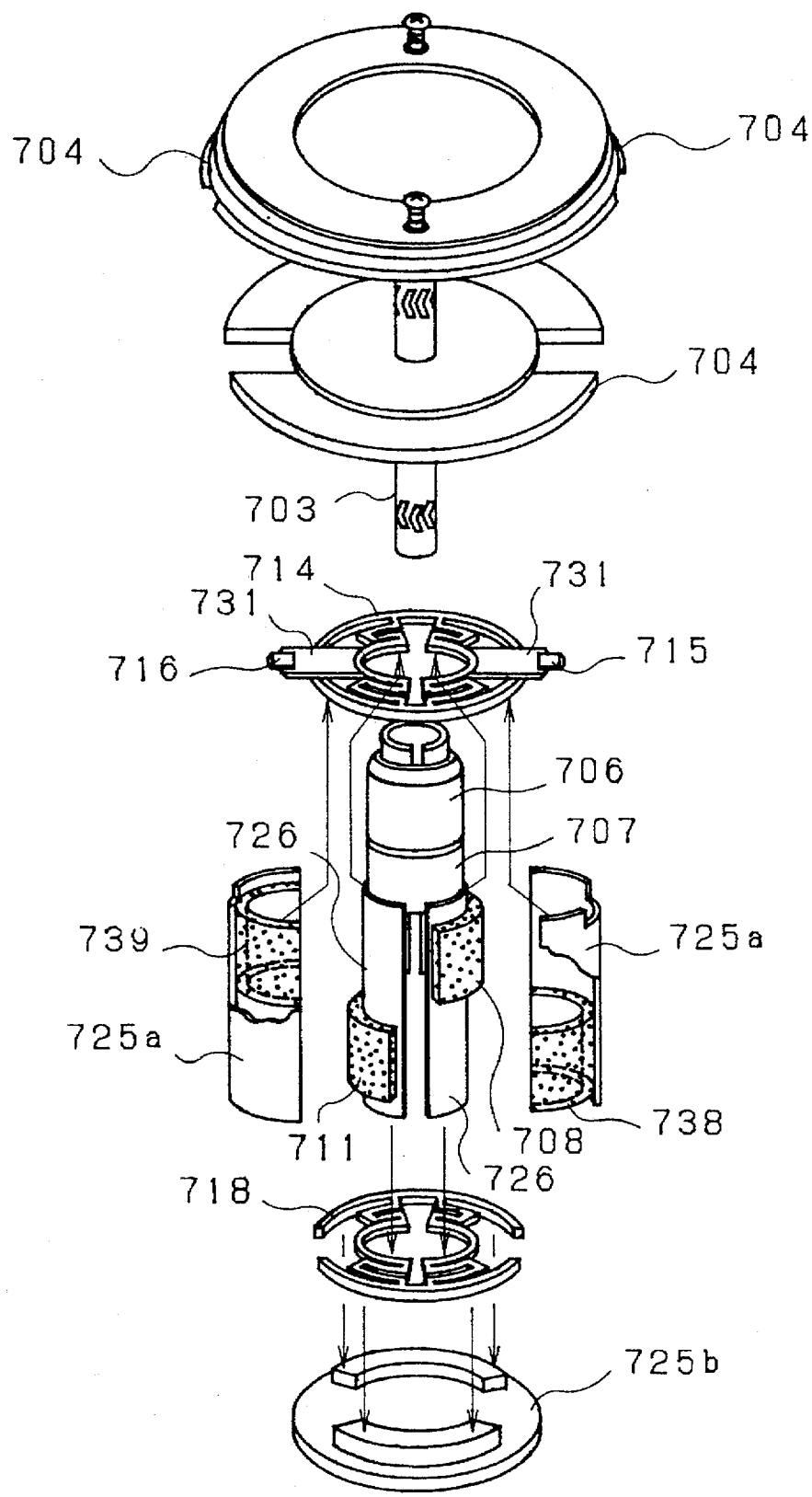
FIG. 102 is an exploded perspective view of a rotary member used in Embodiment 40.

FIG. 102 is an exploded perspective view of the configuration of FIG. 101 which is partly fragmented.

In the figure, the portions constituting the stationary cylinder 701 and a motor disposed above the rotating shaft 703 are not shown.

Figure 103:
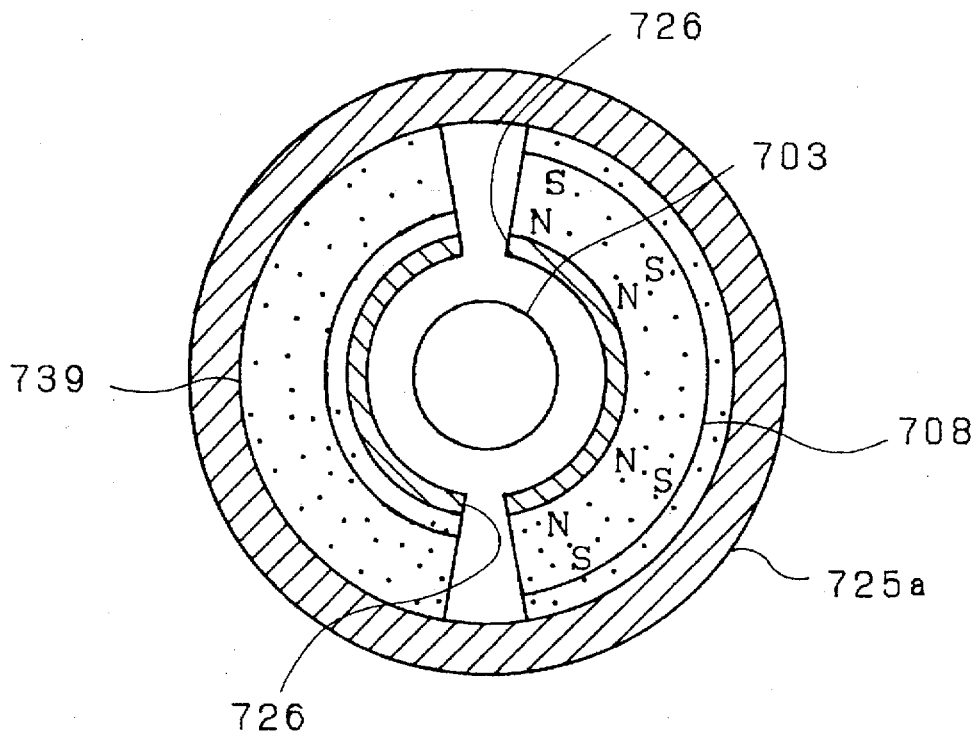
FIG. 103 is a cross section view of an upper magnet A used in Embodiment 40.
Figure 104:
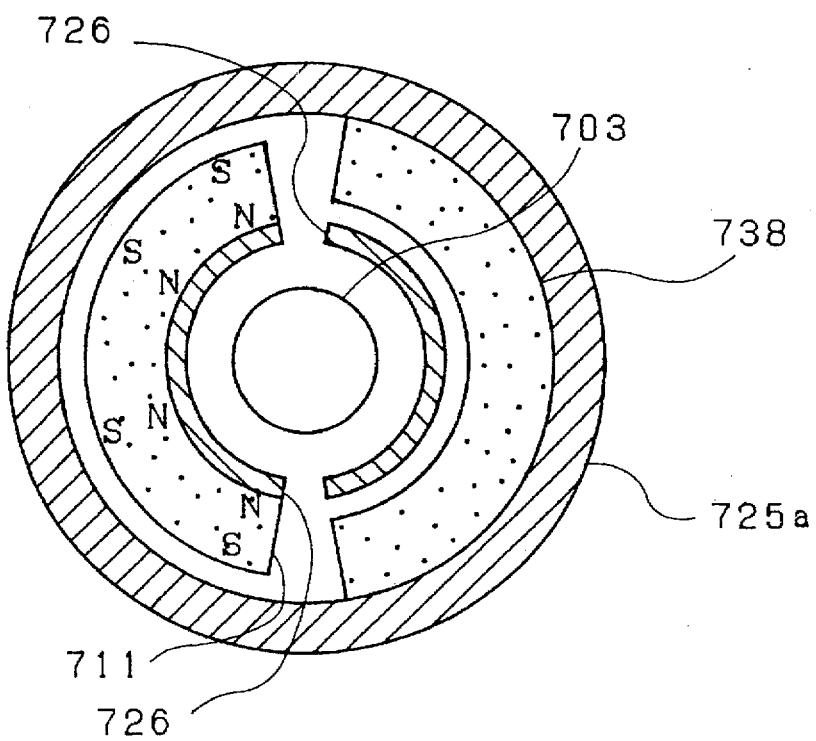
FIG. 104 is a cross section view of a lower magnet B used in Embodiment 40.

FIG. 103 is a cross section view taken along line X—X of FIG. 10, and FIG. 104 is a cross section view taken along line Y—Y of FIG. 101. These figures show the following components as viewed from the top: the rotating shaft 703, an upper magnet A 708, a lower magnet B 711, a lower member 738, an upper member 739, a holder 726, and the rotating shaft 703.

Figure 106:
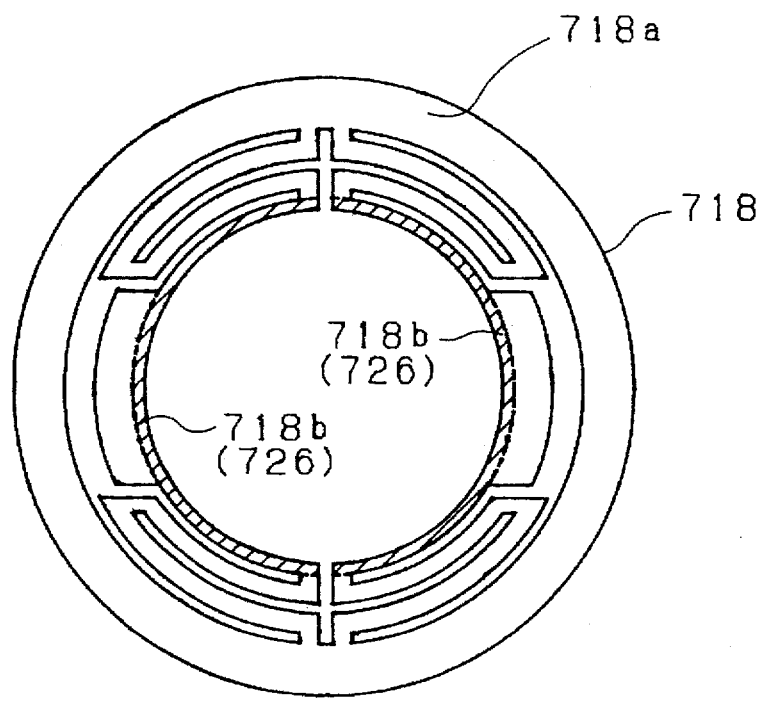
FIG. 106 is a plan view of a lower plate spring used in Embodiment 40.

FIG. 105 is a plan view showing the upper plate spring 714 shown in FIG. 101 and components attached thereto, and FIG. 106 a plan view showing the lower plate spring 718 and components attached thereto. In the figures, the hatched portions indicate the holder 726.

Figure 107:
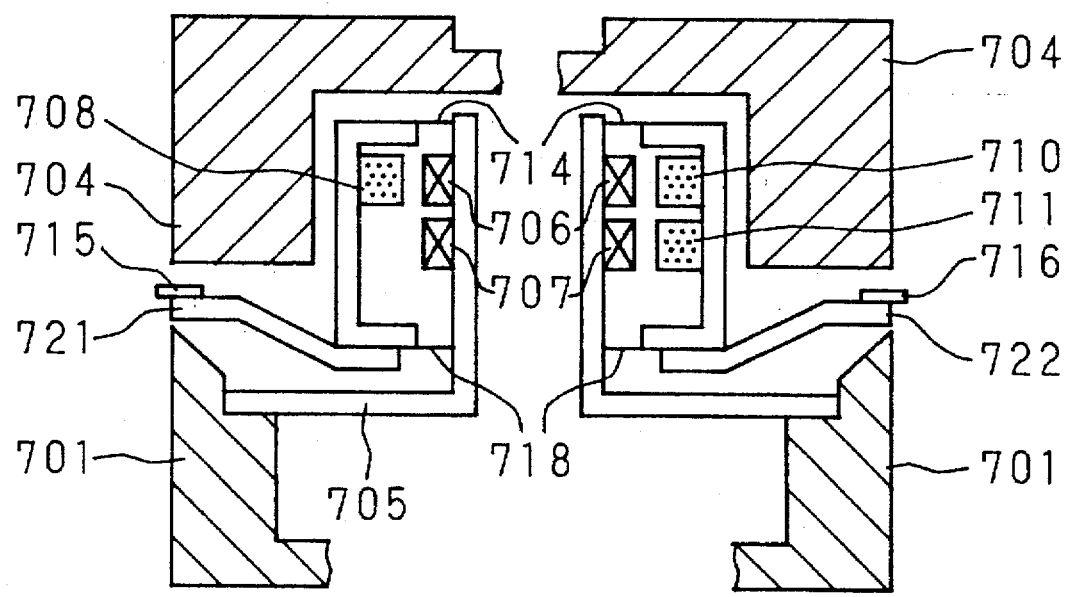
FIG. 107 is a first longitudinal section view illustrating the effects of Embodiment 40.
Figure 108:
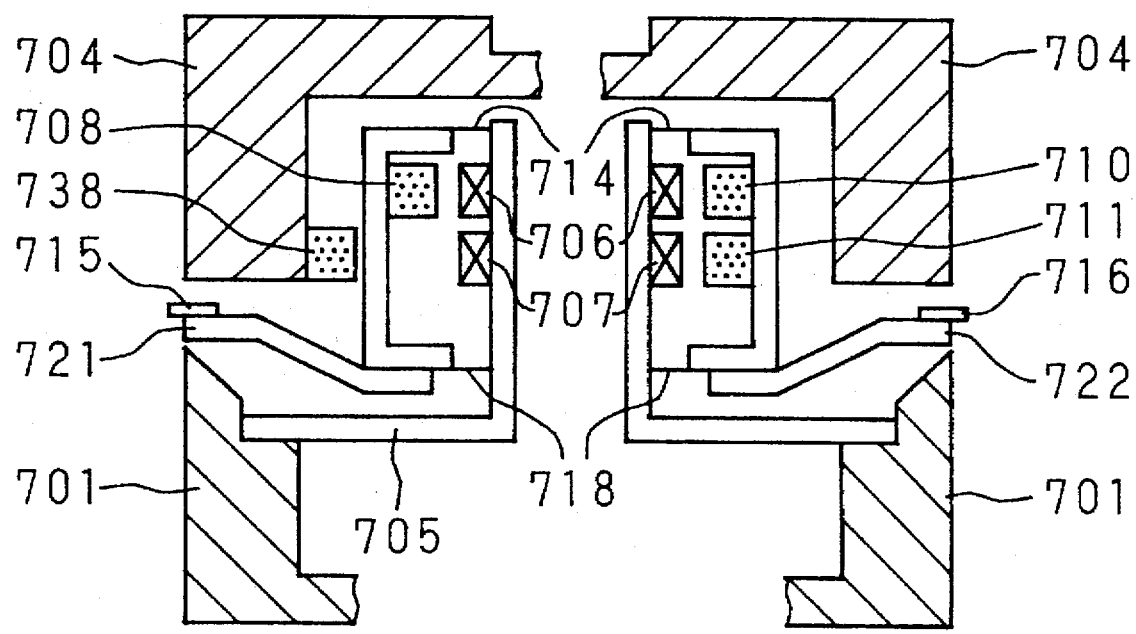
FIG. 108 is a second longitudinal section view illustrating the effects of Embodiment 40.

FIG. 107 is a section view showing the magnetic head driving device which is used in the prior art rotary magnetic head device of FIG. 11 but is not provided with the lower magnet A 709. FIG. 108 is a section view showing a configuration wherein the lower member 738 is disposed in place of the lower magnet A 709 which is not used in the configuration of FIG. 107. FIGS. 109 to 114 show analysis results of operation properties of Embodiment 40.

In FIG. 105, 726 is the holder which is elastically supported by the upper and lower plate springs 714 and 718, 714a is an outer periphery portion of the upper plate spring 714 which is pressingly contracted with and fixed to the rotary cylinder 704 and the stationary body 725a, 714b is an inner periphery portion of the upper plate spring 714 to which the upper end face of the holder 726 is fixedly attached. A magnetic head A 715 and a magnetic head B 716 are respectively attached to head bases 731 which are integral with the inner periphery portion 714b. The portion between the outer periphery portion 714a and the inner periphery portion 714b has an arcuate shape as illustrated, so that the holder 726 and the magnetic heads 715 and 716 have a smaller elastic property in the direction perpendicular to the sheet in FIG. 105 with respect to the outer periphery portion 714a.

In FIG. 106, 718a is an outer periphery portion of the lower plate spring 718 which is pressingly contacted with and fixed between the stationary bodies 725a and 725b, and 718b is an inner periphery portion of the lower plate spring 718 to which the holder 726 is fixedly attached. The portion between the outer periphery portion 718a and the inner periphery portion 718b has an arcuate shape as illustrated, so that the elastic property in the direction perpendicular to the sheet in FIG. 106 is small.

The reference numerals 708 and 711 are the upper magnet A and the lower magnet B which are fixedly attached to an outer periphery portion of the holder 726, respectively. These magnets are magnetized so that the inner periphery side is the N-pole and the outer periphery side is the S-pole.

The reference numerals 706 and 707 are upper and lower coils which are fixedly attached to the hollow cylindrical bobbin 754 and disposed in such a manner that they do not contact with the outer periphery of the rotating shaft 703. Furthermore, the upper coil 706 is located at a position where it opposes the upper magnet A 708, and the lower coil 707 is located at a position where it opposes the lower magnet B 711. The reference numeral 747 designates coil lead wires which are connected to the terminals of the upper and lower coils 706 and 707, and led out via a hole formed in the lower portion of the stationary cylinder 701, whereby the wires are connected with a power supply outside the rotary magnetic head device.

The reference numeral 723 is a rotational upper rotary transformer fixedly attached to the rotary cylinder 704, and 724 is a fixed lower rotary transformer fixedly attached to the stationary cylinder 701. The rotary transformers 723 and 724 transmit signals to the magnetic head A 715 and magnetic head B 716. The reference numeral 748 designates lead wires of the fixed lower rotary transformer 724.

The reference numeral 732 designates Hall elements which constitute a magnetic sensor, respectively oppose the upper portion of the upper magnet A 708 and the lower portion of the lower magnet B 711, and are positioned and fixed so as to be integral with the respective stationary bodies. The Hall element which opposes the lower magnet B 711 is not shown in the figure. The reference numeral 738 is the lower member disposed on the inner periphery face of the stationary body. When the rotary cylinder 704 rotates, the lower member 738 generates an angular moment equivalent to that of the lower magnet B 711 which is located at the symmetrical position about the rotating shaft 703. The reference numeral 739 is the upper member disposed on the inner periphery face of the stationary body. When the rotary cylinder 704 rotates, the upper member 739 generates an angular moment equivalent to that of the upper magnet A 708 which is located at the symmetrical position about the rotating shaft 703.

The reference numeral 740 is a disk-like rotor case which is attached by a screw to the upper end face of the rotating shaft 703 so as to be perpendicular thereto. The reference numeral 741 is a hollow disk-like magnet which is fixed to the lower face of the rotor case 740, 742 is a coil which is fixed to the stationary cylinder 701 so as to be integral therewith and positioned so as to oppose the lower face of the magnet 741, and 743 is a back yoke which is coaxially fixed to the lower portion of the coil 742. The rotor case 740, the magnet 741, the coil 742, and the back yoke 743 constitute a rotary cylinder driving motor.

The reference numeral 745 designates bolts by which the stationary cylinder 701 vertically split with respect to the rotary cylinder 704 is fixed to the stationary cylinder holder 744 while using the rotating shaft 703 as the center axis. The reference numeral 746 designates bolts by which the coil 742 is fixed to the upper end face of the stationary cylinder holder 744.

Hereinafter, the operation of Embodiment 40 will be described. Principally, the magnetic head driving device operates in the same manner as the prior art example, or the device is of the electromagnetic drive type.

In FIGS. 101 and 102, regarding the magnetic head A 715, when a driving current is supplied to the upper coil 706 intersecting with the magnetic field in the magnetic circuit formed by the upper magnet A 708, a driving force is generated in the direction of the rotating shaft 703. This driving force causes the holder 726 which is a movable portion and to which the upper magnet A 708 is attached, to move in the axial direction, and the magnetic head A 715 which moves together with the upper plate spring 714 and the head base 731, to move in the direction of the rotating shaft 703.

On the basis of the strengths of the magnetic fields generated by the upper magnet A 708 and the lower magnet B 711, the Hall elements 732 respectively detects the distances between time elements and the upper magnet A 708 and lower magnet B 711, i.e., the distances from the stationary body 725 to the head base 731, the magnetic head A 715 and the magnetic head B 716.

Figure 109:
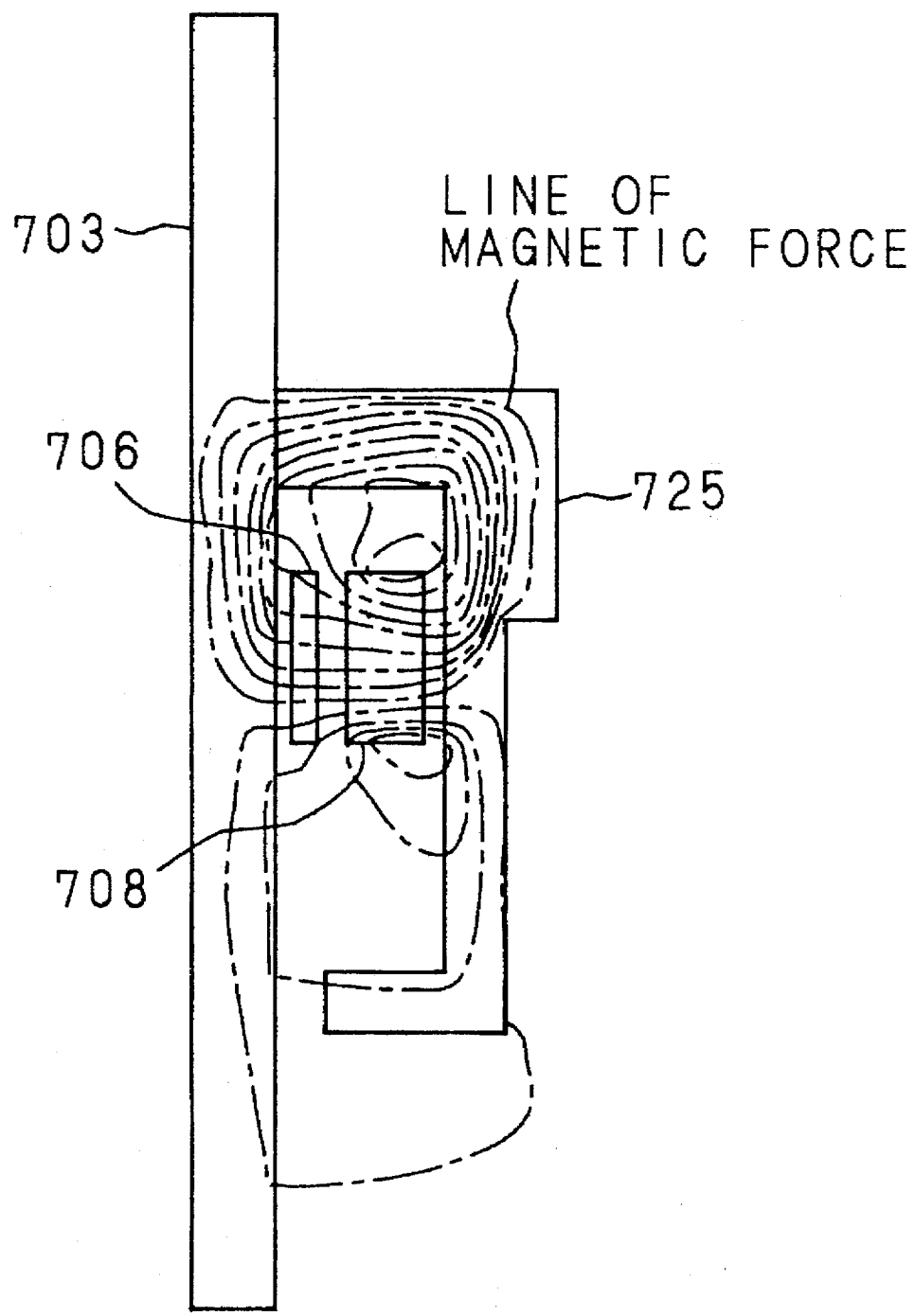
FIG. 109 is a diagram showing output data of a magnetic field analysis in Embodiment 40.
Figure 110:
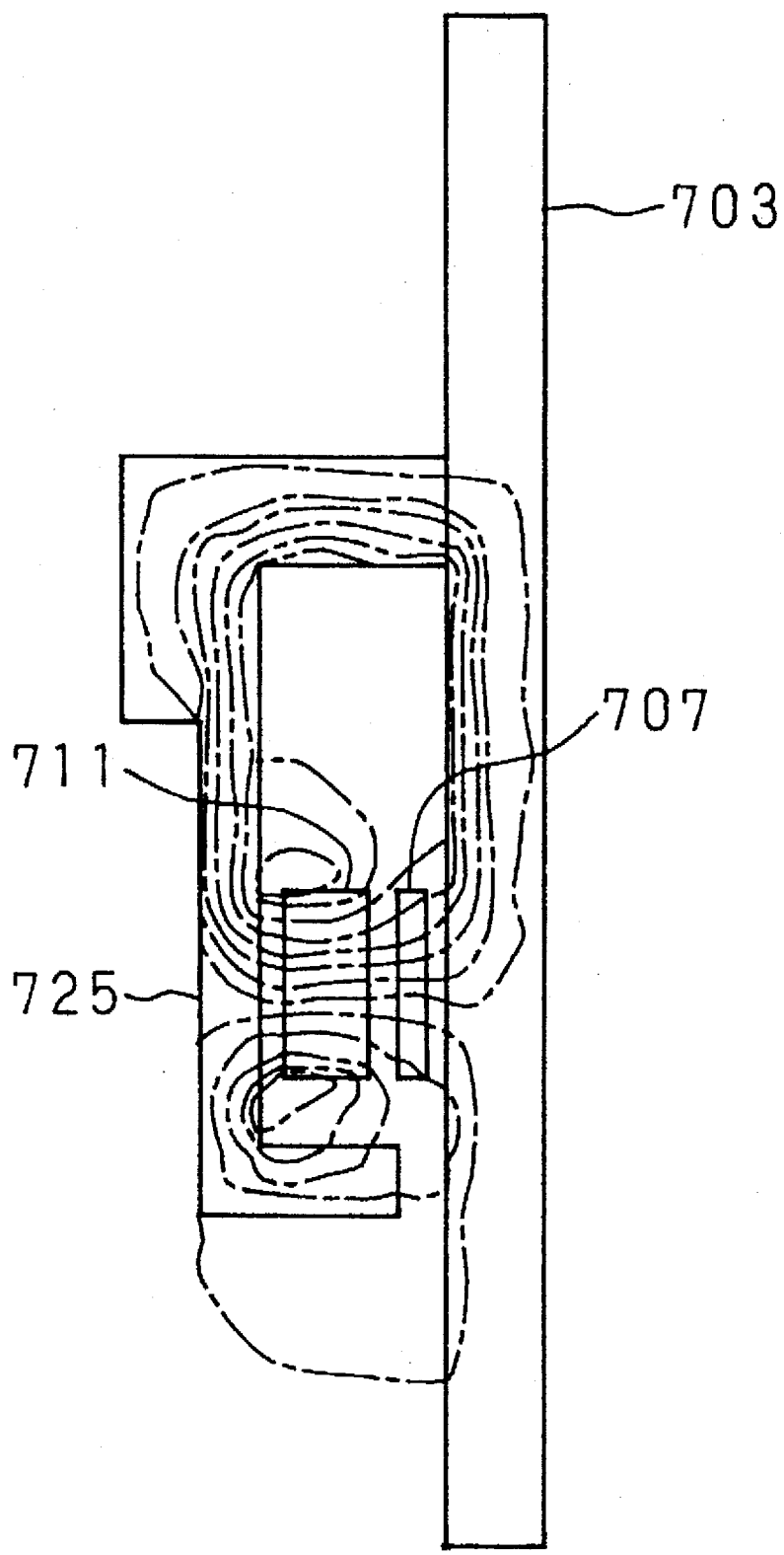
FIG. 110 is a diagram showing data of a magnetic field analysis of a portion of Embodiment 40 which is axially symmetric with the portion of FIG. 109.

FIGS. 109 and 110 show lines of magnetic force which start from the upper magnet A 708 and the lower magnet B 711 and act on the stationary body 725, the rotating shaft 703, and the upper and lower coils 706 and 707. The lines of magnetic force starting from the upper magnet A 708 and the lower magnet B 711 pass through the insides of the rotating shaft 703 and stationary body 725, and return to the respective magnets. The figures show that the circulating lines of magnetic force pass through the upper coil 706 and the lower coil 707 which are disposed in the path of the lines of magnetic force, in the direction perpendicular to the winding direction of the coils.

In the configuration of FIG. 101, a current supplied from a power source which is outside the rotary magnetic head device flows through the coil lead wires 747 in the upper and lower coils 706 and 707. In the magnetic fields in the radial direction and generated by the upper magnet A 708 and the lower magnet B 711, the currents flowing through the upper and lower coils 706 and 707 respectively cause the upper magnet A 708 and the lower magnet B 711 to be subjected to the forces in the direction parallel to the rotating shaft 703, so that the two magnets are moved independently from each other.

In FIGS. 103 to 106, the upper magnet A 708 is moved in the direction parallel to the rotating shaft 703, while being integrated through the split holder 726 with the inner periphery portion 714b of the upper plate spring 714, the inner periphery portion 718b of the lower plate spring 718, the head base 731, and the magnetic head A 715. The lower magnet B711 is moved in the direction parallel to the rotating shaft 703, while being integrated through the split holder 726 with the inner periphery portion 714b of the upper plate spring 714, the inner periphery portion 718b of the lower plate spring 718, the head base 731, and the magnetic head B 716.

Figure 111:
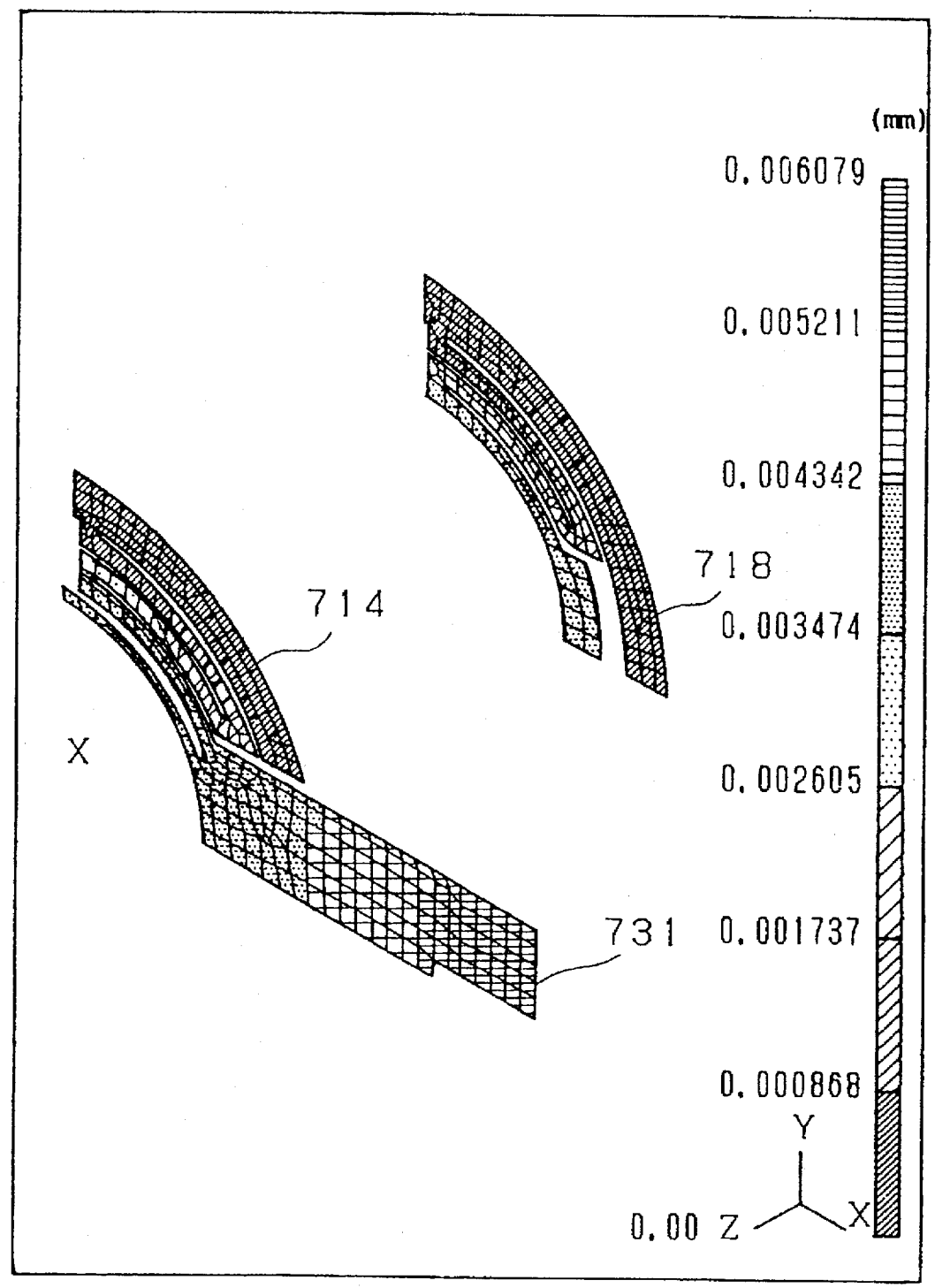
FIG. 111 is a diagram showing data of a structure analysis of the primary resonance state of a plate spring member used in Embodiment 40.
Figure 112:
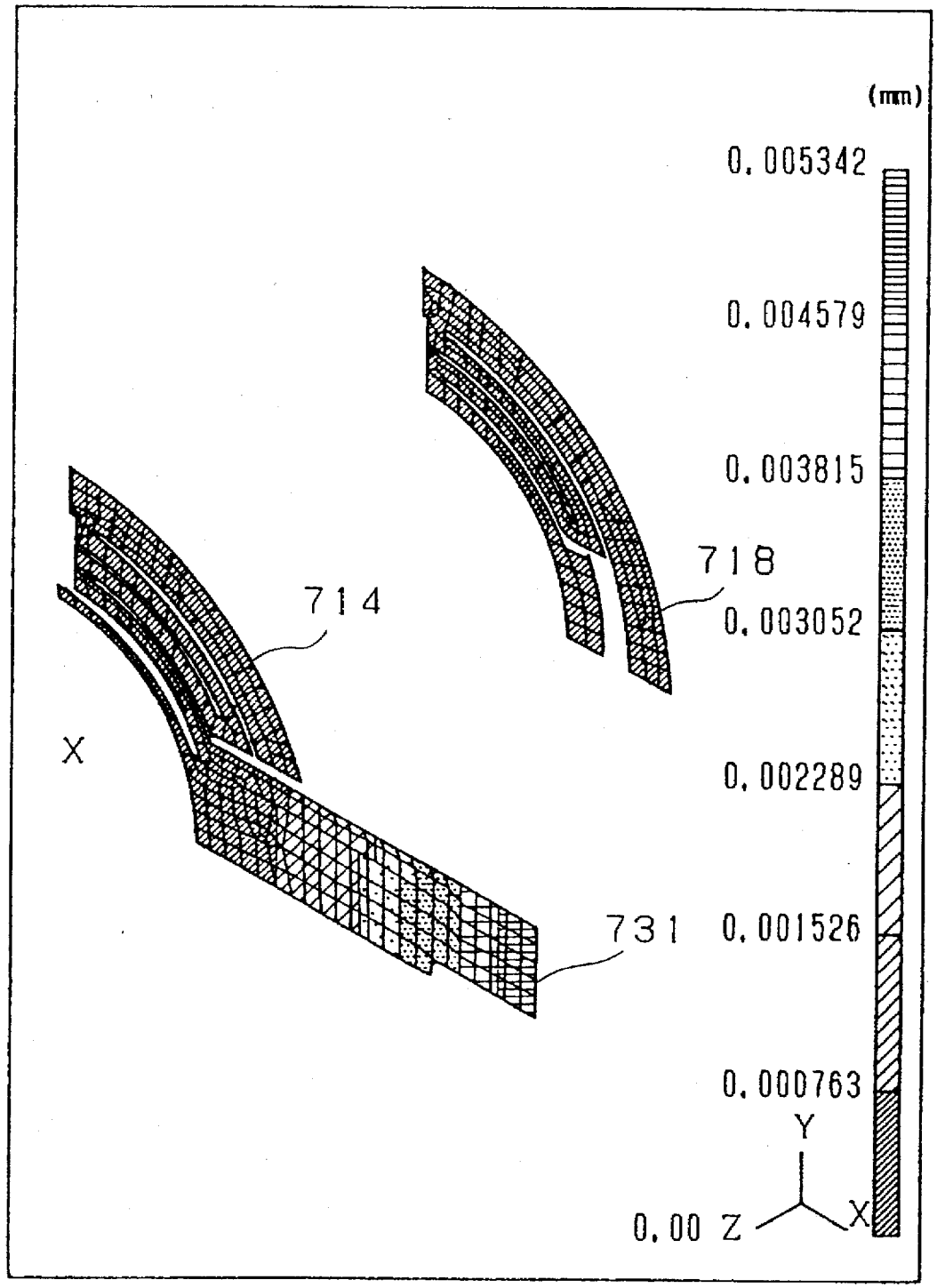
FIG. 112 is a diagram showing data of a structure analysis of the secondary resonance state of the plate spring member used in Embodiment 40.

FIGS. 111 and 112 are views showing results of structure analyses according to the finite element method conducted on a quarter portion of each of the upper and lower plate springs 714 and 718 which is in a plane perpendicular to the rotating shaft 703 and in the range of 90 deg. in which the line connecting the magnetic head A 715 and the rotating shaft 703 is used as the reference. FIG. 111 shows a primary mode oscillation that is an oscillation mode of the integral unit of the upper and lower plate springs 714 and 718, and that is parallel to the rotating shaft 703. FIG. 112 shows a secondary mode oscillation that is an oscillation mode of the head base 731 which is a cantilever integral with the upper plate spring 714 and has a shape shown in FIG. 104, and that is parallel to the rotating shaft 703.

Figure 113:
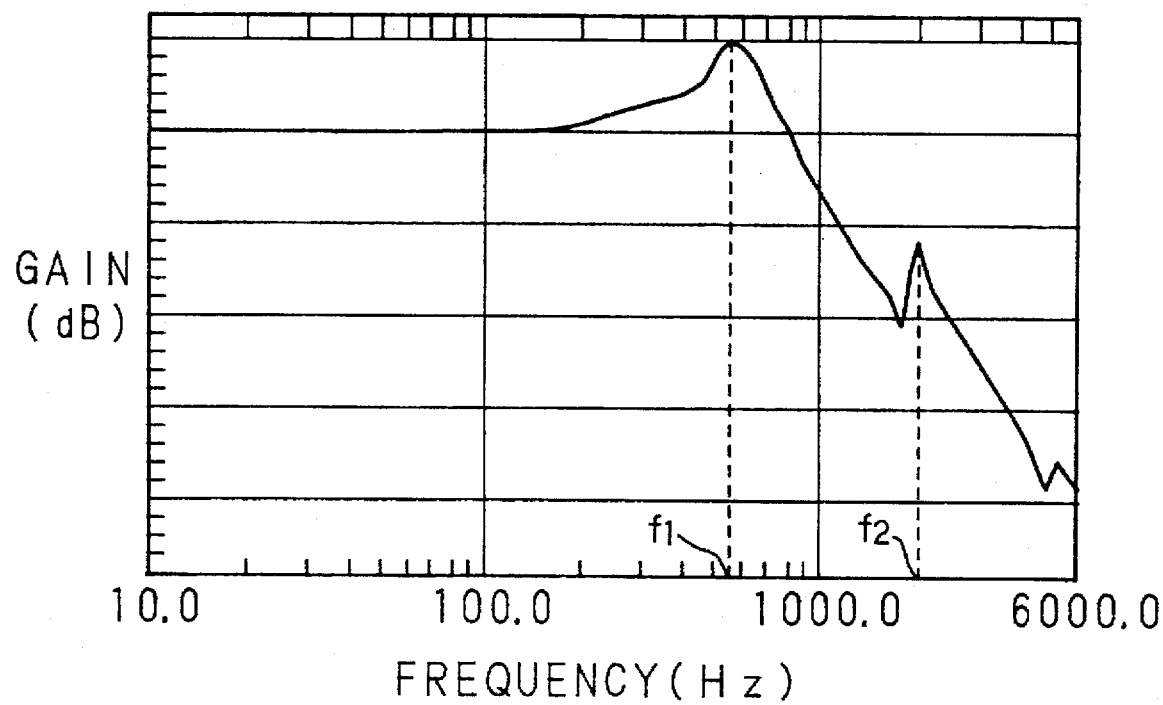
FIG. 113 is a graph showing results of a frequency response analysis according to the data of Embodiment 40.
Figure 114:
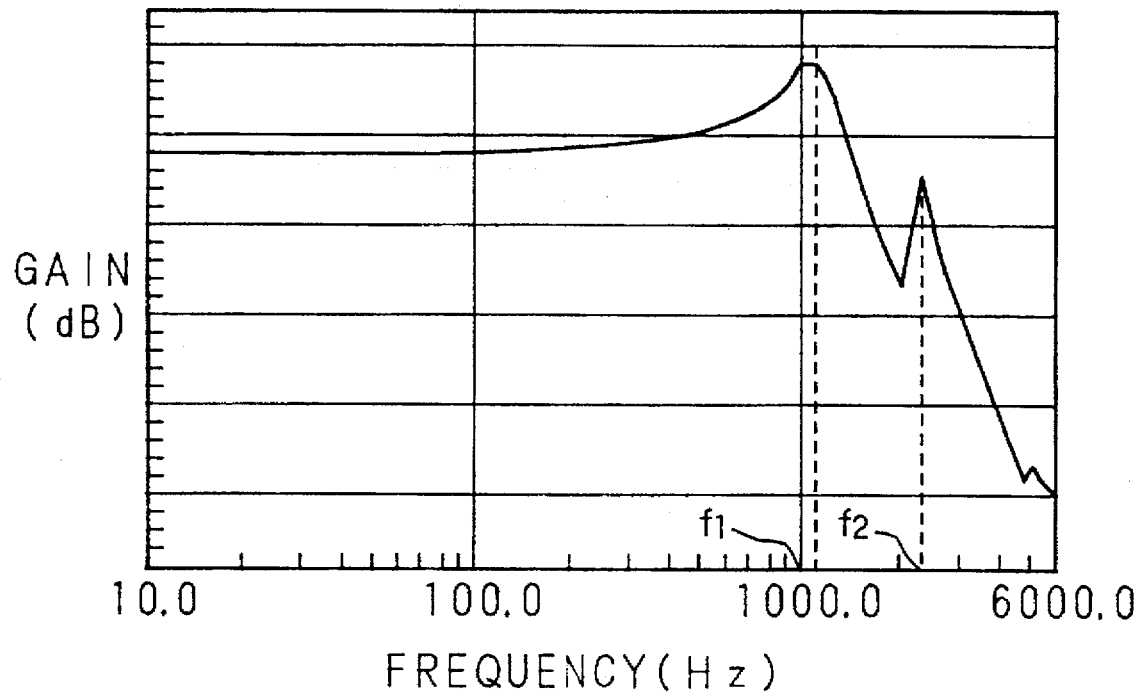

FIGS. 113 and 114 show frequency characteristics of the driving mechanisms for the magnetic head A 715 and the magnetic head B 716. In each of the figures, the axis of abscissas indicates the excitation frequency of the driving mechanism in a logarithmic scale, and the axis of ordinates indicates the ratio of an output amplitude to an input amplitude in a logarithmic scale. The symbol f1 indicates the primary resonance frequency corresponding to the oscillation mode which corresponds to FIG. 111 showing the driving characteristics of the magnetic head A 715 and the magnetic lead B 716, and f2 indicates the secondary resonance frequency corresponding to the oscillation mode which corresponds to FIG. 112 showing the driving characteristics of the magnetic head A 715 and the magnetic head B 716.

In FIGS. 111 and 112, the distribution of deformation is shown by the hues provided to the elements of the structure. In the bar graphs at the right side of the figures, the lower end corresponds to deformation of 0. In the black region above the lower end, the amount of deformation is small. It is shown that, in the black region, the outer peripheries of both the tapper and lower plate springs 714 and 718 are in the fixed state.

In FIG. 111 showing the primary resonance state, the inner periphery members of the upper and lower plate springs 714 and 718 are indicated by the same color. This coincides with the fact that the plate springs are coupled to the holder 726 and move in the direction of the rotating shaft 703 while being integral with the bobbin. The primary resonance frequencies f1 or FIGS. 113 and 114 are obtained from the data of the structure analyses shown in FIG. 111.

In FIG. 12 showing the secondary resonance state, it is shown that the portion of the head base 731 of the upper plate spring 714 oscillates in the direction of time rotating shaft 703. The secondary resonance frequencies f2 of FIGS. 113 and 114 are obtained from the data of the structure analyses shown in FIG. 112.

Since FIG. 113 shows the calculation results obtained by simulating the case where the lower magnet A 709 and the upper magnet B 710 used in the prior art are attached to the holder 726, the primary resonance frequency f1 which is the oscillation mode corresponding to FIG. 111 has a small value.

In contrast, since FIG. 114 shows the calculation results obtained by simulating the case where the lower magnet A 709 and the upper magnet B 710 used in the prior art are not attached to the holder 726 of Embodiment 40, the primary resonance frequency f1 has a large value.

The secondary resonance frequency f2 is not changed because the masses of the head base 731, the magnetic lead A 715, and the magnetic head B 716 are the same as those of FIGS. 113 and 114.

On the other hand, by the interaction of the lines of magnetic force generated by the energized coil 742 and those generated by the magnet 741, the rotor case 740 is caused to rotate while being integral with the rotating shaft 703. As a result of this rotation, the stationary body 725, the holder 726, the upper magnet 708, the lower magnet B 711, the upper and lower plate springs 714 and 718, the magnetic head A 715, and the magnetic head B 716 which are integral with the rotating shaft 703 are caused to rotate.

The upper rotary transformer 723 which is connected to the magnetic head A 715 and the magnetic head B 716 by signal lines (not shown), and the lower rotary transformer 724 which is connected by the lead wires 748 to a signal processing circuit outside the rotary magnetic head device transmit and receive signals during the recording and reproduction processes. The magnetic head A 715 and the magnetic head B 716 contact with a magnetic tape 100 to read out signals recorded thereon during the reproduction process, and to record signals on the magnetic tape 100 during the recording process.

FIG. 107 shows the assumption case where the lower magnet A 709 is not used in the prior art rotary magnetic head device shown in FIG. 11. In this case, there remains only the lower magnet B 711 which is located at the symmetrical position about the rotating shaft 703, and therefore the balance of the moments during when the magnetic head A 715 rotates together with the rotary cylinder 704 is lost.

FIG. 108 shows the case where the lower member 738 is disposed in place of the lower magnet A 709 in FIG. 107. The provision of the weight corresponding to the lower magnet B 711 which is located at the symmetrical position about the rotating shaft 703 recovers the balance of the moments during the rotation. As a result, while the moments during the rotation are maintained, the moving mass consists of only the upper member 739 can be reduced as compared with that in the prior art which consists of the upper and lower magnets A 708 and 709.

As described above, according to the rotary magnetic head device of Embodiment 40, the mass can be reduced while satisfying the electromagnetic driving force and the moments obtained during the rotation in the prior art.

Embodiment 41

Figure 115:
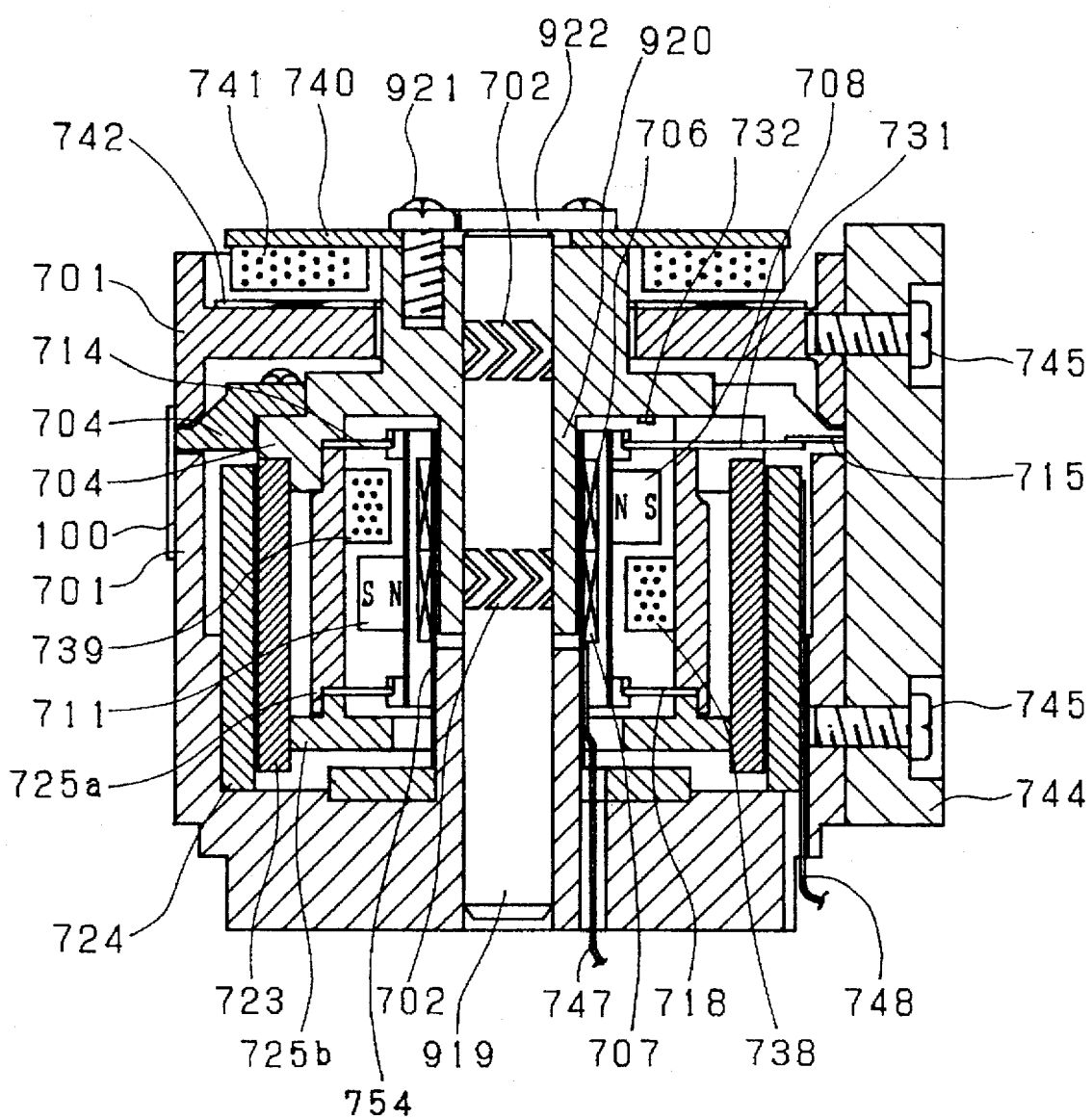
FIG. 115 is a longitudinal section view showing a rotary magnetic head device of Embodiment 41 of the invention.

As Embodiment 41, a rotary magnetic head device in which the shaft mechanism of Embodiment 40 is modified will be described. FIG. 115 is a section view of the rotary magnetic head device of Embodiment 41. In the figure, 919 is a stationary shaft which is pressingly inserted into the lower stationary cylinder 701. The rotary cylinder 704 having a stepped disk-like flange is provided with a bearing supporting portion 920 for supporting the pressure bearing 702 so that it is rotatably supported at a given position of the stationary shaft 919. A thrust bearing 922 is slidingly supported on the upper end face of the stationary shaft 919 by a screw 921, thereby positioning the rotary cylinder 704 in the axial direction. The other configurational points are the same as those of Embodiment 40. Therefore, components identical with or corresponding to those of Embodiment 40 are designated with the same reference numerals, and their description is omitted. Also in this configuration of the stationary shaft type, the same effects as those of Embodiment 40 can be achieved.

Embodiment 42

Figure 116:
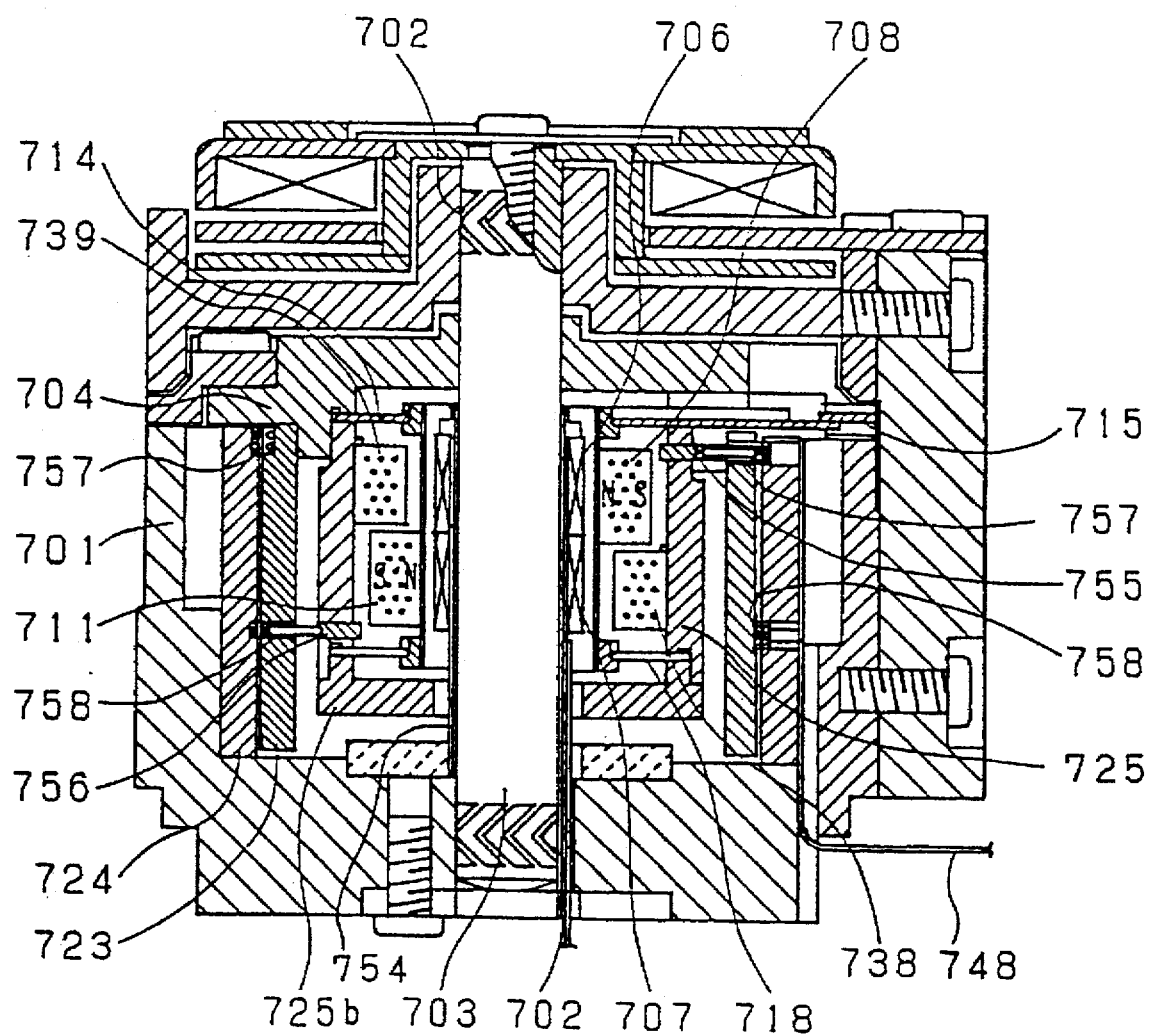
FIG. 116 is a longitudinal section view showing a rotary magnetic head device of Embodiment 42 of the invention.

FIG. 116 is a longitudinal cross section view of Embodiment 42 of the invention.

In the figure, 755 and 756 are Hall elements A and B which are located in portions formed by partly removing the side face of the stationary body 725, so that the Hall element A 755 and Hall element B 756 respectively oppose the upper magnet A 708 and the lower magnet B 711 in the circumferential direction of the rotary cylinder 704, and that, as the upper magnet A 708 and the lower magnet B 711 respectively vertically move together with the magnetic head A 715 and the magnetic head B 716, the respective opposing areas are changed. The reference numeral 757 is an upper coil, and 758 is a lower coil. The coils 757 and 758 connect the Hall element A 755 and the Hall element B 756 with the coils wound in the upper rotary transformer 723, respectively.

Next, the operation of the embodiment of FIG. 116 will be described.

The upper magnet A 708 and the lower magnet B 711 generate magnetic forces in directions perpendicular to the rotating shaft 703, in such a manner that the magnetic forces are equally distributed in the direction parallel to the rotating shaft 703. Therefore, the Hall element A 755 and Hall element B 756 are respectively subject to magnetic forces proportional to the areas of the portions of the magnet A 708 and magnet B 711 which oppose the Hall element A 755 and Hall element B 756.

For example, as the upper magnet A 708 moves upward, the area of the portion of the magnet A 708 which opposes the Hall element A 755 increases, and, in proportion to this increase of the opposing area, also the magnetic force acting on the Hall element A 755 is increased. Accordingly, the Hall element A 755 generates a current output which is proportional to the magnetic force. The current output is transmitted to the coil of the lower rotary transformer 724 which opposes the Hall element. A 755, and then delivered through the connected transformer lead wire 748 to the outside of the rotary magnetic head device.

In contrast, as the lower magnet B 711 moves downward, the area of the portion of the magnet B 711 which opposes the Hall element B 756 increases, and, in proportion to this increase of the opposing area, also the magnetic force acting on the Hall element B 756 is increased. Since the Hall element B 756 generates an output which is proportional to the magnetic force, the output is transmitted to the transformer lead wire 748 through the lower coil 758, and the lower rotary transformer 724 which opposes the lower coil 758. Therefore, the heights or the magnet A 708 and magnet B 711 can be detected at the outside of the rotary magnetic head device.

Embodiment 43

Figure 117:
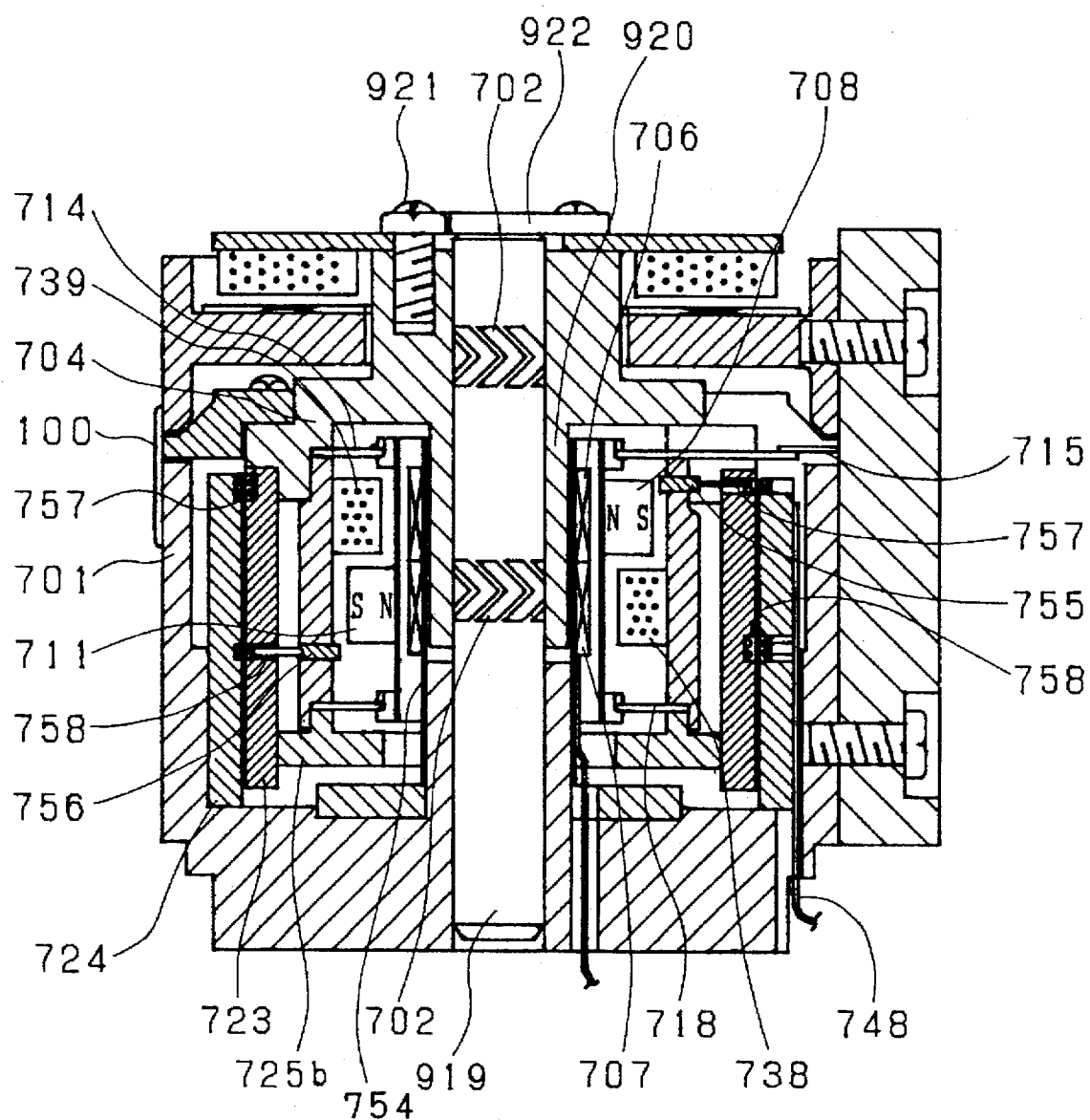

As Embodiment 43, a rotary magnetic head device in which the shaft mechanism or Embodiment 42 is modified will be described. FIG. 117 is a section view of the rotary magnetic head device of Embodiment 43. In the figure, 919 is a stationary shaft which is pressingly inserted into the lower stationary cylinder 701. The rotary cylinder 704 having a stepped disk-like flange is provided with the bearing supporting portion 920 for supporting the pressure bearing 702 so that it is rotatably supported at a given position of the stationary shaft 919. The thrust bearing 922 is slidingly supported on the upper end face of the stationary shaft 919 by the screw 921, thereby positioning the rotary cylinder 704 in the axial direction. The other configurational points are the same as those or Embodiment 42, Therefore, components identical with or corresponding to those of Embodiment 42 are designated with the same reference numerals, and their description is omitted. Also in this configuration of the stationary shaft type, the same effects as those of Embodiment 42 can be achieved.

Embodiment 44

Figure 118:
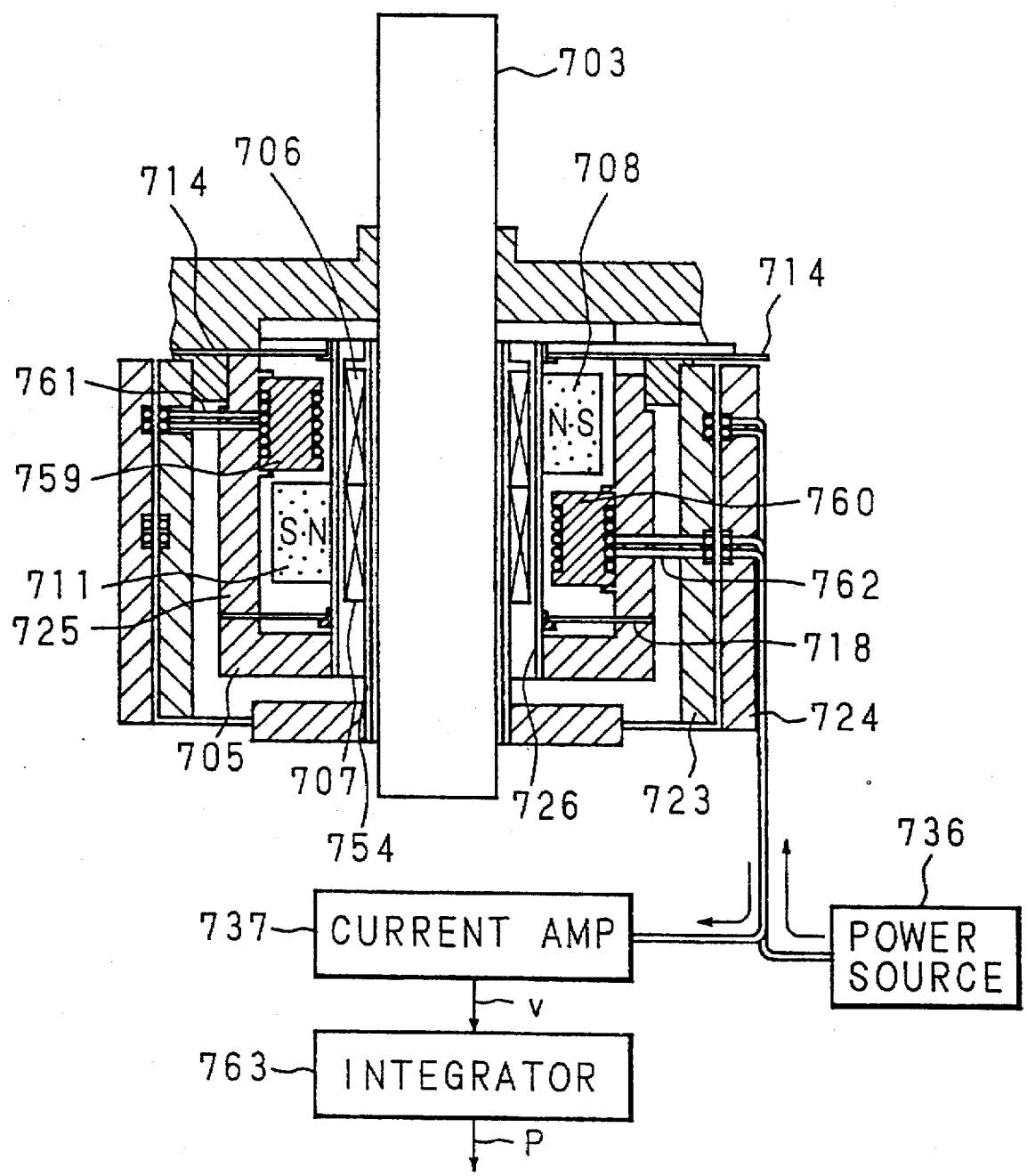

FIG. 118 shows a longitudinal cross section showing the main portions of Embodiment 44 of the invention, and a block circuit diagram of a driving circuit of the embodiment. The rotary member consists of the rotating shaft 703, the stationary body 725 which rotates integrally with, the rotating shaft 703, the upper and lower plate springs 714 and 718, the upper magnet A 708, the lower magnet B 711, and the upper rotary transformer 723. The stationary member consists of the upper coil 706, the lower coil 707, and the lower rotary transformer 724.

In the figure, 759 is an upper electromagnet having at the center an iron core over the periphery of which a coil is wound. The upper electromagnet 759 is fixed to the inner face of the stationary body 725 which is above the lower magnet B 711. The reference numeral 760 is a lower electro-magnet having at the center an iron core over the periphery of which a coil is wound. The lower electromagnet 760 is fixed to the inner face of the stationary body 725 which is below the upper magnet B 708. The reference numerals 761 and 762 are upper and lower coils which connect the coils of the upper and lower electromagnets 759 and 760 to the coil of the upper rotary transformer 723.

Elements disposed outside the rotary magnetic head device include a power source 736, a current amplifier 737, and an integrator 763 which is coupled to the output of the current amplifier 737 and outputs a current signal.

Figure 119:
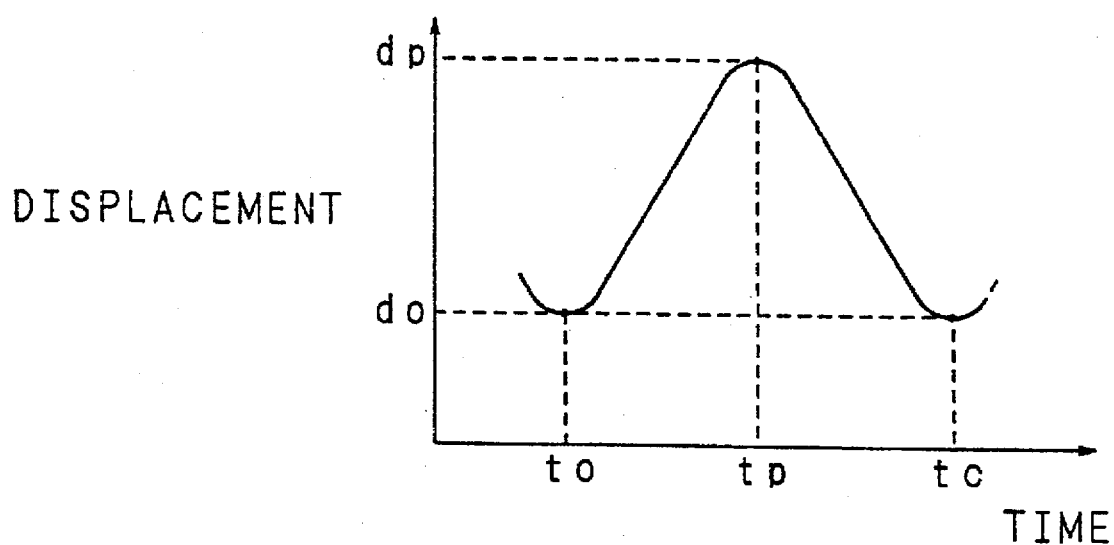
Figure 120:
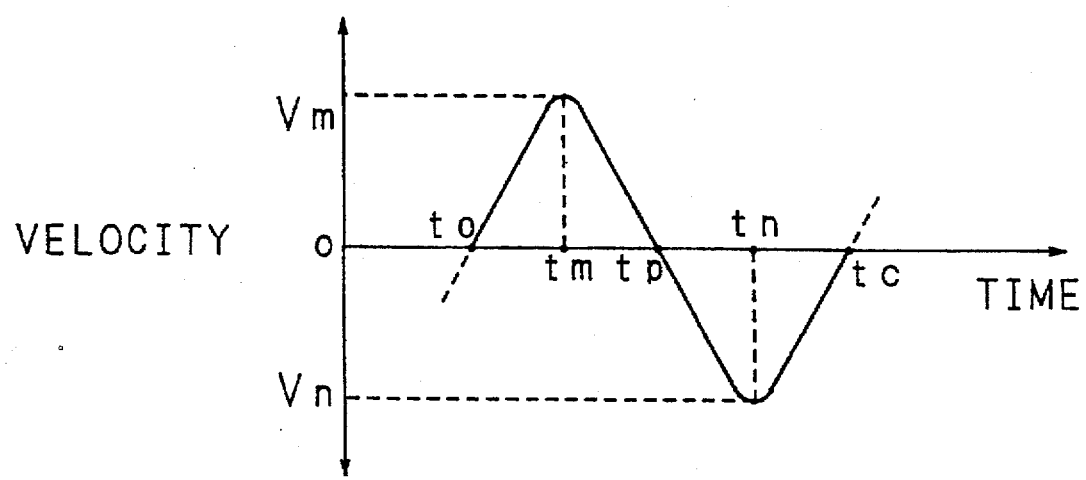
Figure 121:
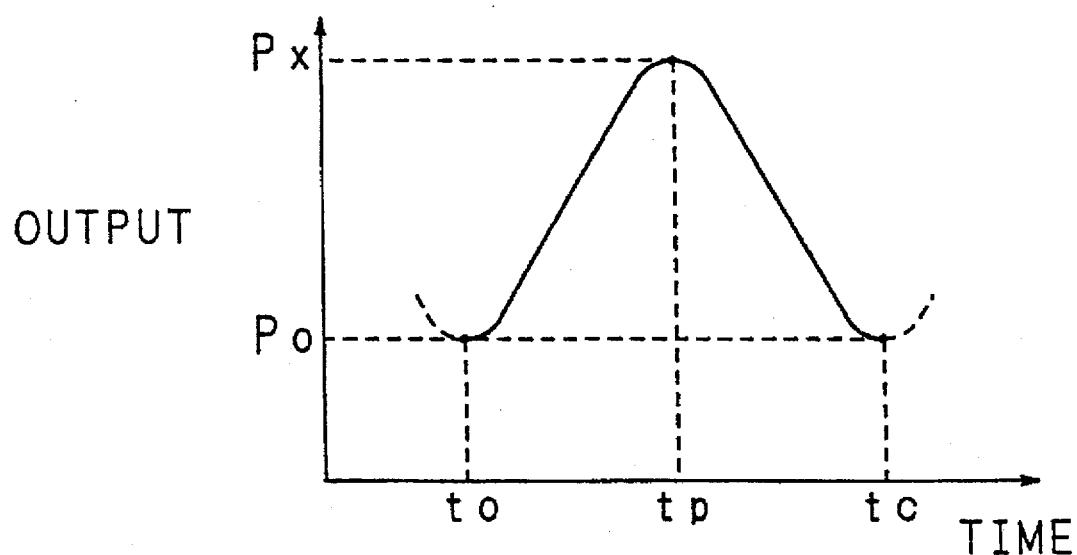

FIGS. 119 to 121 are characteristic graphs showing the temporal variations of the altitude of the upper magnet A 708 or the lower magnet B 711, the output of the current amplifier 737, and the output of the integrator 763. These graphs show phenomena which have been observed within one cycle regarding the upper magnet A 708 or the lower magnet B 711, and from the upper electromagnet 759 or the lower electromagnet 760.

In FIG. 119, do indicates the initial position, and dp indicates the maximum displacement. In FIG. 120 which shows the temporal variation of the output of the current amplifier 737, Vm indicates the maximum velocity, and Vn indicates the minimum velocity. In FIG. 121 which shows the temporal variation of the output of the integrator 763, Po indicates the initial output, and Px indicates the maximum output current. In common with FIGS. 119 to 121, to indicates the start time when the observation of one cycle start, and tm, tp, and tn indicate the maximum-velocity time when the maximum velocity is observed, the maximum-displacement time, and the minimum-velocity time, respectively. The symbol tc indicates one period of the vertical movement of the upper magnet A.

Next, the operation of Embodiment 44 will be described.

The power source 736 supplies a current to the lower and upper electromagnets 760 and 759 through the transformer lead wires 748, and the lower and upper coils 762 and 761 wound in the lower rotary transformer 724. The current amplifier 737 amplifies a weak current obtained through the transformer lead wires 748, and outputs the amplified current. The integrator 763 performs the time-integration at every sampling time on the output of the current amplifier 737, and outputs the integrated current.

For example, the operation of the lower magnet B 711 will be described with reference to FIGS. 119 to 121. FIG. 119 shows a case where the lower magnet B 711 is located at the lowest position do at the time to. The lower magnet B 711 rises until it reaches the maximum displacement dp at the maximum-displacement time tp. Thereafter, the lower magnet B 711 continues to go down until the period tc to return to the initial position do, thereby completing the operation of one cycle.

In FIG. 120, the initial velocity is 0 at the initial time to. At the maximum-velocity time tm which is at the middle of the time period starting from the initial time to and continuing until the maximum-displacement time, the velocity becomes maximum or has the maximum velocity vm. Then, at the minimum-velocity time tn which is at the middle of the time period starting from the maximum-velocity time tin and continuing until the period tc, the velocity becomes minimum or has the minimum velocity vn, and returns to the initial velocity of 0 at the period tc.

FIG. 121 shows results obtained by continuously integrating the output of the current amplifier 737, which corresponds to the velocity at each time in FIG. 120, with a short sampling time dt in the time period starting from the initial time to and continuing until the detection time. In the figure, the output of the integrator 763 continues to increase in the time period starting from the initial time to and continuing until the maximum-displacement time tp in which the velocity is positive, and the output of the integrator 763 continues to decrease in the time period after the maximum-displacement time tp in which the velocity is negative. At the period tc, the absolute value of the output of the integrator 763 for the time period starting from the initial time to and continuing until the maximum-displacement time tp coincides with that of the output of the integrator 763 for the time period starting from the maximum-displacement time tp and continuing until the period tc, resulting in that the output of the integrator 763 returns to the initial velocity of 0.

As described above, the characteristics shown in FIG. 119 are very similar to those shown in FIG. 121. Therefore, the position of the lower magnet B 711 at any time can be detected as the output of the integrator 783.

Embodiment 45

Figure 122:
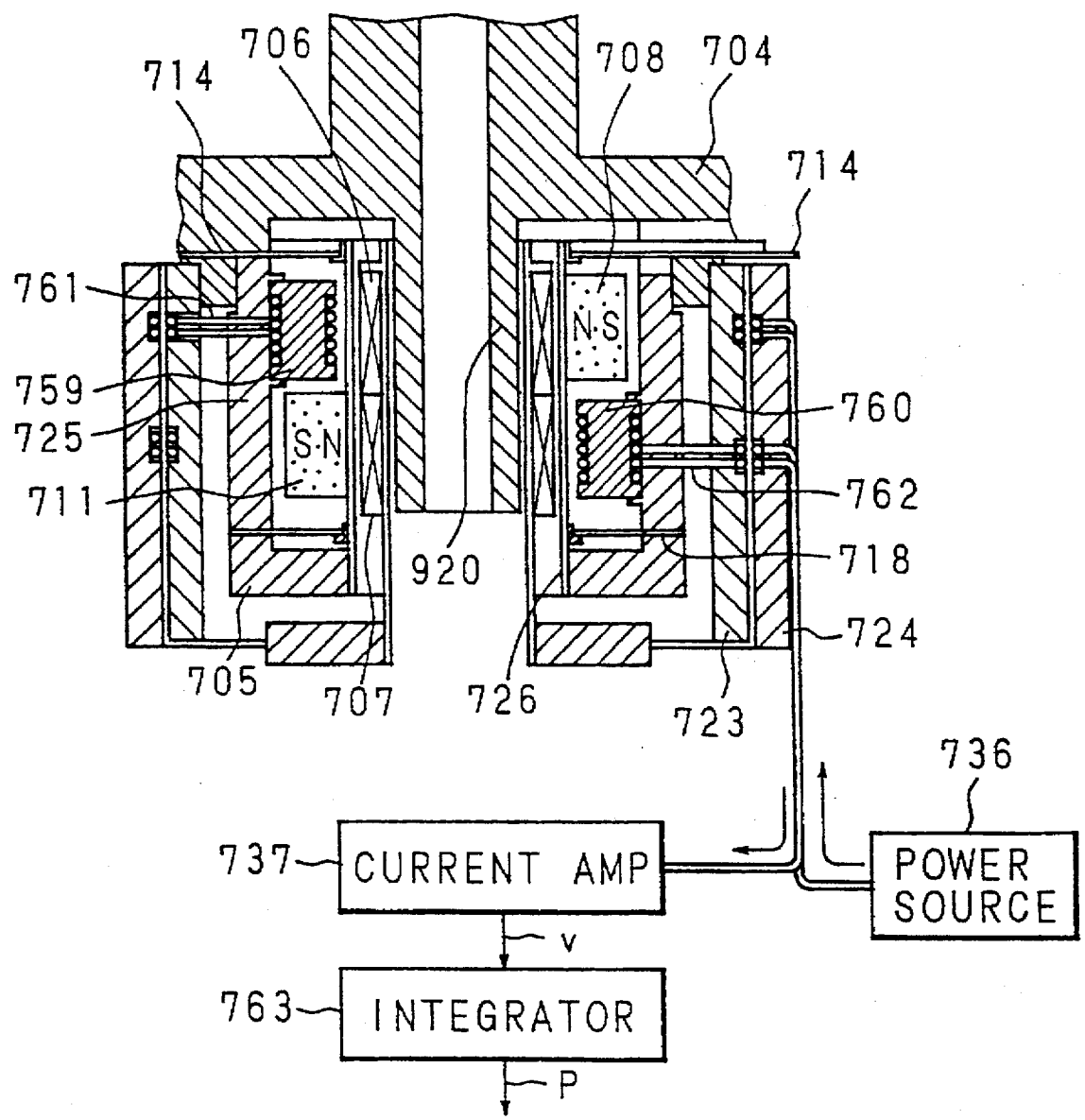

As Embodiment 45, a rotary magnetic head device in which the shaft mechanism of Embodiment 44 is modified will be described. FIG. 122 is a section view of the rotary magnetic head device of Embodiment 45. In the figure, 920 is a bearing supporting portion for supporting the pressure bearing 702 at the rotary cylinder 704 having a stepped disk-like flange 704. The other configurational points are the same as those of Embodiment 44. Therefore, components identical with or corresponding to those of Embodiment 44 are designated with the same reference numerals, and their description is omitted. Also in this configuration of the stationary shaft type, the same effects as those of Embodiment 44 can be achieved.

Embodiment 46

Figure 123:
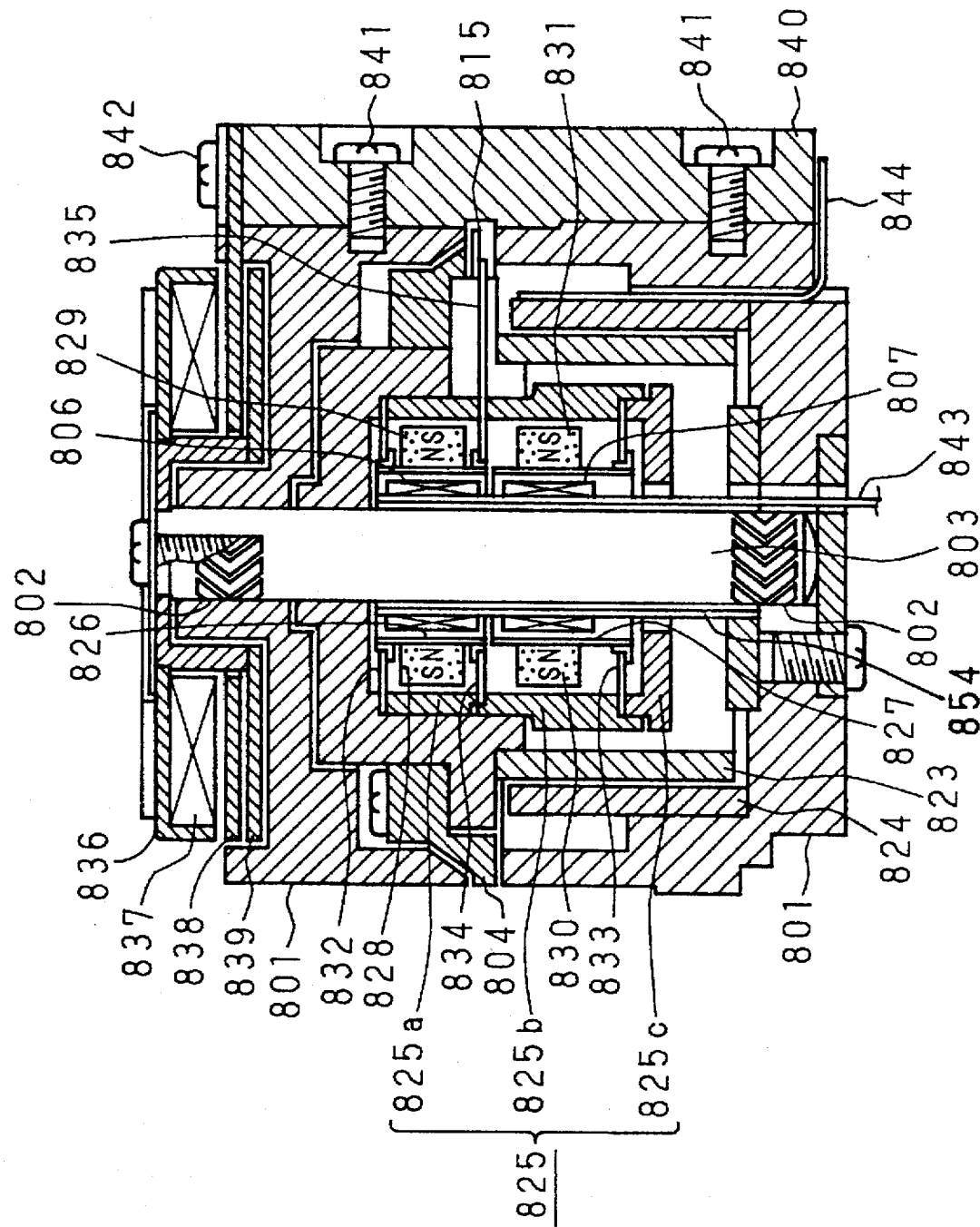
Figure 124:
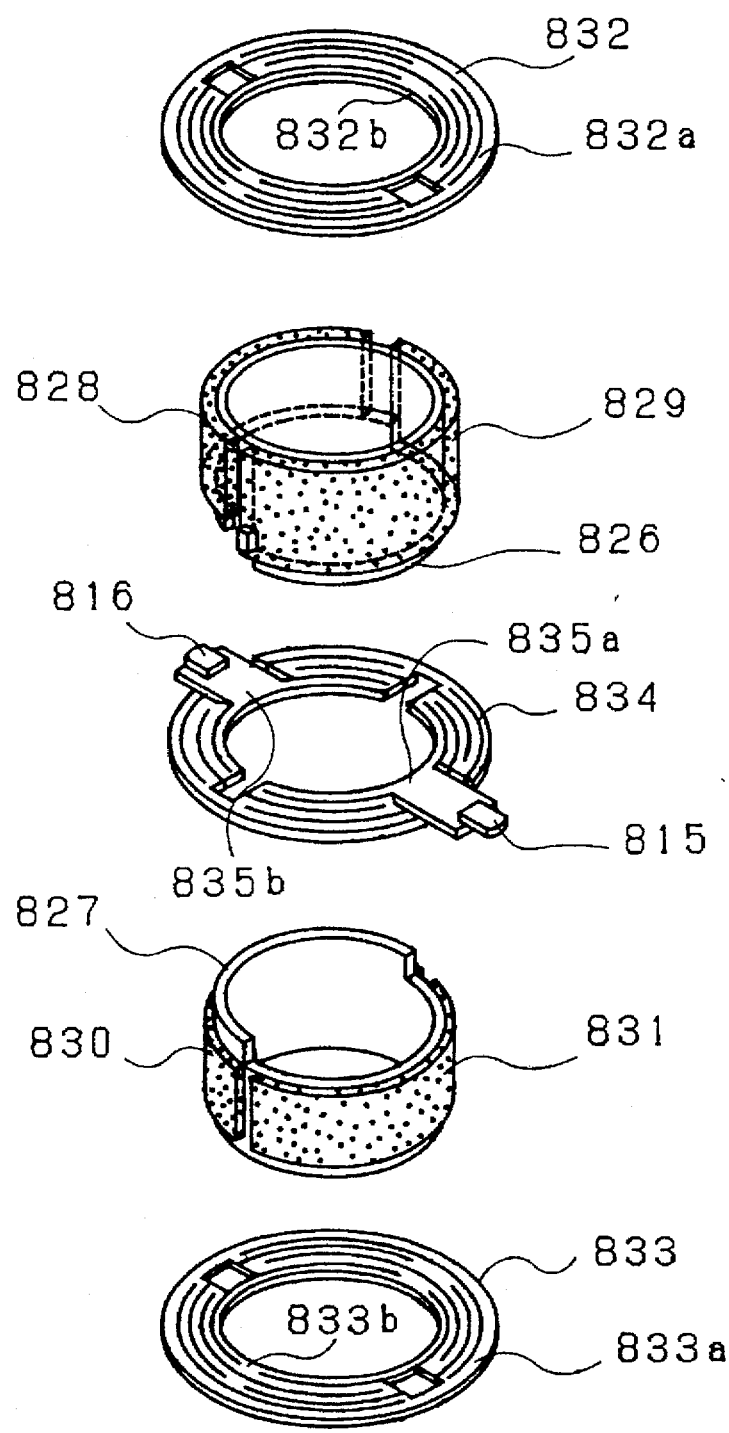
Figure 128:
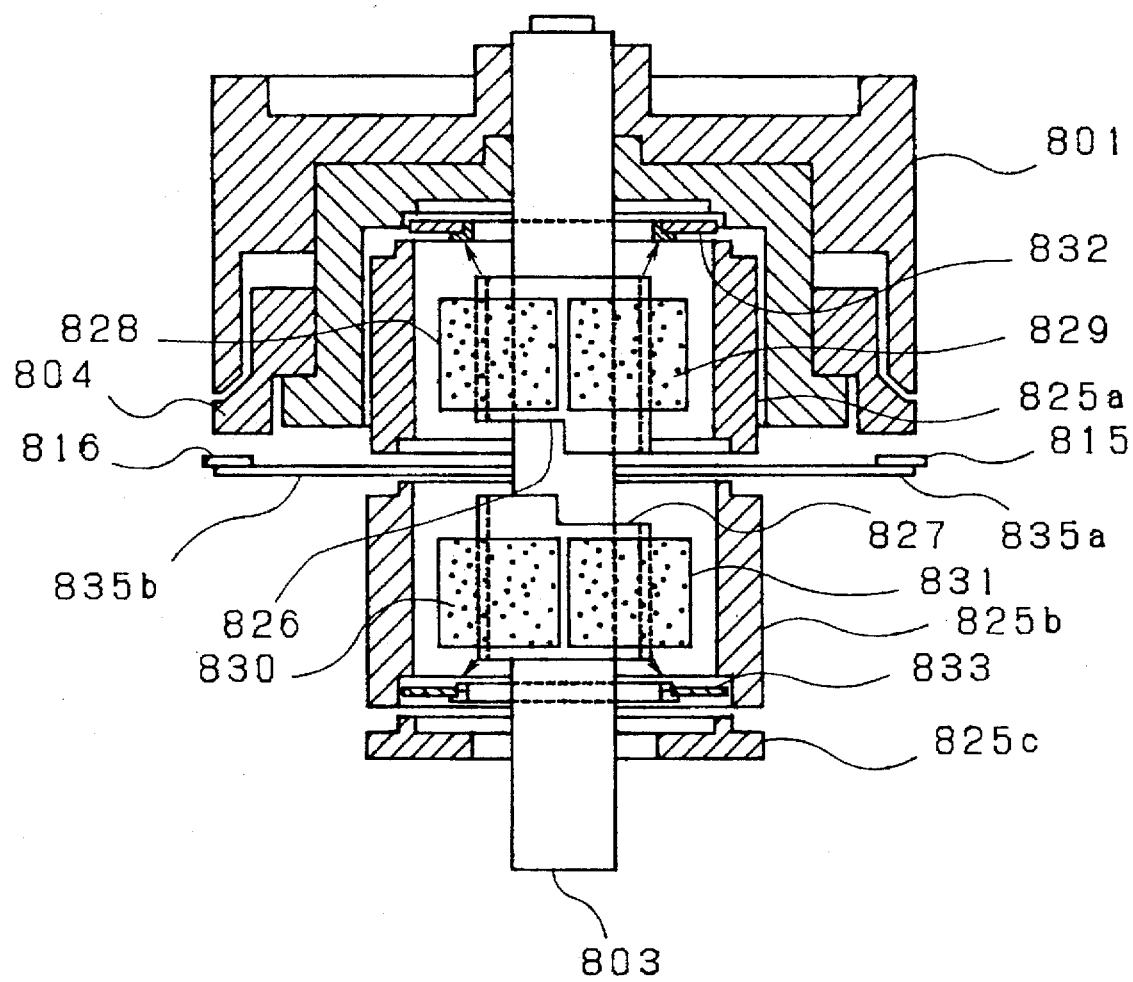

FIG. 123 is a longitudinal cross section view of a rotary magnetic head device of Embodiment 46, and FIG. 124 is an exploded perspective view of the embodiment. Components identical with or corresponding to those of FIG. 11 are designated with the same reference numerals. A stationary cylinder 801 is divided into two portions, or upper and lower portions, and the two portions are made integral with each other by a stationary cylinder holder 840. A spiral bearing portion 802 is formed on an outer periphery portion of a rotating shall 803. The reference numeral 804 is a rotary cylinder fixedly attached to the rotating shaft 803. The reference numeral 854 is a hollow cylindrical bobbin which is coaxial with the rotating shaft 803 having one end fixed to the rotary cylinder 804. The reference numeral 825a, 825b and 825c are stationary bodies fixed to the rotary cylinder 804. An upper plate spring 832 is pressingly contacted with and fixed between the rotary cylinder 804 and the stationary body 825a, a middle plate spring 834 is pressingly contacted with and fixed between the stationary bodies 825a and 825b, and a lower plate spring 833 is pressingly contacted with and fixed between the stationary bodies 825b and 825c. FIG. 128 is a partial section view showing the inside of the rotary cylinder. The stationary bodies 825a, 825b and 825c are integral with each other so as to constitute a stationary body 825 and form a magnetic path as described below.

Figure 125:
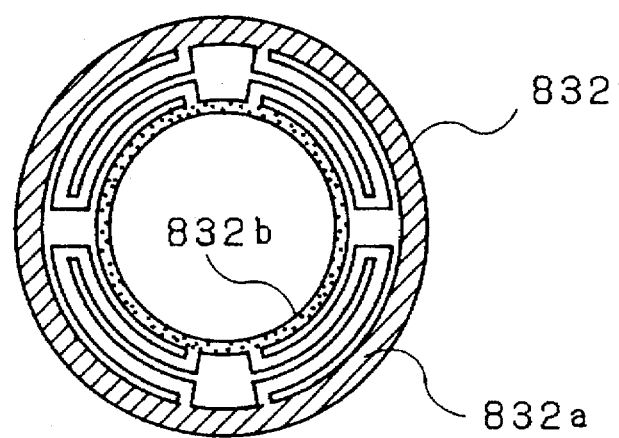
Figure 126:
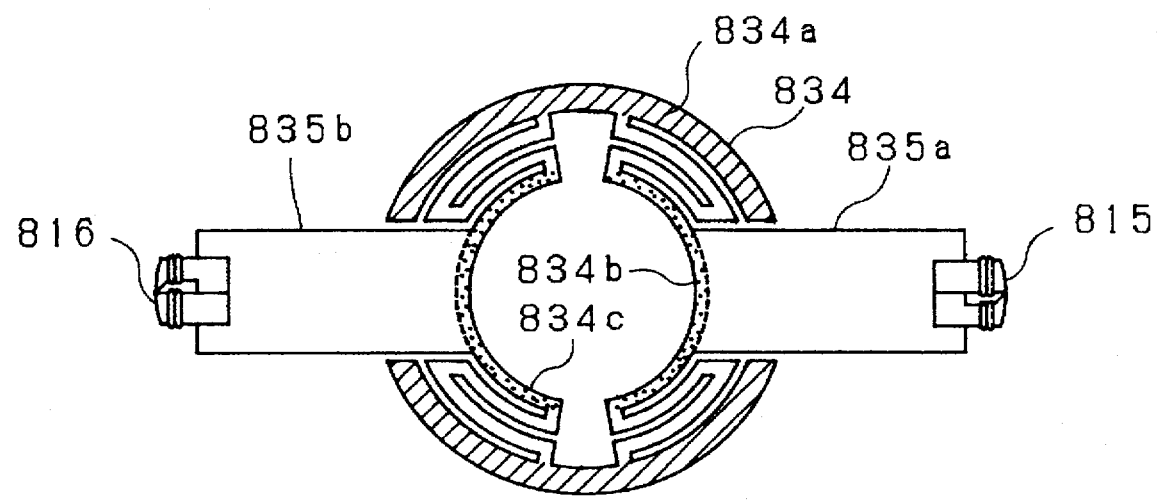

The reference numeral 826 is an upper holder which is elastically supported by the upper and middle plate springs 832 and 834. FIG. 125 is a plan view of the upper plate spring 832, and FIG. 126 is a plan view of the middle plate spring 834. In FIG. 125, 832a is an outer periphery portion of the upper plate spring 832 which is pressingly contacted with and fixed to the rotary cylinder 804 and the stationary body 825a, and 832b is an inner periphery portion to which the upper holder 826 is fixedly attached. The interface between the outer and inner periphery portions 832a and 832b is formed into a folded shape as illustrated, so as to have a small elastic coefficient in the direction perpendicular to the sheet of the figure.

In FIG. 126, 834a is an outer periphery portion of the middle plate spring 834 which is pressingly contacted with and fixed between the stationary bodies 825a and 825b, and 834b is an inner periphery portion to which the lower end face of the upper holder 826 is fixedly attached. A magnetic head A 815 is attached to a head base 835a which is integral with the inner periphery portion 834b. Since the interface between the outer and inner periphery portions 834a and 834b is formed into a folded shape as illustrated, the upper holder 826 and the magnetic head A 815a have a smaller elastic coefficient in the direction perpendicular to the sheet of the figure with respect to the outer periphery portion 834a.

The reference numeral 827 is a lower holder which is elastically supported by the middle and lower plate springs 834 and 833. As shown in FIG. 126, the upper end face of the lower holder 827 is fixedly attached to an inner periphery portion 834c of the middle plate spring 834. A magnetic head B 816 is attached to a head base 835b which is integral with the inner periphery portion 834c. The lower holder and the magnetic head B 816 are supported with a smaller elastic coefficient with respect to the outer periphery portion 834a.

Figure 127:
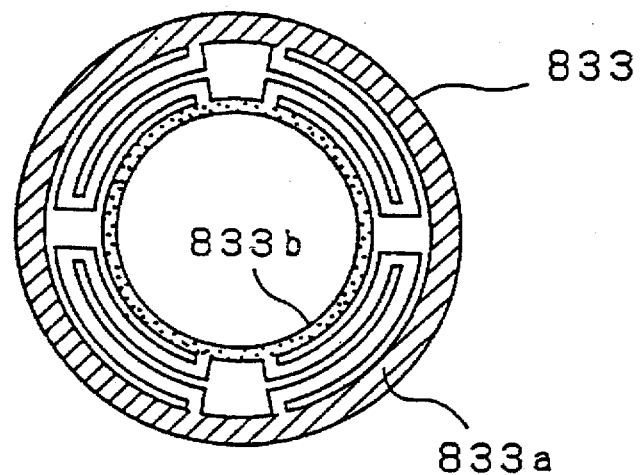

FIG. 127 is a plan view of the lower plate spring 833. The reference numeral 833a is an outer periphery portion which is pressingly contacted with and fixed to the stationary bodies 825b and 825c, 833b is an inner periphery portion to which the lower end face of the lower holder 827 is fixedly attached. The lower plate spring 833 has the same configuration as the upper plate spring 832. The lower holder 827 is supported with a smaller elastic coefficient, by the middle and lower plate springs 834 and 833.

In FIG. 123, 828 and 829 are an upper magnet A and an upper magnet B which are fixedly attached to an outer periphery portion of the upper holder 826, respectively. These magnets are magnetized so that the inner periphery side is the N-pole and the outer periphery side is the S-pole. The reference numerals 830 and 831 are a lower magnet A and a lower magnet B which are fixedly attached to an outer periphery portion of the lower holder 827, respectively. Also these magnets are magnetized so that the inner periphery side is the N-pole and the outer periphery side is the S-pole.

The upper and lower coils 806 and 807 fixed to the hollow cylindrical bobbin 854 are disposed so as not to contact with the outer periphery portion of the rotating shaft 803. The upper coil 806 is located so as to oppose the upper magnets A and B, and the lower coil 807 is located so as to oppose the lower magnets A and B. The reference numeral 843 designates coil lead wires which are connected to the terminals of the upper and lower coils 806 and 807, and led out via a hole formed in the lower portion of the stationary cylinder 801, whereby the coils are connected with a power supply outside the rotary magnetic head device. The reference numeral 844 designates lead wires of the fixed rotary transformer.

The reference numeral 836 is a disk-like rotor case which is attached by a screw to the upper end face of the rotating shaft 803 so as to be perpendicular thereto. The reference numeral 837 is a hollow disk-like magnet which is fixed to the lower face of the rotor case 836, 838 is a coil which is fixed integrally with the stationary cylinder 801 and positioned so as to oppose the lower face of the magnet 837, and 839 is a back yoke which is coaxially fixed to the lower portion of the coil 838. The rotor case 836, the magnet 837, the coil 838, and the back yoke 839 constitute a rotary cylinder driving motor.

Next, the operation of Embodiment 46 will be described.

The upper magnets 828 and 829 generate magnetic fields passing through the upper coil 806. When a current, flows through the upper coil 806, therefore, a driving force is generated in the upper magnet A 828 and the upper magnet B 829 along the vertical direction as viewed in FIG. 123. The upper holder 826 to which the upper magnet A 828 and the upper magnet B 829 are fixedly attached is supported by the upper and middle plate springs 832 and 834 with a smaller elastic coefficient in the vertical direction as viewed in the figure. Accordingly, the upper holder 826 is moved by a distance which corresponds to the driving force.

FIG. 129 shows amounts of deformation caused when the upper holder 826 moves, in the term of results of structure analyses according to the finite element method conducted on a quarter portion of the upper holder 826. In the figure, the upper holder 826 is indicated by broken lines.

In the figure, the same density portions are those where the same amount of deformation was produced. From the figure, it will be noted that the whole portions of the head base 835a are provided with the same density, or that the head base 835a is not inclined. FIG. 130 diagrammatically shows this deformation. As seen from the figure, even when the upper holder 826 is moved to cause the upper and middle plate springs 832 and 834 to deform, the head base 835 is moved while maintaining its parallel posture. In other words, when a current flows through the upper coil 806, the upper holder 826 and the magnetic head A 815 are displaced by the same distance.

The middle plate spring 834 is configured as shown in FIG. 126. Even when the upper holder 826 is moved, therefore, the inner periphery portion 834c and the head base 835b are not affected by this movement, and the lower holder 827 and the magnetic head S 816 are not moved.

In contrast, when a current flows through the lower coil 807, a driving force is generated in the lower magnet A 830 and the lower magnet B 831 along the vertical direction as viewed in FIG. 123. The lower holder 827 to which the lower magnet A 830 and the lower magnet B 831 are fixedly attached is supported by the middle and lower plate springs 834 and 833, and can be moved by a distance which corresponds to the current. In FIG. 126, the magnetic head B 816 is attached to the head base 835b which is integral with the inner periphery portion 834c of the middle plate spring 834. In the same manner as the magnetic head A 815, therefore, the head base 835b is moved without being inclined, by the same distance as the moving distance of the lower holder 827. Furthermore, the upper holder 826 is not affected through the middle plate spring 834 by the movement of the lower holder 827, so that the magnetic lead A 85 is not caused to move by the driving of the magnetic head B 816.

Embodiment 47

As Embodiment 47, a rotary magnetic head device in which the shaft mechanism of Embodiment 46 is modified will be described. FIG. 131 is a section view of the rotary magnetic head device of Embodiment 47. In the figure, 922 is a stationary shaft which is pressingly inserted into the lower portion of the stationary cylinder 801. The rotary cylinder 804 having a stepped disk-like flange 804 is provided with a bearing supporting portion 921 for supporting the pressure bearing 802 so that it is rotatably supported at a given position of the stationary shaft 922. A thrust bearing 923 is slidingly supported on the upper end face of the stationary shaft 922 by a screw 924, thereby positioning the rotary cylinder 804 in the axial direction. The other configurational points are the same as those of Embodiment 46. Therefore, components identical with or corresponding to those of Embodiment 46 are designated with the same reference numerals, and their description is omitted. Also in this configuration of the stationary shaft type, the same effects as those of Embodiment 46 can be achieved.

Embodiment 48

As Embodiment 48, a rotary magnetic head device in which the head moving mechanism including magnetic heads and magnets has another configuration will be described. FIG. 132 is a section view of the rotary magnetic head device of Embodiment 48. In the figure, 826 is the upper holder. The sectorial upper magnet B 829 and a sectorial upper balancer 926 are fixedly attached to an outer periphery portion of the upper holder 826. The sectorial lower magnet A 830 and a sectorial lower balancer 927 are fixedly attached to an outer periphery portion of the lower holder 827. A lower balancer 927 is disposed under the upper magnet B 829, and a lower magnet A 830 is disposed under the upper balancer 926. The other configurational points are the same as those of Embodiment 47. Therefore, identical or corresponding components are designated with the same reference numerals, and their description is omitted. Also in this configuration of the rotary magnetic head device in which the head moving mechanism has a different configuration, the same effects as those of Embodiment 47 can be achieved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A rotary magnetic head device comprising:
   a stationary cylinder having a guide face for guiding a magnetic tape, said guide face being formed on an outer periphery of said stationary cylinder;
   a shaft which supports said stationary cylinder;
   a rotary cylinder which is supported by said shaft, and which is rotatable;
   a plate spring which is attached to said rotary cylinder;
   a plurality of magnetic heads which are respectively mounted on a plurality of ends of said plate spring;
   a plurality of holders, which are supported by said plate spring so as to each be movable in an axial direction of said shaft, for moving said plate spring to respectively drive said plurality of magnetic heads in the axial direction, a plurality of magnets respectively being fixedly attached to said plurality of holders;
   a plurality of bobbins which oppose respective ones of said plurality of holders in a radial direction of said shaft, respective coils being wound on said plurality of bobbins;
   a plurality of position detection means, located at positions which oppose an end face of respective ones of said plurality of magnets in the radial direction, for detecting respective positions of said plurality of magnets in the axial direction; and
   current adjust means for adjusting a level of currents to be supplied to said respective coils to move said plurality of holders, in accordance with detection outputs of said plurality of position detection means.

2. A rotary magnetic head device comprising:
   a stationary cylinder having a guide face for guiding a magnetic tape, said guide face being formed on an outer periphery of said stationary cylinder;
   a shaft for supporting said stationary cylinder;
   a rotary cylinder which is supported by said shaft and which is rotatable;
   a plate spring attached to said rotary cylinder;
   a plurality of magnetic heads which are respectively mounted on a plurality of ends of said plate spring, for recording and reproducing signals on said magnetic tape;
   a plurality of holders supported by said plate spring to each be movable in an axial direction of said shaft, respective magnets being fixedly attached to said plurality of holders;

a plurality of bobbins mounted on said stationary cylinder to oppose respective ones of said plurality of holders in a radial direction of said shaft;

a plurality of coils being wound on respective ones of said plurality of bobbins such that when respective currents are selectively applied to said plurality of coils, said plurality of holders move so as to move said plurality of magnetic heads; and a plurality of head position detecting means, mounted on said rotary cylinder to respectively oppose said respective magnets in the radial direction of said shaft, for determining respective positions of said plurality of magnetic heads in the axial direction of said shaft in accordance with detected positions of said respective magnets and for generating the respective currents applied to said plurality of coils based on the determined positions of said magnetic heads.

* * * * *